(12) United States Patent
Kondo et al.

(10) Patent No.: US 7,824,830 B2
(45) Date of Patent: Nov. 2, 2010

(54) COATING LIQUID AND ELECTROPHOTOGRAPHIC PHOTORECEPTOR PREPARED USING THE COATING LIQUID

(75) Inventors: Maiko Kondo, Ebina (JP); Tatsuya Niimi, Numazu (JP); Naohiro Toda, Yokohama (JP); Takeshi Orito, Numazu (JP); Nozomu Tamoto, Numazu (JP); Katsuichi Ohta, Mishima (JP)

(73) Assignee: Ricoh Company Limited, Tokyo (JP)

( * ) Notice: Subject to any disclaimer, the term of this patent is extended or adjusted under 35 U.S.C. 154(b) by 1214 days.

(21) Appl. No.: 11/304,711

(22) Filed: Dec. 16, 2005

(65) Prior Publication Data

US 2006/0134540 A1 Jun. 22, 2006

(30) Foreign Application Priority Data

Dec. 20, 2004 (JP) ............................. 2004-367655
Jan. 14, 2005 (JP) ............................. 2005-007847

(51) Int. Cl.
*G03G 5/06* (2006.01)
(52) U.S. Cl. .................... 430/59.5; 430/64; 430/134
(58) Field of Classification Search ............... 430/59.5, 430/64, 134
See application file for complete search history.

(56) References Cited

U.S. PATENT DOCUMENTS

| 4,141,774 | A |   | 2/1979  | Ando et al.     |          |
|-----------|---|---|---------|-----------------|----------|
| 4,182,695 | A |   | 1/1980  | Horn et al.     |          |
| 4,308,311 | A |   | 12/1981 | Ogawa et al.    |          |
| 5,091,278 | A | * | 2/1992  | Teuscher et al. | 430/58.05 |
| 5,466,550 | A | * | 11/1995 | Kanemaru et al. | 430/59.6 |
| 5,871,876 | A |   | 2/1999  | Ikuno et al.    |          |
| 6,132,911 | A |   | 10/2000 | Niimi           |          |
| 6,218,533 | B1 |  | 4/2001  | Niimi           |          |
| 6,399,262 | B1 | * | 6/2002 | Oshiba et al.   | 430/58.2 |
| 6,558,863 | B2 |  | 5/2003  | Rokutanzono et al. |       |
| 6,562,531 | B2 |  | 5/2003  | Niimi           |          |
| 2003/0118927 | A1 | * | 6/2003 | Nakamura et al. | 430/65 |

(Continued)

FOREIGN PATENT DOCUMENTS

JP 4-324450 11/1992

(Continued)

OTHER PUBLICATIONS

A. Walch, A. Klimmek, W. Pusch, Methoxylated Polyamide and Polyimide Members, Nov. 1975, Journal of Polymer Science: Polymer Letters Eddition, vol. 13, Issue 11, pp. 701-709.*

(Continued)

*Primary Examiner*—Mark F Huff
*Assistant Examiner*—Rachel L Burney
(74) *Attorney, Agent, or Firm*—Oblon, Spivak, McClelland, Maier & Neustadt, L.L.P.

(57) ABSTRACT

A coating liquid including an N-alkoxymethylated nylon and a solvent, wherein the N-alkoxymethylated nylon includes one or more ions in an amount of from 200 to 500 ppm based on a weight of the N-alkoxymethylated nylon or one or more alkylamines in an amount of from 15 to 100 ppm based on a weight of the N-alkoxymethylated nylon. A photoreceptor including an electroconductive substrate; a charge blocking layer located overlying the substrate; a moiré preventing layer located overlying the charge blocking layer; and a photosensitive layer located overlying the moiré preventing layer, wherein the charge blocking layer is formed using the coating liquid.

33 Claims, 12 Drawing Sheets

U.S. PATENT DOCUMENTS

| | | |
|---|---|---|
| 2004/0033428 A1 | 2/2004 | Niimi |
| 2004/0120730 A1 | 6/2004 | Niimi et al. |
| 2004/0126686 A1 | 7/2004 | Toda et al. |
| 2004/0234875 A1 | 11/2004 | Toda et al. |
| 2004/0248024 A1* | 12/2004 | Suzuki et al. .................. 430/66 |
| 2005/0037274 A1* | 2/2005 | Shida et al. ................... 430/60 |
| 2005/0069797 A1 | 3/2005 | Niimi et al. |
| 2005/0175911 A1 | 8/2005 | Tamoto et al. |
| 2006/0057479 A1* | 3/2006 | Niimi et al. ................. 430/59.4 |

FOREIGN PATENT DOCUMENTS

| | | |
|---|---|---|
| JP | 5-80572 | 4/1993 |
| JP | 6-19174 | 1/1994 |
| JP | 8-82946 | 3/1996 |
| JP | 9-152731 | 6/1997 |
| JP | 2000-56494 | 2/2000 |
| JP | 3091657 | 7/2000 |
| JP | 2002-131936 | 5/2002 |
| JP | 2004-233755 | 8/2004 |
| JP | 2005-128496 | 5/2005 |

OTHER PUBLICATIONS

U.S. Appl. No. 11/611,179, filed Dec. 15, 2006, Niimi, et al.
U.S. Appl. No. 11/219,886, filed Sep. 7, 2005, Niimi, et al.
U.S. Appl. No. 12/020,713, filed Jan. 28, 2008, Matusmoto, et al.
U.S. Appl. No. 11/625,873, filed Jan. 23, 2007, Niimi.
U.S. Appl. No. 12/030,886, filed Feb. 14, 2008, Toda, et al.
U.S. Appl. No. 11/749,292, filed May 16, 2007, Inaba, et al.
U.S. Appl. No. 11/505,860, filed Aug. 18, 2006, Orito, et al.
U.S. Appl. No. 11/853,490, filed Sep. 11, 2007, Miyamoto, et al.
U.S. Appl. No. 11/855,553, filed Sep. 14, 2007, Inaba, et al.
U.S. Appl. No. 12/194,649, filed Aug. 20, 2008, Kita, et al.

* cited by examiner

BAKGROUND ART

BAKGROUND ART

COATING LIQUID AND ELECTROPHOTOGRAPHIC PHOTORECEPTOR PREPARED USING THE COATING LIQUID

BACKGROUND OF THE INVENTION

1. Field of the Invention

The present invention relates to a coating liquid for use in preparing an electrophotographic photoreceptor. In addition, the present invention also relates to an electrophotographic photoreceptor prepared using the coating liquid.

2. Discussion of the Background

Inorganic photosensitive materials such as Se, CdS and ZnO have been used as photosensitive materials for electrophotographic photoreceptors for use in electrophotographic image forming apparatus. However, in recent years organic photosensitive materials are mainly used for such electrophotographic photoreceptors because of having advantages in photosensitivity, thermal stability and toxicity. Among the electrophotographic photoreceptors including an organic photosensitive material, functionally-separated photoreceptors having a configuration such that a charge generation layer and a charge transport layer are overlaid are typically used now because of having good photosensitivity and durability.

In general, electrophotographic image forming apparatus such as printers, copiers and facsimile machines perform a series of image forming processes including a charging process, a light irradiation process, a development process, a transferring process and a fixing process. In addition, recent electrophotographic image forming apparatus have been improved so as to have high speed printability and high durability. Therefore, the photoreceptors used for such image forming apparatus are required to have good reliability such that high quality images can be produced even when the photoreceptors are repeatedly used for a long period of time. In particular, super high speed copiers produce huge volume of copies. The photoreceptors used for such super high speed copiers have to be frequently replaced with new photoreceptors, resulting in deterioration of the productivity of the copiers. In tandem-type color image forming apparatus in which four developing units are arranged in parallel, a photoreceptor having a relatively small diameter is typically used therefor to prevent jumboization of the image forming apparatus. Therefore, a need exists for a photoreceptor having higher durability.

When a photoreceptor is repeatedly used for image forming apparatus using a nega-posi developing method for a long period of time, a background development problem in that the background areas of images are soiled with toner particles is often caused. Specific examples of the causes for the background development problem are as follows:

(1) contamination and defects of the electroconductive substrate used for the photoreceptor;
(2) dielectric breakdown of the photosensitive layer of the photoreceptor;
(3) injection of carriers into the photosensitive layer from the electroconductive substrate;
(4) the dark decay property of the photoreceptor deteriorates; and
(5) thermal carriers generated in the photosensitive layer.

Among these causes, the cause (1) can be removed by cleaning the substrate before forming the photosensitive layer thereon. Therefore, it is an ultimate solution to improve the voltage resistance and electrostatic fatigue property of the photoreceptor, and to prevent occurrence of carrier injection from the substrate.

From this point of view, techniques such that an undercoat layer (or an intermediate layer) is formed between an electroconductive substrate and a photosensitive layer have been proposed. For example, published unexamined Japanese patent application No. (hereinafter referred to as JP-A) 47-6341 discloses an intermediate layer including a nitrocellulose, and JP-A 60-66258 discloses an intermediate layer including a nylon resin. In addition, JP-A 52-10138 discloses an intermediate layer including a maleic acid based resin, and JP-A 58-105155 discloses an intermediate layer including a polyvinyl alcohol resin.

However, these intermediate layers are a resin layer and have a high electric resistance. Therefore, the residual potential of the photoreceptors increases, resulting in decrease of image density when images are formed by a nega-posi developing method. In addition, such intermediate layers exhibit ionic conduction caused by impurities included therein, and therefore the electric resistance thereof increases particularly under low temperature and low humidity conditions, resulting in increase of the residual potential. Therefore, the intermediate layers have to be thinned, and thereby a problem in that the charge properties of the resultant photoreceptors deteriorate after repeated use is caused.

In attempting to solve this problem (i.e., in attempting to control the resistance of an intermediate layer), techniques in that an electroconductive material is included in an intermediate layer have been proposed. For example, JP-A 51-65942 discloses an intermediate layer in which carbon or a chalcogen based material is dispersed in a crosslinked resin. JP-A 52-82238 discloses an intermediate layer which is crosslinked using an isocyanate crosslinking agent upon application of heat thereto and which includes a quaternary ammonium salt. JP-A 55-113045 discloses a resinous intermediate layer including a resistance controlling agent. JP-A 58-93062 discloses a resinous intermediate layer including an organic metal compound. However, the photoreceptors including such a resinous intermediate layer have a drawback in that images having moiré fringes are produced when the photoreceptors are used for image forming apparatus using coherent light such as laser light for image writing.

In attempting to control the resistance of the intermediate layer while preventing occurrence of the moiré fringe problem, intermediate layers including a filler have been proposed. For example, JP-A 58-58556 discloses a resinous intermediate layer including aluminum oxide or tin oxide. JP-A 60-111255 discloses a resinous intermediate layer including a particulate electroconductive material. JP-A 59-17557 discloses an intermediate layer including magnetite. JP-A 60-32054 discloses a resinous intermediate layer including titanium oxide and tin oxide. JP-As 64-68762, 64-68763, 64-73352, 64-73353, 01-118848 and 01-118849 have disclosed resinous intermediate layers including a powder such as borides, nitrides, fluorides and oxides. In these resinous intermediate layers including a filler, the content of a filler in the intermediate layers has to be increased (i.e., the content of a resin has to be decreased) so that the resultant intermediate layers have the desired electric properties. Therefore, the adhesion of the intermediate layers to an electroconductive substrate deteriorates, and thereby a peeling problem in that the intermediate layers are separated from the electroconductive substrate tends to occur. Particularly, when the substrate is a flexible belt, the peeling problem occurs more frequently.

In attempting to solve the peeling problem, photoreceptors having a layered intermediate layer have been proposed. The proposed photoreceptors are broadly classified into two types, which have structures as illustrated in FIGS. 1 and 2.

The photoreceptors of first type, which have a structure as illustrated in FIG. 1, include an electroconductive substrate 1, and a resin layer 2 including a filler, a resin layer 3 including no filler, and a photosensitive layer 4, which are overlaid in this order. The photoreceptors of second type, which have a structure as illustrated in FIG. 2, include an electroconductive substrate 1, and a resin layer 3 including no filler, a resin layer 2 including a filler and a photosensitive layer 4 which are overlaid in this order.

Specifically, in the first type photoreceptors, the electroconductive layer 2 includes a filler having a low electric resistance and is formed on the electroconductive substrate 1. In addition, the resin layer 3 is formed thereon. The intermediate layers of this type have been disclosed in JP-As 58-95351, 59-93453, 04-170552, 06-208238, 06-222600, 08-184979, 09-43886, 09-190005 and 09-288367.

In the intermediate layers of this type, the electroconductive layer 2 serves as an electrode. Therefore the intermediate layers are electrically the same as the resinous intermediate layers mentioned above, and thereby the above-mentioned electrostatic problem caused by the photoreceptors having a resinous intermediate layer cannot be solved. Since the electroconductive layer includes a filler, occurrence of moiré fringes can be prevented because the light beam for image writing scatter. When such a photoreceptor is charged, charges having a polarity opposite to that of the charges formed on the surface of the photoreceptor reach the interface between the electroconductive layer 2 and the resinous layer 3. However, when the electroconductive layer 2 has a relatively high resistance, charges are not well injected from the electroconductive substrate 1, and the resistance of the layer 2 increases after long repeated use, thereby increasing the residual potential of the photoreceptor. In addition, in order to avoid the problem caused by defects of the electroconductive substrate 1, the layer 2 has to have a thickness not less than about 10 μm. In this case, the residual potential increasing problem remarkably occurs.

JP-A 04-324450 discloses a photoreceptor having a configuration as illustrated in FIG. 1 in which the resinous layer 3 includes a polyamide resin including ions in an amount of from 0.001% to 0.02% by weight. It is described therein that the resultant photoreceptor has good environmental stability and can produce images with few black spot images.

In the photoreceptors of second type, a positive hole blocking layer is formed on the electroconductive substrate, and a resin layer including a filler having a low resistance or an electroconductive filler is formed on the positive hole blocking layer. Such a layered intermediate layer has been disclosed in JP-As 05-80572 and 06-19174. The photoreceptors of this type hardly cause the background development problem because the intermediate layer thereof has a positive hole blocking function. In addition, since a filler-containing layer is present as an upper layer, residual potential hardly increases. Specifically, injection of positive holes from the electroconductive substrate 1 to the photosensitive layer 4 can be avoided, and thereby the background development problem in a nega-posi development method is hardly caused. In addition, since a charge blocking layer is formed as a lower layer, the degree of increase of residual potential of the photoreceptor after long repeated use is lower than in the case where the charge blocking layer is formed as an upper layer.

The resins for use in such intermediate layers have to fulfill the following requirements:

(1) The intermediate layer has such a good solvent resistance as not to be easily dissolved in a solvent or to be easily deformed by the solvent when a photosensitive layer having a charge generation layer (hereinafter referred to as a CGL) and a charge transport layer (hereinafter referred to as a CTL) is formed on the intermediate layer by a wet coating method using a coating liquid including such a solvent;
(2) The intermediate layer has good electric barrier property;
(3) The intermediate layer has such good film forming property as to hardly include coating defects; and
(4) The intermediate layer has good adhesion to an electroconductive substrate.

Therefore, polyamide resins (preferably N-alkoxymethylated polyamide resins) are typically used for the intermediate layer. For example, JP-A 09-265202 discloses an undercoat layer including an alkoxymethylated nylon copolymer having an alkoxymethylation degree of from 5 to 30%. JP-A 2002-107984 discloses an intermediate layer including a crosslinked N-alkoxymethylated polyamide and an inorganic pigment. Japanese patent No. 3,086,965 (i.e., JP-A 04-330455) discloses an intermediate layer including an N-alkoxymethylated polyamide copolymer having a main unit obtained from λ-amino-n-lauric acid. In addition, Japanese patent No. 3,226,110 (i.e., JP-A 05-11483) discloses an intermediate layer including a polyamide resin having a unit having a specific formula. Thus, it is well known to use an intermediate layer (or an undercoat layer) including an N-alkoxymethylated nylon for preventing occurrence of injection of charges from an electroconductive substrate (i.e., for preventing occurrence of the background development problem).

However, the photoreceptors having a layered intermediate layer or an intermediate layer including an N-alkoxymethylated nylon tend to have a relatively high residual potential. In particular, the photoreceptors have a seriously high residual potential after long repeated use. This is a problem to be solved. In addition, an N-alkoxymethylated nylon resin having a high hygroscopic property is used for the intermediate layer, the resistance of the layer seriously changes, and the residual potential of the photoreceptors seriously increases under low temperature and low humidity conditions, resulting in occurrence of the background development problem. In addition, the photoreceptors have a low potential under high temperature and high humidity conditions, and thereby the background development problem is also caused. Namely, the photoreceptors have large environmental dependence.

In attempt to solve the problem, Japanese patent No. 2,718,044 (i.e., JP-A 01-177556) discloses an undercoat layer including an N-alkoxymethylated nylon resin including Na, Ca and P atoms as impurities, each of which is included in the resin in an amount of not higher than 10 ppm. JP-A 06-93129 discloses an intermediate layer including an N-alkoxymethylated 6-nylon including components having a molecular weight not higher than 1000 in an amount of not higher than 10 ppm. Japanese patent No. 2,887,209 (i.e., JP-A 04-240862) discloses an intermediate layer which is formed using an alcohol-soluble nylon which has been subjected to a contact treatment using a mixture solvent of an alcohol and a ketone.

These intermediate layers use an N-alkoxymethylated nylon resin which have been treated to an impurity removing treatment to improve the electrostatic property of the resultant photoreceptors. However, the intermediate layer disclosed in Japanese patent No. 2,718,044 can avoid the residual potential increasing problem under high temperature and high humidity conditions but cannot solve the residual potential increasing problem under low temperature and low humidity conditions because the resistance of the intermediate layer seriously increases under low temperature and low humidity conditions. The photoreceptor disclosed in JP-A 06-93129 has good stability at room temperature, but causes the background development problem under high temperature and high humidity conditions and low temperature and low humidity conditions due to decrease of the potential or increase of the residual potential. The photoreceptor disclosed in Japanese patent No. 2,887,209 has good potential contrast even under high humidity conditions and low temperature and low humidity conditions, but the long-term durability of the photoreceptor is not satisfactory. Therefore, the photoreceptor cannot be used for recent high speed electrophotographic image forming apparatus using a photoreceptor having a small diameter.

In addition, N-alkoxymethylated nylon resins are soluble in only alcoholic solvents with minor exceptions. Therefore, a coating liquid including an N-alkoxymethylated nylon resin and an alcoholic solvent is typically used for forming an intermediate layer. However, such coating liquid tends to cause a problem in that the coating liquid becomes clouded after long preservation particularly under low temperature conditions. If such a coating liquid is coated, coating defects are formed in the resultant intermediate layer. This is not described in the above-mentioned patents and publications.

JP-A 09-152731 discloses a technique in that by adding a halogenated hydrocarbon to an alcoholic intermediate layer coating liquid, the long-term preservability of the coating liquid can be improved. However, it is not preferable to use a halogenated hydrocarbon in view of environmental protection, and therefore the method cannot be practically used.

In addition, JP-A 2000-56494 discloses a technique in that benzyl alcohol is added to an alcoholic intermediate layer coating liquid. By using this technique, the long-term preservability of the coating liquid can be improved. However, it takes a long time to dry the coating liquid (i.e., it takes a long time until the coated layer achieves a finger-touchable drying condition), and thereby coating defects tend to be caused in the coated layer. In addition, it is necessary to dry the coated layer at a relatively high temperature because benzyl alcohol has a high boiling temperature.

Because of these reasons, a need exists for a photoreceptor which has an intermediate layer without coating defects and which has such a good charge stability as to be able to produce high quality images without causing the background development problem even when the environmental conditions are changed.

SUMMARY OF THE INVENTION

As an aspect of the present invention, a coating liquid is provided which includes an N-alkoxymethylated nylon including one or more ions in an amount of from 200 to 500 ppm based on the weight of the N-alkoxymethylated nylon or one or more alkyl amines in an amount of from 15 to 100 ppm based on the weight of the N-alkoxymethylated nylon.

As another aspect of the present invention, a photoreceptor is provided which includes an electroconductive substrate, a charge blocking layer located overlying the substrate, a moiré preventing layer located overlying the charge blocking layer, and a photosensitive layer located overlying the moiré preventing layer, wherein the charge blocking layer is formed using the coating liquid mentioned above. In this regard, "overlying" can include direct contact and allow for intermediate layers.

The alkyl amines preferably include a primary amine.

The charge blocking layer preferably has a thickness of not less than 0.1 μm and less than 2.0 μm.

The moiré preventing layer preferably includes a binder resin and an inorganic pigment, wherein the volume ratio of the inorganic pigment to the binder resin is preferably from 1/1 to 3/1. The binder resin is preferably a thermally crosslinked resin and the inorganic pigment is preferably titanium oxide.

The photosensitive layer preferably includes a titanyl phthalocyanine as a charge generation material (hereinafter referred to as a CGM). It is preferable that the titanyl phthalocyanine is a titanyl phthalocyanine crystal having an average primary particle diameter not greater than 0.25 μm and an X-ray diffraction spectrum such that a maximum peak is observed at a Bragg ($2\theta$) angle of $27.2°\pm0.2°$; a peak is observed at each of Bragg ($2\theta$) angles of $9.4°\pm0.2°$, $9.6°\pm0.2°$ and $24.0°\pm0.2°$; a lowest angle peak is observed at an angle of $7.3°\pm0.2°$; no peak is observed between the lowest angle peak and the $9.4°$ peak; and no peak is observed at a Bragg ($2\theta$) angle of $26.3°\pm0.2°$, when a Cu—K$\alpha$ X-ray having a wavelength of 1.542 Å is used.

The photosensitive layer is preferably prepared using a coating liquid prepared by a method including the steps of dispersing the titanyl phthalocyanine crystal in a solvent such that the titanyl phthalocyanine crystal therein has a particle diameter distribution such that an average particle diameter is not greater than 0.3 μm and a standard deviation is not greater than 0.2 μm to prepare a dispersion; and filtering the dispersion using a filter having an effective pore diameter not greater than 3 μm such that the titanyl phthalocyanine crystal has an average primary particle diameter of not greater than 0.25 μm.

The titanyl phthalocyanine crystal is preferably prepared by a method including the steps of providing a titanyl phthalocyanine pigment (raw material) having an amorphous state or a low crystallinity (hereinafter referred to as phthalocyanine pigment having an amorphous state or amorphous titanyl phthalocyanine), which has an average particle diameter not greater than 0.1 μm and has a second X-ray diffraction spectrum such that a maximum peak having a half width not less than 1° is observed at a Bragg ($2\theta$) angle of from 7.0° to 7.5° with a tolerance of $\pm0.2°$; changing the crystal form of the amorphous titanyl phthalocyanine in an organic solvent in the presence of water so that the resultant titanyl phthalocyanine crystal has the above-mentioned X-ray diffraction spectrum; and filtering the dispersion including the titanyl phthalocyanine crystal before the average primary particle diameter thereof exceeds 0.25 μm, to prepare the titanyl phthalocyanine crystal.

The titanyl phthalocyanine crystal is preferably synthesized using raw materials including no halogen atom.

The amorphous titanyl phthalocyanine is preferably prepared by an acid paste method, and then washed using ion-exchanged water to an extent such that the ion-exchange water, which has been used for washing, has a pH of from 6 to 8 and/or a specific conductivity not greater than 8 μS/cm.

In the crystal changing process, the amount of the organic solvent is preferably not less than 30 times that of the amorphous titanyl phthalocyanine.

It is preferable that the photoreceptor further includes a protective layer located overlying the photosensitive layer. The protective layer preferably includes an inorganic pigment such as metal oxides having a resistivity not less than $10^{10}$ $\Omega\cdot$cm. The binder resin is preferably a crosslinked resin. The crosslinked resin is preferably prepared by reacting and crosslinking a radical polymerizable polyfunctional monomer having three or more functional groups and no charge transport structure and a radical polymerizable monofunctional monomer having a charge transport structure.

These and other objects, features and advantages of the present invention will become apparent upon consideration of the following description of the preferred embodiments of the present invention taken in conjunction with the accompanying drawings.

DETAILED DESCRIPTION OF THE INVENTION

Figure 1:
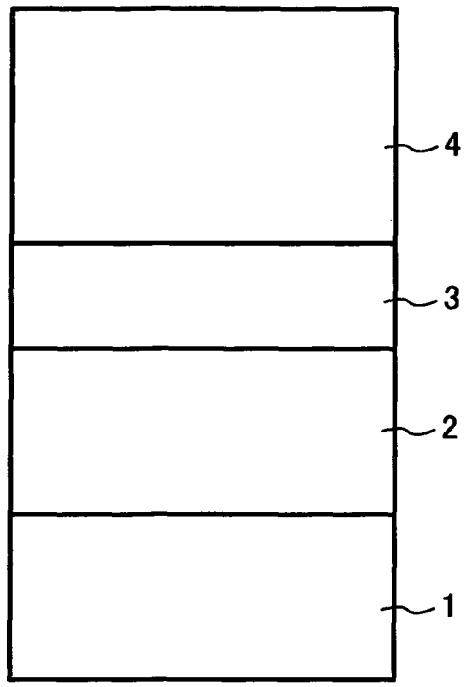
FIG. 1 is a schematic cross sectional view illustrating a conventional photoreceptor.
Figure 2:
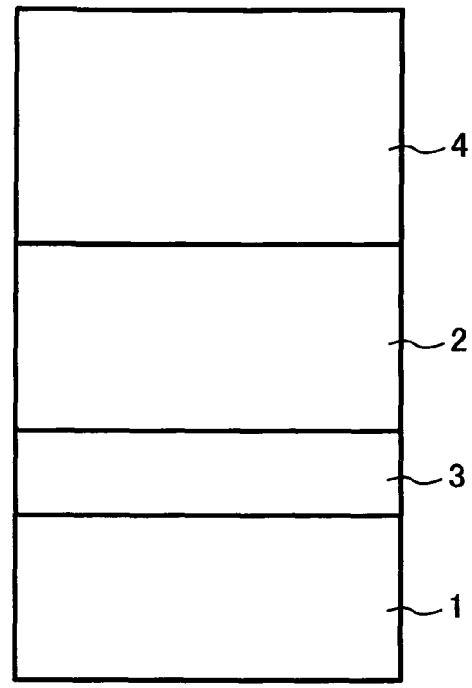
FIG. 2 is a schematic cross sectional view illustrating another conventional photoreceptor.

The present invention will be now explained in detail. At first, N-alkoxymethylated nylons for use in the coating liquid and the photoreceptor of the present invention will be explained N-alkoxymethylated nylons are typically prepared by modifying polyamide 6, polyamide 12 or a polyamide copolymer including a unit of polyamide 6 and/or polyamide 12 using a method such as the method proposed by T. L. Cairns in J. Am. Chem. Soc. 71, P651 (1949). Specifically, N-alkoxymethylated nylons are prepared by substituting one or more of the hydrogen atoms in the amide bonds of an original polyamide with an alkoxymethyl group. The alkoxyl group of the N-alkoxymethylated nylons for use in the photoreceptor of the present invention preferably has from 1 to 10 carbon atoms because the N-alkoxymethylated nylons can be easily dissolved in the solvent used for preparing the coating liquid. Specific examples of the N-alkoxymethylated nylons having an alkoxyl group having from 1 to 10 carbon atoms include methoxymethylated nylons, ethoxymethylated nylons, butoxymethylated nylons, etc. Among these nylons, methoxymethylated nylons are more preferably used. The hydrogen atoms in the amide bonds are preferably substituted at a substitution rate not less than 15% by mole so that the resultant charge blocking layer have small moisture absorbing property (i.e., the layer has good environmental stability).

As a result of the present inventors' study, it is found that a coating liquid including an N-alkoxymethylated nylon including one or more ions in an amount of from 200 to 500 ppm based on the weight of the N-alkoxymethylated nylon does not cause the clouding problem in that the coating liquid becomes clouded as the nylon is crystallized with time in the coating liquid. Therefore, a charge blocking layer without coating defects can be formed by coating the coating liquid. It is also found that the same is true for a case where an N-alkoxymethylated nylon including one or more alkylamines in an amount of from 15 to 100 ppm based on the weight of the N-alkoxymethylated nylon is used for the coating liquid. In general, the higher substitution rate an N-alkoxymethylated nylon has, the higher crystallinity the nylon has. Therefore, a coating liquid including an N-alkoxymethylated nylon having a high substitution rate tends to cause the clouding problem and to increase the viscosity thereof. It is considered that by properly controlling the concentration of ions included in an N-alkoxymethylated nylon, the affinity of the N-alkoxymethylated nylon for a solvent can be improved and thereby crystallization of the nylon can be prevented.

When the total ion concentration is too low, occurrence of the clouding problem and the viscosity increasing problem under low temperature conditions or after long preservation can be hardly prevented. Therefore, the resultant layer tends to have unevenness and/or coating defects. In addition, the residual potential of the photoreceptor prepared by using such a coating liquid tends to increase after the photoreceptor is repeatedly used, resulting in formation of defective images such as low density images. Further, a problem in that uneven density images are formed and/or the background development problem are caused due to the uneven charge blocking layer.

In contrast, when the total ion concentration is too high, the resultant photoreceptor is largely influenced by moisture in the air surrounding the photoreceptor particularly under high temperature and high humidity conditions and thereby the charging property of the photoreceptor is deteriorated, although the coating liquid has good preservability. In addition, defective images such as blurred images are formed and the background development problem is caused.

The total amount of ions included in the N-alkoxymethylated nylon used for the coating liquid of the present invention is preferably from 250 to 500 ppm and more preferably from 270 to 400 ppm.

When the total amounts of alkyl amines included in the N-alkoxymethylated nylon used for the coating liquid of the present invention is too low, the problems occurred when the total ion concentration is too low are also caused. When the concentration of alkyl amines included in the N-alkoxymethylated nylon is too high, the problems occurred when the total ion concentration is too high are also caused.

The total amounts of alkyl amines included in the N-alkoxymethylated nylon is preferably from 20 to 80 ppm, and more preferably from 30 to 60 ppm.

Specific examples of the alkyl amines included in the N-alkoxymethylated nylon include primary amines, secondary amines and tertiary amines. Among these amines, primary amines are preferably used. Suitable primary amines include methyl amine, ethyl amine and propyl amine. Among these amines, methyl amine is preferably used.

The content of an N-alkoxymethylated nylon in the coating liquid is important because of influencing the preservability of the coating liquid. Specifically, when the content is too high, the coating liquid easily causes the clouding problem. Since the coating liquid is used for forming an intermediate layer of a photoreceptor, which layer is typically thin, the solid content of the coating liquid is preferably low. From these viewpoints, the content of an N-alkoxymethylated nylon in the coating liquid is preferably from 0.1 to 20% by weight, and more preferably from 1 to 10% by weight, based on the total weight of the coating liquid.

Suitable solvents for use in the coating liquid include alcohol solvents such as methanol, ethanol, propanol, butanol, mixtures thereof, etc. Among these alcohol solvents, methanol is preferably used because N-alkoxymethylated nylons have a higher solubility in methanol.

However, when methanol is used alone, the resultant coated layer easily causes a blushing problem in that the resultant coated layer is clouded. This is because methanol has a high evaporation speed and a high evaporation latent heat. Therefore, it is preferable to use a mixture of methanol and one or more alcohols each having an evaporation speed lower, than that of methanol. Suitable alcohols to be mixed with methanol include alcohols having, three or more carbon atoms such as n-propanol, iso-propanol, n-butanol, iso-butanol, tert-butanol, n-pentanol, etc. When an alcohol having too large carbon number is included in the coating liquid, the finger-touch drying time, which means the drying time from a time which the coating liquid is coated to a time at which the coated layer is dried to an extent such that the layer is not adhered to a finger, seriously increases. In addition, the solubility of an N-alkoxymethylated nylon included in the coating liquid decreases. Therefore, the carbon number of the alcohols to be mixed with methanol is preferably not greater than 6.

In addition, it is preferable to add water to the coating liquid including an alcoholic mixture solvent. By adding water, solubility of an N-alkoxymethylated nylon in the alcoholic mixture solvent can be improved, and thereby the preservation stability of the coating liquid can be improved. The content of water in the coating liquid is preferably from 5 to 20% by weight based on the total weight of the solvents included in the coating liquid in view of film formability and stability of the coating liquid.

Although running water can be used as for the coating liquid, it is preferable to use distilled water or ion-exchange water. In addition, it is preferable that water is filtered before use using a filter having openings of proper size.

The charge blocking layer coating liquid including this coating liquid can further include other materials such as fillers, and additives such as electron accepting materials, crosslinking agents and dispersants. In addition, organic solvents other than alcohols can also be added thereto.

Then the terms "total amount of ions (total ion concentration)" and "total amount of alkyl amines" used in this application will be explained.

When the total amount of ions or alkyl amines in a binder resin is determined, the following method is typically used:
(1) the binder resin is dissolved in a predetermined amount of an organic solvent, which is not mixed with water;
(2) the solution is then mixed with a predetermined amount of water;
(3) the mixture is shaken to transfer the ions or alkyl amines from the oil phase to the aqueous phase; and
(4) the amount of the ions or alkyl amines included in the aqueous phase is determined by ion chromatography.

However, since N-alkoxymethylated nylons used for the coating liquid of the present invention are soluble in alcohols, the above-mentioned method cannot be used. Therefore, the following method is used.
(1) an N-alkoxymethylated nylon is pulverized such that the resultant particles have a particle diameter as small as possible;
(2) the resultant particles are dispersed in a predetermined amount of ion-exchange water (or pure water, i.e., a dispersing medium) such that the ions or alkyl amines in the nylon are dissolved in water;
(3) the dispersion is then filtered using a filter having openings of proper size to separate the nylon from dispersing medium; and
(4) the amount of the ions or alkyl amines in the dispersing medium is determined by ion chromatography.

When an N-alkoxymethylated nylon is pulverized, a mechanical pulverizing method is typically used. If particles having a large particle diameter are present in the resultant particles, the specific surface area of the particles is small and thereby the ions present in the particles cannot be fully dissolved in ion-exchange water. Therefore, the resultant particles preferably have a particle diameter not greater than 1 mm. It is preferable to pulverize an N-alkoxymethylated nylon using a frost shattering method because the resultant particles have a relatively small particle diameter.

In this method, it is important that all the ions or alkyl amines in a sample are dissolved into ion-exchange water. Therefore, it is preferable to re-disperse the filtered cake (i.e., the N-alkoxymethylated nylon particles) into fresh ion-exchange water to confirm that the N-alkoxymethylated nylon particles have no residual ions or alkyl amines. In this case, if ions (or alkyl amines) are detected from the second, (or later) dispersion, the ion checking operation is repeated until the dispersion includes no residual ions (or alkyl amines). In this regard, the ions (or alkyl amines) detected in the second to last ion (or alkyl amine) checking operations are added to the amount of ions (or alkyl amines) determined in the first ion (or alkyl amine) checking operation to determine the total amount of ions (or alkyl amines) included in the sample.

When ions (or alkyl amines) included in a sample is extracted with ion-exchange water, it is preferable to heat ion-exchange water in order to accelerate releasing of ions (or alkyl amines) from the sample. However, it is not preferable to heat ion-exchange water to a high temperature because ion-exchange water is evaporated and thereby the amount of ions (or alkyl amines) cannot be precisely determined. Therefore, it is preferable to heat ion-exchange water to about 50° C.

When the amount of ions is determined, the ions are not particularly limited and the total amount of all the ions included in an N-alkoxymethylated nylon is determined. N-alkoxymethylated nylons typically include cations such as sodium, calcium and ammonium ions, and anions such as chlorine, nitrate, sulfate and phosphate ions.

The "total amount of ions (or alkyl amines)" used in this application means the thus determined total amount of ions (or alkyl amines).

Then the way to control the total amount of ions (or alkyl amines) included in an N-alkoxymethylated nylon will be explained.

(1) Re-Precipitation Method

At first, an N-alkoxymethylated nylon is dissolved in a good solvent to prepare a solution. Then a poor solvent is added to the solution to precipitate the nylon. Specific examples of the good solvents include alcohols. Among alcohols, methanol is preferably used. Specific examples of the poor water include solvents except alcohols. Among the solvents, water and acetone are preferably used.

(2) Washing Method

An N-alkoxymethylated nylon is washed with a solvent which can dissolve ionic materials but cannot dissolve the nylon. Suitable solvents for use in the washing treatment include water. By washing an N-alkoxymethylated nylon with water, an excess amount of ions or alkyl amines can be removed therefrom.

After an N-alkoxymethylated nylon is treated by the method (1) or (2), the total amount of ions (or alkyl amines) in the treated N-alkoxymethylated nylon is determined. If a working curve which illustrates the relationship between the total amount of ions (or alkyl amines) before and after a treatment while changing the conditions (such as treatment time and number of treatments performed), is previously prepared, the treatment conditions can be empirically determined if the total amount of ions (or alkyl amines) before the treatment and the desired total amount of ions are known.

Alternatively, the following method can be used to control the total amount of ions (or alkyl amines):

(1) the ions or alkyl amines are completely removed from an N-alkoxymethylated nylon; and
(2) a predetermined amount of ions are included in the deionized (or de-alkylamine) N-alkoxymethylated nylon.

Specifically, an N-alkoxymethylated nylon is washed plural times with ion-exchange water by the washing method mentioned above to remove ions (or alkyl amines) included in the nylon. Alternatively, the nylon is dissolved in an alcoholic solvent, and then the solution is subjected to an ion exchange treatment using an ion exchange resin to remove ions (or alkyl amines) included in the nylon. The thus treated nylon is dissolved in an organic solvent and then a predetermined amount of ionic materials or alkyl amines are added thereto, followed by solidification of the nylon. Thus, an N-alkoxymethylated nylon including a predetermined amount of ions (or alkyl amines) can be prepared.

Then the photoreceptor of the present invention will be explained referring to drawings.

Figure 3:
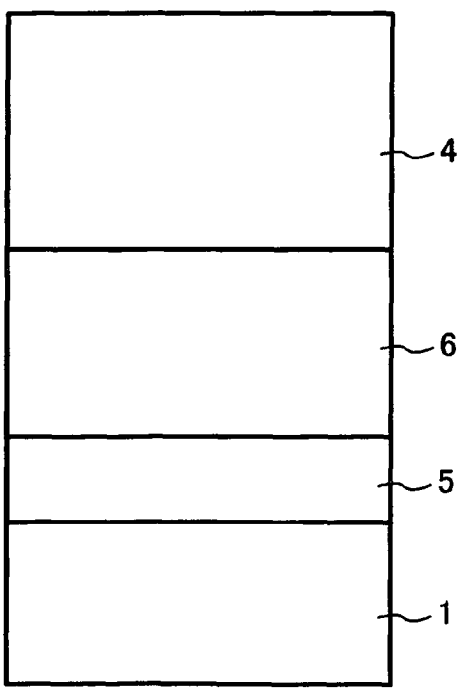
FIG. 3 is a schematic cross sectional view illustrating an example of the photoreceptor of the present invention.

FIG. 3 illustrates a cross section of an example of the photoreceptor of the present invention. The photoreceptor has an electroconductive substrate 1, a charge blocking layer 5, a moiré preventing layer 6 and a photosensitive layer 4 including the titanyl phthalocyanine crystal which has the specific crystal form mentioned above and which has the specific average particle diameter mentioned above, wherein the layers 5, 6 and 4 are overlaid on the electroconductive substrate 1 in this order.

Figure 4:
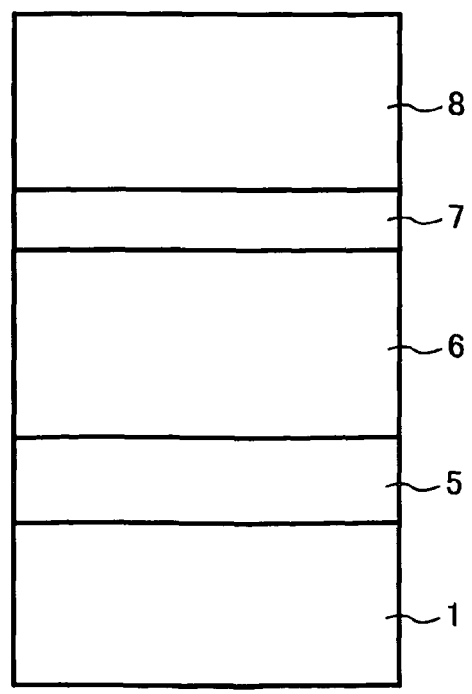
FIG. 4 is a schematic cross sectional view illustrating another example of the photoreceptor of the present invention.

FIG. 4 illustrates a cross section of another example of the photoreceptor of the present invention. The photoreceptor has an electroconductive substrate 1, a charge blocking layer 5, a moiré preventing layer 6, a charge generation layer (CGL) 7, and a charge transport layer (CTL) 8, wherein the layers 5, 6, 7 and 8 are overlaid on the electroconductive substrate 1 in this order.

Figure 5:
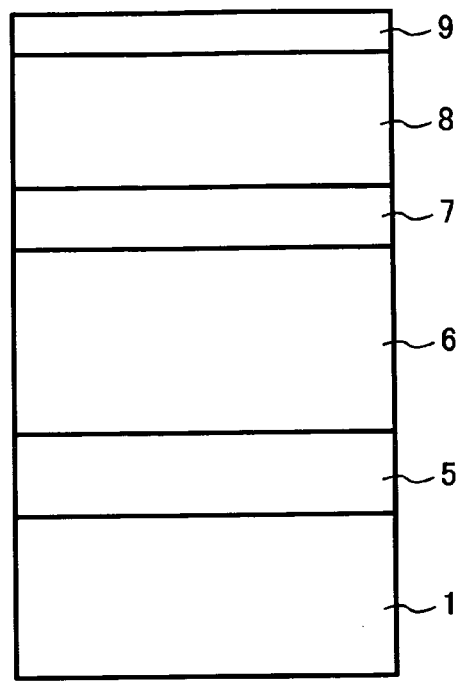
FIG. 5 is a schematic cross sectional view illustrating yet another example of the photoreceptor of the present invention.

FIG. 5 illustrates a cross section of yet another example of the photoreceptor of the present invention. The photoreceptor has an electroconductive substrate 1, a charge blocking layer 5, a moiré preventing layer 6, a CGL 7, a CTL 8, and a protective layer 9, wherein the layers 5, 6, 7, 8 and 9 are overlaid on the electroconductive substrate 1 in this order.

Among these photoreceptors, the photoreceptor having a configuration illustrated in FIG. 4 or 5 is preferably used.

Suitable materials for use as the electroconductive substrate 1 include materials having a volume resistivity not greater than $10^{10}$ Ω·cm. Specific examples of such materials include plastic cylinders, plastic films or paper sheets, on the surface of which a metal such as aluminum, nickel, chromium, nichrome, copper, gold, silver, platinum and the like, or a metal oxide such as tin oxides, indium oxides and the like, is formed by deposition or sputtering. In addition, a plate of a metal such as aluminum, aluminum alloys, nickel and stainless steel can be used. A metal cylinder can also be used as the substrate 1, which is prepared by tubing a metal such as aluminum, aluminum alloys, nickel and stainless steel by a method such as impact ironing or direct ironing, and then treating the surface of the tube by cutting, super finishing, polishing and the like treatments. Further, endless belts of a metal such as nickel, stainless steel and the like can also be used as the substrate 1.

Furthermore, substrates, in which a coating liquid including a binder resin and an electroconductive powder is coated on the supports mentioned above, can be used as the substrate 1. Specific examples of such an electroconductive powder include carbon black, acetylene black, powders of metals such as aluminum, nickel, iron, nichrome, copper, zinc, silver and the like, and metal oxides such as electroconductive tin oxides, ITO and the like. Specific examples of the binder resin include known thermoplastic resins, thermosetting resins and photo-crosslinking resins, such as polystyrene, styrene-acrylonitrile copolymers, styrene-butadiene copolymers, styrene-maleic anhydride copolymers, polyesters, polyvinyl chloride, vinyl chloride-vinyl acetate copolymers, polyvinyl acetate, polyvinylidene chloride, polyarylates, phenoxy resins, polycarbonates, cellulose acetate resins, ethyl cellulose resins, polyvinyl butyral resins, polyvinyl formal resins, polyvinyl toluene, poly-N-vinyl carbazole, acrylic resins, silicone resins, epoxy resins, melamine resins, urethane resins, phenolic resins, alkyd resins and the like resins.

Such an electroconductive layer can be formed by coating a coating liquid in which an electroconductive powder and a binder resin are dispersed or dissolved in a proper solvent such as tetrahydrofuran, dichloromethane, methyl ethyl ketone, toluene and the like solvent, and then drying the coated liquid.

In addition, substrates, in which an electroconductive resin film is formed on a surface of a cylindrical substrate using a heat-shrinkable resin tube which is made of a combination of a resin such as polyvinyl chloride, polypropylene, polyesters, polyvinylidene chloride, polyethylene, chlorinated rubber and fluorine-containing resins (such as TEFLON), with an electroconductive material, can also be used as the substrate 1.

Then the charge blocking layer will be explained.

The charge blocking layer includes an N-alkoxymethylated nylon including ions in an amount of from 200 to 500 ppm. Alternatively, the charge blocking layer includes N-alkoxymethylated nylon including alkyl amines in an amount of from 15 to 100 ppm. The function of the charge blocking layer 5 is to prevent the charges, which are induced in the electrode (i.e., the electroconductive substrate 1) and have a polarity opposite to that of the voltage applied to the photoreceptor by a charger, from being injected to the photosensitive layer. Specifically, when negative charging is performed, the charge blocking layer 5 prevents injection of positive holes to the photosensitive layer. In contrast, when positive charging is performed, the charge blocking layer 5 prevents injection of electrons to the photosensitive layer.

According to the present inventors' study, it is preferable to control the total amount of ions (or alkyl amines) within a range of from 200 to 500 ppm (or from 15 to 100 ppm). In this case, the resultant photoreceptor can produce high quality images without causing the residual potential increasing problem even under high humidity and high temperature conditions and low temperature and low humidity conditions.

Since the charge blocking layer including an N-alkoxymethylated nylon is a resin film, the layer itself is insulating. Although such a resin film can prevent injection of charges from the substrate to the photosensitive layer, resulting in prevention of occurrence of the background development problem, a problem in that transportation of electrons (or positive charges) from the CGL to the substrate is blocked tends to occur. By including a proper amount of ions or alkyl amines in the N-alkoxymethylated nylon, the problem can be solved while preventing injection of charges from the substrate to the photosensitive layer. This effect can be well produced even under low temperature and low humidity conditions.

In addition, electroconductive polymers having a rectification property, and layers including a resin or a compound having an electron accepting or donating property, which is determined depending on the polarity of the charges to be formed on the surface of the photoreceptor, can also be added to the charge blocking layer.

The charge blocking layer 5 preferably has a thickness not less than 0.1 µm and less than 2.0 µm, and more preferably from 0.5 µm to 1.0 µm. When the charge blocking layer is too thick, the residual potential of the photoreceptor increases after charging and imagewise light irradiation are repeatedly performed particularly under low temperature and low humidity conditions. In contrast, the charge blocking layer is too thin, the charge blocking effect is hardly produced. When the charge blocking layer 5 is formed, one or more materials such as crosslinking agents, solvents, additives and crosslinking promoters can be added to the coating liquid. The charge blocking layer 5 can be prepared by coating a coating liquid by a coating method such as blade coating, dip coating, spray coating, bead coating and nozzle coating, followed by drying and crosslinking using heat or light.

Then the moiré preventing layer 6 will be explained.

The function of the moiré preventing layer 6 is to prevent occurrence of moiré in the resultant images due to interference of light, which is caused when coherent light (such as laser light) is used for optical writing. Namely, the moiré preventing layer scatters the light used for optical writing. In order to carry out this function, the layer preferably includes a material having a high refractive index. The moiré preventing layer typically includes a binder resin and an inorganic pigment. Suitable inorganic pigments include white inorganic pigments. Specific examples of the white inorganic pigments include titanium oxide, calcium fluoride, calcium oxide, silica, magnesium oxide and aluminum oxide. Among these pigments, titanium oxide is preferably used because of having a high hiding power.

As can be understood from FIGS. 3-5, injection of charges from the substrate 1 is blocked by the charge blocking layer 5 and therefore the moiré preventing layer 6 preferably has an ability to transport charges having the same polarity as that of the charges formed on the surface of the photoreceptor, to prevent increase of residual potential. For example, in a case of a negative charge type photoreceptor, the moiré preventing layer 6 preferably has an electron conducting ability. Therefore it is preferable to use an electroconductive inorganic pigment or a conductive inorganic pigment for the moiré preventing layer 6. Alternatively, an electroconductive material (such as acceptors) may be added to the moiré preventing layer 6.

Specific examples of the materials for use as the binder resin in the moiré preventing layer 6 include the resins mentioned above for use in the charge blocking layer 5. Since the photosensitive layer 4 is formed on the moiré preventing layer 6 by coating a coating liquid, the binder resin preferably has a good resistance to the solvent included in the photosensitive layer coating liquid. Among the resins, thermosetting resins, and more preferably mixtures of alkyd resins and melamine resins, are preferably used as the binder resin of the moiré preventing layer 6. The mixing ratio of an alkyd resin to a melamine resin is an important factor influencing the structure and properties of the moiré preventing layer 6, and the weight ratio thereof is preferably from 5/5 to 8/2. When the content of a melamine resin is too high, the coated film is shrunk in the thermosetting process, and thereby coating defects are formed in the resultant film. In addition, the residual potential increasing problem occurs. In contrast, when the content of an alkyd resin is too high, the electric resistance of the layer seriously decreases, and thereby the resultant images have background development, although the residual potential of the photoreceptor is reduced.

The mixing ratio (P/R) of the inorganic pigment (P) to the binder resin (R) in the moiré preventing layer 6 is also an important factor, and the volume ratio thereof is preferably from 1/1 to 3/1. When the ratio is too low (i.e., the content of the inorganic pigment is too low), not only the moiré preventing effect deteriorates but also the residual potential increases after repeated use. In contrast, when the ratio is too high, the film formability of the layer deteriorates, resulting in deterioration of surface conditions of the resultant layer. In addition, a problem in that the upper layer (e.g., the photosensitive layer) cannot form a good film thereon because the coating liquid penetrates into the moiré preventing layer occurs. This problem is fatal to the photoreceptor having a layered photosensitive layer including a thin CGL as a lower layer because such a thin CGL cannot be formed on such a moiré preventing layer. In addition, when the ratio is too large, a problem in that the surface of the inorganic pigment cannot be covered with the binder resin. In this case, the CGM is directly contacted with the inorganic pigment and thereby the possibility of occurrence of a problem in that carriers are thermally produced increases, resulting in occurrence of the background development problem.

By using two kinds of titanium oxides having different average particle diameters for the moiré preventing layer, the substrate 1 is effectively hidden by the moiré preventing layer and thereby occurrence of moiré fringes can be well prevented and formation of pinholes in the layer can also be prevented. In this regard, the average particle diameters (D1 and D2, D1>D2) of the two kinds of titanium oxides preferably satisfy the following relationship:

$$0.2 < D2/D1 \leq 0.5.$$

When the ratio D2/D1 is too low, the surface of the titanium oxides become more active, and thereby stability of the electrostatic properties of the resultant photoreceptor seriously deteriorates. In contrast, when the ratio is too high, the electroconductive substrate 1 cannot be well hidden by the moiré preventing layer and thereby the moiré preventing effect deteriorates and abnormal images such as moiréfringes are produced. In this regard, the average particle diameter of the pigment means the average particle diameter of the pigment in a dispersion prepared by dispersing the pigment in water while applying a strong shear force thereto.

Further, the average particle diameter (D2) of the titanium oxide (T2) having a smaller average particle diameter is also an important factor, and is preferably from 0.05 μm to 0.20 μm. When D2 is too small, hiding power of the layer deteriorates. Therefore, moiré fringes tend to be caused. In contrast, when D2 is too large, the filling factor of the titanium oxide in the layer is small, and thereby background development preventing effect cannot be well produced.

The mixing ratio of two kinds of titanium oxides in the moiré preventing layer 6 is also an important factor, and is preferably determined such that the following relationship is satisfied:

$$0.2 \leq T2/(T1+T2) \leq 0.8,$$

wherein T1 represents the weight of the titanium oxide having a larger average particle diameter, and T2 represents the weight of the titanium oxide having a smaller average particle diameter.

When the mixing ratio is too low, the filling factor of the titanium oxide in the layer is small, and thereby background development preventing effect cannot be well produced. In contrast, when the mixing ratio is too high, the hiding power of the layer deteriorates, and thereby the moiré preventing effect cannot be well produced.

The moiré preventing layer preferably has a thickness of from 1 to 10 μm, and more preferably from 2 to 5 μm. When the layer is too thin, the moiré preventing effect cannot be well produced. In contrast, when the layer is too thick, the residual potential increases.

The moiré preventing layer is typically prepared by a wet coating method such as the above-mentioned coating methods. It is preferable for the solvent included in the moiré preventing layer coating liquid not to dissolve or swell the charge blocking layer on which the coating liquid is to be coated. Since an N-alkoxymethylated nylon is included in the charge blocking layer, alcohols should not be included in the moirépreventing layer coating liquid.

Then the photosensitive layer 4 will be explained.

The photosensitive layer 4 may be a single-layered photosensitive layer illustrated in FIG. 3 or a layered photosensitive layer illustrated in FIG. 4. At first, the layered photosensitive layer will be explained.

The CGL 7 will be explained. Known charge generation materials (CGMs) can be used for the CGL.

Specific examples of the organic CGMs include phthalocyanine pigments such as metal phthalocyanine, e.g., titanyl phthalocyanine and chlorogallium phthalocyanine; metal-free phthalocyanine, azulenium salt pigments, squaric acid methyne pigments, symmetric or asymmetric azo pigments having a carbazole skeleton, symmetric or asymmetric azo pigments having a triphenyl amine skeleton, symmetric or asymmetric azo pigments having a diphenyl amine skeleton, symmetric or asymmetric azo pigments having a dibenzothiophene skeleton, symmetric or asymmetric azo pigments having a fluorenone skeleton, symmetric or asymmetric azo pigments having an oxadiazole skeleton, symmetric or asymmetric azo pigments having a bisstilbene skeleton; symmetric or asymmetric azo pigments having a distyryloxadiazole skeleton, symmetric or asymmetric azo pigments having a distyrylcarbazole skeleton; perylene pigments, anthraquinone pigments, polycyclic quinone pigments, quinone imine pigments, diphenylmethane pigments, triphenylmethane pigments, benzoquinone pigments, naphthoquinone pigments, cyanine pigments, azomethine pigments, indigoide pigments, bisbenzimidazole pigments, and the like organic pigments.

Phthalocyanine pigments are preferably used for the CGL of the photoreceptor of the present invention. Specific examples thereof include metal-free phthalocyanine and metal phthalocyanine. Phthalocyanine pigments are typically prepared by the method described by Moser and Thomas in "Phthalocyanine Compounds" (published in 1963 by Reinhold Co.), and other methods.

Specific examples of the center metal of metal phthalocyanine include copper, silver, beryllium, magnesium, calcium, zinc, indium, sodium, lithium, titanium, tin, lead, vanadium, chromium, manganese, iron, cobalt, etc. In addition, halogenated metal having three or more valences may be located at the center instead of a metal atom. Known phthalocyanine such as phthalocyanine crystals having various crystal forms such as α-form, β-form, Y-form, ε-form, τ-form, and X-form, and amorphous phthalocyanine can be used for the CGL of the photoreceptor of the present invention.

Among the phthalocyanines, titanyl phthalocyanine (hereinafter referred to as TiOPc) which is one of phthalocyanine pigments and which includes titanium as the center metal thereof is more preferable because of having a high sensitivity. The formula of TiOPc is as follows:

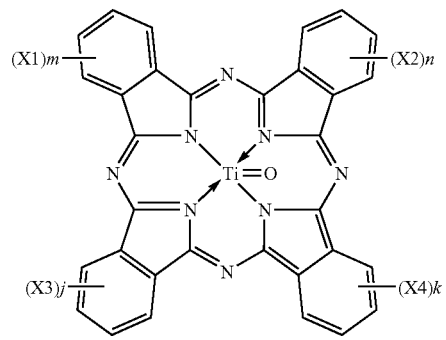

wherein X1, X2, X3 and X4 independently represent a halogen atom, and each of m, n, j and k is 0 or an integer of from 1 to 4.

Among TiOPcs, a TiOPc, which has an X-ray diffraction spectrum such that a maximum peak is observed at a Bragg (2θ) angle of 27.2°±0.2°; a peak is observed at each of Bragg (2θ) angles of 9.4°±0.2°, 9.6±0.2° and 24.0±0.2°; a lowest angle peak is observed at an angle of 7.3°±0.2°; no peak is observed between the lowest angle peak and the 9.4° peak; and no peak is observed at a Bragg (2θ) angle of 26.3°±0.2° when a Cu—Kα X-ray having a wavelength of 1.542 Å is used, is preferably used for the CGL.

The TiOPc having such a crystal form is described in JP-A 2001-19871. In addition, a photoreceptor using the TiOPc and an image forming apparatus using the photoreceptor are also disclosed therein. By using such a TiOPc for a photosensitive layer, the resultant photoreceptor has high photosensitivity and can maintain good charge properties even after long repeated use. However, when such a photoreceptor is repeatedly used for forming images for a long period of time, the photoreceptor causes the background development problem. Namely, the photoreceptor does not have a long life. The reason therefor is considered to be that although background development caused by the CGL itself can be solved by using such a TiOPc, background development, which is caused by injection of charges from the electroconductive substrate, cannot be solved by this method.

As a result of the present inventors' study, it is found that by using a TiOPc which has the X-ray diffraction spectrum mentioned above and which has an average primary particle diameter not greater than 0.25 µm for a CGL, the photosensitivity of the resultant photoreceptor can be dramatically improved and in addition occurrence of the background development problem can be prevented. Namely, it is important to use a TiOPc, which has the X-ray diffraction spectrum mentioned above and whose average primary particle diameter is controlled so as to be not greater than 0.25 µm, as a CGM. The method for controlling the average primary particle diameter will be explained later.

When the techniques disclosed in, for example, JP-A 05-80572 in that a layered undercoat (or intermediate) layer is formed between an electroconductive substrate and a photosensitive layer are used in combination with a photosensitive layer having a high sensitivity, the background development problem is not perfectly avoided because the charge property of the photosensitive layer is affected by the hot carriers generated in the photosensitive layer. This problem is more frequently caused when a CGM having absorption in a relatively long wavelength range like the titanyl phthalocyanine mentioned above for use in the present invention is used.

Thus, various techniques for preventing occurrence of the background development problem by improving a CGL or an undercoat layer have been disclosed. However, the background development problem is not caused only by one factor. Therefore, it is necessary to remove plural factors causing the background development problem in order to prepare a photoreceptor which can be stably used for a long period of time. In other words, there is a case where a factor, which hardly affects the initial background image quality of a photoreceptor, seriously affects the background image quality thereof if the photoreceptor becomes fatigue or the constituents of the photoreceptor are deteriorated after repeated use. Therefore, it is preferable that the factors causing the background development problem are removed as much as possible while the stability of the photoreceptor after repeated use is improved. However, a technique for solving the two problems (i.e., a technique for forming a photoreceptor having a high durability) has not yet been discovered.

The present inventors can remove the factors causing the background development problem while improving the long-term stability of the photoreceptor and minimizing the side effects causing increase of residual potential and environmental stability of the photoreceptor. Therefore, the background development preventing effects can be maintained even when the photoreceptor is used for a long period of time.

Then the method for synthesizing the titanyl phthalocyanine crystal having the specific crystal form mentioned above will be explained.

At first, the method for synthesizing a crude titanyl phthalocyanine will be explained. The methods for synthesizing TiOPcs are well known and several methods have been disclosed in, for example, "Phthalocyanine Compounds" (1963) and "The Phthalocyanines" (1983), which were described by Moser, and JP-A 06-293769.

For example, one method is that a mixture of a phthalic anhydride compound, a metal or a halogenated metal, and urea is heated in the presence or absence of a solvent having a high boiling point. In this case, a catalyst such as ammonium molybdate is used if desired. The second method is that a mixture of a phthalonitrile compound and a halogenated metal is heated in the presence or absence of a solvent having a high boiling point. This method is used for synthesizing phthalocyanines such as aluminum phthalocyanines, indium phthalocyanines, oxovanadium phthalocyanines, oxotitanium phthalocyanines, zirconium phthalocyanines, etc., which cannot be synthesized by the first method. The third method is that phthalic anhydride or a phthalonitrile compound is reacted with ammonia to produce an intermediate such as 1,3-diiminoisoindoline, followed by reaction of the intermediate with a halogenated metal in a solvent having a high boiling point. The fourth method is that a phthalonitrile compound is reacted with a metal alkoxide in the presence of urea, etc. Since the fourth method has an advantage in that the benzene ring is not halogenated, the method is preferably used for synthesizing a TiOPc for use in electrophotography. Therefore, the method is preferably used in the present invention.

Thus, the TiOPc for use in the photoreceptor of the present invention is preferably synthesized by a method which is described in JP-A 06-293769 and which does not use a halogenated titanium as a raw material. The greatest advantage of this method is that the synthesized titanyl phthalocyanine is free from halogen. When a TiOPc including a halogenated titanyl phthalocyanine crystal as an impurity is used for a photoreceptor, the photoreceptor has low photosensitivity and poor charge properties as described in Japan Hardcopy '89 p. 103, 1989. The halogen-free titanyl phthalocyanine as described in JP-A 2001-19871 is preferably used for the photoreceptor of the present invention. A halogen-free TiOPc can be prepared using halogen-free raw materials. The method for preparing a halogen-free titanyl phthalocyanine is mentioned below.

An amorphous titanyl phthalocyanine (i.e., titanyl phthalocyanine having low crystallinity) can be typically prepared by a method such as acid paste methods (or acid slurry methods) in which a crude phthalocyanine is dissolved in sulfuric acid and the solution is diluted with water to re-precipitate the phthalocyanine.

Specifically, the procedure is as follows:

(1) the crude titanyl phthalocyanine prepared above is dissolved in concentrated sulfuric acid having a weight of from 10 to 50 times that of the crude titanyl phthalocyanine;

(2) materials remaining undissolved in sulfuric acid are removed therefrom by filtering, etc.;

(3) the solution is added to ice water having a weight of from 10 to 50 times that of the sulfuric acid used, to precipitate an amorphous titanyl phthalocyanine;

(4) after the amorphous titanyl phthalocyanine is separated by filtering, the titanyl phthalocyanine is repeatedly subjected to washing with ion-exchange water and filtering until the filtrate becomes neutral; and (5) the amorphous titanyl phthalocyanine is washed with ion-exchange water, followed by filtering to prepare an aqueous paste having a solid content of from 5 to 15% by weight.

In this case, it is important to well wash the amorphous titanyl phthalocyanine so that the amount of sulfuric acid in the aqueous paste becomes as small as possible. Specifically, the filtrate (i.e., water used for washing the amorphous titanyl phthalocyanine) preferably has a pH of from 6 to 8 and/or a specific conductivity not greater than 8 µS/cm (preferably not greater than 5 µS/cm and more preferably not greater than 3 µS/cm). It is found that when the pH and/or the specific conductivity of the filtrate fall in the ranges mentioned above, the properties of the resultant photoreceptor are not affected by sulfuric acid remaining in the TiOPc. The pH and specific conductivity can be measured with a marketed pH meter and a marketed electric conductivity measuring instrument, respectively. The lower limit of the specific conductivity of the filtrate is the specific conductivity of the ion-exchange water used for washing.

When the pH and specific conductivity do not fall in the above-mentioned ranges (i.e., the amount of residual sulfuric acid is large), the resultant photoreceptor has low photosensitivity and poor charge properties.

The thus prepared amorphous titanyl phthalocyanine is used as a raw material for the TiOPc for use in the CGL of the photoreceptor of the present invention. The amorphous titanyl phthalocyanine preferably has an X-ray diffraction spectrum such that a maximum peak is observed at a Bragg ($2\theta$) angle of from 7.0° to 7.5° with a tolerance of +0.2° when a Cu—Kα X-ray having a wavelength of 1.542 Å is used. In addition, the half width of the maximum peak is preferably not less than 1°. Further, the average particle diameter of the primary particles thereof is preferably not greater than 0.1 µm.

Then the method for changing the crystal form of the TiOPc will be explained.

In the crystal form changing process, the amorphous titanyl phthalocyanine is changed to a TiOPc which has an X-ray diffraction spectrum such that a maximum peak is observed at a Bragg ($2\theta$) angle of 27.2°±0.2°; a peak is observed at each of Bragg ($2\theta$) angles of 9.4°±0.2°, 9.6±0.2° and 24.0±0.2°; a lowest angle peak is observed at an angle of 7.3°±0.2°; no peak is observed between the lowest angle peak and the 9.4° peak; and no peak is observed at a Bragg ($2\theta$) angle of 26.3°±0.2°, when a Cu—Kα X-ray having a wavelength of 1.542 Å is used.

Specifically, the desired TiOPc can be prepared by mixing the amorphous above-prepared titanyl phthalocyanine, which is not dried, with an organic solvent in the presence of water while agitating.

Suitable solvents for use in the crystal form changing process include any known solvents by which the desired titanyl phthalocyanine crystal can be prepared. In particular, it is preferable to use one or more of tetrahydrofuran, toluene, methylene chloride, carbon disulfide, o-dichlorobenzene, and 1,1,2-trichloroethane. It is preferable to use one of these solvents alone, but mixtures thereof can also be used. In addition, other solvents can be added to the solvents.

The amount of the solvent used for the crystal form changing process is preferably not less than 10 times, and more preferably not less than 30 times, the weight of the titanyl phthalocyanine used. In this case, the crystal change can be rapidly performed and in addition the impurities included in the titanyl phthalocyanine can be well removed. As mentioned above, the amorphous titanyl phthalocyanine used for the crystal changing process is typically prepared by an acid paste method. In this case, it is preferable to fully wash the amorphous titanyl phthalocyanine to remove sulfuric acid therefrom. When sulfuric acid is not fully removed from the amorphous titanyl phthalocyanine, sulfate ions are included in the resultant TiOPc even after the TiOPc is well washed. When sulfate ions are included therein, the resultant photoreceptor has a low photosensitivity and poor charge properties.

For example, JP-A 08-110649 discloses a crystal changing method in a comparative example therein, in which a TiOPc which is dissolved in sulfuric acid and water are added to an organic solvent to change the crystal form of the TiOPc. The resultant TiOPc has an X-ray diffraction spectrum similar to that of the TiOPc for use in the present invention. However, the TiOPc includes sulfate ions at a high concentration. Therefore, the resultant photoreceptor has low photosensitivity. Namely, the TiOPc preparation method is not preferable and cannot be used for preparing the TiOPc for use in the present invention.

The above-mentioned crystal changing method for use in the present invention is similar to the method disclosed in JP-A 2001-19871. As mentioned above, by controlling the average primary particle diameter of the TiOPc so as to be not greater than 0.25 µm, the effects of the TiOPc can be enhanced.

The methods for preparing such a small titanyl phthalocyanine crystal will be explained.

The methods are broadly classified into two methods. One of the methods is that the TiOPc is synthesized while controlling the particle diameter of the crystal so as not greater than 0.25 µm. The other method is that when the TiOPc crystal is dispersed, coarse particles having a particle diameter greater than 0.25 µm are removed therefrom. Needless to say, it is more preferable to use both the methods.

At first, the method for synthesizing a TiOPc having a small particle diameter will be explained.

As a result of the present inventors' investigation of synthesizing a TiOPc having a small particle diameter, the following knowledge can be acquired. Specifically, it is found that the above-mentioned amorphous titanyl phthalocyanine having an irregular form (i.e., titanyl phthalocyanine with low crystallinity) typically has a primary particle diameter not greater than 0.1 µm (almost all the particles have a primary particle diameter of from 0.01 to 0.05 µm) as can be understood from FIG. 6. In FIG. 3, the practical length of the scale bar is 0.2 µm. In addition, it is found that the crystal change is performed while crystal growth is also performed.

Figure 7:
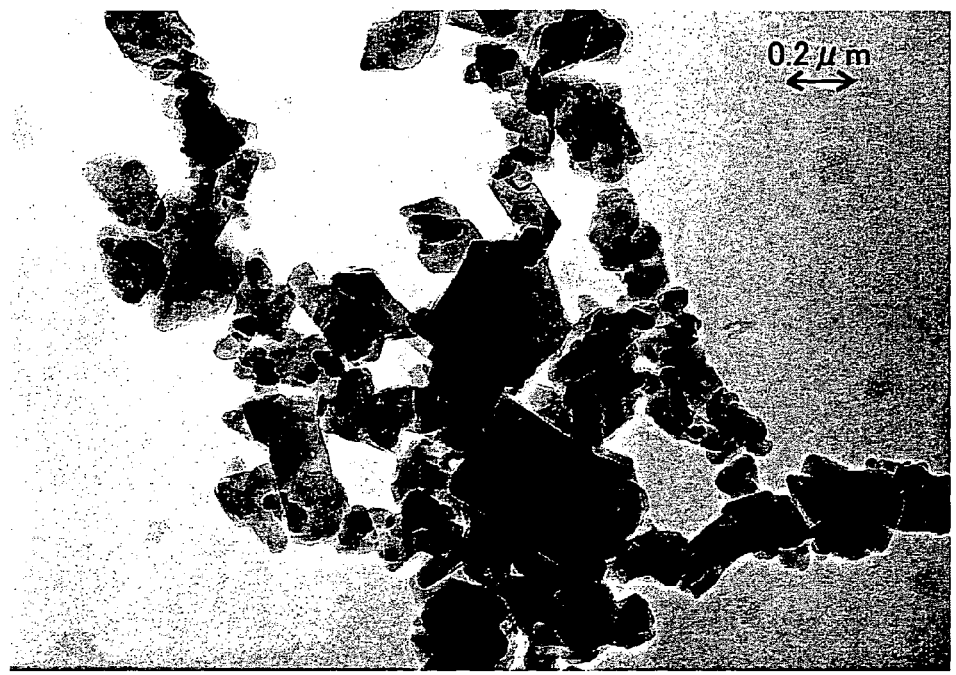
FIG. 7 is a micrograph showing primary particles of a titanyl phthalocyanine crystal prepared by subjecting the titanyl phthalocyanine raw material to a crystal changing treatment, which is taken using a transmission electron microscope.

In general, in such a crystal changing process, the crystal changing operation is performed for a relatively long time to fully perform crystal changing, i.e., to prevent inclusion of the raw material in the product. Then the product is filtered to prepare a TiOPc having the desired crystal form. Therefore, even though the titanyl phthalocyanine raw material has a small particle diameter, the resultant TiOPc crystal typically has a relatively large particle diameter (from about 0.3 to about 0.5 µm) as can be understood from FIG. 7. In FIG. 7, the practical length of the scale bar is 0.2 µm. The thus prepared TiOPc is dispersed while applying a high shearing force thereto such that the particle diameter thereof becomes not greater than 0.25 µm (preferably not greater than 0.20 µm). In addition, the TiOPc crystal is pulverized if necessary. Therefore, a problem in that part of the crystal has a crystal form different from the desired crystal form occurs.

Figure 6:
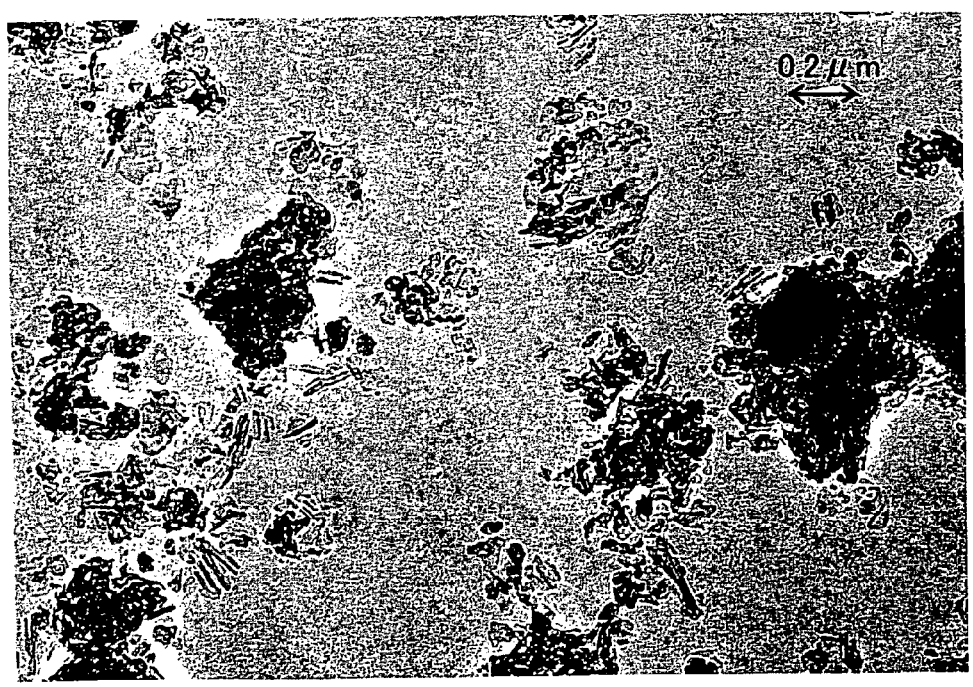
FIG. 6 is a micrograph showing a titanyl phthalocyanine raw material having an amorphous state, which is taken using a transmission electron microscope.

In contrast, in the present invention, the crystal changing operation is stopped at a time in which the crystal change is completed while crystal growth is hardly caused. Specifically, the crystal changing operation is stopped at a time when the crystal change is completed and the resultant TiOPc, which is prepared by changing the amorphous titanyl phthalocyanine, has almost the same particle diameter (not greater than about 0.25 µm and preferably not greater than 0.20 µm) as that of the amorphous titanyl phthalocyanine (raw material), which is illustrated in FIG. 6. Since the crystal change of a TiOPc is typically accompanied by change of color or viscosity of the dispersion, the crystal change can be visually determined. The particle diameter of the crystal increases in proportion to the time during which the crystal changing operation is performed. Therefore, it is important that the crystal changing efficiency is enhanced to complete the crystal changing operation in a short time, and the following is the key points.

Specifically, one of the key points is that the proper solvents as mentioned above are used for the crystal changing process. Another key point is that the aqueous paste of the amorphous titanyl phthalocyanine is efficiently contacted with a crystal changing solvent in the crystal changing process by performing strong agitation. Specifically, the amorphous titanyl phthalocyanine is preferably mixed with the crystal changing solvent using a dispersion machine which can perform strong agitation using a propeller, such as homogenizers (e.g., HOMOMIXER). By using these methods, the crystal changing operation can be completed in a short time. Namely, a TiOPc in which crystal change is fully performed (i.e., which hardly includes the raw material) while crystal growth is hardly caused can be prepared.

Even in this case, it is important to use a proper amount of solvent for crystal changing as mentioned above. Specifically, the amount of the solvent is preferably not less than 10 times, and more preferably not less than 30 times, the amount of the amorphous titanyl phthalocyanine (raw material) used. By using this method, the crystal changing can be completed in a short time while preventing the impurities included in the titanyl phthalocyanine raw material from remaining in the resultant TiOPc.

As mentioned above, the particle diameter of the TiOPc increases in proportion to the crystal changing time. Therefore, it is also effective to rapidly stop the crystal changing reaction soon after the crystal changing reaction is completed. In order to rapidly stop the reaction, it is preferable to add a large amount of second solvent, in which crystal changing is hardly caused, to the reaction system. Specific examples of such second solvents include alcohol solvents and ester solvents. The ratio of the second solvent to the crystal changing solvent is preferably about 10/1 to rapidly stop the crystal changing reaction.

With respect to the thus prepared TiOPc, the smaller particle diameter the crystal has, the better properties the resultant photoreceptor has. However, when the particle diameter is too small, problems in that the filtering operation takes a relatively long time and the dispersion stability of the dispersion including the crystal deteriorates (i.e., the primary particles aggregate because the surface area of the particles is large) tend to occur. Therefore, the particle diameter of the TiOPc is preferably from about 0.05 μm to about 0.2 μm.

Figure 8:
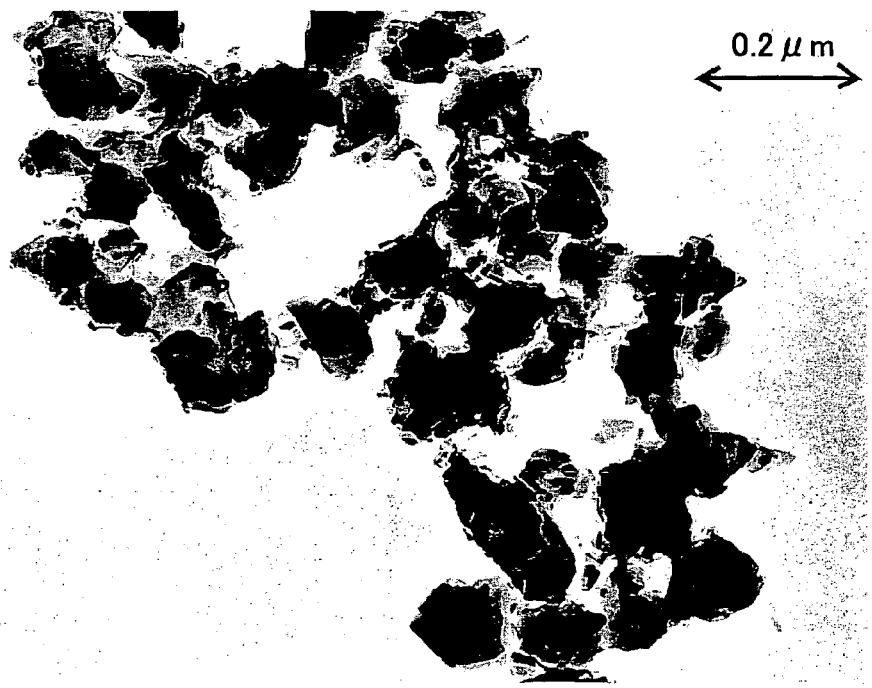
FIG. 8 is a micrograph showing primary particles of a titanyl phthalocyanine crystal prepared by rapidly performing the crystal changing treatment, which is taken using a transmission electron microscope.

FIG. 8 is a photograph showing a TiOPc which is prepared by performing crystal change in a short time. In FIG. 8, the practical length of the scale bar is 0.2 μm. As can be understood from FIGS. 7 and 8, the crystal as shown in FIG. 8 has a relatively small average particle diameter and the variation of the particle diameter is relatively small. In addition, the crystal as shown in FIG. 8 includes no coarse particles whereas the crystal as shown in FIG. 7 includes coarse particles.

The thus prepared TiOPc can be dispersed by applying a shearing force enough to dissociate secondary particles, which are formed due to aggregation of primary particles, into primary particles. Since a high shearing force is not applied, a dispersion including a crystal having an average particle diameter not greater than 0.25 μm (preferably not greater than 0.20 μm) can be easily prepared without causing a problem in that part of the crystal causes crystal change.

In this regard, the particle diameter means the volume average particle diameter, and can be determined by a centrifugal automatic particle diameter analyzer, CAPA-700 from Horiba Ltd. The volume average particle diameter means the cumulative 50% particle diameter (i.e., Median diameter). However, by using this particle diameter determining method, there is a case where a small amount of coarse particles cannot be detected. Therefore, it is preferable to directly observe the dispersion including a TiOPc crystal with an electron microscope, to determine the particle diameter of the crystal.

In addition, with respect to minute coating defects included in a layer formed using a titanyl phthalocyanine crystal dispersion, the following knowledge can be acquired. Whether coarse particles are present in the dispersion can be detected by a particle diameter measuring instrument if the concentration of coarse particles is on the order of a few percent or more. However, when the concentration is not greater than 1%, the presence of coarse particles cannot be detected by such an instrument. Therefore, even when it is confirmed that the average particle diameter of the crystal in a dispersion falls in the preferable range, a problem in that the resultant charge generation layer has minute coating defects can occur.

Figure 9:
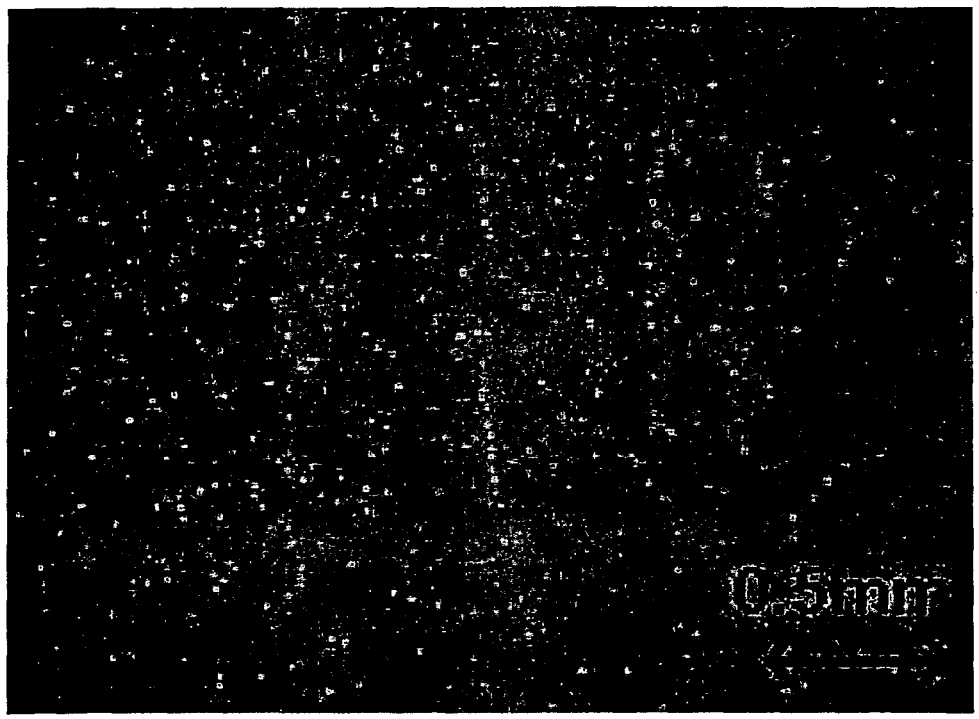
FIGS. 9 and 10 are photographs showing the dispersion states of the titanyl phthalocyanine crystal in different dispersions A and B which are prepared by the same method except that the dispersion time is changed.
Figure 10:
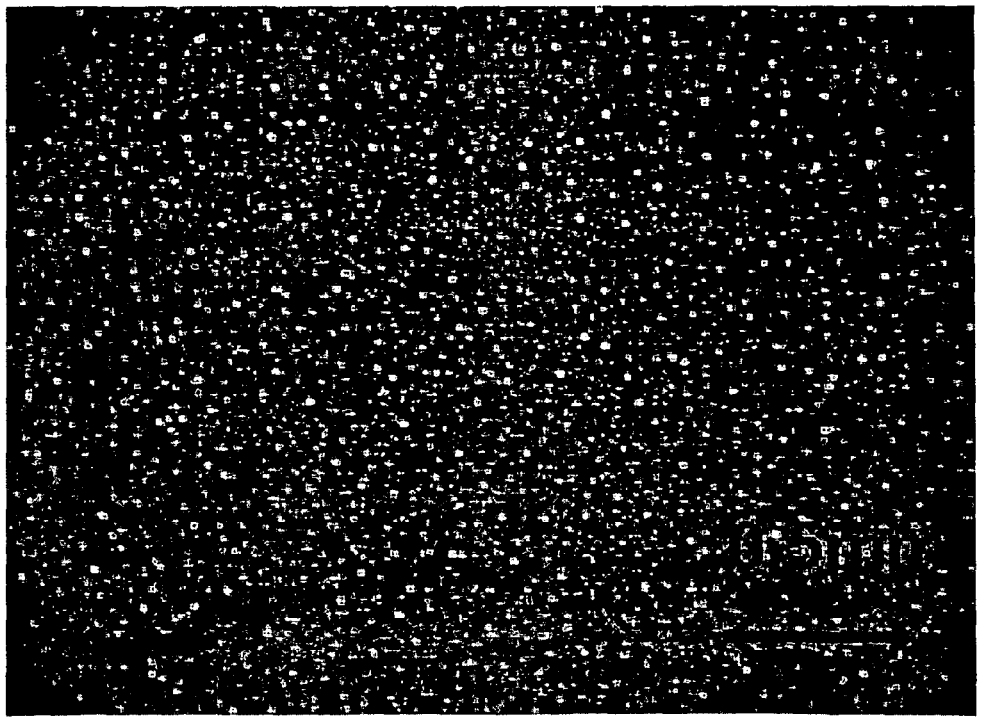

FIGS. 9 and 10 are photographs showing the dispersion state of the same titanyl phthalocyanine crystal in different dispersions A and B which are prepared by the same method except that the dispersion time is changed. The dispersion time for the dispersion A is shorter than that for the dispersion B. It is clear from the comparison of FIG. 9 with FIG. 10 that coarse particles are present in the dispersion A illustrated in FIG. 9. Coarse particles are observed as black spots in FIG. 9.

Figure 11:
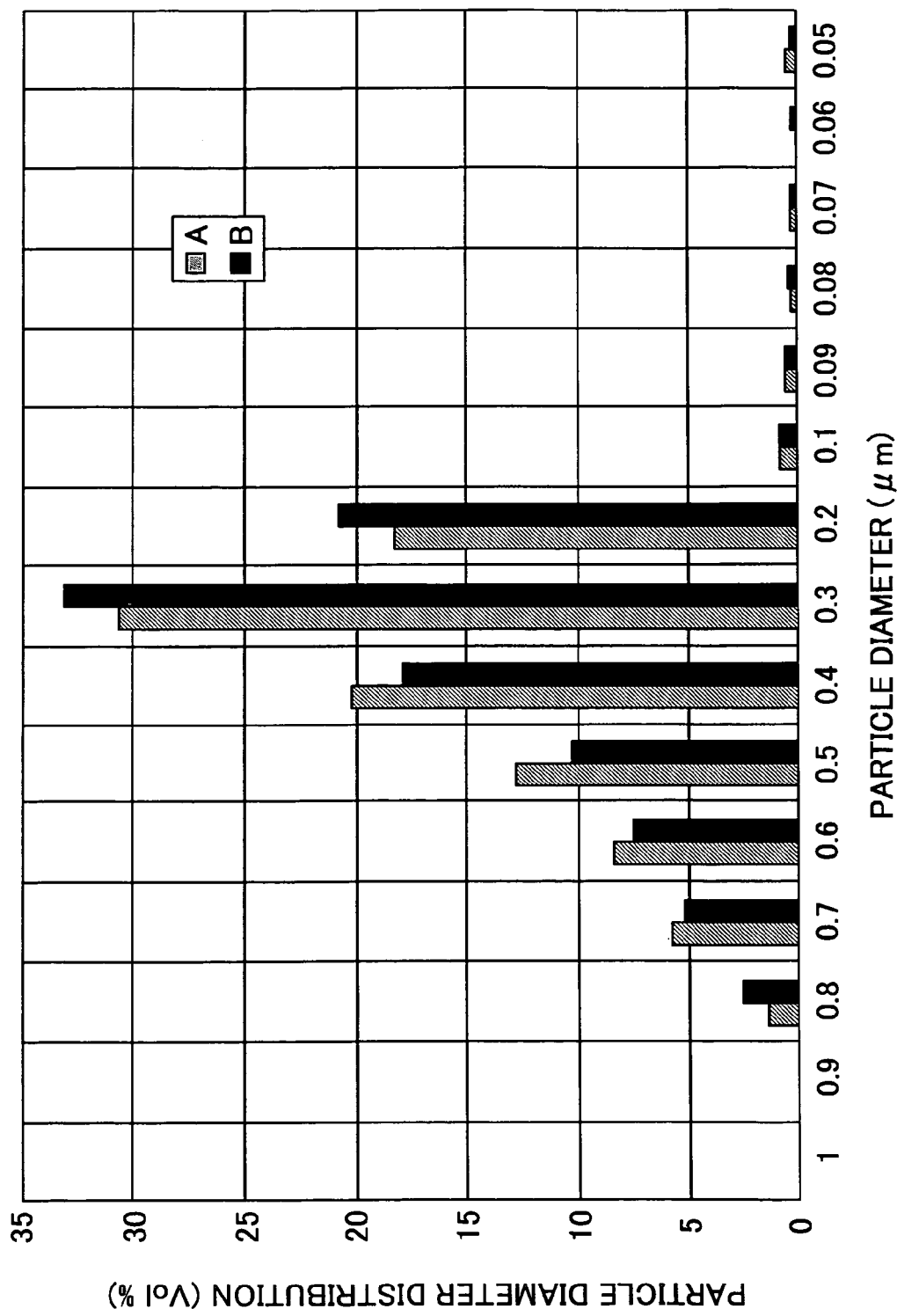
FIG. 11 is a graph showing the particle diameter distributions of the dispersions A and B.

The particle diameter distributions of the dispersions A and B, which are measured with a centrifugal automatic particle diameter analyzer, CAPA-700 from Horiba Ltd., are illustrated in FIG. 11. In FIG. 11, characters A and B represent the particle diameter distributions of the dispersions A and B, respectively. As can be understood from the graph, the particle diameter distributions are almost the same. The average particle diameters of the dispersions A and B are 0.29 μm and 0.28 μm, respectively, which are the same when considering the measurement error. Thus, whether or not coarse particles are present cannot be determined using such a particle diameter measuring instrument. As mentioned above, whether coarse particles are present in a dispersion can be detected only by the method in which the dispersion is directly observed using a microscope.

Under such circumstances, it is very effective that the primary particle diameter of the TiOPc is controlled so as to be as small as possible in the crystal changing process. Specifically, the following is the key points:

(1) such a proper solvent as mentioned above is used as the solvent in the crystal changing process to increase the crystal change efficiency; and (2) an aqueous titanyl phthalocyanine paste (i.e., an aqueous paste of amorphous titanyl phthalocyanine) is well contacted with a crystal changing solvent by performing strong agitation in the crystal changing process to rapidly complete the crystal change.

By using this method, a TiOPc crystal having a small primary particle diameter (i.e., not greater than 0.25 μm, and preferably not greater than 0.2 μm) can be prepared. In addition, it is very effective for heightening the effects of the present invention to use this method in combination with the method described in 2001-19871 mentioned above.

The thus prepared TiOPc is preferably filtered rapidly using a filter with a proper pore size to separate the crystal from the solvent. In this case, the filtration operation is preferably performed under a reduced pressure.

The thus prepared TiOPc is heated to be dried, if necessary. Any known heating dryers can be used for drying the crystal, but fan heaters are preferably used when drying is performed under normal pressure. In order to increase the drying speed and to enhance the effects of the present invention, it is preferable to perform drying under a reduced pressure. Particularly, this method is useful for materials (TiOPcs) which decompose or cause crystal change at a high temperature. The pressure is preferably not higher than 10 mmHg when drying is performed under a reduced pressure.

The thus prepared TiOPc having such a specific crystal form as mentioned above is preferably used as a charge generation material for use in electrophotographic photoreceptors. As mentioned above, by using conventional methods for preparing a TiOPc dispersion, the TiOPc crystal easily causes crystal change in the dispersion preparation process. However, by using the above-mentioned method of the present invention in which a TiOPc having a relatively small particle diameter is synthesized, a dispersion of the TiOPc can be prepared without applying so high a shearing force to the TiOPc. Accordingly, the TiOPc does not cause crystal change in the dispersing process.

Next, the method for removing coarse particles from a TiOPc dispersion will be explained.

A dispersion is prepared by dispersing the TiOPc crystal in a solvent, optionally together with a binder resin, using a ball mill, an attritor, a sand mill, a bead mill, an ultrasonic dispersing machine or the like. In this case, it is preferable that a proper binder resin is chosen in consideration of the electrostatic properties of the resultant photoreceptor and a proper solvent is chosen while considering its abilities to wet and disperse the crystal.

As mentioned above, it is known that the TiOPc having an X-ray diffraction peak such that a maximum peak is present at Bragg (2θ) angle of 27.2°±0.2° easily causes crystal change when a stress (such as heat energy and mechanical shearing force) is applied thereto. The titanyl phthalocyanine crystal for use in the present invention also has this property.

In order to prepare a dispersion in which the dispersed TiOPc keeps having a small particle diameter, it is important to optimize the dispersion conditions. However, to maintain the crystal form and to prepare a dispersion including a small crystal typically establish a trade-off relationship. It is not impossible to avoid the trade off, but the suitable production condition is very limited (i.e., it is very difficult to stably produce such a dispersion). Therefore, a need exists for a method by which such a dispersion as mentioned above can be easily and stably prepared. The present inventors discover the method.

Specifically, the method is that the TiOPc prepared above is dispersed while applying a shear thereto such that the crystal does not cause crystal change, and the dispersion is then filtered using a filter with a proper pore size. By using this method, a small amount of coarse particles (which cannot be visually observed or cannot be detected by a particle diameter measuring instrument) can be removed from the dispersion. In addition, the particle diameter distribution of the particles in the dispersion can be properly controlled. Specifically, it is preferable to use a filter with an effective pore diameter not greater than 3 μm, and more preferably not greater than 1 μm. By using such a filter, a dispersion in which the TiOPc is dispersed while having an average particle diameter not greater than 0.25 μm (or not greater than 0.20 μm) can be prepared. By using this dispersion, a CGL can be formed without causing coating defects. Therefore, the effects of the present invention can be fully produced.

It is preferable that a proper filter is chosen depending on the size of coarse particles to be removed. As a result of the present inventors' investigation, it is found that coarse particles having a particle diameter not less than 3 μm affect the image qualities of images with a resolution of 600 dpi (600 dots/inch (25.4 mm)). Therefore, it is preferable to use a filter with a pore diameter not greater than 3 μm, and more preferably not greater than 1 μm. Filters with too small a pore diameter filter out TiOPc particles, which can be used for the CGL, as well as coarse particles to be removed. In addition, such filters cause problems in that filtering takes a long time, the filters are clogged with particles, and an excessive stress is applied to the pump used. Therefore, a filter with a proper pore diameter is preferably used. Needless to say, the filter preferably has good resistance to the solvent used for the dispersion.

When a dispersion including a large amount of coarse particles is filtered, the amount of particles removed by filtering increases, and thereby a problem in that the solid content of the resultant dispersion is seriously decreased. Therefore, it is preferable that the dispersion to be filtered has a proper particle diameter distribution (i.e., a proper particle diameter and a proper standard deviation of particle diameter). Specifically, in order to efficiently perform the filtering operation without causing the clogging problem of the filter at a little loss of the resultant TiOPc, it is preferable that the average particle diameter is not greater than 0.3 μm and the standard deviation of the particle diameter is not greater than 0.2 μm.

By subjecting the dispersion to the filtering treatment, coarse particles can be removed from the dispersion. Therefore, the background development problem which is caused by a CGL prepared using a coating liquid including such a dispersion can be avoided. As mentioned above, by using a fine filter for filtering the dispersion, coarse particles can be securely removed. However, particles having a proper particle diameter tend to be also removed. Therefore, it is preferable to combine the technique in that a TiOPc having a desired crystal form and a proper particle diameter is synthesized with filtering. Specifically, the key points in preparing the CGL of the photoreceptor of the present invention are as follows:

(1) A titanyl phthalocyanine crystal having a small particle diameter is synthesized. By using such a crystal, the dispersion time and stress applied to the crystal in the dispersing operation can be reduced, and thereby the possibility of crystal change can be decreased.

(2) Since content of coarse particles in the TiOPc dispersion is relatively low compared to the cases where the crystal has a large particle diameter (i.e., crystals prepared by conventional methods), a filter with a small pore diameter can be used for filtering the dispersion, and thereby coarse particles in the dispersion can be securely removed therefrom. In addition, since the amount of the particles removed from the dispersion can be decreased, the formula of the dispersion hardly changes even after the filtering process. Therefore, the desired charge generation layer can be stably produced.

(3) As a result, a photoreceptor, which can produce high quality images without causing the background development problem, can be stably produced.

The CGL 7 is typically prepared by coating a coating liquid, which is prepared by dispersing a CGM (preferably the TiOPc prepared above) in a solvent, optionally together with a binder resin, using a ball mill, an attritor, a sand mill or an ultrasonic dispersion machine, followed by drying. Suitable coating methods include dip coating, spray coating, bead coating, nozzle coating, spinner, coating and ring coating.

Specific examples of the binder resins, which are optionally included in the CGL coating liquid, include polyamide, polyurethane, epoxy resins, polyketone, polycarbonate, silicone resins, acrylic resins, polyvinyl butyral, polyvinyl formal, polyvinyl ketone, polystyrene, polysulfone, poly-N-vinylcarbazole, polyacrylamide, polyvinyl benzal, polyester, phenoxy resins, vinyl chloride-vinyl acetate copolymers, polyvinyl acetate, polyphenylene oxide, polyamides, polyvinyl pyridine, cellulose resins, casein, polyvinyl alcohol, polyvinyl pyrrolidone, and the like resins. Among the binder resins, polyvinyl acetal represented by polyvinyl butyral is preferably used.

The content of the binder resin in the CGL is preferably from 0 to 500 parts by weight, and preferably from 10 to 300 parts by weight, per 100 parts by weight of the CGM included in the layer.

Specific examples of the solvents for use in the CGL coating liquid include isopropanol, acetone, methyl ethyl ketone, cyclohexanone, tetrahydrofuran, dioxane, ethyl cellosolve, ethyl acetate, methyl acetate, dichloromethane, dichloroethane, monochlorobenzene, cyclohexane, toluene, xylene, ligroin, and the like solvents. Among these solvents, ketones, esters and ethers are preferably used.

The CGL preferably has a thickness of from 0.01 to 0.5 μm, and more preferably from 0.1 to 2 μm.

Then the charge transport layer (CTL) 8 will be explained. The CTL is typically prepared by coating a coating liquid, which is prepared by dissolving or dispersing a charge transport material in a solvent optionally together with a binder resin, followed by drying. If desired, additives such as plasticizers, leveling agents and antioxidants can be added to the coating liquid.

Charge transport materials (CTMs) are classified into positive-hole transport materials and electron transport materials.

Specific examples of the electron transport materials include electron accepting materials such as chloranil, bromanil, tetracyanoethylene, tetracyanoquinodimethane, 2,4,7-trinitro-9-fluorenon, 2,4,5,7-tetranitro-9-fluorenon, 2,4,5,7-tetanitroxanthone, 2,4,8-trinitrothioxanthone, 2,6,8-trinitro-4H-indeno[1,2-b]thiophene-4-one, 1,3,7-trinitrodibenzothiphene-5,5-dioxide, benzoquinone derivatives and the like.

Specific examples of the positive-hole transport materials include known materials such as poly-N-vinyl carbazole and its derivatives, poly-γ-carbazolylethylglutamate and its derivatives, pyrene-formaldehyde condensation products and their derivatives, polyvinyl pyrene, polyvinyl phenanthrene, polysilane, oxazole derivatives, oxadiazole derivatives, imidazole derivatives, monoarylamines, diarylamines, triarylamines, stilbene derivatives, α-phenyl stilbene derivatives, benzidine derivatives, diarylmethane derivatives, triarylmethane derivatives, 9-styrylanthracene derivatives, pyrazoline derivatives, divinyl benzene derivatives, hydrazone derivatives, indene derivatives, butadiene derivatives, pyrene derivatives, bisstilbene derivatives, enamine derivatives, and the like.

These CTMs can be used alone or in combination.

Specific examples of the binder resins for use in the CTL include known thermoplastic resins and thermosetting resins, such as polystyrene, styrene-acrylonitrile copolymers, styrene-butadiene copolymers, styrene-maleic anhydride copolymers, polyester, polyvinyl chloride, vinyl chloride-vinyl acetate copolymers, polyvinyl acetate, polyvinylidene chloride, polyarylate, phenoxy resins, polycarbonate, cellulose acetate resins, ethyl cellulose resins, polyvinyl butyral resins, polyvinyl formal resins, polyvinyl toluene, poly-N-vinyl carbazole, acrylic resins, silicone resins, epoxy resins, melamine resins, urethane resins, phenolic resins, alkyd resins and the like.

The content of the CTM in the charge transport layer is preferably from 20 to 300 parts by weight, and more preferably from 40 to 150 parts by weight, per 100 parts by weight of the binder resin included in the CTL. The thickness of the CTL 8 is preferably from 5 to 100 μm.

Suitable solvents for use in the CTL coating liquid include tetrahydrofuran, dioxane, toluene, dichloromethane, monochlorobenzene, dichloroethane, cyclohexanone, methyl ethyl ketone, acetone and the like solvents. In view of environmental protection, non-halogenated solvents are preferably used. Specifically, cyclic ethers such as tetrahydrofuran, dioxolan and dioxane, aromatic hydrocarbons such as toluene and xylene, and their derivatives are preferably used.

Charge transport polymers, which have both a binder resin function and a charge transport function, can be preferably used for the charge transport layer because the resultant charge transport layer has good abrasion resistance.

Suitable charge transport polymers include known charge transport polymer materials. Among these materials, polycarbonate resins having a triarylamine group in their main chain and/or side chain are preferably used. In particular, charge transport polymers having the following formulae of from (1) to (10) are preferably used:

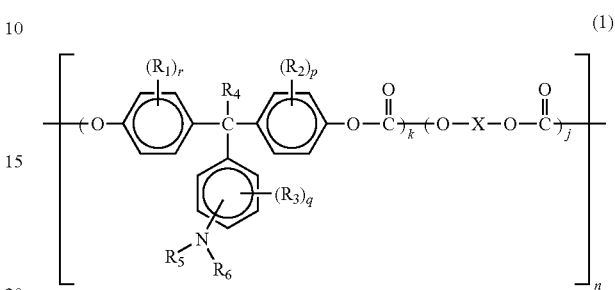

(1)

wherein $R_1$, $R_2$ and $R_3$ independently represent a substituted or unsubstituted alkyl group, or a halogen atom; $R_4$ represents a hydrogen atom, or a substituted or unsubstituted alkyl group; $R_5$, and $R_6$ independently represent a substituted or unsubstituted aryl group; r, p and q independently represent 0 or an integer of from 1 to 4; k is a number of from 0.1 to 1.0 and j is a number of from 0 to 0.9; n is an integer of from 5 to 5000; and X represents a divalent aliphatic group, a divalent alicyclic group or a divalent group having the following formula:

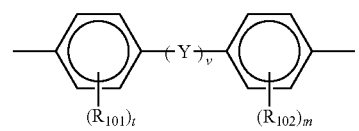

wherein $R_{101}$, and $R_{102}$ independently represent a substituted or unsubstituted alkyl group, a substituted or unsubstituted aryl group, or a halogen atom; t and m represent 0 or an integer of from 1 to 4; v is 0 or 1; and Y represents a linear alkylene group, a branched alkylene group, a cyclic alkylene group, —O—, —S—, —SO—, —SO$_2$—, —CO—, —CO—O—Z—O—CO— (Z represents a divalent aliphatic group), or a group having the following formula:

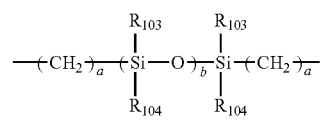

wherein a is an integer of from 1 to 20; b is an integer of from 1 to 2000; and $R_{103}$ and $R_{104}$ independently represent a substituted or unsubstituted alkyl group, or a substituted or unsubstituted aryl group, wherein $R_{101}$, $R_{102}$, $R_{103}$ and $R_{104}$ may be the same or different from the others.

(2)

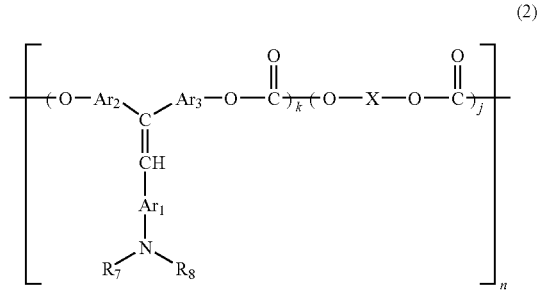

wherein $R_7$ and $R_8$ independently represent a substituted or unsubstituted aryl group; $Ar_1$, $Ar_2$ and $Ar_3$ independently represent an arylene group; and X, k, j and n are defined above in formula (1).

(3)

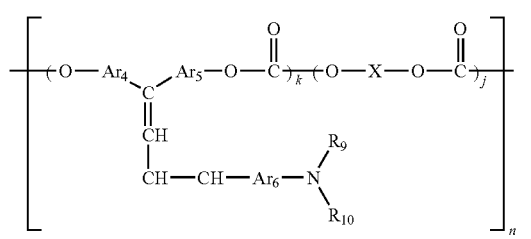

wherein $R_9$ and $R_{10}$ independently represent a substituted or unsubstituted aryl group; $Ar_4$, $Ar_5$ and $Ar_6$ independently represent an arylene group; and X, k, j and n are defined above in formula (1).

(4)

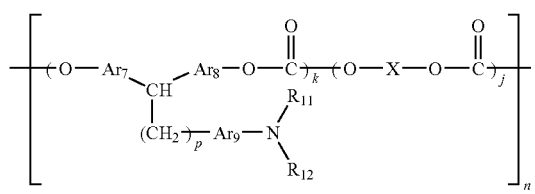

wherein $R_{11}$ and $R_{12}$ independently represent a substituted or unsubstituted aryl group; $Ar_7$, $Ar_8$ and $Ar_9$ independently represent an arylene group; p is an integer of from 1 to 5; and X, k, j and n are defined above in formula (1).

(5)

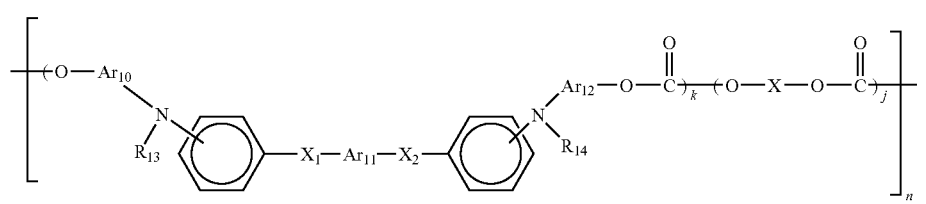

wherein $R_{13}$ and $R_{14}$ independently represent a substituted or unsubstituted aryl group; $Ar_{10}$, $Ar_{11}$ and $Ar_{12}$ independently represent an arylene group; $X_1$ and $X_2$ independently represent a substituted or unsubstituted ethylene group, or a substituted or unsubstituted vinylene group; and X, k, j and n are defined above in formula (1).

(6)

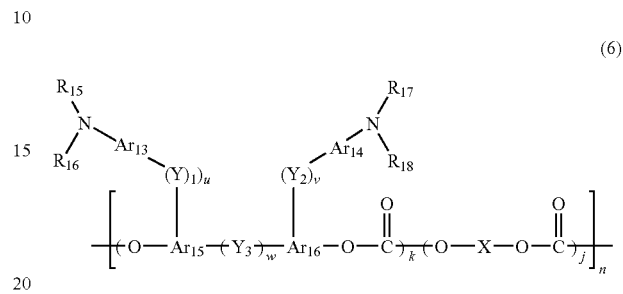

wherein $R_{15}$, $R_{16}$, $R_{17}$ and $R_{18}$ independently represent a substituted or unsubstituted aryl group; $Ar_{13}$, $Ar_{14}$, $Ar_{15}$ and $Ar_{16}$ independently represent an arylene group; $Y_1$, $Y_2$ and $Y_3$ independently represent a substituted or unsubstituted alkylene group, a substituted or unsubstituted cycloalkylene group, a substituted or unsubstituted alkyleneether group, an oxygen atom, a sulfur atom, or a vinylene group; u, v and w independently represent 0 or 1; and X, k, j and n are defined above in formula (1).

(7)

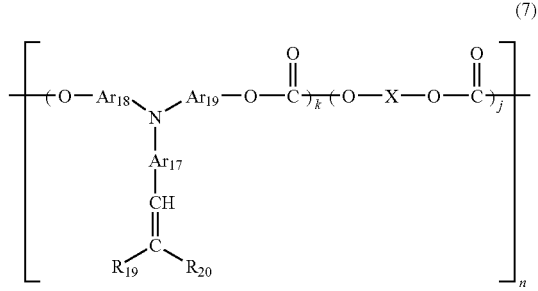

wherein $R_{19}$ and $R_{20}$ independently represent a hydrogen atom, or substituted or unsubstituted aryl group, and $R_{19}$ and $R_{20}$ optionally share bond connectivity to form a ring; $Ar_{17}$, $Ar_{18}$ and $Ar_{19}$ independently represent an arylene group; and X, k, j and n are defined above in formula (1).

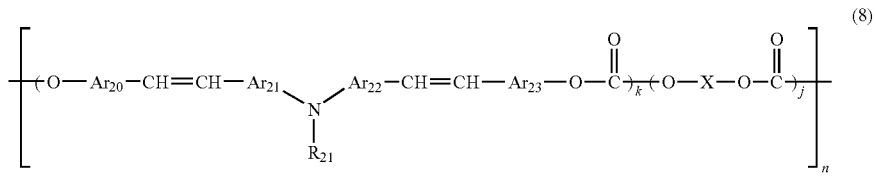

wherein $R_{21}$ represents a substituted or unsubstituted aryl group; $Ar_{20}$, $Ar_{21}$, $Ar_{22}$ and $Ar_{23}$ independently represent an arylene group; and X, k, j and n are defined above in formula (1).

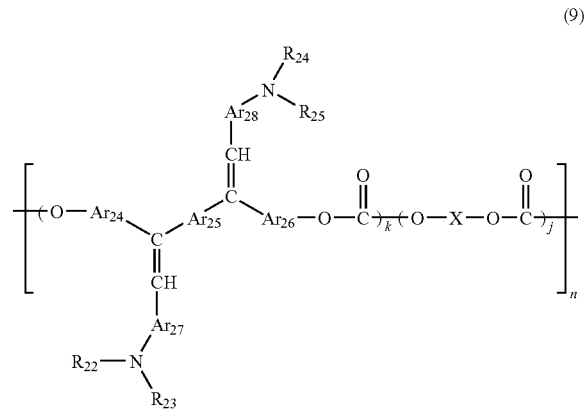

wherein $R_{22}$, $R_{23}$, $R_{24}$ and $R_{25}$ independently represent a substituted or unsubstituted aryl group; $Ar_{24}$, $Ar_{25}$, $Ar_{26}$, $Ar_{27}$ and $Ar_{28}$ independently represent an arylene group; and X, k, j and n are defined above in formula (1).

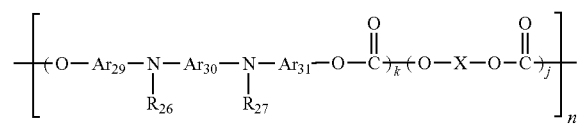

wherein $R_{26}$ and $R_{27}$ independently represent a substituted or unsubstituted aryl group; $Ar_{29}$, $Ar_{30}$ and $Ar_{31}$ independently represent an arylene group; and X, k, j and n are defined above in formula (1).

Formulae (1) to (10) are illustrated in the form of block copolymers, but the polymers are not limited thereto. The polymers may be random copolymers.

In addition, the CTL can also be formed by coating one or more monomers or oligomers, which have an electron donating group, and then subjecting the monomers or oligomers to a crosslinking reaction after forming the layer such that the layer has a two- or three-dimensional structure.

The CTL constituted of a polymer or a crosslinked polymer, which has an electron donating group, has good abrasion resistance. In electrophotographic image forming apparatus, the potential of the charges formed on a photoreceptor (i.e., the potential of a non-lighted area) is generally set to be constant. Therefore, the larger the abrasion amount of the photosensitive layer of the photoreceptor, the larger the electric field formed on the photoreceptor.

When the electric field increases, background development occurs in the resultant images. Namely a photoreceptor having good abrasion resistance hardly causes the background development problem. The above-mentioned charge transport layer constituted of a polymer having an electron donating group has good film formability because the layer itself a polymer. In addition, the charge transport layer has good charge transportability because of including charge transport moieties at a relatively high concentration compared to charge transport layers including a polymer and a low molecular weight charge transport material. Namely, the photoreceptor including a charge transport layer constituted of a charge transport polymer has high response.

Known copolymers, block polymers, graft polymers, and star polymers can also be used for the polymers having an electron donating group. In addition, crosslinking polymers including an electron donating group, which have been disclosed in JP-As 03-109406, 2000-206723, and 2001-34001, can also be used for the charge transport layer.

The CTL may include additives such as plasticizers and leveling agents. Specific examples of the plasticizers include known plasticizers such as dibutyl phthalate and dioctyl phthalate. The content of the plasticizer in the CTL is from 0 to 30% by weight based on the total weight of the binder resin included in the charge transport layer. Specific examples of the leveling agents include silicone oils such as dimethyl silicone oils and methyl phenyl silicone oils, and polymers and oligomers, which include a perfluoroalkyl group in their side chain. The content of the leveling agent in the CTL is from 0 to 1% by weight based on the total weight of the binder resin included in the charge transport layer.

Hereinbefore, the layered photosensitive layer is explained. However, the photosensitive layer of the photoreceptor of the present invention is not limited to the layered photosensitive layer, and a single-layered photosensitive layer can be used. In this case, the photosensitive layer 4 includes at least a CGM and a binder resin. Suitable materials for use as the binder resin include the materials mentioned above for use as the binder resin in the CGL and CTL. In addition, a CTM is preferably added to the single-layered photosensitive layer so that the resultant photoreceptor has high photosensitivity, high carrier transportability and low residual potential. In this case, a proper CTM is chosen from hole transport materials or electron transport materials of the charge transport materials, depending on the polarity of charges to be formed on the surface of the photoreceptor. In addition, the charge transport polymers mentioned above can also be preferably used for the single-layered photosensitive layer.

In the photoreceptor of the present invention, a protective layer 9 is optionally formed on the photosensitive layer to protect the photosensitive layer. Recently, computers are used in daily life, and therefore a need exists for a high-speed and small-sized printer. By forming a protective layer on the photosensitive layer, the resultant photoreceptor has good durability while having a high photosensitivity and producing images without abnormal images.

Specific examples of the material for use in the protective layer 9 include ABS resins, ACS resins, olefin-vinyl monomer copolymers, chlorinated polyether, aryl resins, phenolic resins, polyacetal, polyamide, polyamideimide, polyallysulfone, polybutylene, polybutyleneterephthalate, polycarbonate, polyarylate, polyethersulfone, polyethylene, polyethyleneterephthalate, polyimide, acrylic resins, polymethylpentene, polypropylene, polyphenyleneoxide, polysulfone, polystyrene, AS resins, butadiene-styrene copolymers, polyurethane, polyvinyl chloride, polyvinylidene chloride, epoxy resins, etc. Among these resins, polycarbonate and polyarylate are preferably used.

In addition, in order to impart good abrasion resistance to the protective layer, fluorine-containing resins such as polytetrafluoroethylene, and silicone resins can be used therefor. Further, materials in which such resins are mixed with an inorganic filler such as titanium oxide, aluminum oxide, tin oxide, zinc oxide, zirconium oxide, magnesium oxide, potassium titanate and silica or an organic filler can also be used therefor. These inorganic fillers may be subjected to a surface-treatment.

Suitable organic fillers for use in the protective layer include powders of fluorine-containing resins such as polytetrafluoroethylene, silicone resin powders, amorphous carbon powders, etc. Specific examples of the inorganic fillers for use in the protective layer include powders of metals such as copper, tin, aluminum and indium; metal oxides such as alumina, silica, tin oxide, zinc oxide, titanium oxide, alumina, zirconia, indium oxide, antimony oxide, bismuth oxide, calcium oxide, tin oxide doped with antimony, indium oxide doped with tin; potassium titanate, etc. In view of hardness, the inorganic fillers are preferable. In particular, silica, titanium oxide and alumina are preferable, and α-alumina is more preferable.

The content of the filler in the protective layer is preferably determined depending on the species of the filler used and the application of the resultant photoreceptor, but the content of a filler in the surface portion of the protective layer is preferably not less than 5% by weight, more preferably from 10 to 50% by weight, and even more preferably from 10 to 30% by weight, based on the total weight of the surface portion of the protective layer.

The filler included in the protective layer preferably has a volume average particle diameter of from 0.1 to 2 μm, and more preferably from 0.3 to 1 μm. When the average particle diameter is too small, good abrasion resistance cannot be imparted to the resultant photoreceptor. In contrast, when the average particle diameter is too large, the surface of the resultant protective layer is seriously roughened or a problem such that a protective layer itself cannot be formed occurs.

In the present application, the average particle diameter of a filler means a volume average particle diameter unless otherwise specified, and is measured using an instrument, CAPA-700 manufactured by Horiba Ltd. In this case, the cumulative 50% particle diameter (i.e., the median particle diameter) is defined as the average particle diameter. In addition, it is preferable that the standard deviation of the particle diameter distribution curve of the filler used in the protective layer is not greater than 1 μm. When the standard deviation is too large (i.e., when the filler has too broad particle diameter distribution), the effect of the present invention cannot be produced.

The pH of the filler used in the protective layer coating liquid largely influences on the dispersibility of the filler therein and the resolution of the images produced by the resultant photoreceptor. The reasons therefor are as follows. Fillers (in particular, metal oxides) typically include hydrochloric acid therein which is used when the fillers are produced. When the amount of residual hydrochloric acid is large, the resultant photoreceptor tends to produce blurred images. In addition, inclusion of too large an amount of hydrochloric acid causes the dispersibility of the filler to deteriorate.

Another reason therefor is that the charge properties of fillers (in particular, metal oxides) are largely influenced by the pH of the fillers. In general, particles dispersed in a liquid are charged positively or negatively. In this case, ions having a charge opposite to the charge of the particles gather around the particles to neutralize the charge of the particles, resulting in formation of an electric double layer, and thereby the particles are stably dispersed in the liquid. The potential (i.e., zeta potential) of a point around one of the particles decreases (i.e., approaches to zero) as the distance between the point and the particle increases. Namely, a point far apart from the particle is electrically neutral, i.e., the zeta potential thereof is zero. In this case, the higher the zeta potential, the better the dispersion of the particles. When the zeta potential is nearly equal to zero, the particles easily aggregate (i.e., the particles are unstably dispersed). The zeta potential of a system largely depends on the pH of the system. When the system has a certain pH, the zeta potential becomes zero. This pH point is called an isoelectric point. It is preferable to increase the zeta potential by setting the pH of the system to be far apart from the isoelectric point, in order to increase the dispersion stability of the system.

It is preferable for the protective layer to include a filler having an isoelectric point at a pH of 5 or more, in order to prevent formation of blurred images. In other words, fillers having a highly basic property can be preferably used in the photoreceptor of the present invention because the effect of the present invention can be heightened. Fillers having a highly basic property have a high zeta potential (i.e., the fillers are stably dispersed) when the system for which the fillers are used is acidic.

In this application, the pH of a filler means the pH of the filler at the isoelectric point, which is determined by the zeta potential of the filler. Zeta potential can be measured by a laser beam potential meter manufactured by Ootsuka Electric Co., Ltd.

In addition, in order to prevent production of blurred images, fillers having a high electric resistance (i.e., not less than $1 \times 10^{10}$ Ω·cm in resistivity) are preferably used. Further, fillers having a pH not less than 5 and fillers having a dielectric constant not less than 5 can be more preferably used. Fillers having a dielectric constant not less than 5 and/or a pH not less than 5 can be used alone or in combination. In addition, combinations of a filler having a pH not less than 5 and a filler having a pH less than 5, or combinations of a filler having a dielectric constant not less than 5 and a filler having a dielectric constant less than 5, can also be used. Among these fillers, α-alumina having a closest packing structure is preferably used. This is because α-alumina has a high insulating property, a high heat stability and a good abrasion resistance, and thereby formation of blurred images can be prevented and abrasion resistance of the resultant photoreceptor can be improved.

In the present application, the resistivity of a filler is defined as follows. The resistivity of a powder such as fillers largely changes depending on the filling factor of the powder when the resistivity is measured. Therefore, it is necessary to measure the resistivity under a constant condition. In the present application, the resistivity is measured by a device similar to the devices disclosed in FIG. 1 of JP-As 5-94049 and FIG. 1 of 5-113688. The surface area of the electrodes of the device is 4.0 cm$^2$. Before the resistivity of a sample powder is measured, a load of 4 kg is applied to one of the electrodes for 1 minute and the amount of the sample powder is adjusted such that the distance between the two electrodes becomes 4 mm.

The resistivity of the sample powder is measured by pressing the sample powder only by the weight (i.e., 1 kg) of the upper electrode without applying any other load to the sample. The voltage applied to the sample powder is 100 V. When the resistivity is not less than $10^6$ Ω·cm, HIGH RESISTANCEMETER (from Yokogawa Hewlett-Packard Co.) is used to measure the resistivity. When the resistivity is less than $10^6$ Ω·cm, a digital multimeter (from Fluke Corp.) is used.

The dielectric constant of a filler is measured as follows. A cell similar to that used for measuring the resistivity is also used for measuring the dielectric constant. After a load is applied to a sample powder, the capacity of the sample powder is measured using a dielectric loss measuring instrument (from Ando Electric Co., Ltd.) to determine the dielectric constant of the powder.

The fillers to be included in the protective layer are preferably subjected to a surface treatment using a surface treatment agent in order to improve the dispersion of the fillers in the protective layer. When a filler is poorly dispersed in the protective layer, the following problems occur.

(1) the residual potential of the resultant photoreceptor increases;
(2) the transparency of the resultant protective layer decreases;
(3) coating defects are formed in the resultant protective layer;
(4) the abrasion resistance of the protective layer deteriorates;
(5) the durability of the resultant photoreceptor deteriorates; and
(6) the image qualities of the images produced by the resultant photoreceptor deteriorate.

Suitable surface treatment agents include known surface treatment agents. However, surface treatment agents which can maintain the highly insulating property of the fillers used are preferably used.

As for the surface treatment agents, titanate coupling agents, aluminum coupling agents, zircoaluminate coupling agents, higher fatty acids, combinations of these agents with a silane coupling agent, $Al_2O_3$, $TiO_2$, $ZrO_2$, silicones, aluminum stearate, and the like, can be preferably used to improve the dispersibility of fillers and to prevent formation of blurred images. These materials can be used alone or in combination.

When fillers treated with a silane coupling agent are used, the resultant photoreceptor tends to produce blurred images. However, combinations of a silane coupling agent with one of the surface treatment agents mentioned above can often produce good images without blurring.

The coating weight of the surface treatment agents is preferably from 3 to 30% by weight, and more preferably from 5 to 20% by weight, based on the weight of the filler to be treated, although the weight is determined depending on the average primary particle diameter of the filler.

When the content of the surface treatment agent is too low, the dispersibility of the filler cannot be improved. In contrast, when the content is too high, the residual potential of the resultant photoreceptor seriously increases.

These fillers can be dispersed using a proper dispersion machine. In this case, the fillers are preferably dispersed such that the aggregated particles are dissociated and primary particles of the fillers are dispersed, to improve the transparency of the resultant protective layer.

In addition, a CTM can be included in the protective layer to enhance the photo response and to reduce the residual potential of the resultant photoreceptor. The CTMs mentioned above for use in the charge transport layer can also be used for the protective layer.

When a low molecular weight CTM is used for the protective layer, the concentration of the CTM may be changed in the thickness direction of the protective layer. Specifically, it is preferable to reduce the concentration of the CTM at the surface portion of the protective layer in order to improve the abrasion resistance of the resultant photoreceptor. At this point, the concentration of the CTM means the ratio of the weight of the CTM to the total weight of the protective layer.

It is preferable to use a charge transport polymer in the protective layer in order to improve the durability of the photoreceptor.

The protective layer 9 can be formed by any known coating methods. The thickness of the protective layer is preferably from 0.1 to 10 μm. In addition, layers of amorphous carbon or amorphous silicon carbide, which are formed by a vacuum deposition method, can also be used as the protective layer 9.

A crosslinked protective layer having a charge transport structure can be preferably used as the protective layer 9. By using such a crosslinked protective layer, increase of strength of electric field formed on the resultant photoreceptor after repeated use can be prevented and thereby occurrence of the background development problem can be prevented. In addition, the photoreceptor has good scratch resistance and filming resistance, and thereby frequency of formation of defective images can be decreased. Therefore, it is effective at producing a highly durable photoreceptor. Further, the crosslinked protective layer is superior in uniformity to protective layers in which a filler is dispersed in a resin. Therefore, the crosslinked protective layer has such an advantage as to be uniformly abraded when the surface thereof is rubbed with a cleaning member, etc. In addition, since charges are microscopically uniformly formed on the surface of the crosslinked protective layer, high quality images can be produced.

The crosslinked protective layer having a charge transport structure is preferably prepared by reacting and crosslinking a radical polymerizable tri- or more-functional monomer having no charge transport structure and a radical polymerizable monofunctional monomer having a charge transport structure. This protective layer has high hardness because of having a well-developed three dimensional network and a high crosslinking density. In addition, since the surface of the protective layer is uniform and smooth, the protective layer has good abrasion resistance and scratch resistance.

Although it is important to increase the crosslinking density of the protective layer, a problem in that the protective layer has a high internal stress due to shrinkage in the crosslinking reaction tends to occur. The internal stress increases as the thickness of the protective layer increases. Therefore, when a thick protective layer is crosslinked, problems in that the protective layer is cracked and peeled occur. Even though these problems are not caused when a photoreceptor is new, the problems are easily caused when the photoreceptor receives various stresses after being repeatedly subjected to charging, developing, transferring and cleaning.

In order to prevent occurrence of the problems, the following techniques can be used.

(1) a polymeric component is added to the crosslinked protective layer;
(2) a large amount of mono- or di-functional monomers are used for forming the crosslinked protective layer; and
(3) a polyfunctional monomer having a group capable of imparting softness to the resultant crosslinked protective layer is used for forming the crosslinked protective layer.

However, the crosslinked protective layers prepared using these techniques have a low crosslinking density. Therefore, a good abrasion resistance cannot be imparted to the resultant protective layer.

In contrast, the crosslinked protective layer for use in the photoreceptor of the present invention has a well-developed three dimensional network, a high crosslinking density and a high charge transporting ability while having a thickness of from 1 to 10 μm. Therefore, the resultant photoreceptor has high abrasion resistance and hardly causes cracking and peeling problems. The thickness of the crosslinked protective layer is preferably from 2 to 8 μm. In this case, the margin for the above-mentioned problems can be improved and flexibility in choosing materials for forming a protective layer having a higher crosslinking density can be enhanced.

The reasons why the photoreceptor of the present invention hardly causes the cracking and peeling problems are as follows.

(1) a relatively thin crosslinked protective layer having a charge transport structure is formed and thereby increase of internal stress of the photoreceptor can be prevented; and
(2) since a CTL is formed below the crosslinked protective layer having a charge transport structure, the internal stress of the crosslinked protective layer can be relaxed.

Therefore, it is not necessary to increase the amount of polymer components in the protective layer. Therefore, occurrence of problems in that the protective layer is scratched or a film (such as a toner film) is formed on the protective layer, which is caused by incomplete mixing of polymer components and the crosslinked material formed by reaction of radical polymerizable monomers, can be prevented.

In addition, when a protective layer is crosslinked by irradiating light, a problem in that the inner portion of the protective layer is incompletely reacted because the charge transport moieties absorb light occurs if the protective layer is too thick. However, since the protective layer of the photoreceptor of the present invention has a thickness of not greater than 10 μm, the inner portion of the protective layer can be completely crosslinked and thereby a good abrasion resistance can be imparted to the entire protective layer.

Further, since the crosslinked protective layer is prepared using a monofunctional monomer having a charge transport structure, the monofunctional monomer is incorporated in the crosslinking bonds formed by one or more tri- or more-functional monomers. When a crosslinked protective layer is formed using a low molecular weight charge transport material having no functional group, a problem in that the low molecular weight charge transport material is separated from the crosslinked resin, resulting in precipitation of the low molecular weight charge transport material and formation of a clouded protective layer, and thereby the mechanical strength of the protective layer is deteriorated. When a crosslinked protective layer is formed using di- or more-functional charge transport compounds as main components, the resultant protective layer is seriously distorted, resulting in increase of internal stress, because the charge transfer moieties are bulky, although the protective layer has a high crosslinking density.

Further, the photoreceptor of the present invention has good electric properties, good stability, and high durability. This is because the crosslinked protective layer has a structure in that a unit obtained from a monofunctional monomer having a charge transport structure is connected with the crosslinking bonds like a pendant. In contrast, the protective layer formed using a low molecular weight charge transport material having no functional group causes the precipitation and clouding problems, and thereby the photosensitivity of the photoreceptor is deteriorated and residual potential of the photoreceptor is increased (i.e., the photoreceptor has poor electric properties). In addition, in the crosslinked protective layer formed using di- or more-functional charge transport compounds as main components, the charge transport moieties are fixed in the crosslinked network, and thereby charges are trapped, resulting in deterioration of photosensitivity and increase of residual potential. When such electric properties of a photoreceptor are deteriorated, problems in that the resultant images have low image density and character images are narrowed occur.

Since a CTL having a high mobility and few charge traps can be formed as the CTL of the photoreceptor of the present invention, production of side effects in electric properties of the photoreceptor can be prevented even when the crosslinked protective layer is formed on the CTL.

Further, a crosslinked protective layer having a charge transport structure is insoluble in organic solvents typically has an excellent abrasion resistance. The crosslinked protective layer prepared by reacting a tri- or more-functional polymerizable monomer having no charge transport structure with a monofunctional monomer having a charge transport structure has a well-developed three dimensional network and a high crosslinking density. However, in a case where materials (such as mono- or di-functional monomers, polymer binders, antioxidants, leveling agents, and plasticizers) other than the above-mentioned polymerizable monomers are added and/or the crosslinking conditions are changed, problems in that the crosslinking density of the resultant protective layer is locally low and the resultant protective layer is constituted of aggregates of minute crosslinked material having a high crosslinking density tend to occur. Such a crosslinked protective layer has poor mechanical strength and poor resistance to organic solvents. Therefore, when the photoreceptor is repeatedly used, a problem in that a portion of the protective layer is seriously abraded or is released from the protective layer occurs.

In contrast, the crosslinked protective layer for use in the photoreceptor of the present invention has high molecular weight and good solvent resistance because of having a well-developed three dimensional network and a high crosslinking density. Therefore, the resultant photoreceptor has excellent abrasion resistance and does not cause the above-mentioned problems.

Then the constituents of the coating liquid for forming the crosslinked protective layer having a charge transport structure will be explained.

The tri- or more-functional monomers having no charge transport structure mean monomers which have three or more radical polymerizable groups and which do not have a charge transport structure (such as a positive hole transport structure (e.g., triarylamine, hydrazone, pyrazoline and carbazole structures); and an electron transport structure (e.g., condensed polycyclic quinine structure, diphenoquinone structure, a cyano group and a nitro group)). As the radical polymerizable groups, any radical polymerizable groups having a carbon-carbon double bond can be used. Suitable radical polymerizable groups include 1-substituted ethylene groups having the below-mentioned formula (11) and 1,1-substituted ethylene groups having the below-mentioned formula (12).

1-Substituted Ethylene Groups $$CH_2=CH-X^1- \qquad (11)$$

wherein $X^1$ represents an arylene group (such as a phenylene group and a naphthylene group), which optionally has a substituent, a substituted or unsubstituted alkenylene group, a —CO— group, a —COO— group, a —CON($R^{10}$) group ($R^{10}$ represents a hydrogen atom, an alkyl group (e.g., a methyl group, and an ethyl group), an aralkyl group (e.g., a benzyl group, a naphthylmethyl group and a phenetyl group), or an aryl group (e.g., a phenyl group and a naphthyl group)) or a —S— group.

Specific examples of the groups having formula (11) include a vinyl group, a stylyl group, 2-methyl-1,3-butadienyl group, a vinylcarbonyl group, acryloyloxy group, acryloylamide, vinyl thio ether, etc.

1,1-Substituted Ethylene Groups $$CH_2=C(Y)-(X^2)n- \qquad (12)$$

wherein Y represents a substituted or unsubstituted alkyl group, a substituted or unsubstituted aralkyl group, a substituted or unsubstituted aryl group (such as phenyl and naphthyl groups), a halogen atom, a cyano group, a nitro group, an alkoxyl group (such as methoxy and ethoxy groups), or a —$COOR^{11}$ group (wherein $R^{11}$ represents a hydrogen atom, a substituted or unsubstituted alkyl group (such as methyl and ethyl groups), a substituted or unsubstituted aralkyl group (such as benzyl and phenethyl groups), a substituted or unsubstituted aryl group (such as phenyl and naphthyl groups) or a —$CONR^{12}R^{13}$ group (wherein each of $R^{12}$ and $R^{13}$ represents a hydrogen atom, a substituted or unsubstituted alkyl group (such as methyl and ethyl groups), a substituted or unsubstituted aralkyl group (such as benzyl, naphthylmethyl and phenethyl groups), a substituted or unsubstituted aryl group (such as phenyl and naphthyl groups))); $X^2$ represents a group selected from the groups mentioned above for use in $X^1$ and an alkylene group, wherein at least one of Y and $X^2$ is an oxycarbonyl group, a cyano group, an alkenylene group or an aromatic group; and n is 0 or 1.

Specific examples of the groups having formula (12) include an α-chloroacryloyloxy group, a methacryloyloxy group, an α-cyanoethylene group, an α-cyanoacryloyloxy group, an α-cyanophenylene group, a methacryloylamino group, etc.

Specific examples of the substituents for use in the groups $X^1$, $X^2$ and Y include halogen atoms, a nitro group, a cyano group, alkyl groups (such as methyl and ethyl groups), alkoxy groups (such as methoxy and ethoxy groups), aryloxy groups (such as a phenoxy group), aryl groups (such as phenyl and naphthyl groups), aralkyl groups (such as benzyl and phenethyl groups), etc.

Among these radical polymerizable tri- or more-functional groups, acryloyloxy groups and methacryloyloxy groups having three or more functional groups are preferably used. Compounds having three or more acryloyloxy groups can be prepared by subjecting (meth)acrylic acid (salts), (meth) acrylhalides and (meth)acrylates, which have three or more hydroxyl groups, to an ester reaction or an ester exchange reaction. The three or more radical polymerizable groups included in a radical polymerizable tri- or more-functional monomer are the same as or different from the others therein.

Specific examples of the radical polymerizable tri- or more-functional monomers include trimethylolpropane triacrylate (TMPTA), trimethylolpropane trimethacylate, trimethylolpropane alkylene-modified triacrylate, trimethylolpropane ethyleneoxy-modified triacrylate, trimethylolpropane propyleneoxy-modified triacrylate, trimethylolpropane caprolactone-modified triacrylate, trimethylolpropane alkylene-modified trimethacrylate, pentaerythritol triacrylate, pentaerythritol tetraacrylate (PETTA), glycerol triacrylate, glycerol epichlorohydrin-modified triacrylate, glycerol ethyleneoxy-modified triacrylate, glycerol propyleneoxy-modified triacrylate, tris(acryloxyethyl)isocyanurate, dipentaerythritol hexaacrylate (DPHA), dipentaerythritol caprolactone-modified hexaacrylate, dipentaerythritol hydroxypentaacrylate, alkylated dipentaerythritol tetraacrylate, alkylated dipentaerythritol triacrylate, dimethylolpropane tetraacrylate (DTMPTA), pentaerhythritol ethoxytriacrylate, ethyleneoxy-modified triacryl phosphate, 2,2,5,5-tetrahydroxymethylcyclopentanone tetraacrylate, etc. These monmers are used alone or in combination.

In order to form a dense crosslinked network in the crosslinked protective layer, the ratio (Mw/F) of the molecular weight (Mw) of the tri- or more-functional monomer to the number of functional groups (F) included in a molecule of the monomer is preferably not greater than 250. When the number is too large, the resultant protective becomes soft and thereby the abrasion resistance of the layer slightly deteriorates. In this case, it is not preferable to use only one monomer having a functional group having a long chain group such as ethylene oxide, propylene oxide and caprolactone.

The content of the unit obtained from the tri- or more-functional monomers in the crosslinked protective layer is preferably from 20 to 80% by weight, and more preferably from 30 to 70% by weight based on the total weight of the protective layer. When the content is too low, the three dimensional crosslinking density is low, and thereby good abrasion resistance cannot be imparted to the protective layer. In contrast, when the content is too high, the content of the charge transport compound decreases, good charge transport property cannot be imparted to the protective layer. In order to balance the abrasion resistance and charge transport property of the crosslinked protective layer, the content of the unit obtained from the tri- or more-functional monomers in the protective layer is preferably from 30 to 70% by weight.

Suitable radical polymerizable monofunctional monomers having a charge transport structure for use in preparing the crosslinked protective layer include compounds having one radical polymerizable functional group and a charge transport structure such as positive hole transport groups (e.g., triarylamine, hydrazone, pyrazoline and carbazole structures) and electron transport groups (e.g., electron accepting aromatic groups such as condensed polycyclic quininestructure, diphenoquinone structure, and cyano and nitro groups). As the functional group of the radical polymerizable monofunctional monomers, acryloyloxy and methacryloyloxy groups are preferably used. Among the charge transport groups, triarylamine groups are preferably used. Among the compounds having a triarylamine group, compounds having the following formula (13) or (14) are preferably used because of having good electric properties (i.e., high photosensitivity and low residual potential)

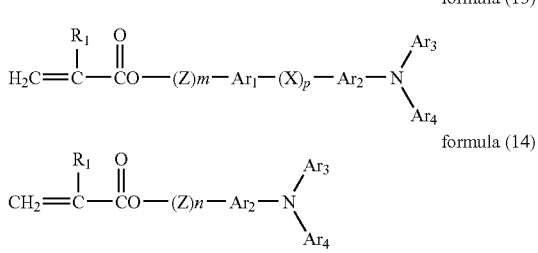

formula (13)

formula (14)

In formulae (13) and (14), $R^1$ represents a hydrogen atom, a halogen atom, a substituted or unsubstituted alkyl group, a substituted or unsubstituted aralkyl group, a substituted or unsubstituted aryl group, a cyano group, a nitro group, an alkoxy group, a —$COOR^7$ group (wherein $R^7$ represents a hydrogen atom, a substituted or unsubstituted alkyl group, a substituted or unsubstituted aralkyl group and a substituted or unsubstituted aryl group), a halogenated carbonyl group or a —$CONR^8R^9$ (wherein each of $R^8$ and $R^9$ represents a hydrogen atom, a substituted or unsubstituted alkyl group, a substituted or unsubstituted aralkyl group and a substituted or unsubstituted aryl group); each of $Ar^1$ and $Ar^2$ represents a substituted or unsubstituted arylene group; each of $Ar^3$ and $Ar^4$ represents a substituted or unsubstituted arylene group; X represents a substituted or unsubstituted alkylene group, a substituted or unsubstituted cycloalkylene group, a substituted or unsubstituted alkylene ether group, an oxygen atom, a sulfur atom or a vinylene group; Z represents a substituted or unsubstituted alkylene group, a substituted or unsubstituted divalent alkylene ether group, or a substituted or unsubstituted divalent alkyleneoxy carbonyl group; each of m and n is 0 or an integer of from 1 to 3; and p is 0 or 1.

In formulae (13) and (14), specific examples of the alkyl, aryl, aralkyl, and alkoxy groups for use in $R^1$ include the following.

Alkyl Group

Methyl, ethyl, propyl and butyl groups.

Aryl Group

Phenyl and naphthyl groups, etc.

Aralkyl Group

Benzyl, phenethyl and naphthylmethyl groups.

Alkoxy Group

Methoxy, ethoxy and propoxy groups.

These groups may be substituted with a halogen atom, a nitro group, a cyano group, an alkyl group (such as methyl and ethyl groups), an alkoxy group (such as methoxy and ethoxy groups), an aryloxy group (such as a phenoxy group), an aryl group (such as phenyl and naphthyl groups), an aralkyl group (such as benzyl and phenethyl groups), etc.

Among these groups, a hydrogen atom and a methyl group are preferable as $R^1$.

Suitable substituted or unsubstituted aryl groups for use as $Ar^3$ and $Ar^4$ include condensed polycyclic hydrocarbon groups, non-condensed cyclic hydrocarbon groups, and heterocyclic groups.

Specific examples of the condensed polycyclic hydrocarbon groups include compounds in which 18 or less carbon atoms constitute one or more rings, such as pentanyl, indecenyl, naphthyl, azulenyl, heptalenyl, biphenilenyl, as-indacenyl, s-indacenyl, fluorenyl, acenaphthylenyl, preiadenyl, acenaphthenyl, phenarenyl, phenanthoryl, anthoryl, fluorantenyl, acephenanthorylenyl, aceanthorylenyl, triphenylenyl, pyrenyl, chrysenyl, and naphthasenyl groups.

Specific examples of the non-condensed cyclic hydrocarbon groups include monovalent groups of benzene, diphenyl ether, polyethylene diphenyl ether, diphenyl thioether, and diphenyl sulfone; monovalent groups of non-condensed polycyclic hydrocarbon groups such as biphenyl, polyphenyl, diphenyl alkans, diphenylalkenes, diphenyl alkyne, triphenyl methane, distyryl benzene, 1,1-diphenylcycloalkanes, polyphenyl alkans, polyphenyl alkenes; and ring aggregation hydrocarbons such as 9,9-diphenyl fluorenone.

Specific examples of the heterocyclic groups include monovalent groups of carbazole, dibenzofuran, dibenzothiophene, oxadiazole, and thiadiazole.

The aryl groups for use as $Ar^3$ and $Ar^4$ may be substituted with the following groups.

(1) Halogen atoms, and cyano and nitro groups.

(2) Linear or branched alkyl groups which preferably have from 1 to 12 carbon atoms, more preferably from 1 to 8 carbon atoms and even more preferably from 1 to 4 carbon atoms. These alkyl groups can be further substituted with another group such as a fluorine atom, a hydroxyl group, a cyano group, an alkoxy group having 1 to 4 carbon atoms, and a phenyl group which may be further substituted with a halogen atom, an alkyl group having 1 to 4 carbon atoms, or an alkoxy group having 1 to 4 carbon atoms. Specific examples of the alkyl groups include methyl, ethyl, n-propyl, iso-propyl, n-butyl, sec-butyl, t-butyl, trifluoromethyl, 2-hydroxyethyl, 2-ethoxyethyl, 2-cyanoethyl, 2-methoxyethyl, benzyl, 4-chlorobenzyl, 4-methylbenzyl and 4-phenylbenzyl groups.

(3) Alkoxy groups (i.e., —$OR_2$). $R_2$ represents one of the alkyl groups defined above in paragraph (2). Specific examples of the alkoxy groups include methoxy, ethoxy, n-propoxy, iso-propoxy, t-butoxy, n-butoxy, s-butoxy, iso-butoxy, 2-hydroxyethoxy, benzyloxy and trifluoromethoxy groups.

(4) Aryloxy groups. Specific examples of the aryl group of the acryloxy groups include phenyl and naphthyl groups. The aryloxy groups may be substituted with an alkoxy group having from 1 to 4 carbon atoms, an alkyl group having from 1 to 4 carbon atoms, or a halogen atom. Specific examples of the groups include phenoxy, 1-naphthyloxy, 2-naphthyloxy, 4-methoxyphenoxy, and 4-methylphenoxy groups.

(5) Alkylmercapto or arylmercapto group. Specific examples of the groups include methylthio, ethylthio, phenylthio, and p-methylphenylthio groups (6) Groups having the following formula (15).

formula (15)

In formula (15), each of $R_3$ and $R_4$ represents a hydrogen atom, one of the alkyl groups defined in paragraph (2) or an aryl group (such as phenyl, biphenyl, and naphthyl groups). These groups may be substituted with another group such as an alkoxy group having from 1 to 4 carbon atoms, an alkyl group having from 1 to 4 carbon atoms, and a halogen atom. In addition, $R_3$ and $R_4$ optionally share bond connectivity to form a ring.

Specific examples of the groups having formula (15) include amino, diethylamino, N-methyl-N-phenylamino, N,N-diphenylamino, N,N-di(tolyl)amino, dibenzylamino, piperidino, morpholino, and pyrrolidino groups.

(7) Alkylenedioxy or alkylenedithio groups such as methylenedioxy and methylenedithio groups.

(8) Substituted or unsubstituted styryl groups, substituted or unsubstituted β-phenylstyryl groups, diphenylaminophenyl groups, and ditolylaminophenyl groups.

As the arylene groups for use in $Ar^1$ and $Ar^2$, divalent groups delivered from the aryl groups mentioned above for use in $Ar^3$ and $Ar^4$ can be used.

The group X is a substituted or unsubstituted alkylene group, a substituted or unsubstituted cycloalkylene group, a substituted or unsubstituted alkylene ether, an oxygen atom, a sulfur atom, and a vinylene group.

Suitable groups for use as the substituted or unsubstituted alkylene group include linear or branched alkylene groups which preferably have from 1 to 12 carbon atoms, more preferably from 1 to 8 carbon atoms and even more preferably from 1 to 4 carbon atoms. These alkylene groups can be further substituted with another group such as a fluorine atom, a hydroxyl group, a cyano group, an alkoxy group having 1 to 4 carbon atoms, and a phenyl group which may be further substituted with a halogen atom, an alkyl group having 1 to 4 carbon atoms, or an alkoxy group having 1 to 4 carbon atoms. Specific examples of the alkylene groups include methylene, ethylene, n-propylene, iso-propylene, n-butylene, sec-butylene, t-butylene, trifluoromethylene, 2-hydroxyethylene, 2-ethoxyethylene, 2-cyanoethylene, 2-methoxyethylene, benzylidene, phenylethylene, 4-chlorophenylethylene, 4-methylphenylethylene and 4-biphenylethylene groups.

Suitable groups for use in the substituted or unsubstituted cycloalkylene groups include cyclic alkylene groups having from 5 to 7 carbon atoms, which may be substituted with a fluorine atom or another group such as a hydroxyl group, alkyl groups having from 1 to 4 carbon atoms, and alkoxy groups having 1 to 4 carbon atoms. Specific examples of the substituted or unsubstituted cycloalkylene groups include cyclohexylidene, cyclohexylene, and 3,3-dimethylcyclohexylidene groups.

Specific examples of the substituted or unsubstituted alkylene ether groups include ethyleneoxy, propyleneoxy, ethylene glycol, propylene glycol, diethylene glycol, tetraethylene glycol, and tripropylene glycol groups. The alkylene group of the alkylene ether groups may be substituted with another group such as hydroxyl, methyl and ethyl groups.

As the vinylene group, groups having one of the following formulae can be preferably used.

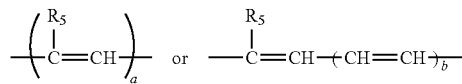

In the above-mentioned formulae, $R_5$ represents a hydrogen atom, one of the alkyl groups mentioned above for use in paragraph (2), or one of the aryl groups mentioned above for use in $Ar^3$ and $Ar^4$, wherein a is 1 or 2, and b is 1, 2 or 3.

In formulae (13) and (14), Z represents a substituted or unsubstituted alkylene group, a substituted or unsubstituted divalent alkylene ether group, a divalent alkyleneoxycarbonyl group. Specific examples of the substituted or unsubstituted alkylene group include the alkylene groups mentioned above for use as X. Specific examples of the substituted or unsubstituted alkylene ether group include the divalent alkylene ether groups mentioned above for use as X. Specific examples of the divalent alkyleneoxycarbonyl group include divalent groups modified by caprolactone.

More preferably, monomers having the following formula (16) are used as the radical polymerizable monofunctional monomer having a charge transport structure.

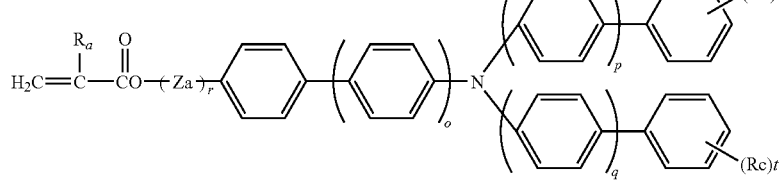

formula (16)

In formula (16), each of o, p and q is 0 or 1; Ra represents a hydrogen atom, or a methyl group; each of Rb and Rc represents an alkyl group having from 1 to 6 carbon atoms, wherein each of Rb and Rc can include plural groups which are the same as or different from each other; each of s and t is 0, 1, 2 or 3; r is 0 or 1; Za represents a methylene group, an ethylene group or a group having one of the following formulae.

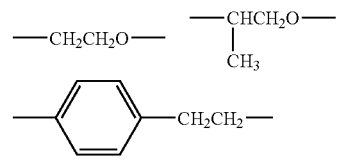

In formula (16), each of Rb and Rc is preferably a methyl group or an ethyl group.

The radical polymerizable monofunctional monomers having formula (13) or (14) (preferably formula (16)), have the following property. Namely, a monofunctional monomer is polymerized while the double bond of a molecule is connected with the double bonds of other molecules. Therefore, the monomer is incorporated in a polymer chain, i.e., in a main chain or a side chain of the crosslinked polymer chain which is formed by the monomer and a radical polymerizable tri- or more-functional monomer. The side chain of the unit obtained from the monofunctional monomer is present between two main polymer chains which are connected by crosslinking chains. In this regard, the crosslinking chains are classified into intermolecular crosslinking chains and intramolecular crosslinking chains.

In any of these case, the triarylamine group which is a pendant of the main chain of the unit obtained from the monofunctional monomer is bulky and is connected with the main chain with a carbonyl group therebetween while not being fixed (i.e., while being fairly free three-dimensionally). Therefore, the crosslinked polymer has little strain, and in addition the crosslinked protective layer has good charge transport property.

Specific examples of the radical polymerizable monofunctional monomers include the following compounds Nos. 1-160, but are not limited thereto.

No. 1

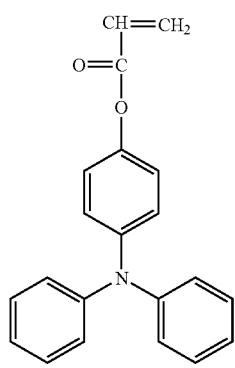

No. 2

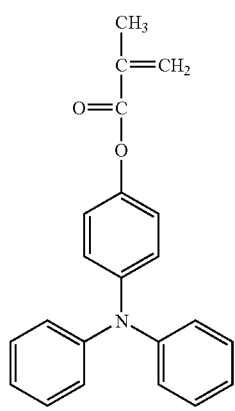

No. 3

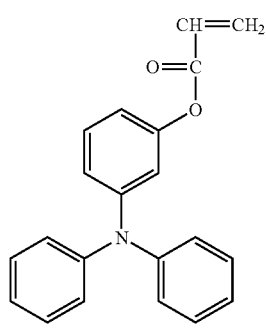

-continued

No. 4

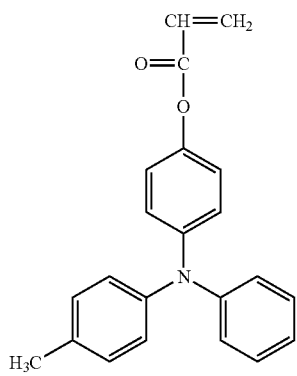

No. 5

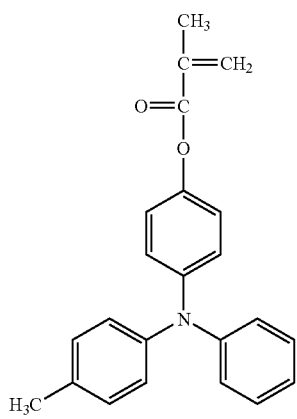

No. 6

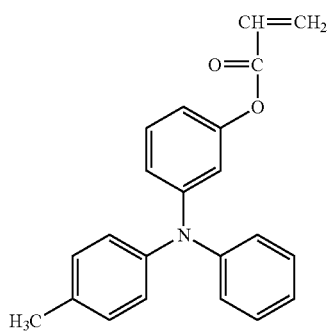

No. 7

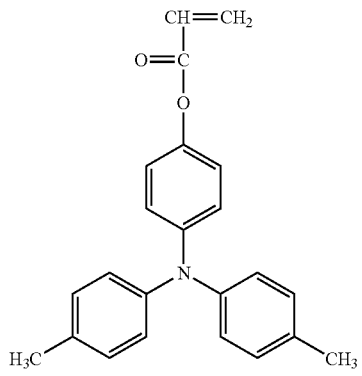

-continued
No. 8
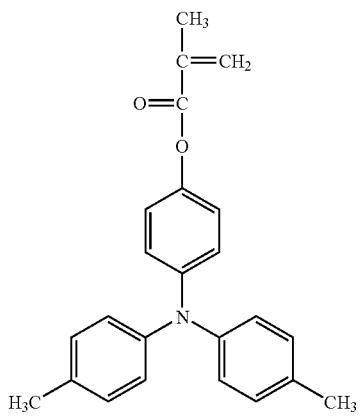
No. 9
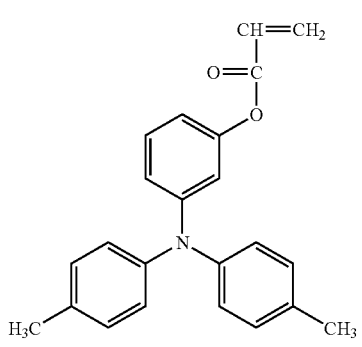
No. 10
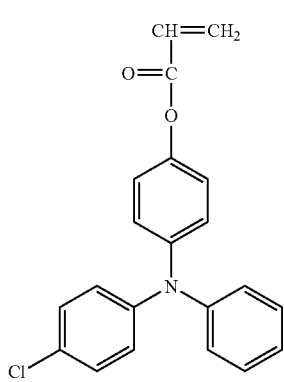
No. 11
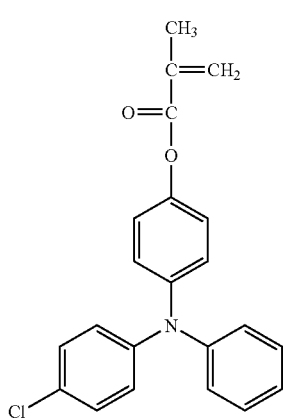
-continued
No. 12
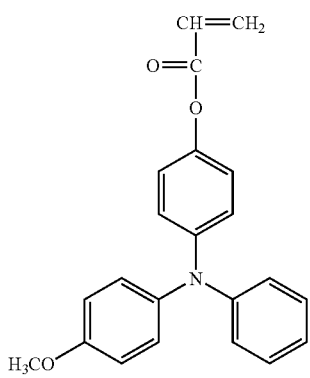
No. 13
No. 14

-continued
No. 15
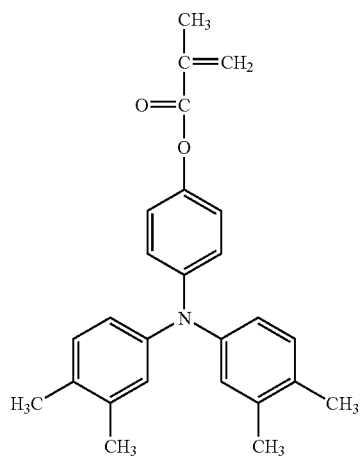
No. 16
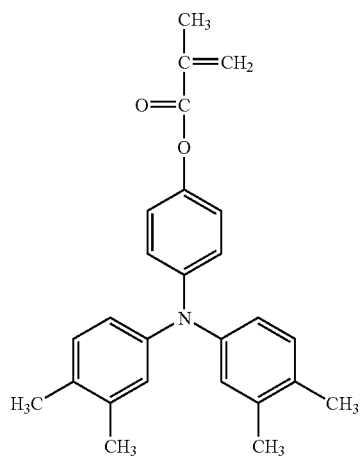
No. 17
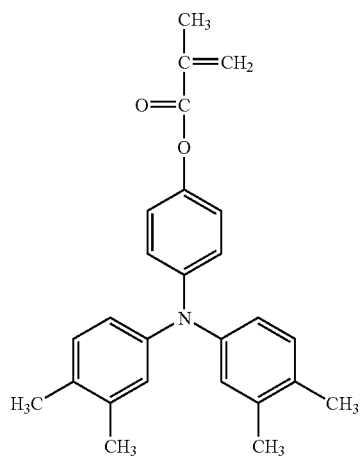
-continued
No. 18
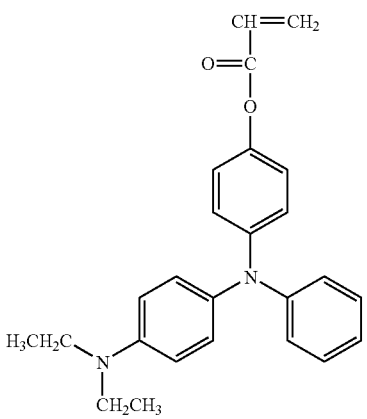
No. 19
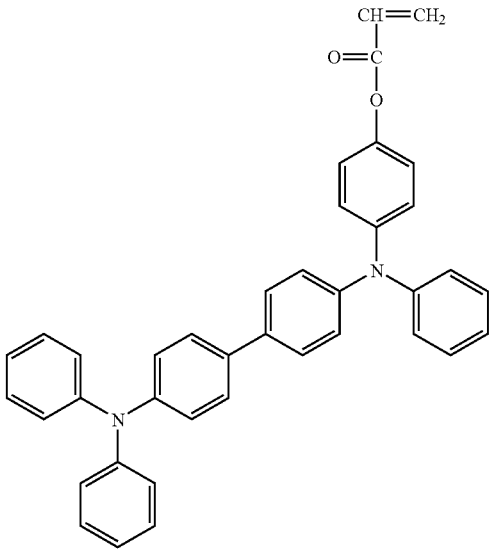
No. 20
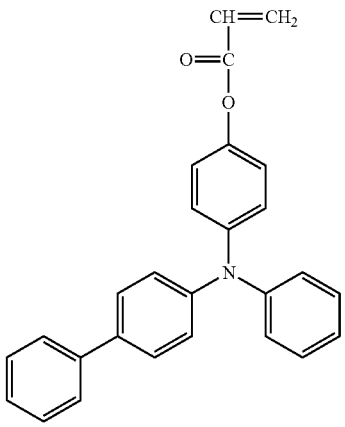

No. 21
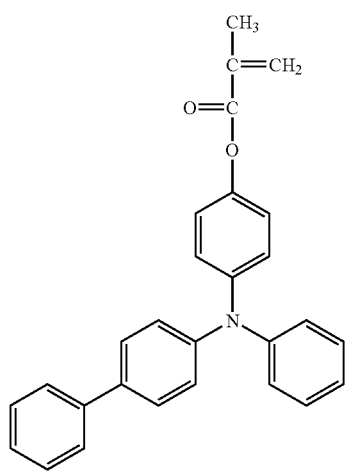
No. 24
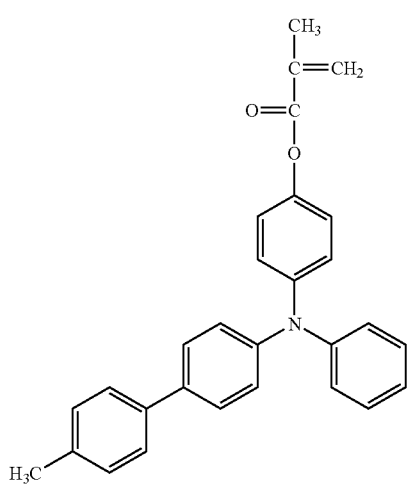
No. 22
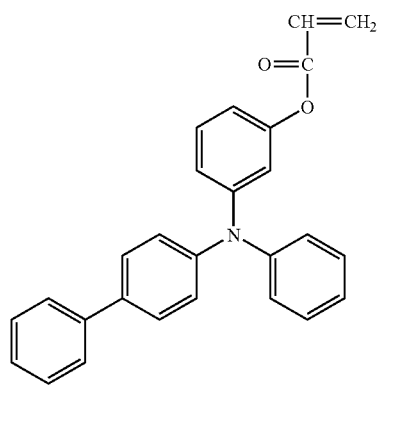
No. 25
No. 23
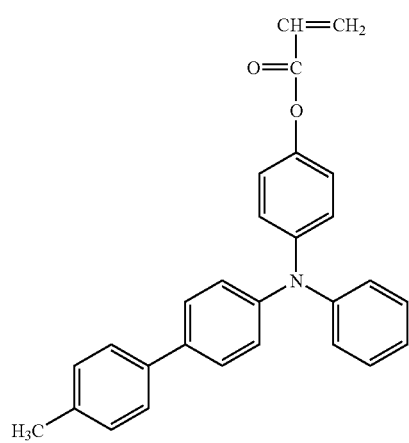
No. 26
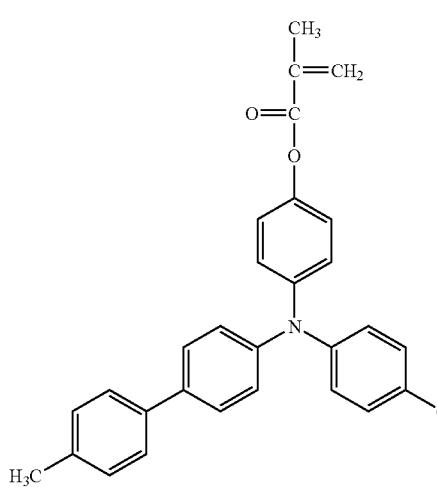

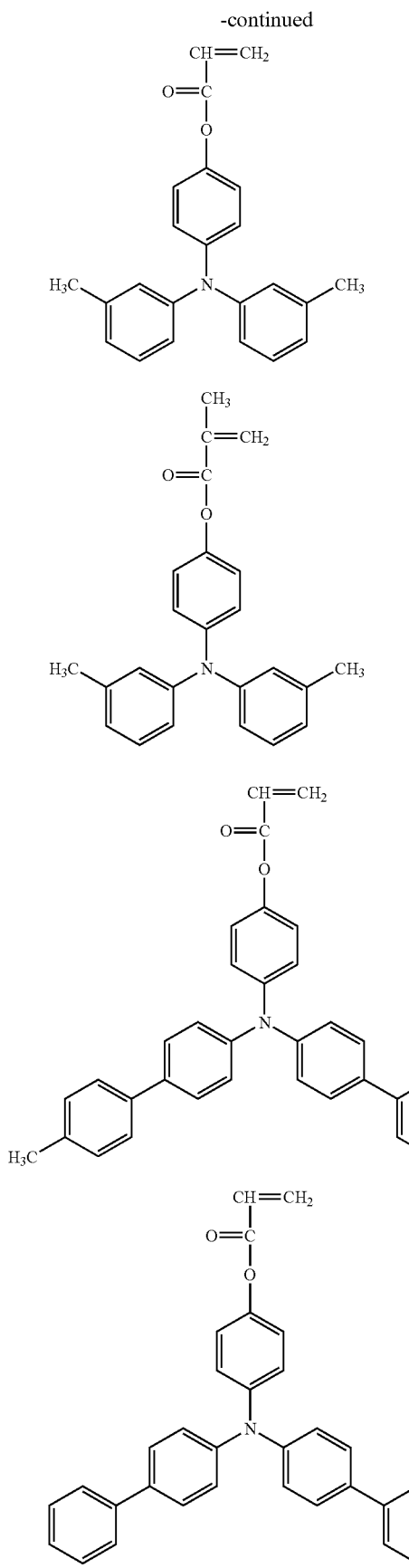

-continued
No. 35
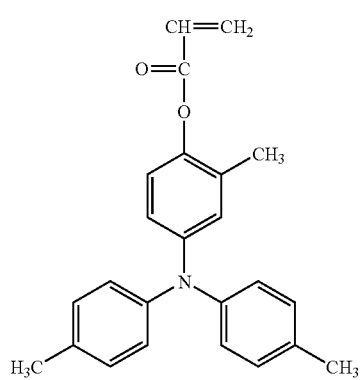
No. 36
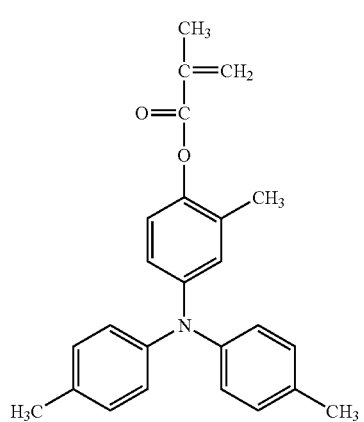
No. 37
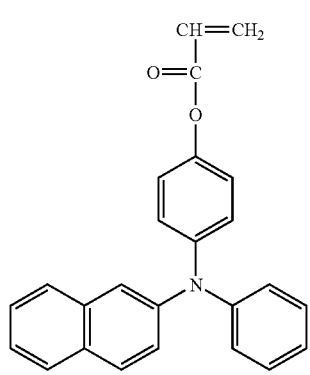
No. 38
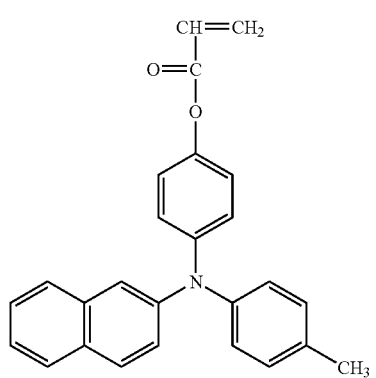
-continued
No. 39
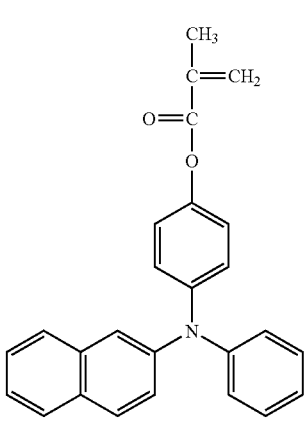
No. 40
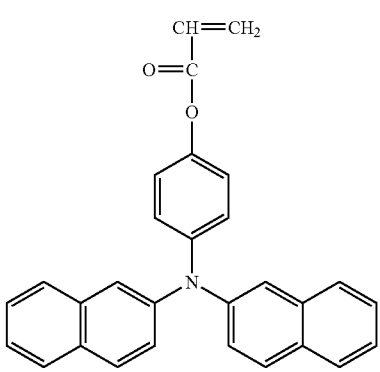
No. 41
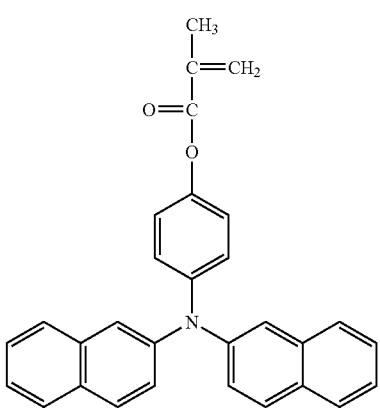

No. 42
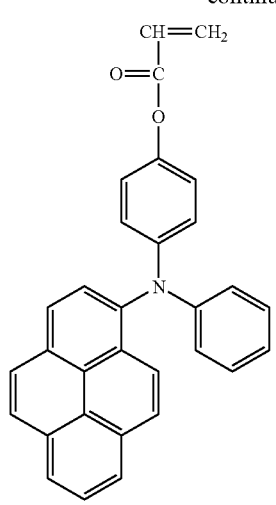
No. 43
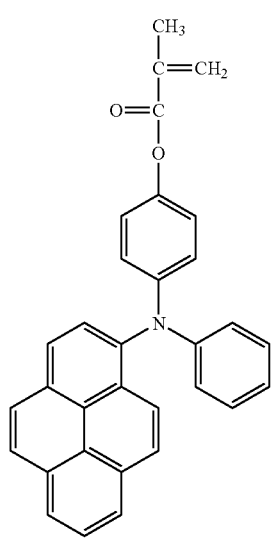
No. 44
No. 45
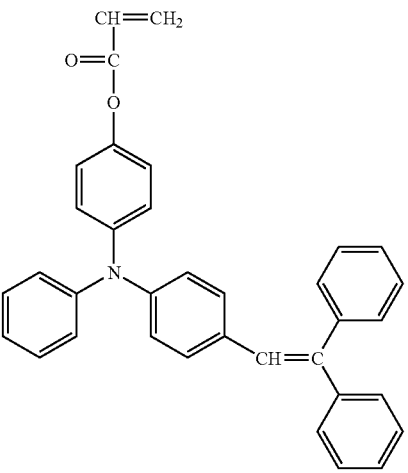
No. 46
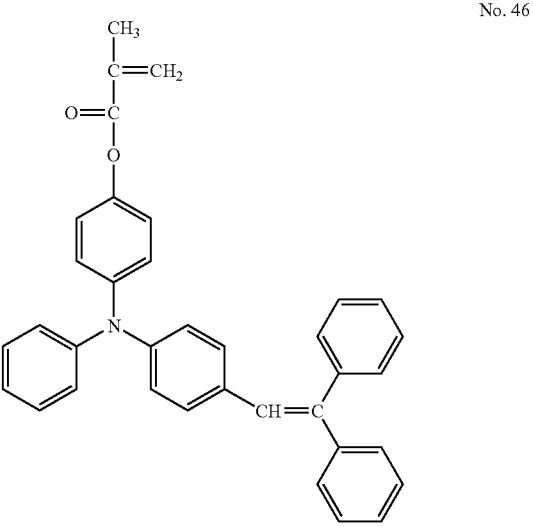
No. 47
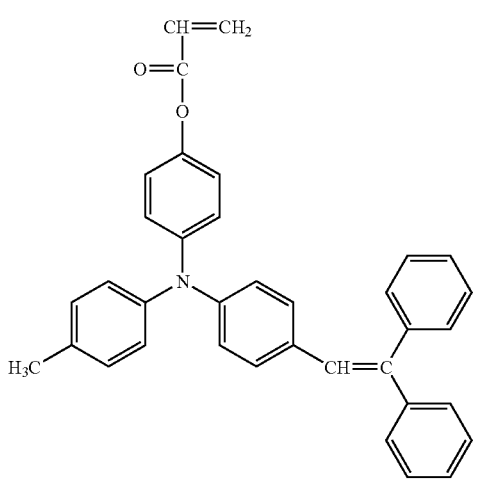

-continued

No. 48
No. 49
No. 50
No. 51
No. 52
No. 53

-continued
No. 54
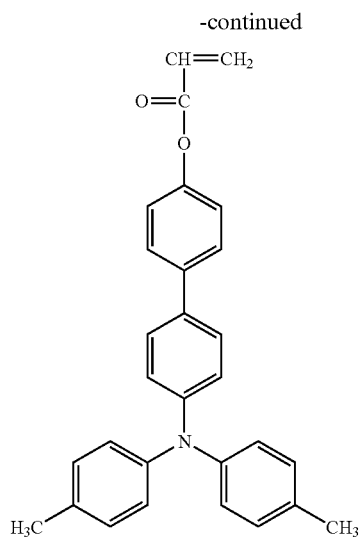
No. 55
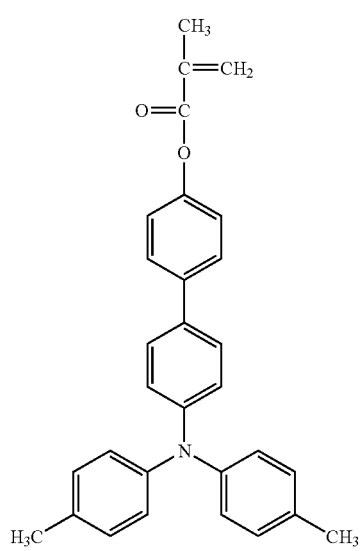
No. 56
-continued
No. 57
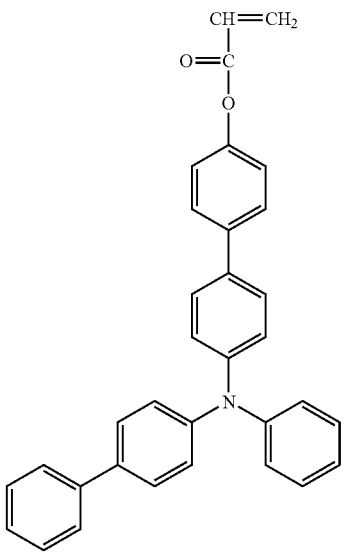
No. 58
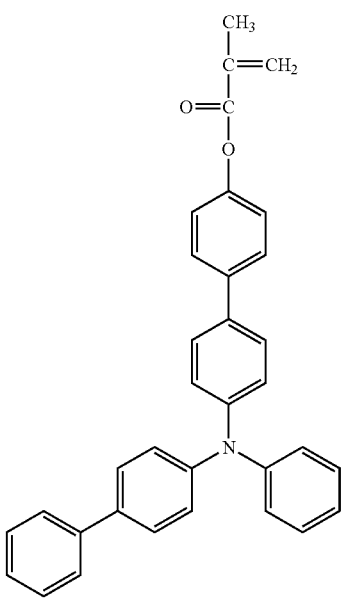

-continued
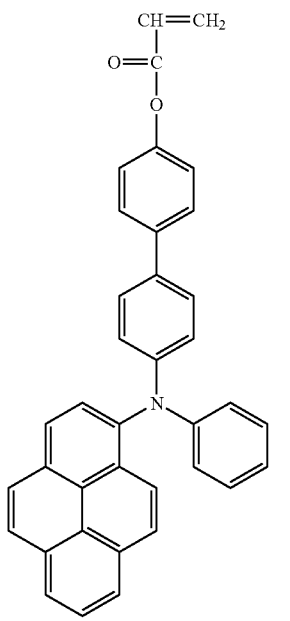
No. 60
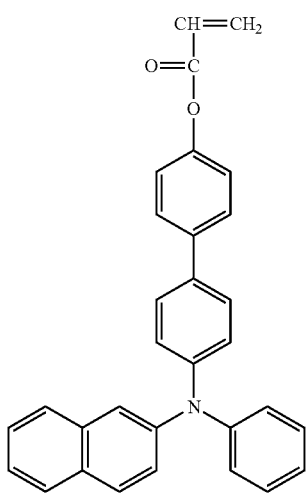
No. 61
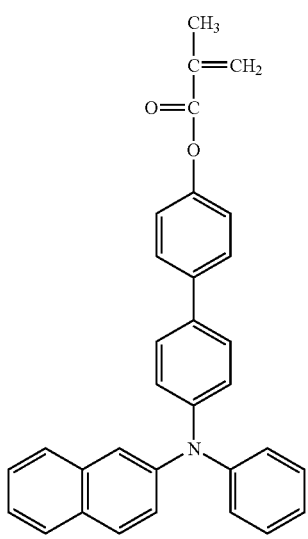
-continued
No. 59
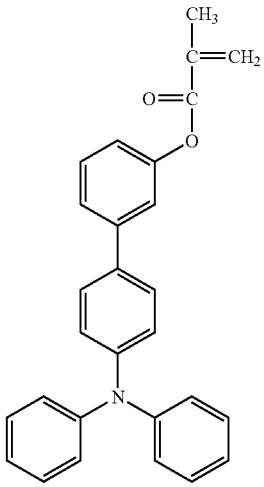
No. 62
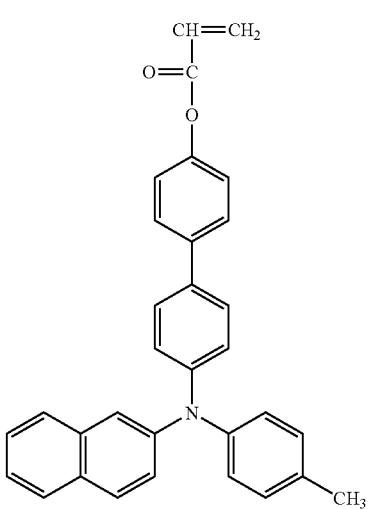
No. 63
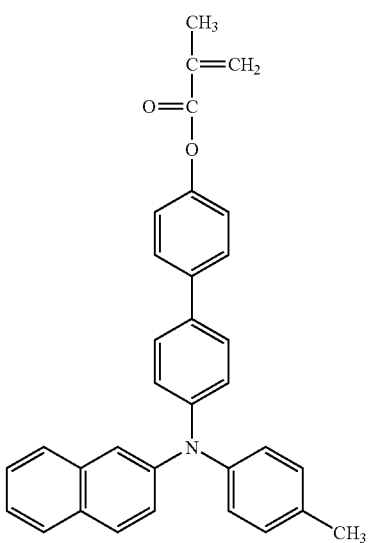
No. 64

-continued
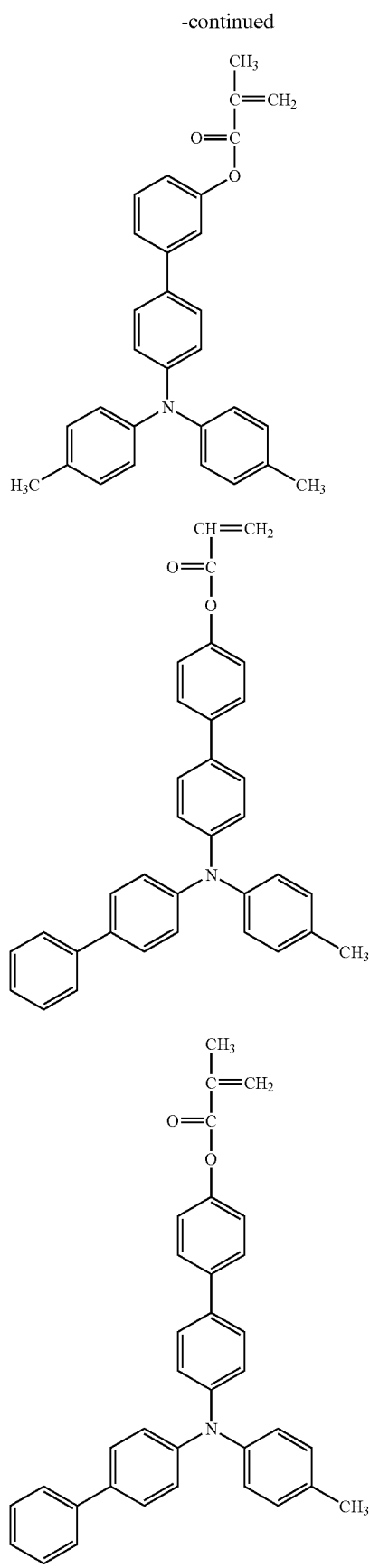
No. 65
No. 66
No. 67
-continued
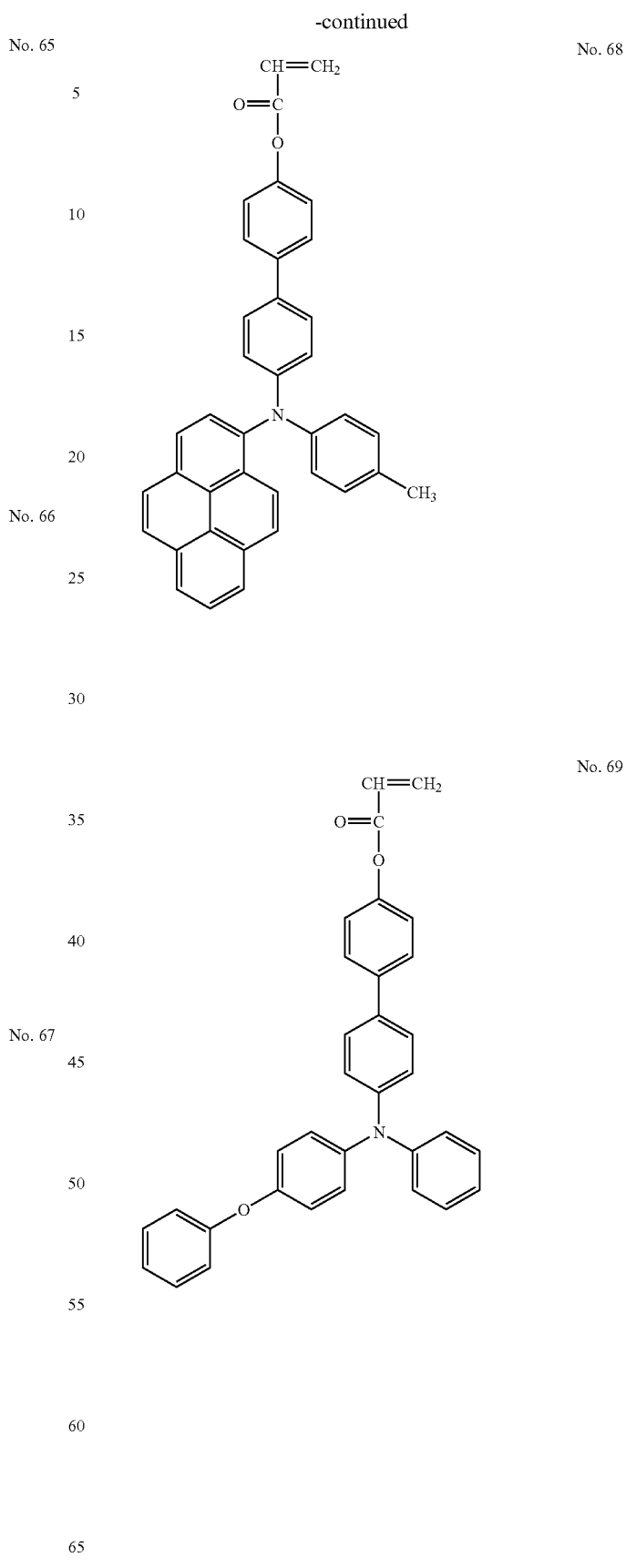
No. 68
No. 69

-continued
No. 70
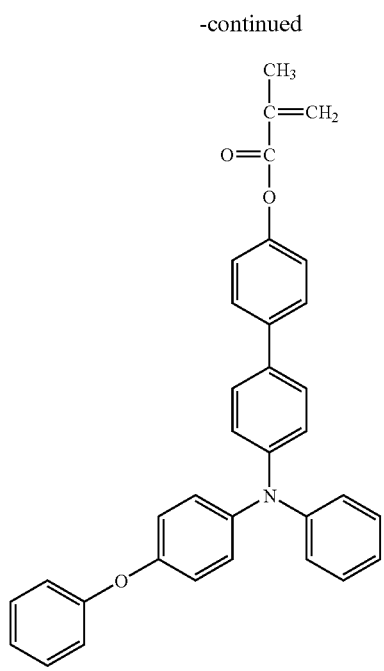
No. 71
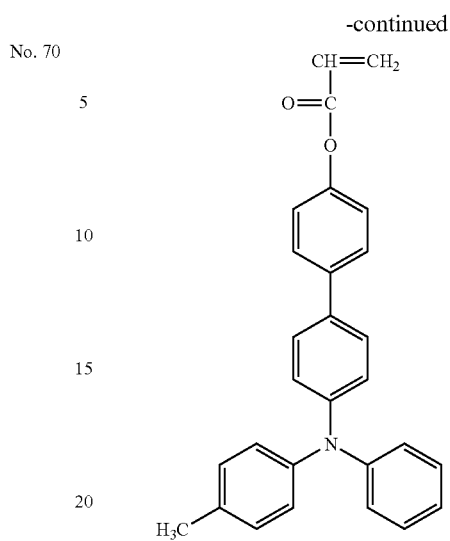
-continued
No. 72
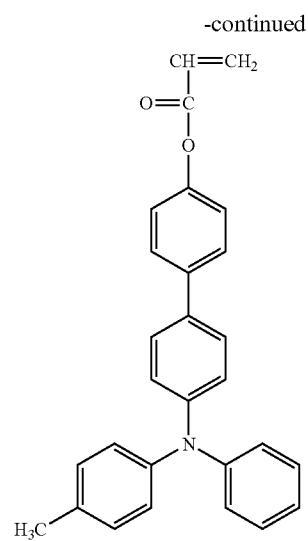
No. 73
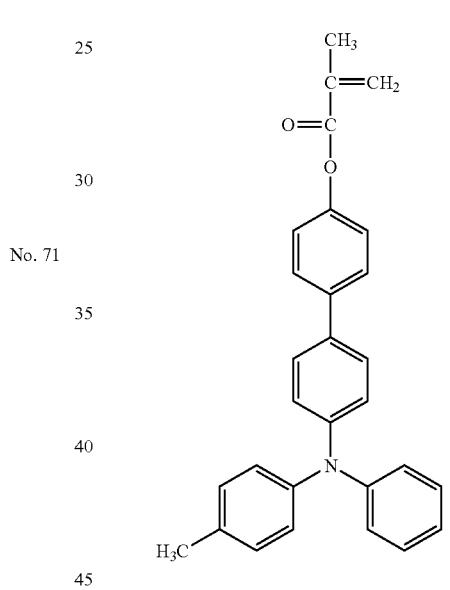
No. 74
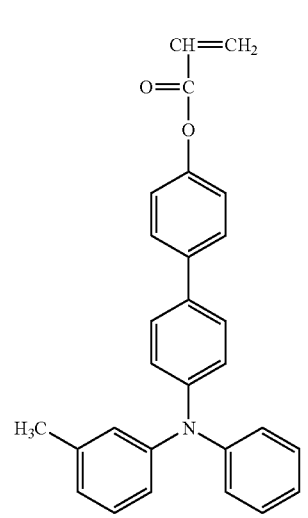

-continued
No. 75
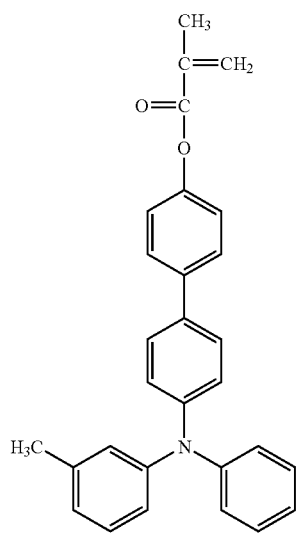
No. 76
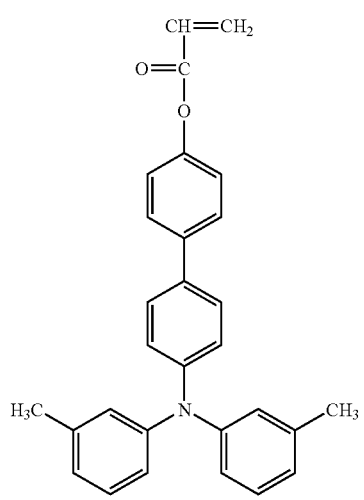
No. 77
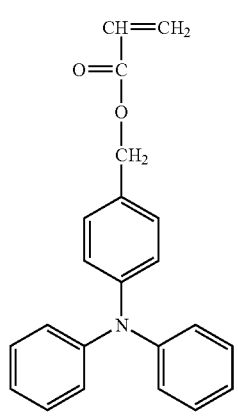
-continued
No. 78
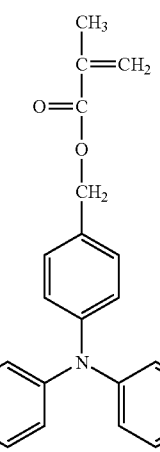
No. 79
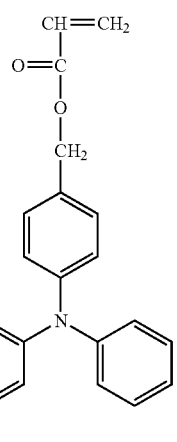
No. 80
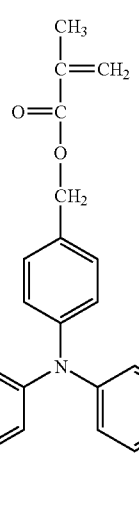

-continued
No. 81
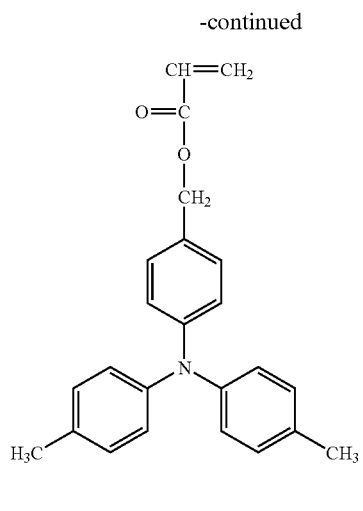
No. 84
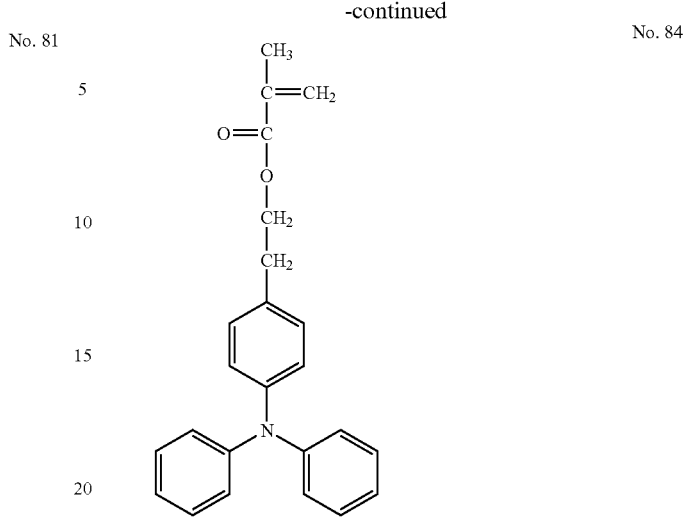
No. 82
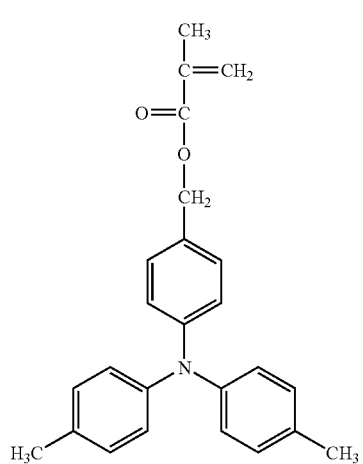
No. 85
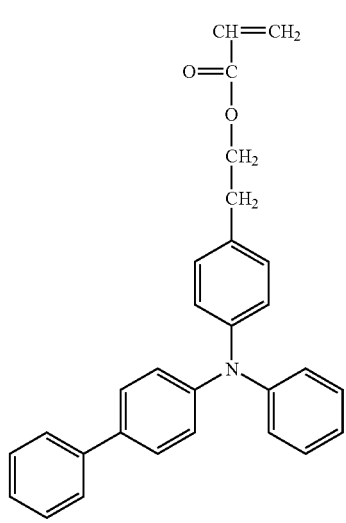
No. 83
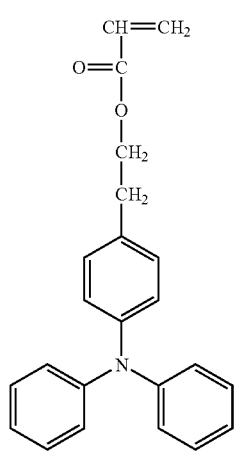
No. 86
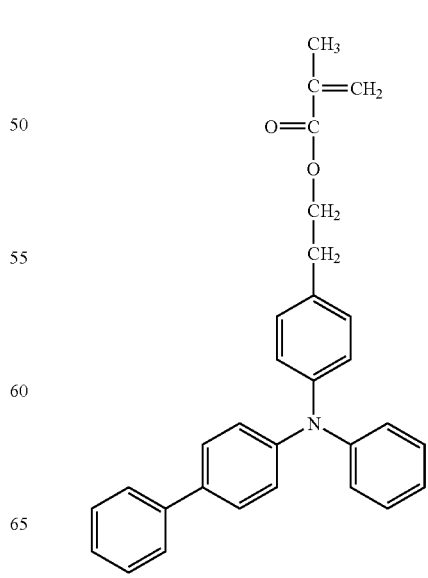

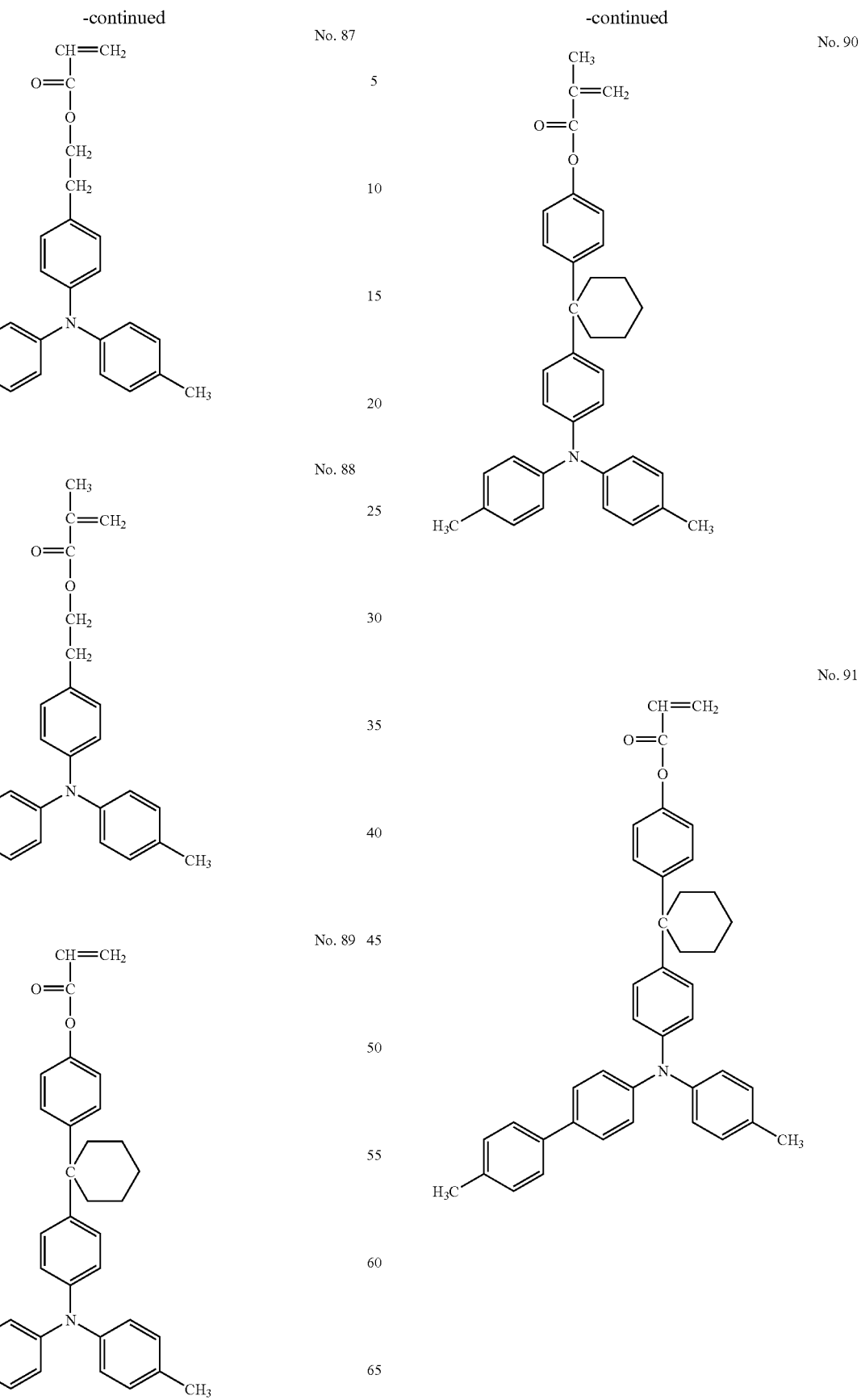

No. 92
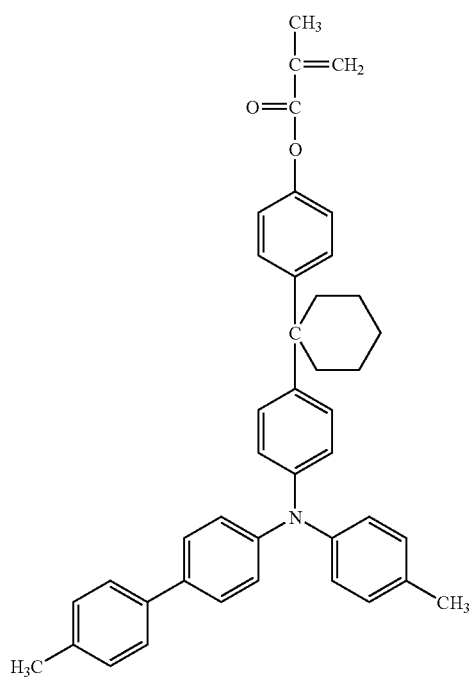
No. 94
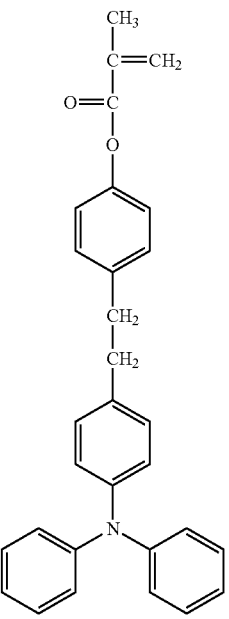
No. 93
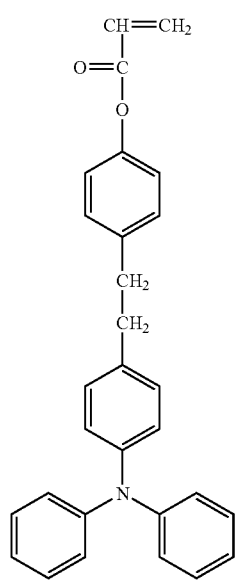
No. 95
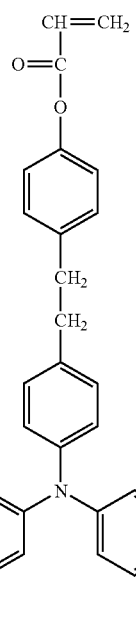

-continued
No. 96
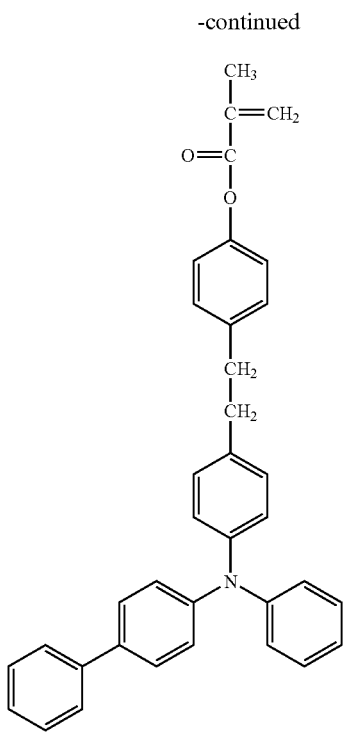
No. 98
No. 99
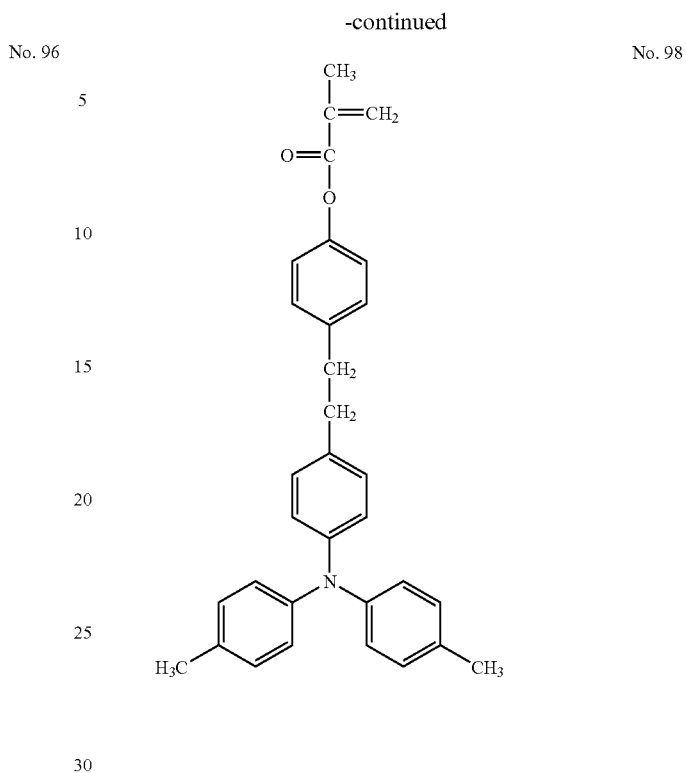
No. 97
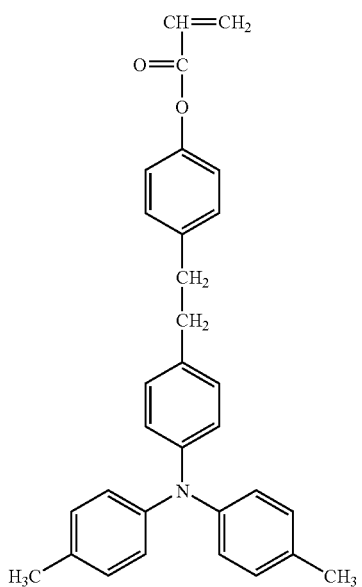

-continued
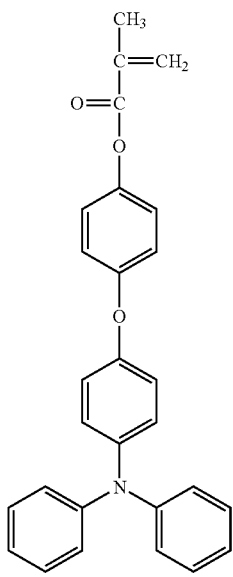
No. 100
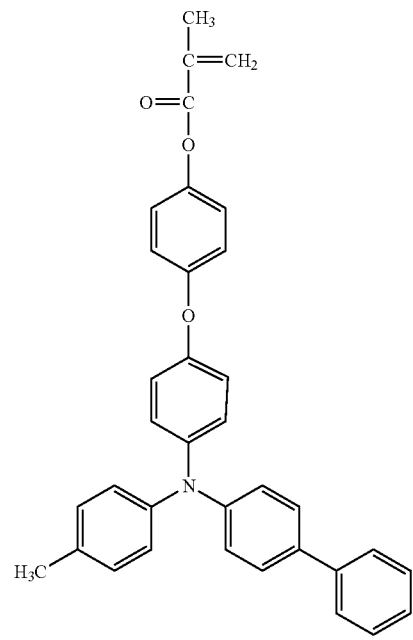
No. 102
No. 101
No. 103

No. 104
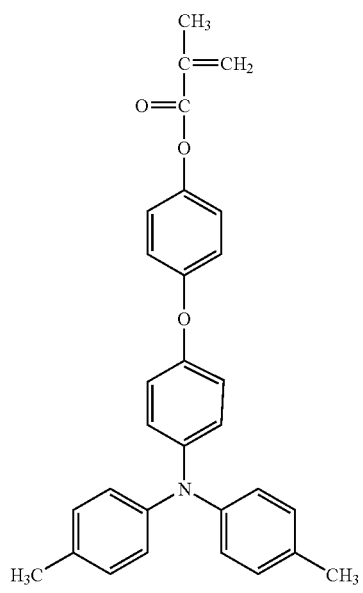
No. 106
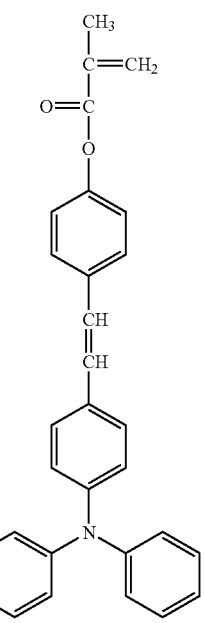
No. 105
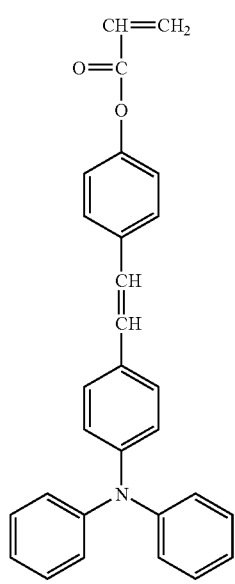
No. 107

-continued
No. 108
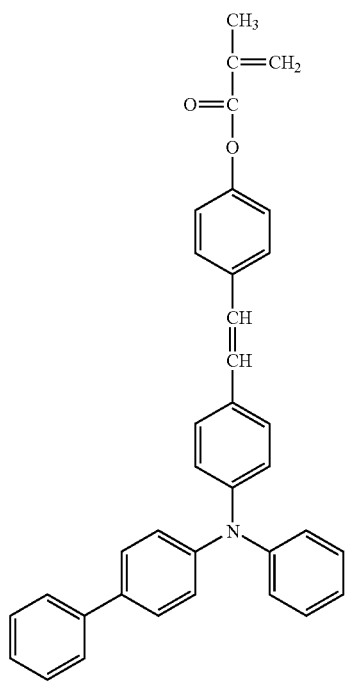
No. 109
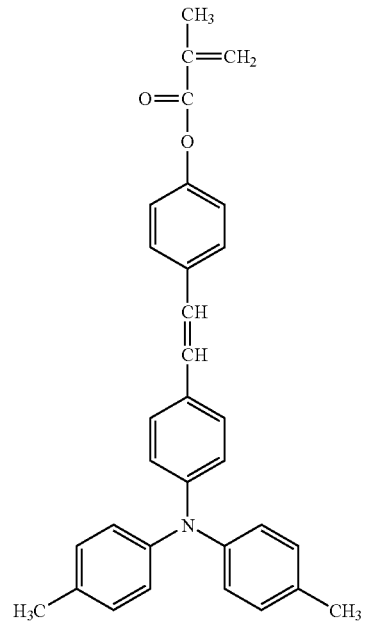
-continued
No. 110
No. 111
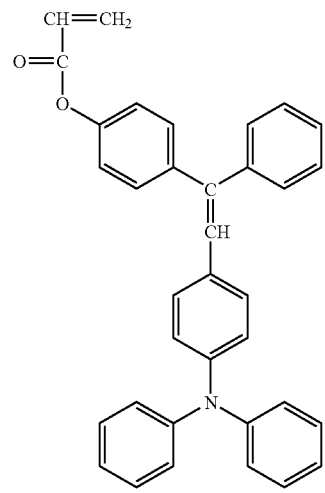
No. 112
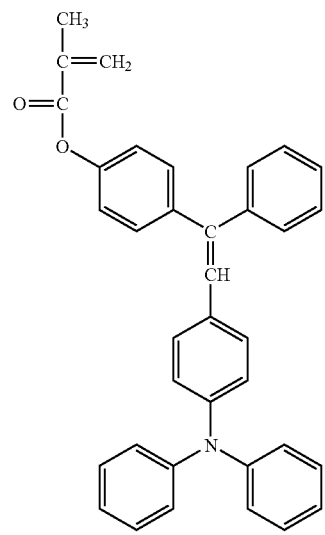

-continued
No. 113
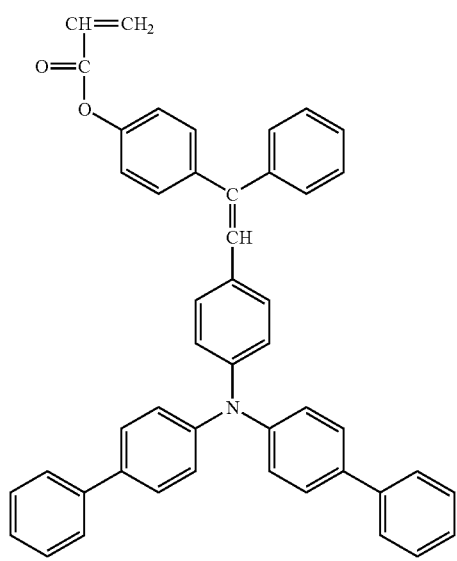
No. 114
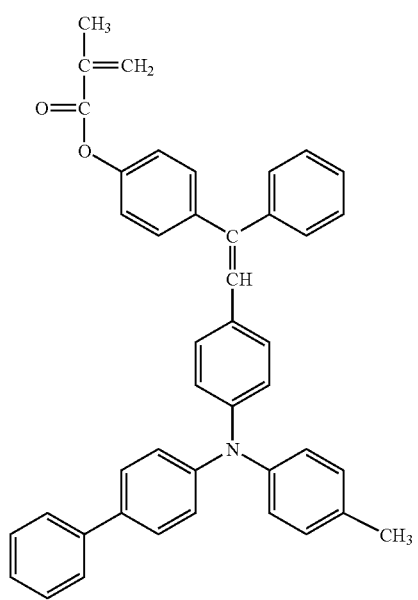
No. 115
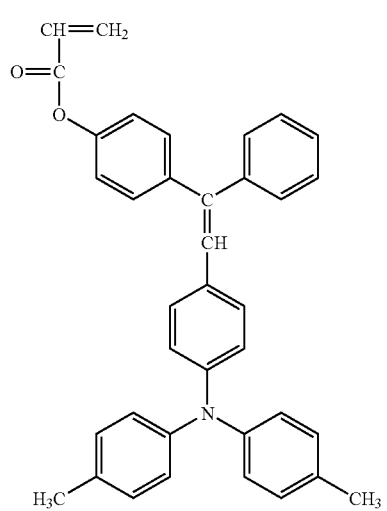
-continued
No. 116
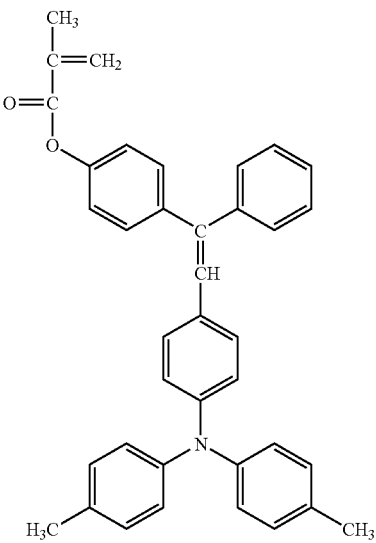
No. 117
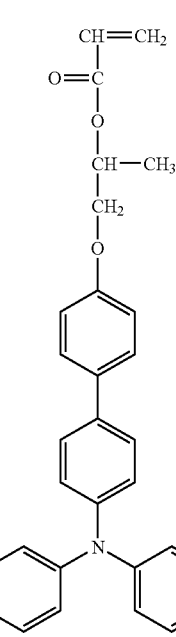

No. 118
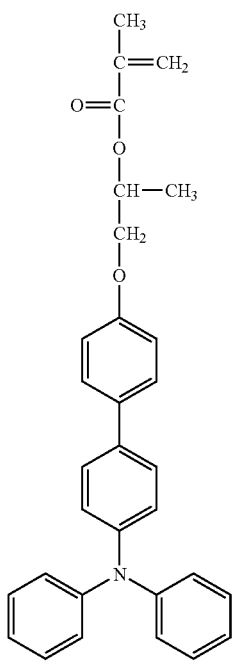
No. 119
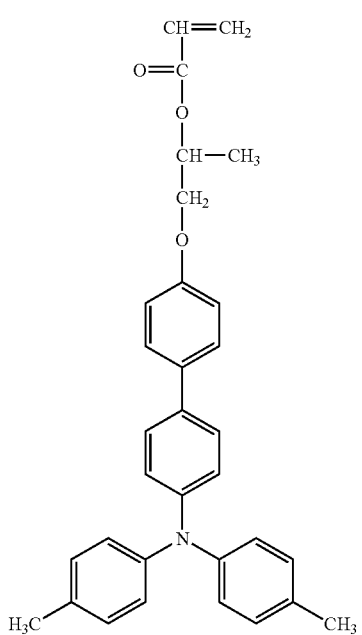
No. 120
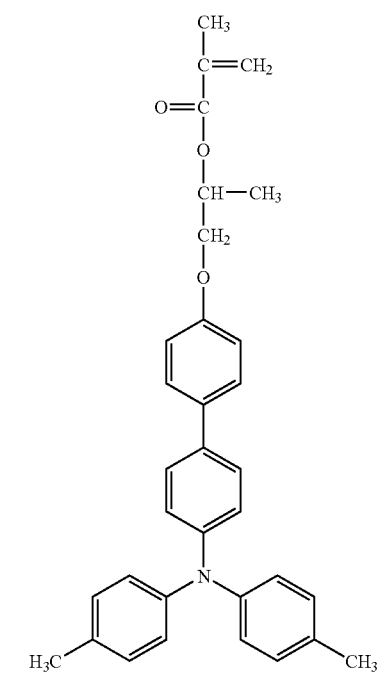
No. 121
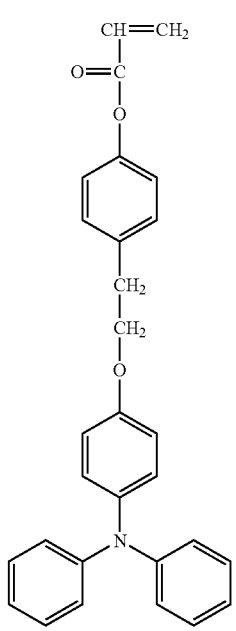

No. 122
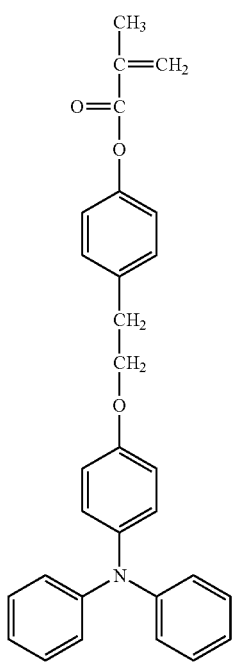
No. 123
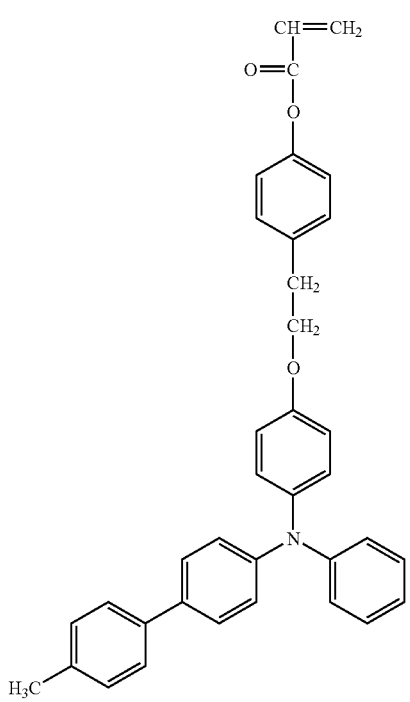
No. 124
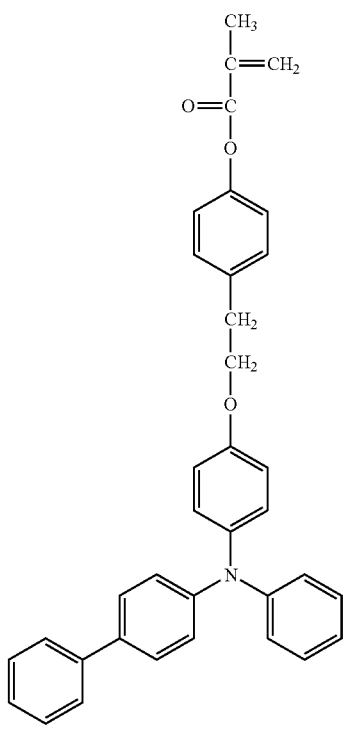
No. 125

-continued
No. 126
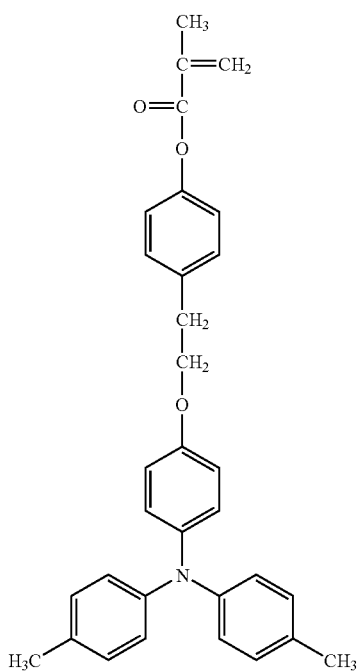
No. 127
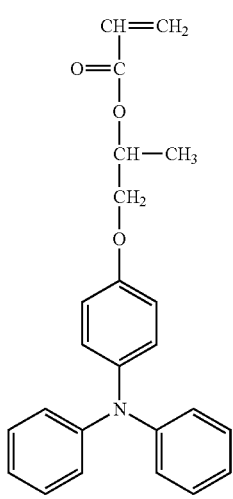
No. 128
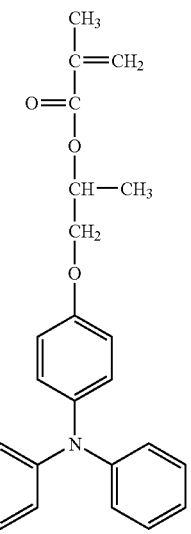
No. 129
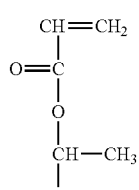

No. 130 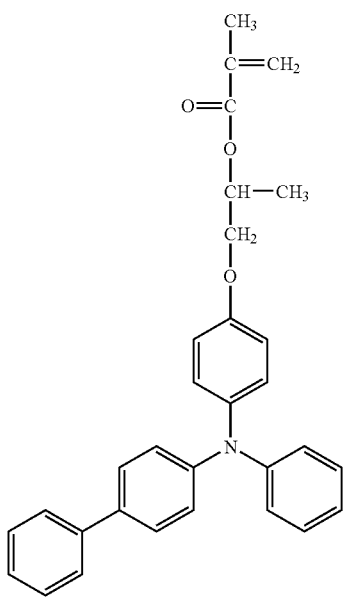
No. 131 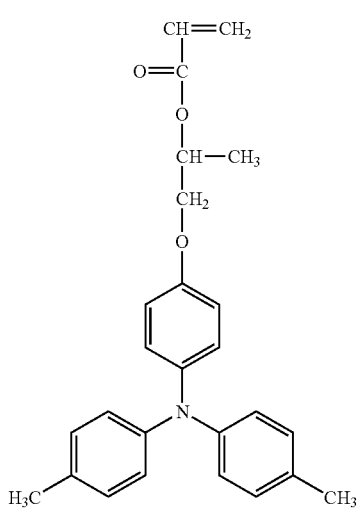
No. 132 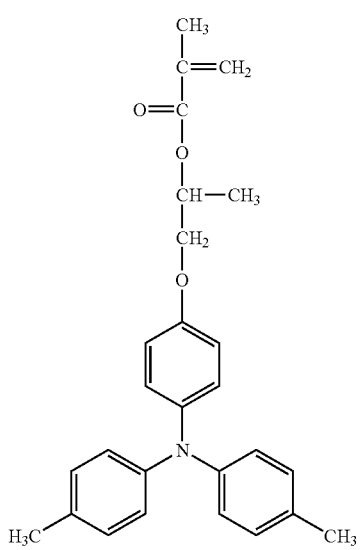
No. 133 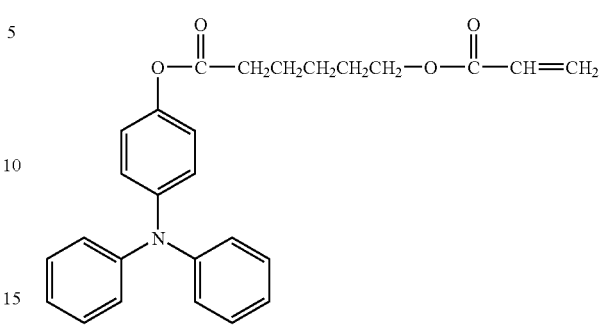
No. 134 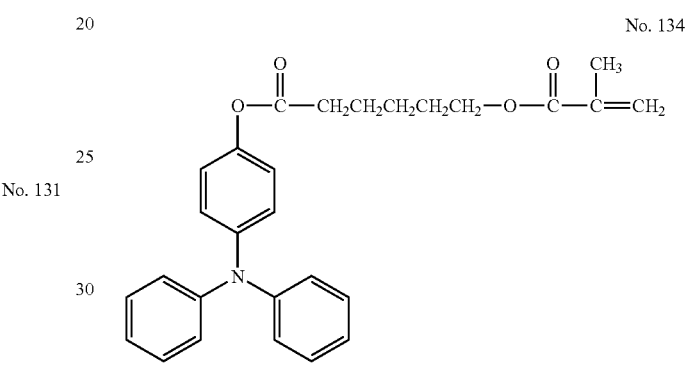
No. 135 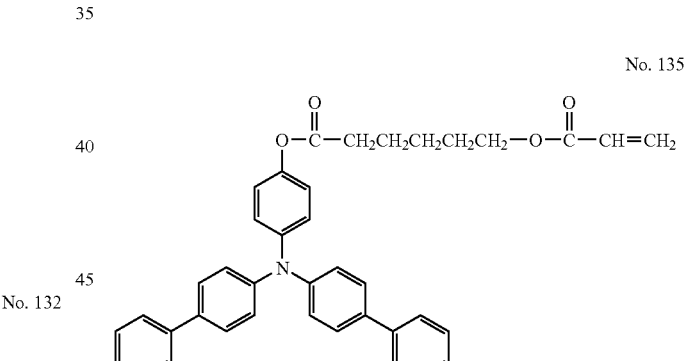
No. 136 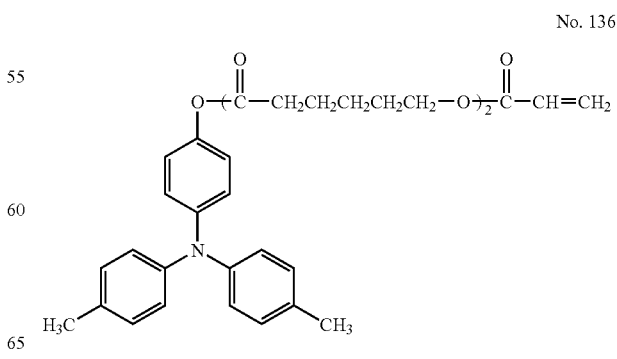

-continued
No. 137
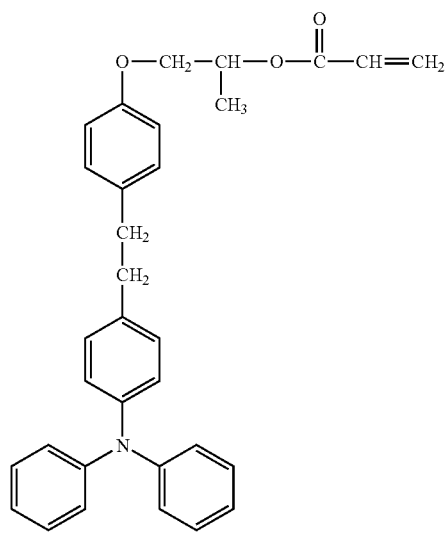
No. 138
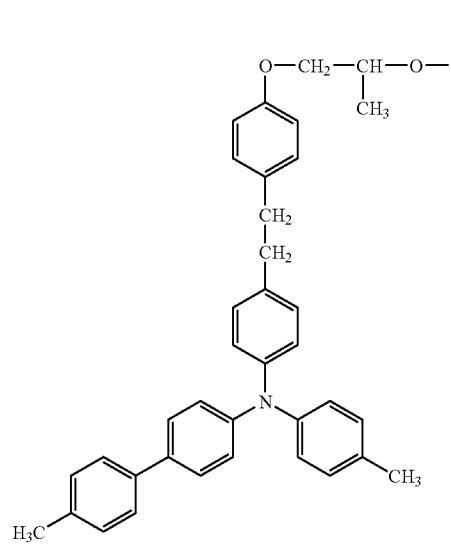
No. 139
-continued
No. 140
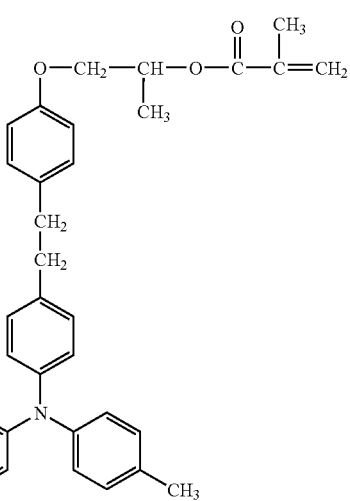
No. 141
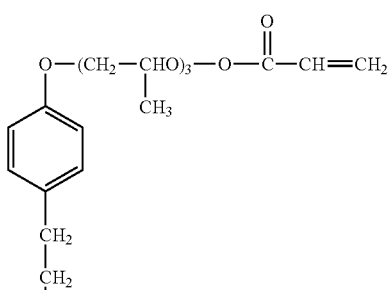

No. 142
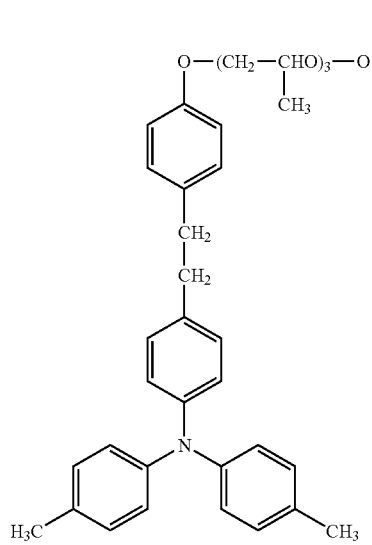
No. 143
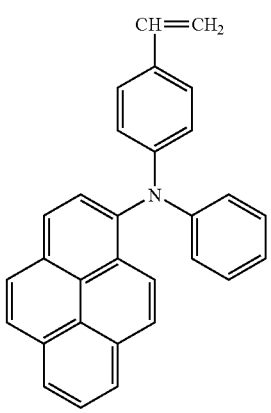
No. 144
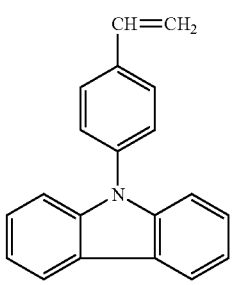
No. 145
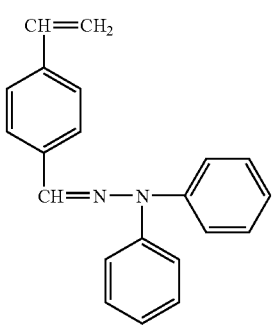
No. 146
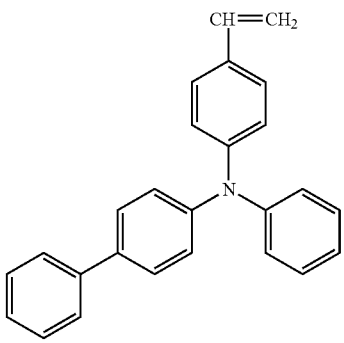
No. 147
No. 148
No. 149
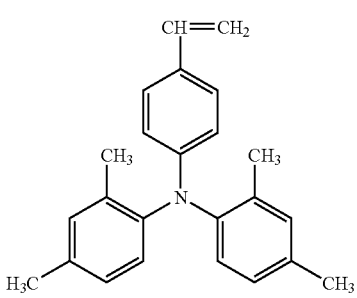
No. 150

-continued
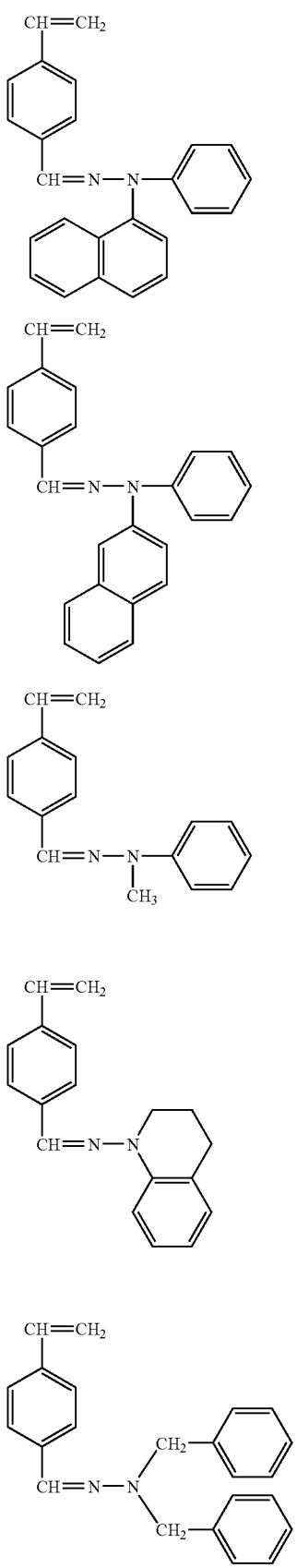
No. 151
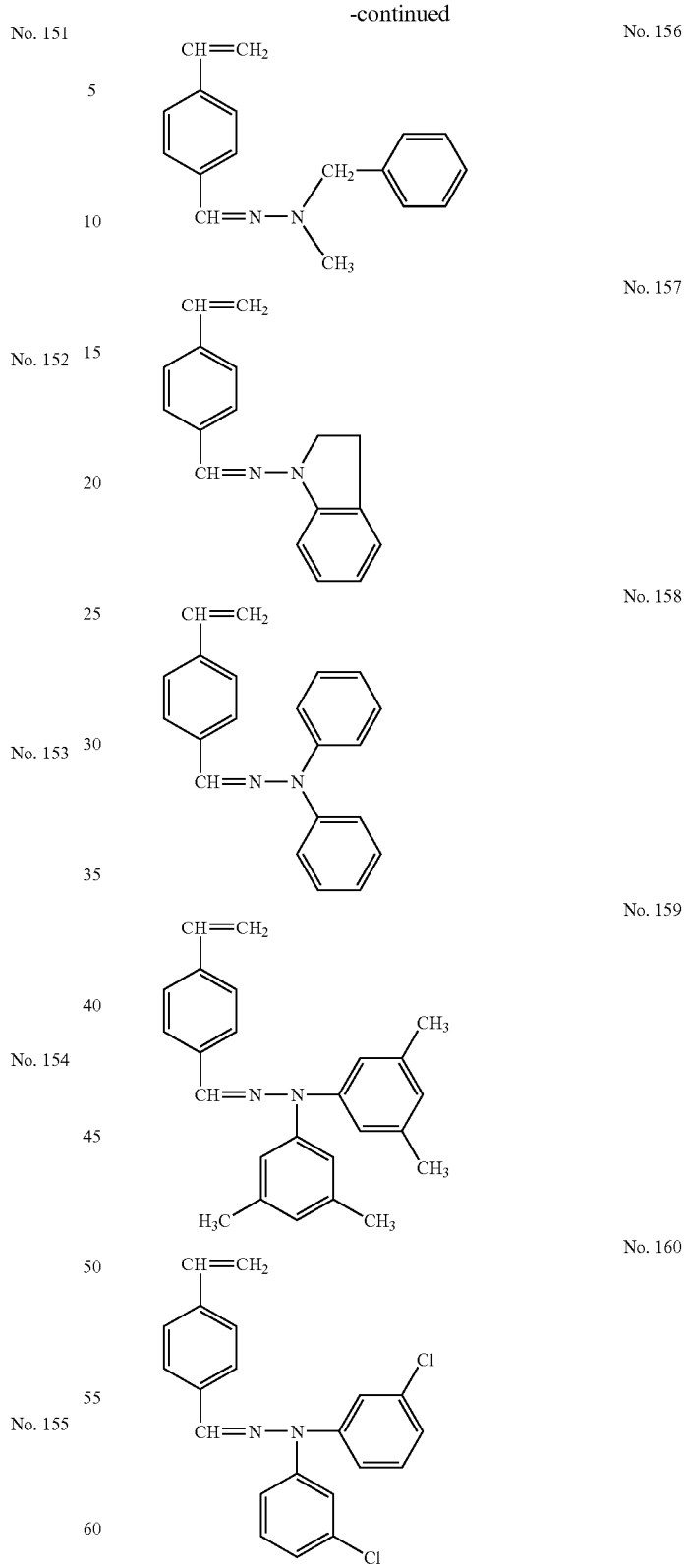
No. 152
No. 153
No. 154
No. 155
No. 156
No. 157
No. 158
No. 159
No. 160
The radical polymerizable monofunctional monomers are used for imparting a charge transport property to the resultant protective layer. The added amount of the radical polymerizable monofunctional monomers is preferably from 20 to 80% by weight, and more preferably from 30 to 70% by weight, based on the total weight of the protective layer. When the added amount is too small, good charge transport property cannot be imparted to the resultant polymer, and thereby the electric properties (such as photosensitivity and residual potential) of the resultant photoreceptor deteriorate. In contrast, when the added amount is too large, the crosslinking density of the resultant protective layer decreases, and thereby the abrasion resistance of the resultant photoreceptor deteriorates. From this point of view, the added amount of the monofunctional monomers is from 30 to 70% by weight.

The crosslinked protective layer is typically prepared by reacting (crosslinking) at least a radical polymerizable tri- or more-functional monomer and a radical polymerizable monofunctional monomer. However, in order to reduce the viscosity of the coating liquid, to relax the stress of the protective layer, and to reduce the surface energy and friction coefficient of the protective layer, known radical polymerizable mon- or di-functional monomers and radical polymerizable oligomers having no charge transport structure can be used in combination therewith.

Specific examples of the radical polymerizable monofunctional monomers having no charge transport structure include 2-ethylhexyl acrylate, 2-hydroxyethyl acrylate, 2-hydroxypropyl acrylate, tetrahydrofurfuryl acrylate, 2-ethylhexylcarbitol acrylate, 3-methoxybutyl acrylate, benzyl acrylate, cyclohexyl acrylate, isoamyl acrylate, isobutyl acrylate, methoxytriethyleneglycol acrylate, phenoxytetraethyleneglycol acrylate, cetyl acrylate, isostearyl acrylate, stearyl acrylate, styrene, etc.

Specific examples of the radical polymerizable difunctional monomers having no charge transport structure include 1,3-butanediol diacrylate, 1,4-butanediol diacrylate, 1,4-butanediol dimethacrylate, 1,6-hexanediol diacrylate, 1,6-hexanediol dimethacrylate, diethylene glycol diacryalte, neopentylglycol diacrylate, binsphenol A—ethyleneoxy-modified diacrylate, bisphenol F—ethyleneoxy-modified diacrylate, neopentylglycol diacryalte, etc.

Specific examples of the mon- or di-functional monomers for use in imparting a function such as low surface energy and/or low friction coefficient to the crosslinked protective layer include fluorine-containing monomers such as octafluoropentyl acrylate, 2-perfluorooctylethyl acrylate, 2-perfluorooctylethyl methacrylate, and 2-perfluoroisononylethyl acrylate; and vinyl monomers, acrylates and methacrylates having a polysiloxane group such as siloxane units having a repeat number of from 20 to 70 which are described in JP-B 05-60503 and 06-45770 (e.g., acryloylpolydimethylsiloxaneethyl, methacryloylpolydimethylsiloxaneethyl, acryloylpolydimethylsiloxanepropyl, acryloylpolydimethylsiloxanebutyl, and diacryloylpolydimethylsiloxanediethyl).

Specific examples of the radical polymerizable oligomers include epoxyacryalte oligomers, urethane acrylate oligomers, polyester acrylate oligomers, etc.

The added amount of such mono- and di-functional monomers is preferably not greater than 50 parts by weight, and more preferably not greater than 30 parts by weight, per 100 parts by weight of the tri- or more-functional monomers used. When the added amount is too large, the crosslinking density decreases, and thereby the abrasion resistance of the resultant protective layer deteriorates.

In addition, in order to efficiently crosslink the protective layer, a polymerization initiator can be added to the protective layer coating liquid. Suitable polymerization initiators include heat polymerization initiators and photo polymerization initiators. The polymerization initiators can be used alone or in combination.

Specific examples of the heat polymerization initiators include peroxide initiators such as 2,5-dimethylhexane-2,5-dihydroperoxide, dicumyl peroxide, benzoyl peroxide, t-butylcumyl peroxide, 2,5-dimethyl-2,5-di(peroxybenzoyl)hexyne-3, di-t-butylperoxide, t-butylhydroperoxide, cumenehydroperoxide, lauroyl peroxide, and 2,2-bis(4,4-di-t-butylperoxycyclohexy)propane; and azo type initiators such as azobisisobutyronitrile, azobiscyclohexanecarbonitrile, azobisbutyric acid methyl ester, hydrochloric acid salt of azobisisobutylamidine, and 4,4'-azobis-cyanovaleric acid.

Specific examples of the photopolymerization initiators include acetophenone or ketal type photopolymerization initiators such as diethoxyacetophenone, 2,2-dimethoxy-1,2-diphenylethane-1-one, 1-hydroxy-cyclohexyl-phenyl-ketone, 4-(2-hydroxyethoxy)phenyl-(2-hydroxy-2-propyl) ketone, 2-benzyl-2-dimethylamino-1-(4-morpholinophenyl) butanone-1, 2-hydroxy-2-methyl-1-phenylpropane-1-one, 2-methyl-2-morpholino(4-methylthiophenyl)propane-1-one, and 1-phenyl-1,2-propanedione-2-(o-ethoxycarbonyl) oxime; benzoin ether type photopolymerization initiators such as benzoin, benzoin methyl ether, benzoin ethyl ether, benzoin isobutyl ether, and benzoin isopropyl ether; benzophenone type photopolymerization initiators such as benzophenone, 4-hydroxybenzophenone, o-benzoylbenzoic acid methyl ester, 2-benzoyl naphthalene, 4-benzoyl biphenyl, 4-benzoyl phenyl ether, acryalted benzophenone, and 1,4-benzoyl benzene; thioxanthone type photopolymerization initiators such as 2-isopropylthioxanthone, 2-chlorothioxanthone, 2,4-dimethylthioxanthone, 2,4-diethylthioxanthone, and 2,4-dichlorothioxanthone; and other photopolymerization initiators such as ethylanthraquinone, 2,4,6-trimethylbenzoyldiphenylphosphineoxide, 2,4,6-trimethylbenzoylphenylethoxyphosphineoxide, bis(2,4,6-trimethylbenzoyl)phenylphosphineoxide, bis(2,4-dimethoxybenzoyl)-2,4,4-trimethylpentylphosphineoxide, methylphenylglyoxyester, 9,10-phenanthrene, acridine compounds, triazine compounds, imidazole compounds, etc.

Photopolymerization accelerators can be used alone or in combination with the above-mentioned photopolymerization initiators. Specific examples of the photopolymerization accelerators include triethanolamine, methyldiethanolamine, ethyl 4-dimethylaminobenzoate, isoamyl 4-dimethylaminobenzoate, 2-dimethylaminoethyl benzoate, 4,4'-dimethylaminobenzophenone, etc.

The added amount of the polymerization initiators is preferably from 0.5 to 40 parts by weight, and more preferably from 1 to 20 parts by weight, per 100 parts by weight of the total weight of the radical polymerizable monomers used.

In order to relax the stress of the crosslinked protective layer and to improve the adhesion of the protective layer to the CTL, the protective layer coating liquid may include additives such as plasticizers, leveling agent, and low molecular weight charge transport materials having no radical polymerizability.

Specific examples of the plasticizers include known plasticizers for use in general resins, such as dibutyl phthalate, and dioctyl phthalate. The added amount of the plasticizers in the protective layer coating liquid is preferably not greater than 20% by weight, and more preferably not greater than 10% by weight, based on the total solid components included in the coating liquid.

Specific examples of the leveling agents include silicone oils (such as dimethylsilicone oils, and methylphenylsilicone oils), and polymers and oligomers having a perfluoroalkyl group in their side chains. The added amount of the leveling agents is preferably not greater than 3% by weight based on the total solid components included in the coating liquid.

The crosslinked protective layer is typically prepared by coating a coating liquid including a radical polymerizable tri- or more-functional monomer and a radical polymerizable monofunctional monomer on the CTL and then crosslinking the coated layer. When the monomers are liquid, it may be possible to dissolve other components in the monomers, resulting in preparation of the protective layer coating liquid. The coating liquid can optionally include a solvent to well dissolve the other components and/or to reduce the viscosity of the coating liquid.

Specific examples of the solvents include alcohols such as methanol, ethanol, propanol, and butanol; ketones such as acetone, methyl ethyl ketone, methyl isobutyl ketone, and cyclohexanone; esters such as ethyl acetate, and butyl acetate; ethers such as tetrahydrofuran, dioxane, and propyl ether; halogenated solvents such as dichloromethane, dichloroethane, trichloroethane, and chlorobenzene; aromatic solvents such as benzene, toluene, and xylene; cellosolves such as methyl cellosolve, ethyl cellosolve and cellosolve acetate; etc. These solvents can be used alone or in combination.

The added amount of the solvents is determined depending on the solubility of the solid components, the coating method used, and the target thickness of the protective layer. Coating methods such as dip coating methods, spray coating methods, bead coating methods, and ring coating methods can be used for forming the protective layer.

After coating a protective layer coating liquid, energy such as heat energy, photo energy and radiation energy is applied to the coated layer to crosslink the layer. Specific examples of the method for applying heat energy are as follows:

(1) applying heated gas (such as air and nitrogen gas) thereto;
(2) contacting a heated material thereto; and
(3) irradiating the coated layer with light or electromagnetic waves from the coated layer side or the opposite side.

The temperature at which the coated protective layer is heated is preferably from 100 to 170° C. When the temperature is too low, the crosslinking speed becomes too slow, and thereby a problem in that the coated layer is not sufficiently crosslinked is caused. When the temperature is too high, the crosslinking reaction is unevenly performed, and thereby a problem in that the resultant protective layer has a large strain or includes non-reacted functional groups is caused. In order to uniformly perform the crosslinking reaction, a method in which at first the coated layer is heated at a relatively low temperature (not higher than about 100° C.), followed by heating at a relatively high temperature (not lower than about 100° C.) is preferably used.

Specific examples of the light source for use in photo-crosslinking the coated layer include ultraviolet light emitting devices such as high pressure mercury lamps and metal halide lamps. In addition, visible light emitting lamps can also be used if the radical polymerizable monomers and the photopolymerization initiators used have absorption in a visible region. The illuminance intensity is preferably from 50 to 1000 mW/cm$^2$. When the illuminance intensity is too low, it takes a long time until the coated layer is crosslinked. In contrast, when the illuminance intensity is too high, a problem in that the crosslinking reaction is unevenly performed, thereby forming wrinkles in the resultant protective layer, or the layer includes non-reacted reaction groups therein is caused. In addition, a problem in that due to rapid crosslinking, the resultant protective layer causes cracks or peeling occurs.

Specific examples of the radiation energy applying methods include methods using electron beams.

Among these methods, the methods using heat or light are preferably used because the reaction speed is high and the energy applying devices have a simple structure.

The thickness of the crosslinked protective layer is preferably from 1 to 10 μm, and more preferably from 2 to 8 μm. When the crosslinked protective layer is too thick, the above-mentioned cracking and peeling problems occurs. When the thickness is not greater than 8 μm, the margin for the cracking and peeling problems can be increased. Therefore, a relatively large amount of energy can be applied to the coated layer, and thereby crosslinking density can be further increased. In addition, flexibility in choosing materials for imparting good abrasion resistance to the protective layer and flexibility in setting crosslinking conditions can be enhanced.

In general, radical polymerization reaction is obstructed by oxygen included in the air, namely, crosslinking is not well performed in the surface portion (from 0 to about 1 μm in the thickness direction) of the coated layer due to oxygen in the air, resulting in formation of unevenly-crosslinked layer. Therefore, if the crosslinked protective layer is too thin (i.e., the thickness of the protective layer is less than about 1 μm), the layer has poor abrasion resistance. Further, when the protective layer coating liquid is coated directly on a CTL, the components included in the CTL tends to be dissolved in the coated liquid, resulting in migration of the components into the protective layer. In this case, if the protective layer is too thin, the components are migrated into the entire protective layer, resulting in occurrence of a problem in that crosslinking cannot be well performed or the crosslinking density is low.

Thus, the thickness of the protective layer is preferably not less than 1 μm so that the protective layer has good abrasion resistance and scratch resistance. However, if the entire protective layer is abraded, the CTL located below the protective layer is abraded more easily than the protective layer. In this case, problems in that the photosensitivity of the photoreceptor seriously changes and uneven half tone images are produced occur. In order that the resultant photoreceptor can produce high quality images for a long period of time, the crosslinked protective layer preferably has a thickness not less than 2 μm.

When the crosslinked protective layer, which is formed as an outermost layer of a photoreceptor having a CGL, and CTL, is insoluble in organic solvents, the resultant photoreceptor has dramatically improved abrasion resistance and scratch resistance. The solvent resistance of a protective layer can be checked by the following method:

(1) dropping a solvent, which can well dissolve polymers, such as tetrahydrofuran and dichloromethane, on the surface of the protective layer;
(2) naturally drying the solvent;
(3) the surface of the protective layer is visually observed to determine whether the condition of the surface portion is changed.

If the protective layer has poor solvent resistance, the following phenomena are observed:

(1) the surface portion is recessed while the edge thereof is projected;
(2) the charge transport material in the protective layer is crystallized, and thereby the surface portion is clouded; or
(3) the surface portion is at first swelled, and then wrinkled.

If the protective layer has good solvent resistance, the above-mentioned phenomena are not observed.

In order to prepare a crosslinked protective layer having good resistance to organic solvents, the key points are as follows.

(1) to optimize the formula of the protective layer coating liquid, i.e., to optimize the content of each of the components included in the liquid;
(2) to choose a proper solvent for diluting the protective layer coating liquid, while properly controlling the solid content of the coating liquid;
(3) to use a proper method for coating the protective layer coating liquid;
(4) to crosslink the coated layer under proper crosslinking conditions; and
(5) to form a CTL which located below the protective layer and is hardly insoluble in the solvent included in the protective layer coating liquid.

It is preferable to use one or more of these techniques.

The protective layer coating liquid can include additives such as binder resins having no radical polymerizable group, antioxidants and plasticizers other than the radical polymerizable tri- or more-functional monomers having no charge transport structure and radical polymerizable monofunctional monomers having a charge transport structure.

Since the added amount of these additives is too large, the crosslinking density decreases and the protective layer causes a phase separation problem in that the crosslinked polymer is separated from the additives, and thereby the resultant protective layer becomes soluble in organic solvents. Therefore, the added amount of the additives is preferably not greater than 20% by weight based on the total weight of the solid components included in the protective layer coating liquid. In addition, in order not to decrease the crosslinking density, the total added amount of the mono- or di-functional monomers, reactive oligomers and reactive polymers in the protective layer coating liquid is preferably not greater than 20% by weight based on the weight of the radical polymerizable tri- or more-functional monomers. In particular, when the added amount of the di- or more-functional monomers having a charge transport structure is too large, units having a bulky structure are incorporated in the protective layer while the units are connected with plural chains of the protective layer, thereby generating strain in the protective layer, resulting in formation of aggregates of micro crosslinked materials in the protective layer. Such a protective layer is soluble in organic solvents. The added amount of a radical polymerizable di- or more-functional monomer having a charge transport structure is determined depending on the species of the monomer used, but is generally not greater than 10% by weight based on the weight of the radical polymerizable monofunctional monomer having a charge transport structure included in the protective layer.

When an organic solvent having a low evaporating speed is used for the protective layer coating liquid, problems which occur are that the solvent remaining in the coated layer adversely affects crosslinking of the protective layer; and a large amount of the components included in the CTL is migrated into the protective layer, resulting in deterioration of crosslinking density or formation of an unevenly crosslinked protective layer (i.e., the crosslinked protective layer becomes soluble in organic solvents). Therefore, it is preferable to use solvents such as tetrahydrofuran, mixture solvents of tetrahydrofuran and methanol, ethyl acetate, methyl ethyl ketone, and ethyl cellosolve. It is preferable that one or more proper solvents are chosen among the solvents in consideration of the coating method used.

When the solid content of the protective layer coating liquid is too low, similar problems occur. The upper limit of the solid content is determined depending on the target thickness of the protective layer and the target viscosity of the protective layer coating liquid, which is determined depending on the coating method used, but in general, the solid content of the protective layer coating liquid is preferably from 10 to 50% by weight.

Suitable coating methods for use in preparing the crosslinked protective layer include methods in which the weight of the solvent included in the coated layer is as low as possible, and the time during which the solvent in the coated layer contacts the CTL on which the coating liquid is coated is as short as possible. Specific examples of such coating methods include spray coating methods and ring coating methods in which the weight of the coated layer is controlled so as to be light. In addition, in order to control the amount of the components of the CTL migrating into the protective layer so as to be as small as possible, it is preferable to use a charge transport polymer for the CTL and/or to form an intermediate layer, which is hardly soluble in the solvent used for the protective layer coating liquid, between the CTL and the protective layer.

When the heating or irradiating energy is low in the crosslinking process, the coated layer is not completely crosslinked. In this case, the resultant layer becomes soluble in organic solvents. In contrast, when the energy is too high, uneven crosslinking is performed, resulting in increase of non-crosslinked portions or portions at which radical is terminated, or formation of aggregates of micro crosslinked materials. In this case, the resultant protective layer is soluble in organic solvents.

In order to make a protective layer insoluble in organic solvents, the crosslinking conditions are preferably as follows:

Heat Crosslinking Conditions
  Temperature: 100 to 170° C.
  Heating time: 10 minutes to 3 hours UV Light Crosslinking Conditions
  Illuminance intensity: 50 to 1000 mW/cm$^2$
  Irradiation time: 5 seconds to 5 minutes
  Temperature of coated material: 50° C. or less In order to make a protective layer insoluble in organic solvents in a case where an acrylate monomer having three acryloyloxy group and a triarylamine compound having one acryloyloxy group are used for the protective layer coating liquid, the weight ratio (A/T) of the acrylate monomer (A) to the triarylamine compound (T) is preferably 7/3 to 3/7. The added amount of a polymerization initiator is preferably from 3 to 20% by weight based on the total weight of the acrylate monomer (A) and the triarylamine compound (T). In addition, a proper solvent is preferably added to the coating liquid. Provided that the CTL, on which the protective layer coating liquid is coated, is formed of a triarylamine compound (serving as a CTM) and a polycarbonate resin (serving as a binder resin), and the protective layer coating liquid is coated by a spray coating method, the solvent of the protective layer coating liquid is preferably selected from tetrahydrofuran, 2-butanone, and ethyl acetate. The added amount of the solvent is preferably from 300 to 1000 parts by weight per 100 parts by weight of the acrylate monomer (A).

After the protective layer coating liquid is prepared, the coating liquid is coated by a spray coating method on a peripheral surface of a drum, which includes, for example, an aluminum cylinder and an undercoat layer, a CGL and a CTL which are formed on the aluminum cylinder. Then the coated layer is naturally dried, followed by drying for a short period of time (from 1 to 10 minutes) at a relatively low temperature (from 25 to 80° C.). Then the dried layer is heated or exposed to UV light to be crosslinked.

When crosslinking is performed using UV light, metal halide lamps are preferably used. In this case, the illuminance intensity of UV light is preferably from 50 mW/cm$^2$ to 1000 mW/cm$^2$. Provided that plural UV lamps emitting UV light of 200 mW/cm$^2$ are used, it is preferable that plural lamps uniformly irradiate the coated layer with UV light along the peripheral surface of the coated drum for about 30 seconds. In this case, the temperature of the drum is controlled so as not to exceed 50° C. When heat crosslinking is performed, the temperature is preferably from 100 to 170° C., and the heating device is preferably an oven with an air blower. When the heating temperature is 150° C., the heating time is preferably from 20 minutes to 3 hours.

It is preferable that after the crosslinking operation, the thus prepared photoreceptor is heated for a time of from 10 minutes to 30 minutes at a temperature of from 100 to 150° C. to remove the solvent remaining in the protective layer. Thus, a photoreceptor (i.e., an image bearing member) of the present invention is prepared.

Next, an image forming apparatus using the photoreceptor of the present invention will be explained in detail.

Figure 12:
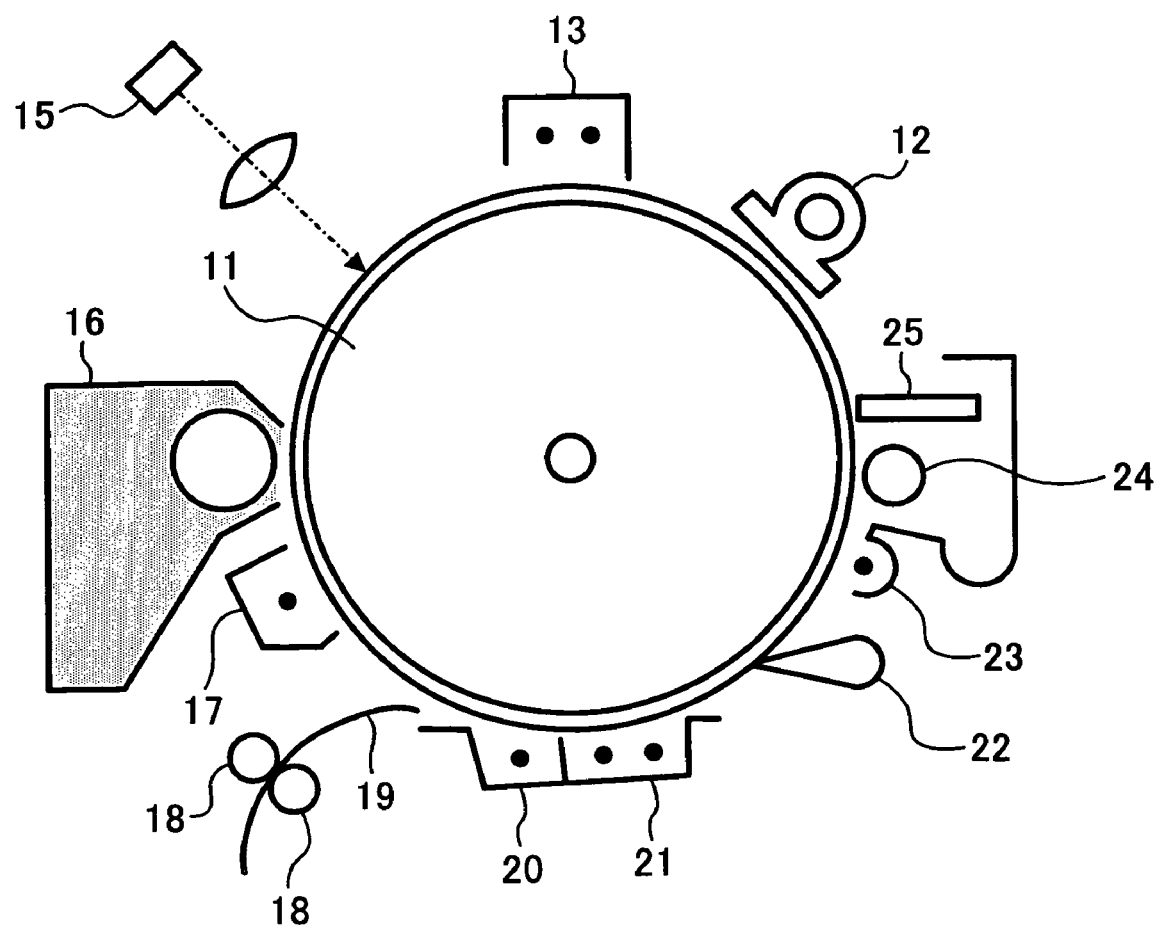
FIG. 12 is a schematic view illustrating an image forming apparatus using the photoreceptor of the present invention.

FIG. 12 is a schematic view illustrating an embodiment of the image forming apparatus. The image forming apparatus includes the photoreceptor of the present invention which includes at least an electroconductive substrate, a charge blocking layer, a moiré preventing layer, and a photosensitive layer, wherein the charge blocking layer includes an N-alkoxymethylated nylon including one or more ions in an amount of from 200 to 500 ppm or includes one or more alkyl amines in an amount of from 15 to 100 ppm. Although a photoreceptor 11 has a drum-form, the shape is not limited thereto and sheet-form and endless belt-form photoreceptors can also be used.

Around the photoreceptor 11, a quenching lamp 12 configured to discharge the charges remaining on the photoreceptor 11, a charger 13 configured to charge the photoreceptor 11, an imagewise light irradiator 15 configured to irradiate the photoreceptor 11 with imagewise light to form an electrostatic latent image on the photoreceptor 11, an image developer 16 configured to develop the latent image with a toner to form a toner image on the photoreceptor 11, and a cleaning unit including a fur brush 24 and a cleaning blade 25 configured to clean the surface of the photoreceptor 11 are arranged while contacting or being set closely to the photoreceptor 11. The toner image formed on the photoreceptor 11 is transferred on a receiving paper 19 fed by a pair of registration rollers 18 at a transfer device (i.e., a pair of a transfer charger 20 and a separating charger 21). The receiving paper 19 having the toner image thereon is separated from the photoreceptor 11 by a separating pick 22.

In the image forming apparatus of the present invention, a pre-transfer charger 17 and a pre-cleaning charger 23 may be arranged if desired.

As the charger 13, the pre-transfer charger 17, the transfer charger 20, the separating charger 21 and the pre-cleaning charger 23, all known chargers such as corotrons, scorotrons, solid state chargers, roller chargers and brush chargers can be used.

Among the chargers, contact chargers such as charging rollers, charging blades and charging brushes and short-range chargers which charge a photoreceptor while a small gap is formed between the charging member and the photoreceptor can be preferably used. In particular, by using these chargers, the amount of generated ozone can be drastically reduced, and therefore the photoreceptor can be maintained to be stable and deterioration of image qualities can be prevented even when the photoreceptor is repeatedly used. In addition, the image forming apparatus can be minimized in size.

Suitable light sources for use in the imagewise light irradiator 15 and the discharging lamp 12 include fluorescent lamps, tungsten lamps, halogen lamps, mercury lamps, sodium lamps, light emitting diodes (LEDs), laser diodes (LDs), light sources using electroluminescent lamps (EL), and the like. In addition, in order to obtain light having a desired wave length range, filters such as sharp-cut filters, band pass filters, near-infrared cutting filters, dichroic filters, interference filters, color temperature converting filters and the like can be used.

Among these light sources, LEDs, and LDs are preferably used because of emitting a high energy light beam having a wavelength of from 600 nm to 800 nm, to which the titanyl phthalocyanine pigment in the charge generation layer has high sensitivity.

The above-mentioned lamps can be used not only for the processes mentioned above and illustrated in FIG. 12, but also for other processes using light irradiation, such as a transfer process including light irradiation, a discharging process, a cleaning process including light irradiation and a pre-exposure process.

Referring to FIG. 12, when the toner image formed on the photoreceptor 11 by the developing unit 16 is transferred onto the receiving paper 19, all of the toner particles of the toner image are not transferred on the receiving paper 19, and a part of the toner particles remain on the surface of the photoreceptor 11. The residual toner particles are removed from the photoreceptor 11 by the fur blush 24 and/or the cleaning blade 25. The residual toner particles remaining on the photoreceptor 11 can be removed only by a cleaning brush. Suitable cleaning blushes include known cleaning blushes such as fur blushes and mag-fur blushes.

When the photoreceptor 11 which is previously charged positively (or negatively) is exposed to imagewise light, an electrostatic latent image having a positive (or negative) charge is formed on the photoreceptor 11. When the latent image having a positive (or negative) charge is developed with a toner having a negative (or positive) charge, a positive image can be obtained. In contrast, when the latent image having a positive (negative) charge is developed with a toner having a positive (negative) charge, a negative image (i.e., a reversal image) can be obtained. As the developing method, known developing methods can be used. In addition, as the discharging methods, known discharging methods can also be used.

The above-mentioned image forming unit may be fixedly set in an image forming apparatus such as copiers, facsimiles and printers. However, the image forming unit may be set therein as a process cartridge. The process cartridge means an image forming unit which includes at least the photoreceptor of the present invention and a housing. The process cartridge can further include one or more of a charger, a developing device, a transferring device and a cleaner.

Figure 14:
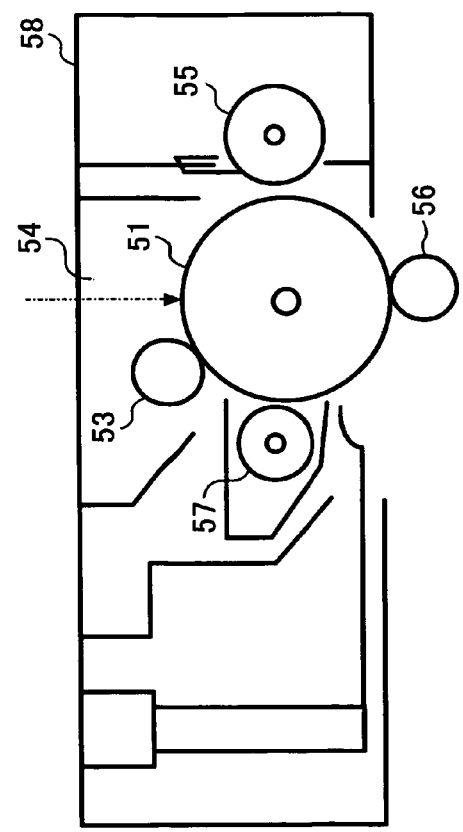
FIG. 14 is a schematic view illustrating a process cartridge using the photoreceptor of the present invention.

FIG. 14 is a schematic view illustrating an embodiment of the process cartridge of the present invention. In FIG. 14, the process cartridge includes a photoreceptor 51 which is the photoreceptor of the present invention, a charging roller 53 configured to charge the photoreceptor 51, an imagewise light irradiating section 54 configured to irradiate the photoreceptor 51 with imagewise light to form an electrostatic latent image on the photoreceptor 51, a developing device (a developing roller) 55 configured to develop the latent image with a toner, an image transfer device 56 configured to transfer the toner image onto a receiving paper, a cleaning brush 57 configured to clean the surface of the photoreceptor 51, and a housing 58.

Figure 13:
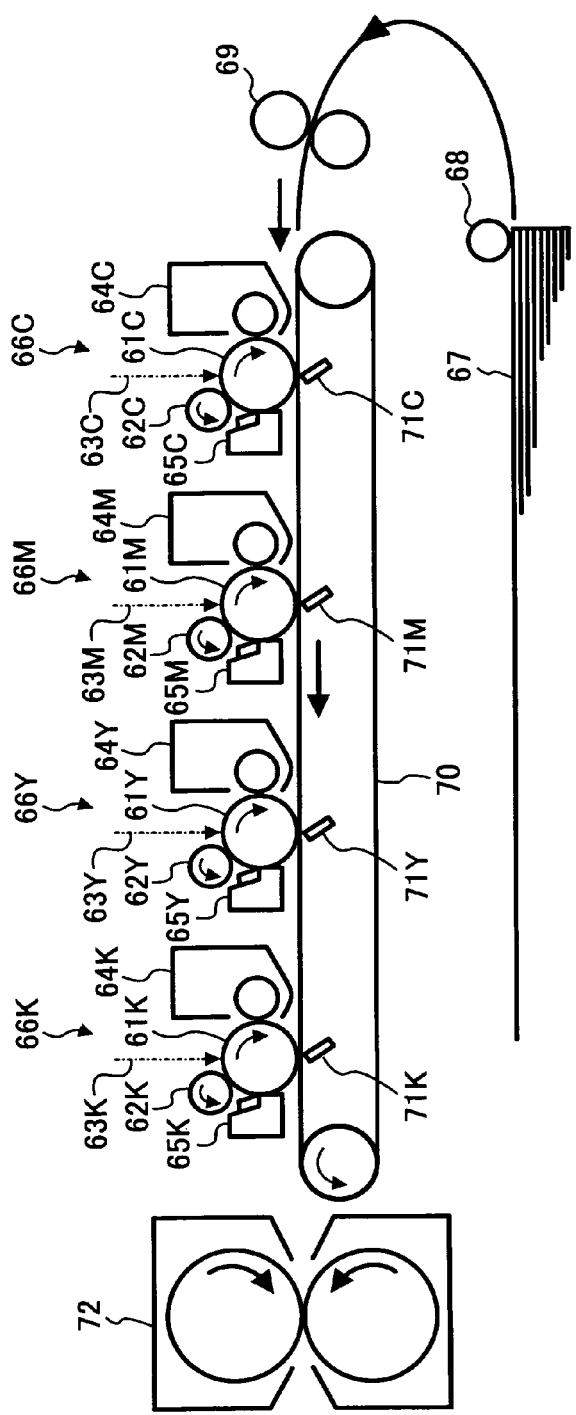
FIG. 13 is a schematic view illustrating a tandem-type full color image forming apparatus using the photoreceptor of the present invention.

FIG. 13 is a schematic view illustrating another embodiment of the image forming apparatus (i.e., a tandem type image forming apparatus) using the photoreceptor of the present invention.

In FIG. 13, the tandem type image forming apparatus has a cyan image forming unit 66C, a magenta image forming unit 66M, a yellow image forming unit 66Y and a black image forming unit 66K. Drum photoreceptors 61C, 61M, 61Y and 61K, which are the photoreceptor of the present invention, rotate in the direction indicated by respective arrows. Around the photoreceptors 61C, 61M, 61Y and 61K, chargers 62C, 62M, 62Y and 62K, image developers 64C, 64M, 64Y and 64K, and cleaners 65C, 65M, 65Y and 65K are arranged in this order in the clockwise direction. As the chargers, the above-mentioned chargers which can uniformly charge the surfaces of the photoreceptors are preferably used. An imagewise light irradiator irradiates surfaces of the respective photoreceptors with laser light beams 63C, 63M, 63Y and 63K at points between the chargers and the image developers to form electrostatic latent images on the respective photoreceptors. The four image forming units 66C, 66M, 66Y and 66K are arranged along a transfer belt 70. The transfer belt 70 contacts the respective photoreceptor 61C, 61M, 61Y or 61K at an image transfer point located between the respective image developer and the respective cleaner to receive color images formed on the photoreceptors. At the backsides of the image transfer points of the transfer belt 70, transfer brushes 71C, 71M, 71Y and 71K are arranged to apply a transfer bias to the transfer belt 70.

The image forming process will be explained referring to FIG. 13.

At first, in each of the image forming units 66C, 66M, 66Y and 66K, the photoreceptor 61C, 61M, 61Y or 61K is charged with the charger 62C, 62M, 62Y or 62K which rotates in the direction indicated by the arrow. Then an image irradiator (not shown) irradiates each of the photoreceptors 61C, 61M, 61Y and 61K with the laser light beam 63C, 63M, 63Y or 63K to form an electrostatic latent image on each photoreceptor.

Then the electrostatic latent images formed on each photoreceptors are developed with the image developers 64C, 64M, 64Y and 64K including respective color toners C, M, Y and K to form different color toner images on the respective photoreceptors. The thus prepared color toner images are transferred onto a receiving material 67 fed from a paper tray.

The receiving material 67 is fed by a feeding roller 68 and is stopped by a pair of registration rollers 69. The receiving material 67 is then timely fed to the transfer belt 70 by the pair of registration rollers 69 such that the color toner images formed on the photoreceptors are transferred onto proper positions of the receiving material 67. Each of the toner images on the photoreceptors is transferred onto the receiving material 67 at the contact point (i.e., the transfer position) of the photoreceptor 61 and the receiving material 67.

The toner image on each photoreceptor is transferred onto the receiving material 67 due to an electric field which is formed due to the difference between the transfer bias voltage and the potential of the photoreceptor. After passing through the four transfer positions, the receiving material 67 having the color toner images thereon is then transported to a fixer 72 so that the color toner images are fixed to the receiving material 67. Then the receiving material 67 is discharged from the main body of the image forming apparatus. Toner particles, which remain on the photoreceptors even after the transfer process, are collected by the respective cleaners 65C, 65M, 65Y and 65K.

In the image forming apparatus, the image forming units 66C, 66M, 66Y and 66K are arranged in this order in the paper feeding direction, but the order is not limited thereto. In addition, although the color toner images are directly transferred onto a receiving material in this image forming apparatus, the toner images can be transferred to the receiving material via an intermediate transfer medium.

When a black image is formed, the other image forming units 66C, 66M and 66Y may be stopped. In addition, in FIG. 13, the chargers 62C, 62M, 62Y and 62K contact the respective photoreceptors 61C, 61M, 61Y and 61K, but the chargers may be short-range charges in which a proper gap of from 10 to 200 µm is formed between the charging members and the respective photoreceptors. Such short-range chargers have advantages such that the abrasion of the photoreceptors and the chargers can be reduced, and in addition a toner film is hardly formed on the charging members.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

At first, examples of synthesizing an N-alkoxymethylated nylon for use in the photoreceptor of the present invention will be explained.

Synthesis Example 1

At first, 100 parts of a 6-nylon was dissolved in 160 parts of methanol to prepare a solution. Then 75 parts of formaldehyde and 2 parts of phosphoric acid were added to the solution and the mixture was agitated well. The mixture was heated to 125° C. over 1 hour. After heated for 30 minutes at 125° C., the mixture was cooled to room temperature over 45 minutes. The mixture achieved a semi-transparent gel state.

In order to neutralize phosphoric acid included in the gel, a mixture including 95% ethanol and an excess amount of ammonia was added to the gel to dissolve the gel. The thus prepared solution was added to water to precipitate a polyamide.

The thus precipitated polyamide was separated from the liquid by filtering. Then the polyamide was washed with 1 litter of running water, followed by drying. Thus, an N-methoxymethylated nylon was prepared (hereinafter referred to as resin 1).

Synthesis Example 2

The procedure for preparation of the resin 1 was repeated except that the washing operation using running water was performed twice. Thus, a resin 2 was prepared.

Synthesis Example 3

The procedure for preparation of the resin 1 was repeated except that the washing operation using running water was performed three times. Thus, a resin 3 was prepared.

Synthesis Example 4

The procedure for preparation of the resin 1 was repeated except that the washing operation using running water was performed four times. Thus, a resin 4 was prepared.

Synthesis Example 5

The procedure for preparation of the resin 1 was repeated except that the washing operation using running water was performed five times. Thus, a resin 5 was prepared.

Synthesis Example 6

The procedure for preparation of the resin 1 was repeated except that the washing operation was performed using ion-exchange water instead of running water. Thus, a resin 6 was prepared.

Synthesis Example 7

The resin 6 was treated to a re-precipitation treatment using the method described in JP-B 6-93129. Specifically, 20 g of the N-methoxymethylated nylon (i.e., the resin 6) was dissolved in 200 g of methanol upon application of heat thereto. After the resin 6 was dissolved in methanol, the solution was cooled to room temperature. The solution was dropped into 2500 g of acetone over 40 minutes to precipitate the resin 6. The mixture was subjected to a suction filtration treatment to separate the precipitated resin from liquid using a filter paper No. 4 manufactured by Kiriyama Filter Paper. The precipitated resin was washed with acetone, and then dried for 2 days at 80° C. Thus, a resin 7 was prepared. Thus, the resin 7 was re-precipitated twice in total (i.e., first re-precipitation using ethanol and second re-precipitation using acetone).

The thus prepared resins were subjected to ion chromatography to determine the amount of total ions included in the resins. Specifically, the method is as follows.

(1) 0.5 g of a resin which had been pulverized by a frost shattering method was dipped into 25 ml of super pure water;
(2) the mixture was heated for 30 minutes at 50° C. to extract water-soluble components;
(3) the extracting liquid was filtered using a filter having openings of 0.45 μm to prepare a test sample; and
(4) the test sample was subjected to ion chromatography using instruments DX-500 and DX-300, which are manufactured by DIONEX, to determine the amount of anionic ions and cationic ions and to determine the concentration of total ions in the resin.

The results are shown in Table 1.

TABLE 1

|  | Concentration of total ions (ppm) |
|---|---|
| Resin 1 | 550 |
| Resin 2 | 450 |
| Resin 3 | 330 |
| Resin 4 | 290 |
| Resin 5 | 215 |
| Resin 6 | 120 |
| Resin 7 | 20 |

Comparative Example 1

Preparation of Charge Blocking Layer Coating Liquid 1

The following components were mixed to dissolve resin 1 in the solvents.

| Resin 1 | 6.4 parts |
|---|---|
| Methanol | 70 parts |
| n-Butanol | 30 parts |

Thus, a charge blocking layer coating liquid 1 was prepared.

Examples 1 to 4 and Comparative Examples 2 and 3

Preparation of Charge Blocking Layer Coating Liquids 2-7

The procedure for preparation of the charge blocking layer coating liquid 1 was repeated except that the resin 1 was replaced with each of the resins 2 to 7. Thus, charge blocking layer coating liquids 2 to 7 were prepared.

Example 5

Preparation of Charge Blocking Layer Coating Liquid 8

The following components were mixed to dissolve the resin 3 in the solvents.

| Resin 3 | 6.4 parts |
|---|---|
| Methanol | 70 parts |
| n-Butanol | 25 parts |
| Ion-exchange water | 5 parts |

Thus, a charge blocking layer coating liquid 8 was prepared.

The thus prepared charge blocking layer coating liquids 1-8 were evaluated with respect to the following properties.

1. Preservation Stability
(1) Clouding

Each of the charge blocking layer coating liquids 1-8 was contained in a closed flask. The liquids were preserved at a temperature of 22±1° C. for one month, three months or 6 months. After the preservation tests, the spectral transmission factor of the liquids was measured using a recording spectrophotometer (UV-3100 from Shimadzu Corp.) while changing the wavelength of light. In this regard, when the degree of clouding of a liquid increases, the spectral transmission factor thereof decreases. The measuring conditions are as follows.

Scanning speed: medium speed
Slit width: 2.0 mm
Sampling pitch 0.5 nm

The spectral transmission factor of the liquids at 370 nm was defined as the transmission factor thereof. In addition, a clouding rate which is defined as follows was calculated.

$$\text{Clouding rate} = \{(T1-T2)/T1\} \times 100$$

wherein T1 represents the transmission factor of a liquid just after the liquid is prepared; and T2 represents the transmission factor of the liquid after the one-month, three-month or six-month preservation test.

The clouding property of each coating liquid was graded as follows:

⊚: The clouding rate is less than 20% (i.e., the liquid is hardly clouded).
○: The clouding rate is not less than 20% and less than 40% (i.e., the liquid is slightly clouded).
Δ: The clouding rate is not less than 40% and less than 70% (i.e., the liquid is considerably clouded).
X: The clouding rate is not less than 70% (i.e., the liquid is seriously clouded).

(2) Thickness Variation

Each of the coating liquids 1-8 was coated by dip coating on an aluminum drum having a diameter of 30 mm and a length of 340 mm, and then dried upon application of heat thereto so that the resultant film has a thickness of 0.7 μm. The coating liquids just after the production and the coating liquids preserved for 6 months were used for the test. The thickness of each coated layer was measured using a thickness meter using an optical interferometry method while changing the measuring points in the longitudinal direction and peripheral direction.

The thickness variation property of each coating liquid was graded as follows:

⊚: The thickness variation is little and the coated layer is even.
○: The thickness of the coated layer slightly varies but the thickness variation is substantially even.
Δ: The thickness of the coated layer varies but the thickness variation is still acceptable.
X: The thickness of the coated layer seriously varies.

(3) Low Temperature Preservability

Each of the charge blocking layer coating liquids 1-8 was preserved for one month at a temperature of 10±1° C. The clouding rate of each coating liquid was determined by the same method as that mentioned above in paragraph (1).

In addition, the thickness variation of each of the coating liquids preserved for one month was evaluated by the same method as that mentioned above in paragraph (2).

The evaluation results are shown in Tables 2 and 3.

TABLE 2

|  |  | Ions (ppm) | Clouding rate (%) | | | Thickness variation | |
| --- | --- | --- | --- | --- | --- | --- | --- |
|  |  |  | After 1 month | After 3 months | After 6 months | After 0 month | After 6 months |
| Comp. Ex. 1 | Liquid 1 | 550 | ○ | Δ | X | ○ | X |
| Ex. 1 | Liquid 2 | 450 | ⊚ | ⊚ | ○ | ⊚ | Δ |
| Ex. 2 | Liquid 3 | 330 | ⊚ | ⊚ | ○ | ⊚ | ○ |
| Ex. 3 | Liquid 4 | 290 | ⊚ | ○ | Δ | ⊚ | ○ |
| Ex. 4 | Liquid 5 | 215 | ○ | ○ | Δ | ○ | Δ |
| Comp. Ex. 2 | Liquid 6 | 120 | ○ | Δ | X | ○ | Δ |
| Comp. Ex. 3 | Liquid 7 | 20 | X | X | X | Δ | X |
| Ex. 5 | Liquid 8 | 330 | ⊚ | ⊚ | ⊚ | ⊚ | ○ |

It is clear from Table 2 that the coating liquids including an N-alkoxymethylated nylon including ions in an amount of from 200 to 500 ppm has a small clouding rate even when being preserved for a long period of time. Therefore, by using such coating liquids, a layer with uniform thickness can be formed.

TABLE 3

|  |  | Ions (ppm) | Clouding rate After 1 month preservation | Thickness variation After 1 month preservation |
| --- | --- | --- | --- | --- |
| Comp. Ex. 1 | Liquid 1 | 550 | X | X |
| Ex. 1 | Liquid 2 | 450 | ○ | ○ |
| Ex. 2 | Liquid 3 | 330 | ○ | ⊚ |
| Ex. 3 | Liquid 4 | 290 | Δ | ○ |
| Ex. 4 | Liquid 5 | 215 | Δ | Δ |
| Comp. Ex. 2 | Liquid 6 | 120 | Δ | Δ |
| Comp. Ex. 3 | Liquid 7 | 20 | X | X |
| Ex. 5 | Liquid 8 | 330 | ⊚ | ⊚ |

It is clear from Table 3 that the coating liquids including an N-alkoxymethylated nylon including ions in an amount of from 200 to 500 ppm has a small clouding rate even when preserved under a low temperature condition. Therefore, by using such coating liquids, a layer with uniform thickness can be formed.

Then synthesis examples of titanyl phthalocyanine (TiOPc) will be explained.

Pigment Synthesis Example 1

A TiOPc pigment was prepared by the method described in JP-A 2001-19871. Specifically, in a container 29.2 g of 1,3-diiminoisoindoline and 200 ml of sulforane were mixed while stirring. Under a nitrogen gas flow, 20.4 g of titanium tetrabutoxide was dropped therein. After the addition of titanium tetrabutoxide was completed, the temperature of the mixture was gradually increased to 180° C. The temperature of the mixture was maintained in a range of from 170° C. to 180° C. for 5 hours while stirring the mixture to react the compounds. After the reaction was terminated, the reaction product was cooled. Then the reaction product was filtered to obtain the precipitate. Then the precipitate was washed with chloroform until the precipitate colored blue. The precipitate was then washed with methanol several times, followed by washing with hot water of 80° C. several times. Thus, a crude TiOPc was prepared.

One part of the thus prepared crude TiOPc was gradually added to 20 parts of concentrated sulfuric acid to be dissolved therein. The solution was gradually added to 100 parts of ice water while stirred, to precipitate a TiOPc pigment. The pigment was obtained by filtering. The pigment was washed until the filtrate became neutral. In this case, the pH of the filtrate was 6.8. Forty (40) grams of the thus prepared aqueous wet cake of the TiOPc pigment, which has a solid content of 15% by weight, was added to 200 g of tetrahydrofuran (THF) and the mixture was stirred for about 4 hours. In this case, the ratio of the pigment to the crystal change solvent (THF) was 1:33. Then the mixture was filtered and the wet cake was dried to prepare a TiOPc crystal 1. The materials used for the titanyl phthalocyanine pigment does not include a halogenated compound.

Figure 15:
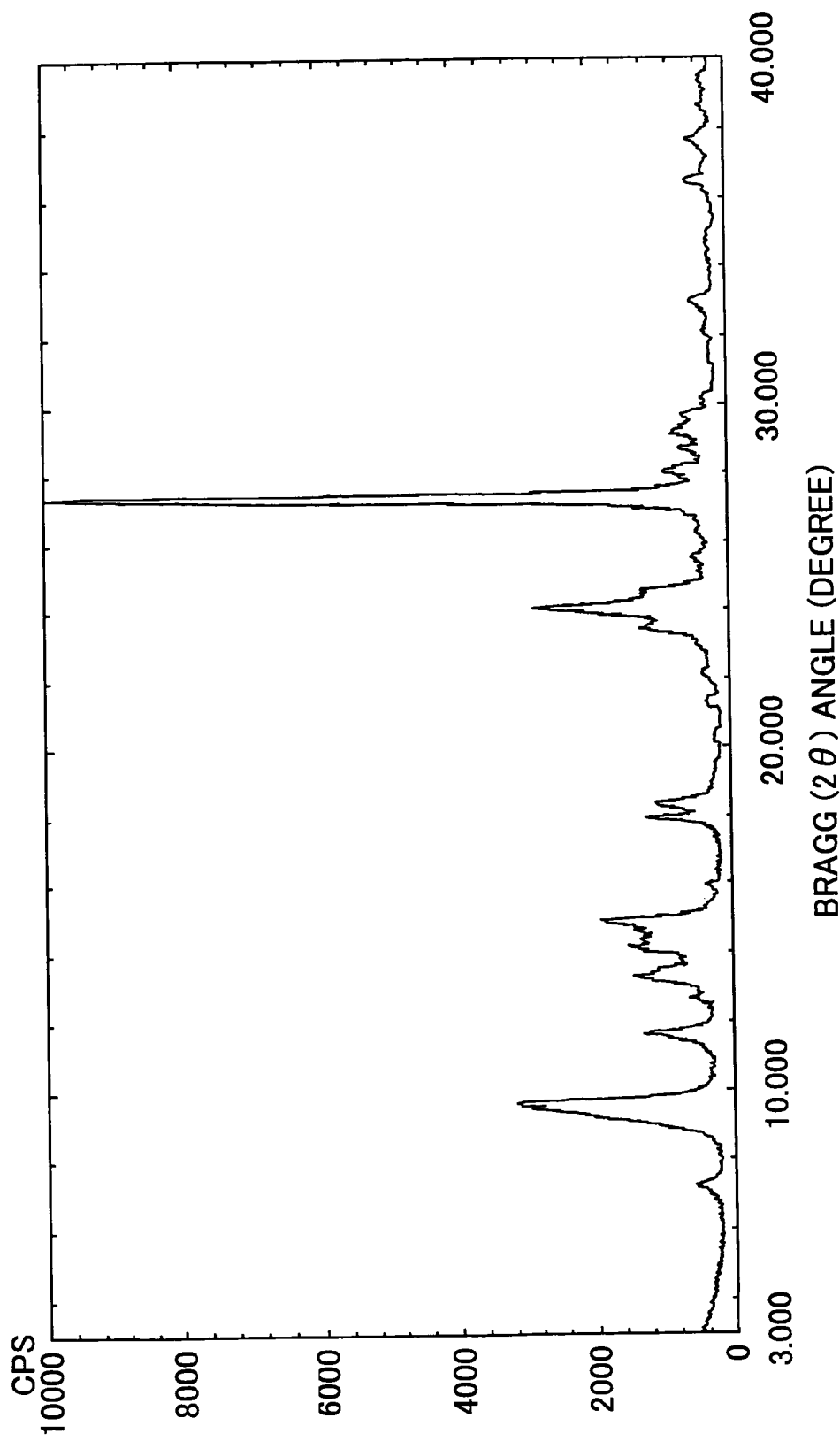
FIG. 15 is the X-ray diffraction spectrum of the titanyl phthalocyanine crystal prepared in Pigment Synthesis Example 1.

When the thus prepared TiOPc crystal 1 was subjected to an X-ray diffraction analysis using a Cu—Kα X-ray having a wavelength of 1.542 Å, the TiOPc had an X-ray diffraction spectrum such that a maximum peak is observed at a Bragg (2 θ) angle of 27.2±0.2°, a lowest angle peak at an angle of 7.3±0.2°, and a main peak at each of angles of 9.4±0.2°, 9.6±0.2°, and 24.0±0.2°, wherein no peak is observed between the peaks of 7.3° and 9.4° and at an angle of 26.3. The X-ray diffraction spectrum thereof is illustrated in FIG. 15.

Figure 16:
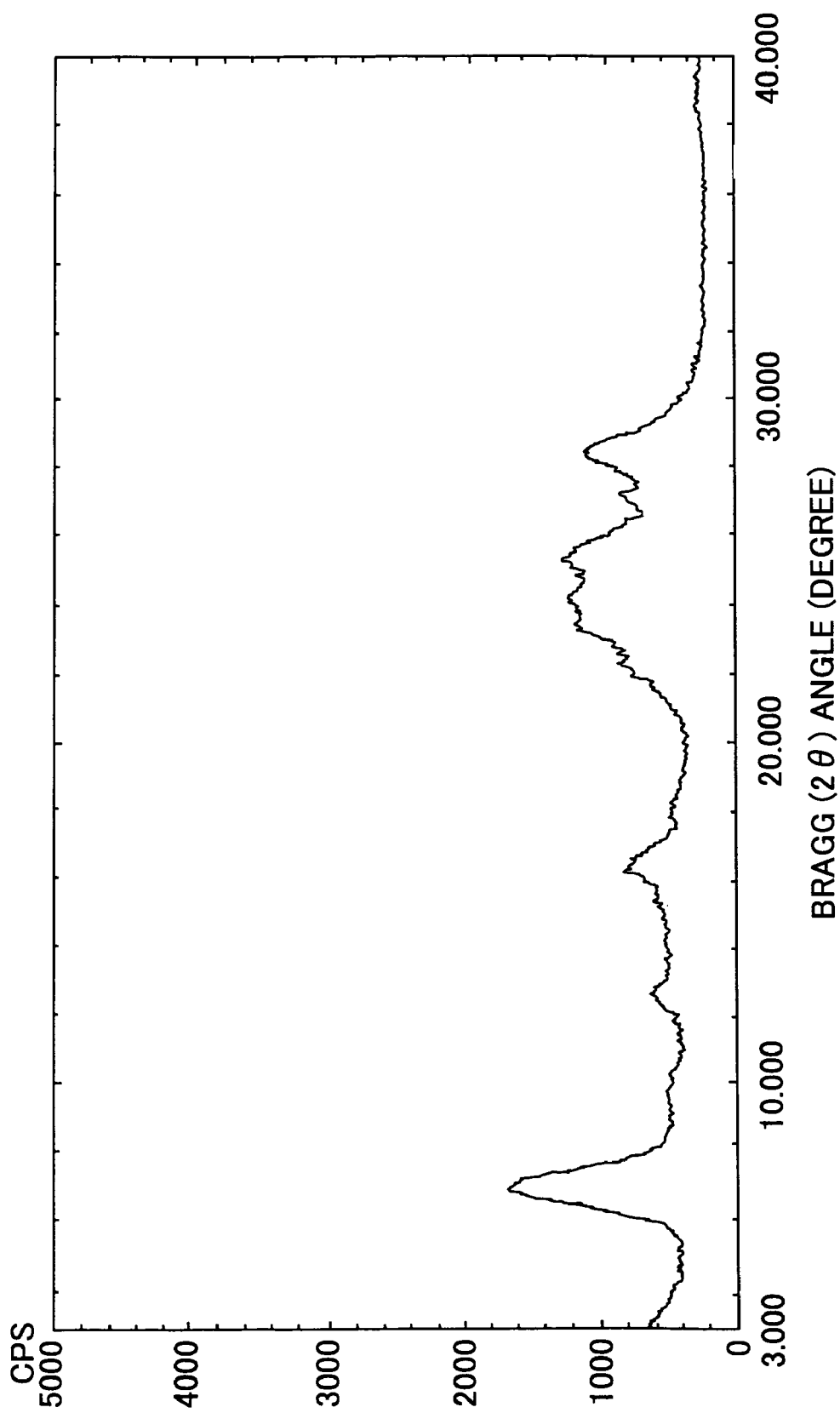
FIG. 16 is the X-ray diffraction spectrum of the titanyl phthalocyanine pigment obtained by drying the wet paste prepared in Pigment Synthesis Example 1.

In addition, a part of the aqueous wet cake prepared above was dried at 80° C. for 2 days under a reduced pressure of 5 mmHg, to prepare a TiOPc pigment, which has a low crystallinity. The X-ray diffraction spectrum of the TiOPc pigment is illustrated in FIG. 16.

The X-ray diffraction spectra were measured under the following conditions:
 X-ray tube: Cu
 Voltage: 50 kV
 Current: 30 mA
 Scanning speed: 2°/min
 Scanning range: 3° to 40°
 Time constant: 2 seconds Pigment Synthesis Example 2

The procedure for preparation of the aqueous wet cake of the TiOPc pigment in Pigment Synthesis Example 1 was repeated. The thus prepared TiOPc pigment was subjected to the following crystal changing treatment to prepare a TiOPc crystal, which has a smaller primary particle diameter than the TiOPc crystal prepared in Pigment Synthesis Example 1.

Specifically, 60 parts of the thus prepared aqueous wet cake of the TiOPc pigment, which has a solid content of 15% by weight, was mixed with 400 g of tetrahydrofuran (THF) and the mixture was strongly agitated with a HOMOMIXER (MARK IIf from Kenis Ltd.) at a revolution of 2,000 rpm until the color of the paste was changed from navy blue to light blue. The color was changed after the agitation was performed for about 20 minutes. In this regard, the ratio of the TiOPc pigment to the crystal change solvent (THF) is 44. The dispersion was then filtered under a reduced pressure. The thus obtained cake on the filter was washed with tetrahydrofuran to prepare a wet cake of a TiOPc crystal. The crystal was dried for 2 days at 70° C. under a reduced pressure of 5 mmHg. Thus, 8.5 parts of a TiOPc crystal 2 was prepared. No halogen-containing raw material was used for synthesizing the TiOPc crystal 2. The solid content of the wet cake was 15% by weight, and the weight ratio (S/C) of the solvent (S) used for crystal change to the wet cake (C) was 44.

A part of the aqueous wet paste of the TiOPc pigment prepared in Pigment Synthesis Example 1, which had not been subjected to a crystal change treatment, was diluted with ion-exchange water such that the resultant dispersion has a solid content of 1% by weight. The TiOPc pigment was placed on a 150-mesh copper net covered with a continuous collodion membrane and a conductive carbon layer. The TiOPc pigment was observed with a transmission electron microscope (H-9000NAR from Hitachi Ltd., hereinafter referred to as a TEM) of 75,000 power magnification to measure the average particle size of the TiOPc pigment. The average particle diameter thereof was determined as follows.

The images of particles of the TiOPc pigment in the TEM were photographed. Among the particles (needle form particles) of the TiOPc pigment in the photograph, 30 particles were randomly selected to measure the lengths of the particles in the long axis direction. The lengths were arithmetically averaged to determine the average particle diameter of the TiOPc pigment.

As a result, the TiOPc pigment in the aqueous wet paste prepared in Pigment Synthesis Example 1 had an average primary particle diameter of about 0.06 μm.

Similarly, each of the TiOPc crystals 1 and 2 prepared in Pigment Synthesis Examples 1 and 2, which had been subjected to the crystal change treatment but was not filtered, was diluted with tetrahydrofuran such that the resultant dispersion has a solid content of 1% by weight. The average particle diameters of the TiOPc crystals were determined by the method mentioned above. The results are shown in Table 4. In this regard, the form of the crystals was not uniform and includes triangle forms, quadrangular forms, etc. Therefore, the maximum lengths of the diagonal lines of the particles were arithmetically averaged.

It is clear from Table 4 below that the TiOPc crystal 1 prepared in Pigment Synthesis Example 1 has a relatively large average particle diameter and in addition includes coarse particles. In contrast, the TiOPc crystal 2 prepared in Pigment Synthesis Example 2 has a relatively small average particle diameter and in addition the particle size of the particles is uniform.

TABLE 4

| TiOPc | Average particle diameter (μm) | Note |
|---|---|---|
| TiOPc crystal 1 (Pig. Syn. Ex. 1) | 0.31 | Coarse particles having a particle diameter of from 0.3 to 0.4 μm are included. |
| TiOPc crystal 2 (Pig. Syn. Ex. 2) | 0.12 | The particle diameters of the crystal are almost uniform. |

Pigment Synthesis Example 3

A titanyl phthalocyanine crystal was prepared using the method described in Example 1 of JP-A 01-299874. Specifically, the procedure for preparation of the wet cake in Pigment Synthesis Example 1 was repeated. The wet cake was dried to prepare the TiOPc pigment. One gram of the TiOPc pigment was mixed with 50 g of polyethylene glycol, and the mixture was milled using 100 g of glass beads to change the crystal form. Then the resultant TiOPc crystal was washed with diluted sulfuric acid, followed by washing with ammonium hydroxide and drying. Thus a TiOPc crystal 3 was prepared. No halogen-containing raw material was used for synthesizing the TiOPc crystal 3.

Pigment Synthesis Example 4

A titanyl phthalocyanine crystal was prepared using the method described in Example 1 of JP-A 03-269064. Specifically, the procedure for preparation of the wet cake in Pigment Synthesis Example 1 was repeated. The wet cake was dried to prepare the TiOPc pigment. One gram of the TiOPc pigment was mixed with a mixture solvent of 10 g of ion-exchange water and 1 g of monochlorobenzene, and the mixture was agitated for 1 hour at 50° C. Then the resultant TiOPc crystal was washed with methanol, followed by washing with ion-exchange water and drying. Thus a TiOPc crystal 4 was prepared. No halogen-containing raw material was used for synthesizing the TiOPc crystal 4.

Pigment Synthesis Example 5

A TiOPc crystal was prepared using the method described in Example 1 of JP-A 02-8256 (i.e., JP-B 07-91486). Specifically, in a container 9.8 g of phthalodinitrile and 75 ml of 1-chloronaphthalene were mixed while stirring. Under a nitrogen gas flow, 2.2 ml of titanium tetrachloride were dropped therein. After the addition of titanium tetrachloride was completed, the temperature of the mixture was gradually increased to 200° C. The temperature of the mixture was maintained in a range of from 200° C. to 220° C. for 3 hours while stirring the mixture to react the compounds. After the reaction was terminated, the reaction product was cooled to 130° C. Then the reaction product was filtered to obtain the precipitate. Then the precipitate was washed with 1-chloronathalene until the precipitate colored blue. The precipitate was then washed with methanol several times, followed by washing with hot water of 80° C. several times and drying. Thus a TiOPc crystal 5 was prepared. A halogen-containing raw material was used for synthesizing the TiOPc crystal 5.

Pigment Synthesis Example 6

A TiOPc crystal was prepared using the method described in Synthesis Example 1 of JP-A 64-17066. Specifically, 5 parts of an α-form TiOPc crystal, 10 g of sodium chloride and 5 g of acetophenone were milled for 10 hours at 100° C. using a sand grinder to change the crystal form of the TiOPc. Then the resultant TiOPc crystal was washed with ion-exchange water, followed by washing with methanol and refining with diluted sulfuric acid. Then the crystal was washed with ion-exchange water to an extent such that the filtrate includes no acidic component, followed by drying. Thus a TiOPc crystal 6 was prepared. A halogen-containing raw material was used for synthesizing the TiOPc crystal 6.

Pigment Synthesis Example 7

A TiOPc crystal was prepared using the method described in Example 1 of JP-A 11-5919. Specifically, in a container containing 50 g of quinoline, 20.4 g of o-phthalodinitrile and 7.6 g of titanium tetrachloride were reacted at 200° C. for 2 hours. After the reaction, the solvent was removed by a steam distillation. Then the reaction product was refined with a 2% aqueous solution of hydrochloric acid, followed by refinement using a 2% sodium hydroxide. Then the precipitate was washed with methanol, followed by washing with N,N-dimethylformamide and drying. Thus a TiOPc pigment was prepared. Two grams of the TiOPc pigment was gradually dissolved in 40 g of 98% sulfuric acid with a temperature of 5° C. The mixture was agitated for 1 hour at 5° C. Then the solution was gradually added to 400 g of ice water while agitating to precipitate a crystal. The resultant crystal was filtered, followed by washing with distilled water to an extent such that the acid does not remain in the filtrate. Thus, a wet cake was prepared. The wet cake was mixed with 100 g of tetrahydrofuran and the mixture was agitated for 5 hours. Then the mixture was filtered, and the wet cake was washed with tetrahydrofuran and dried. Thus, a TiOPc crystal 7 was prepared. A halogen-containing raw material was used for synthesizing the TiOPc crystal 7.

Pigment Synthesis Example 8

A TiOPc crystal was prepared using the method described in Example 1 of JP-A 03-255456. Specifically, the procedure for preparation of the wet cake in Pigment Synthesis Example 1 was repeated. Ten (10) grams of the wet cake was mixed with 15 g of sodium chloride and 7 g of diethylene glycol and the mixture was milled for 60 hours at 80° C. using an automatic mortar. Then the pigment was washed with water to remove sodium chloride and diethylene glycol therefrom. The dispersion was dried under a reduced pressure to prepare a powder. The powder was mixed with 200 g of cyclohexanone and the mixture was subjected to sand milling for 30 minutes using glass beads with a diameter of 1 mm. Thus, a TiOPc crystal 8 was prepared. No halogen-containing raw material was used for synthesizing the TiOPc crystal 8.

Pigment Synthesis Example 9

A TiOPc crystal was prepared using the method described in Example 1 of JP-A 08-110649. Specifically, 58 g of 1,3-diiminoisoindoline and 51 g of tetrabuthoxy titanium were reacted in 300 ml of α-chloronaphthalene for 5 hours at 210° C. Then the reaction product was washed with α-chloronaphthalene, followed by washing with dimethylformamide. Then the reaction product was washed with hot dimethylformamide, followed by washing with hot water. Further, the reaction product was washed with methanol, followed by drying. Thus, 50 g of a TiOPc was prepared. Four (4) grams of the pigment was added to 400 g of concentrated sulfuric acid cooled to 0° C., and the mixture was agitated for 1 hour at 0° C. After the TiOPc pigment was perfectly dissolved, the solution was added to a mixture of 800 ml of water and 800 ml of toluene which had been cooled to 0° C. After mixing was performed for 2 hours at room temperature, the precipitated TiOPc crystal was filtered. The cake was washed with methanol, followed by washing with water and filtering. After the filtrate became neutral, the TiOPc crystal was filtered, followed by drying. Thus, 2.9 g of a TiOPc crystal 9 were prepared. No halogen-containing raw material was used for synthesizing the TiOpc crystal 9.

It was confirmed that the X-ray diffraction spectra of the TiOPc crystals 3 to 9 are the same as those described in the respective patent publications. The X-ray spectrum of the TiOPc crystal 2 prepared in Pigment Synthesis Example 2 is the same as that of the TiOPc crystal 1 prepared in Pigment Synthesis Example 1. The peaks of the X-ray spectra of the pigments 1-9 are described in Table 5.

TABLE 5

| TiOPc Crystal No. | Max. Peak | Lowest angle peak | $9.4°$ peak | $9.6°$ peak | Peak between $7.3°$ and $9.4°$ | $24.0°$ peak | $26.3°$ peak |
|---|---|---|---|---|---|---|---|
| 1 | 27.2° | 7.3° | Yes | Yes | No | Yes | No |
| 2 | 27.2° | 7.3° | Yes | Yes | No | Yes | No |
| 3 | 27.2° | 7.3° | No | No | No | Yes | No |
| 4 | 27.2° | 9.6° | Yes | Yes | No | Yes | No |
| 5 | 27.2° | 7.4° | No | Yes | No | No | No |

TABLE 5-continued

| TiOPc Crystal No. | Max. Peak | Lowest angle peak | 9.4° peak | 9.6° peak | Peak between 7.3° and 9.4° | 24.0° peak | 26.3° peak |
|---|---|---|---|---|---|---|---|
| 6 | 27.2° | 7.3° | Yes | Yes | Yes (7.5°) | Yes | No |
| 7 | 27.2° | 7.5° | No | Yes | Yes (7.5°) | Yes | No |
| 8 | 27.2° | 7.4° | No | No | Yes (9.2°) | Yes | Yes |
| 9 | 27.2° | 7.3° | Yes | Yes | No | Yes | No |

Then the method for preparing dispersions for use in preparing CGLs using the above-mentioned charge generation materials (i.e., TiOPcs) will be explained.

Dispersion Preparation Example 1

A dispersion having the following formula was prepared using the TiOPc crystal 1 prepared in Pigment Synthesis Example 1.

| | |
|---|---|
| TiOPc crystal 1 | 15 parts |
| Polyvinyl butyral | 10 parts |
| (S-LEC BX-1 from Sekisui Chemical Co., Ltd.) | |
| 2-Butanone | 280 parts |

At first, the polyvinyl butyral resin was dissolved in 2-butanone to prepare a resin solution. Then TiOPc crystal 1 was dispersed for 30 minutes in the resin solution using a dispersion machine including PSZ balls with a particle diameter of 0.5 mm while the rotor was rotated at a revolution of 1,200 rpm. Thus, a dispersion (i.e., a CGL coating liquid 1) was prepared.

Dispersion Preparation Examples 2-9

The procedure for preparation of the dispersion 1 in Dispersion Preparation Example 1 was repeated except that TiOPc crystal 1 was replaced with each of the TiOPc crystals 2-9. Thus, dispersions 2-9 (i.e., CGL coating liquids 2-9) were prepared.

Dispersion Preparation Example 10

The dispersion 1 prepared in Dispersion Preparation Example 1 was subjected to filtering using a cotton wind cartridge filter TCW-1-CS with an effective pore diameter of 1 μm, which is manufactured by ADVANTECH, while applying a pressure using a pump. Thus, a dispersion 10 (i.e., a CGL coating liquid 10) was prepared.

Dispersion Preparation Example 11

The procedure for preparation of the dispersion 10 in Dispersion Preparation Example 10 was repeated except that the filter was replaced with a cotton wind cartridge filter TCW-3-CS with an effective pore diameter of 3 μm, which is manufactured by ADVANTECH. Thus, a dispersion 11 (i.e., a CGL coating liquid 11) was prepared.

Dispersion Preparation Example 12

The procedure for preparation of the dispersion 10 in Dispersion Preparation Example 10 was repeated except that the filter was replaced with a cotton wind cartridge filter TCW-5-CS with an effective pore diameter of 5 μm, which is manufactured by ADVANTECH. Thus, a dispersion 12 (i.e., a CGL coating liquid 12) was prepared.

Dispersion Preparation Example 13

The procedure for preparation of the dispersion 1 in Dispersion Preparation Example 1 was repeated except that the rotor was rotated for 20 minutes at a revolution of 1,000 rpm. Thus, a dispersion 13 (i.e., a CGL coating liquid 13) was prepared.

Dispersion Preparation Example 14

The dispersion 13 prepared in Dispersion Preparation Example 13 was subjected to filtering using a cotton wind cartridge filter TCW-1-CS with an effective pore diameter of 1 μm, which is manufactured by ADVANTECH, while applying a pressure using a pump to prepare a dispersion 14 (i.e., a CGL coating liquid 14). However, the filter was clogged with coarse particles of the dispersion 13, and therefore all of the dispersion could not be filtered. Therefore, the dispersion 14 could not be evaluated.

The particle diameter distributions of the pigment particles in the thus prepared dispersions 1-13 were determined using an instrument CAPA 700 from Horiba Ltd.

The results are shown in Table 6.

TABLE 6

| Dispersion | Average particle diameter (μm) | Standard Deviation (μm) |
|---|---|---|
| 1 | 0.29 | 0.18 |
| 2 | 0.19 | 0.13 |
| 3 | 0.28 | 0.19 |
| 4 | 0.31 | 0.20 |
| 5 | 0.30 | 0.20 |
| 6 | 0.27 | 0.19 |
| 7 | 0.29 | 0.20 |
| 8 | 0.27 | 0.18 |
| 9 | 0.26 | 0.19 |
| 10 | 0.22 | 0.16 |
| 11 | 0.24 | 0.17 |
| 12 | 0.28 | 0.18 |
| 13 | 0.33 | 0.23 |

Dispersion Preparation Example 15

The following components were mixed and the mixture was milled for 72 hours using a ball mill to prepare a dispersion 15 (i.e., a CGL coating liquid 15).

| | |
|---|---|
| Butyral resin<br>(S-LEC BMS from Sekisui Chemical Co., Ltd.) | 5 parts |
| Trisazo pigment having the following formula | 15 parts |

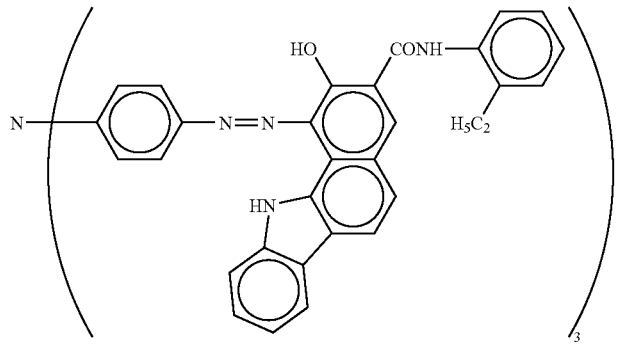

| | |
|---|---|
| Cyclohexanone | 700 parts |
| 2-Butanone | 300 parts |

Preparation of Photoreceptor

Then the method for preparing electrophotographic photoreceptors using the above-prepared CGL coating liquids. The CGL coating liquids were used after preserved for 6 months at a temperature of 22±1° C.

Example 6

Preparation of Charge Blocking Layer

The above-prepared charge blocking layer coating liquid 5 was coated on an aluminum drum (specified in JIS1050), which has an outside diameter of 60 mm, and the coated liquid was dried to form a charge blocking layer having a thickness of 0.3 μm.

Preparation of Moiré Preventing Layer

The following components were mixed to prepare a moiré preventing layer coating liquid.

| | |
|---|---|
| Titanium oxide<br>(CR-EL from Ishihara Sangyo Kaisha Ltd.) | 70 parts |
| Alkyd resin<br>(BEKKOLITE M6401-50-S from Dainippon Ink & Chemicals, Inc., solid content of 50%) | 14 parts |
| Melamine resin<br>(SUPER BEKKAMIN G-821-60 from Dainippon Ink & Chemicals, Inc., solid content of 60%) | 10 parts |
| 2-Butanone | 100 parts |

The thus prepared moiré preventing layer coating liquid was coated on the charge blocking layer, and the coated liquid was dried to form a moiré preventing layer having a thickness of 3.5 μm.

In this case, the volume ratio of the inorganic pigment (titanium oxide) to the binder resin is 1.66/1. The weight ratio of the alkyd resin to the melamine resin is 7/6.

Preparation of CGL

The CGL coating liquid 2 prepared above was coated on the moiré preventing layer, and the coated liquid was dried to form a CGL having a thickness of 0.3 μm.

Preparation of CTL

The following components were mixed to prepare a CTL coating liquid.

| | |
|---|---|
| Polycarbonate<br>(TS2050 from Teijin Chemicals Ltd.) | 10 parts |
| CTM having the following formula | 7 parts |

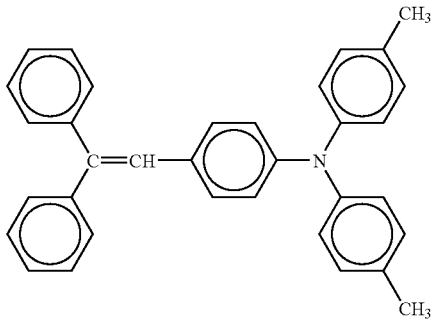

| | |
|---|---|
| Tetrahydrofuran | 80 parts |

The thus prepared CTL coating liquid was coated on the CGL and then dried. Thus a charge transport layer having a thickness of 25 μm was prepared.

Thus, a photoreceptor of Example 6 was prepared.

Comparative Examples 4 and 5

The procedure for preparation of the photoreceptor in Example 6 was repeated except that the charge blocking layer coating liquid 5 was replaced with each of the charge blocking layer coating liquids 1 and 6. Thus, photoreceptors of Comparative Examples 4 and 5 were prepared.

Example 7

The procedure for preparation of the photoreceptor in Example 6 was repeated except that the charge blocking layer coating liquid 5 was replaced with the charge blocking layer coating liquid 4. Thus, a photoreceptor of Example 7 was prepared.

Example 8

The procedure for preparation of the photoreceptor in Example 6 was repeated except that the charge blocking layer coating liquid 5 was replaced with the charge blocking layer coating liquid 2. Thus, a photoreceptor of Example 8 was prepared.

Example 9

The procedure for preparation of the photoreceptor in Example 6 was repeated except that the charge blocking layer coating liquid 5 was replaced with the charge blocking layer coating liquid 3. Thus, a photoreceptor of Example 9 was prepared.

Example 10

The procedure for preparation of the photoreceptor in Example 6 was repeated except that the charge blocking layer coating liquid 5 was replaced with the charge blocking layer coating liquid 8. Thus, a photoreceptor of Example 10 was prepared.

Example 11

The procedure for preparation of the photoreceptor in Example 6 was repeated except that the thickness of the charge blocking layer was changed to 0.7 µm. Thus, a photoreceptor of Example 11 was prepared.

Example 12

The procedure for preparation of the photoreceptor in Example 6 was repeated except that the thickness of the charge blocking layer was changed to 2.1 µm. Thus, a photoreceptor of Example 12 was prepared.

Example 13

The procedure for preparation of the photoreceptor in Example 6 was repeated except that the thickness of the charge blocking layer was changed to 0.05 µm. Thus, a photoreceptor of Example 13 was prepared.

Example 14

The procedure for preparation of the photoreceptor in Example 6 was repeated except that the thickness of the charge blocking layer was changed to 1.9 µm. Thus, a photoreceptor of Example 14 was prepared.

Comparative Example 6

The procedure for preparation of the photoreceptor in Example 6 was repeated except that the charge blocking layer was not formed. Thus, a photoreceptor of Comparative Example 6 was prepared.

Comparative Example 7

The procedure for preparation of the photoreceptor in Example 6 was repeated except that the moiré preventing layer was not formed. Thus, a photoreceptor of Comparative Example 7 was prepared.

Comparative Example 8

The procedure for preparation of the photoreceptor in Example 6 was repeated except that the positions of the charge blocking layer and the moiré preventing layer were reversed. Thus, a photoreceptor of Comparative Example 8 was prepared.

Comparative Example 9.

The procedure for preparation of the photoreceptor in Example 6 was repeated except that the charge blocking layer coating liquid 5 was replaced with the charge blocking layer coating liquid 7. Thus, a photoreceptor of Example 10 was prepared.

Evaluation (Evaluation Method 1)

Each of the thus prepared photoreceptors of Examples 6 to 14 and Comparative Examples 4 to 9 was set in an image forming apparatus having a constitution as illustrated in FIG. 12. The image forming apparatus includes an image irradiator which irradiates the photoreceptor with laser light having a wavelength of 780 nm emitted by a laser diode while scanning the light using a polygon mirror; a scorotron charger configured to charge the photoreceptor so as to have a potential of −900V; and a transfer device including a transfer belt. A running test in which 200,000 images of an original with an image proportion of 6% are continuously reproduced using a A-4 size plain paper was performed on each photoreceptor, followed by production of white solid images and half tone images. The image forming conditions are as follows.

(1) environmental conditions: 22° C. and 55% RH; 10° C. and 15% RH; and 30° C. and 90% RH The image qualities of the white solid images and half tone images, i.e., background development, moiré fringes and image density, were checked. The background development was graded into the following four ranks:
⊚: excellent
○: good
Δ: slightly bad
X: bad The results are shown in Tables 7-1, 7-2 and 7-3.

TABLE 7-1

| | | (22° C. and 55% RH) | | |
|---|---|---|---|---|
| | Charge blocking layer | Image qualities | | |
| | | Initial | After running test | |
| Photoreceptor | coating liquid | Background development | Background development | Other image qualities |
| Ex. 6 | 5 | ○ | ○-Δ | Slightly uneven density image |

TABLE 7-1-continued (22° C. and 55% RH)

| Photoreceptor | Charge blocking layer coating liquid | Image qualities | | |
|---|---|---|---|---|
| | | Initial | After running test | |
| | | Background development | Background development | Other image qualities |
| Ex. 7 | 4 | ○ | ○ | Slightly uneven density image |
| Ex. 8 | 2 | ◎ | ○ | Slightly uneven density image |
| Ex. 9 | 3 | ◎ | ◎ | Excellent |
| Ex. 10 | 8 | ◎ | ◎ | Excellent |
| Ex. 11 | 5 | ◎ | ○ | Good |
| Ex. 12 | 5 | ○ | Δ | Slightly low density image |
| Ex. 13 | 5 | ○-Δ | Δ | Slight background development |
| Ex. 14 | 5 | ◎ | ◎ | Excellent |
| Comp. Ex. 4 | 1 | X | X | Seriously uneven density image |
| Comp. Ex. 5 | 6 | Δ-X | X | Uneven density image |
| Comp. Ex. 6 | — (no layer) | Δ | Δ-X | Uneven density image, low density image |
| Comp. Ex. 7 | 1 | Δ-X | X | Uneven density image, moire fringe |
| Comp. Ex. 8 | 1 | X | X | Seriously uneven density image, low density image |
| Comp. Ex. 9 | 7 | X | X | Seriously uneven density image, low density image |

TABLE 7-2

(10° C. and 15% RH)

| Photoreceptor | Charge blocking layer coating liquid | Image qualities | | |
|---|---|---|---|---|
| | | Initial | After running test | |
| | | Background development | Background development | Other image qualities |
| Ex. 6 | 5 | ○ | ○-Δ | Slightly uneven density image |
| Ex. 7 | 4 | ○ | ○ | Slightly uneven density image |
| Ex. 8 | 2 | ◎ | ○ | Slightly uneven density image |
| Ex. 9 | 3 | ◎ | ◎-○ | Good |
| Ex. 10 | 8 | ◎ | ◎ | Excellent |
| Ex. 11 | 5 | ◎ | ○ | Good |
| Ex. 12 | 5 | ○ | Δ | Slightly low density image |
| Ex. 13 | 5 | ○-Δ | Δ | Slight background development |
| Ex. 14 | 5 | ◎ | ◎ | Excellent |
| Comp. Ex. 4 | 1 | X | X | Seriously uneven density image, seriously low density image |
| Comp. Ex. 5 | 6 | X | X | Uneven density image, seriously low density image |
| Comp. Ex. 6 | — (no layer) | Δ | X | Uneven density image, low density image |
| Comp. Ex. 7 | 1 | X | X | Uneven density image, moire fringe |
| Comp. Ex. 8 | 1 | X | X | Seriously uneven density image, low density image |
| Comp. Ex. 9 | 7 | X | X | Seriously uneven density image, low density image |

TABLE 7-3

(30° C. and 90% RH)

| Photo-receptor | Charge blocking layer coating liquid | Image qualities Initial Background development | After running test Background development | Other image qualities |
|---|---|---|---|---|
| Ex. 6 | 5 | ○ | ○-△ | Slightly uneven density image |
| Ex. 7 | 4 | ○ | ○ | Slightly uneven density image |
| Ex. 8 | 2 | ○ | △ | Slightly uneven density image |
| Ex. 9 | 3 | ◎ | ◎-○ | Good |
| Ex. 10 | 8 | ◎ | ◎ | Excellent |
| Ex. 11 | 5 | ◎ | ○ | Good |
| Ex. 12 | 5 | ○ | △ | Slightly low density image |
| Ex. 13 | 5 | ○-△ | △ | Slight background development |
| Ex. 14 | 5 | ◎ | ◎ | Excellent |
| Comp. Ex. 4 | 1 | X | X | Seriously uneven density image, seriously low density image |
| Comp. Ex. 5 | 6 | △-X | X | Seriously uneven density image, seriously low density image |
| Comp. Ex. 6 | — (no layer) | X | X | Uneven density image, seriously low density image |
| Comp. Ex. 7 | 1 | △ | X | Uneven density image, moiré fringe |
| Comp. Ex. 8 | 1 | X | X | Seriously uneven density image, low density image |
| Comp. Ex. 9 | 7 | X | X | Seriously uneven density image, low density image |

It is clear from Tables 7-1 to 7-3 that the photoreceptors having a charge blocking layer prepared by the charge blocking layer coating liquid of the present invention have good environmental stability and can stably produce high quality images without causing undesired images such as background development and uneven density images even when the charge blocking layer coating liquid is preserved for a long period of time.

Example 15

The procedure for preparation of the photoreceptor in Example 11 was repeated except that the formula of the moiré preventing layer coating liquid was changed as follows.

| Formula of moiré preventing layer coating liquid | |
|---|---|
| Titanium oxide (CR-EL from Ishihara Sangyo Kaisha Ltd., average particle diameter of 0.25 μm) | 168 parts |
| Alkyd resin (BEKKOLITE M6401-50-S from Dainippon Ink & Chemicals, Inc., solid content of 50%) | 33.6 parts |
| Melamine resin (SUPER BEKKAMIN L-121-60 from Dainippon Ink & Chemicals, Inc., solid content of 60%) | 18.7 parts |
| 2-Butanone | 100 parts |

In this case, the volume ratio of the inorganic pigment (titanium oxide) to the binder resin is 2/1. The weight ratio of the alkyd resin to the melamine resin is 6/4.

Thus, a photoreceptor of Example 15 was prepared.

Example 16

The procedure for preparation of the photoreceptor in Example 11 was repeated except that the formula of the moiré preventing layer coating liquid was changed as follows.

| Formula of moiré preventing layer coating liquid | |
|---|---|
| Titanium oxide (CR-EL from Ishihara Sangyo Kaisha Ltd., average particle diameter of 0.25 μm) | 252 parts |
| Alkyd resin (BEKKOLITE M6401-50-S from Dainippon Ink & Chemicals, Inc., solid content of 50%) | 33.6 parts |
| Melamine resin (SUPER BEKKAMIN L-121-60 from Dainippon Ink & Chemicals, Inc., solid content of 60%) | 18.7 parts |
| 2-Butanone | 100 parts |

In this case, the volume ratio of the inorganic pigment (titanium oxide) to the binder resin is 3/1. The weight ratio of the alkyd resin to the melamine resin is 6/4.

Thus, a photoreceptor of Example 16 was prepared.

Example 17

The procedure for preparation of the photoreceptor in Example 11 was repeated except that the formula of the moiré preventing layer coating liquid was changed as follows.

| Formula of moiré preventing layer coating liquid | |
|---|---|
| Titanium oxide (CR-EL from Ishihara Sangyo Kaisha Ltd., average particle diameter of 0.25 μm) | 84 parts |
| Alkyd resin (BEKKOLITE M6401-50-S from Dainippon Ink & Chemicals, Inc., solid content of 50%) | 33.6 parts |
| Melamine resin (SUPER BEKKAMIN L-121-60 from Dainippon Ink & Chemicals, Inc., solid content of 60%) | 18.7 parts |
| 2-Butanone | 100 parts |

In this case, the volume ratio of the inorganic pigment (titanium oxide) to the binder resin is 1/1. The weight ratio of the alkyd resin to the melamine resin is 6/4.

Thus, a photoreceptor of Example 17 was prepared.

Example 18

The procedure for preparation of the photoreceptor in Example 11 was repeated except that the formula of the moiré preventing layer coating liquid was changed as follows.

| Formula of moiré preventing layer coating liquid | |
| --- | --- |
| Titanium oxide (CR-EL from Ishihara Sangyo Kaisha Ltd., average particle diameter of 0.25 μm) | 42 parts |
| Alkyd resin (BEKKOLITE M6401-50-S from Dainippon Ink & Chemicals, Inc., solid content of 50%) | 33.6 parts |
| Melamine resin (SUPER BEKKAMIN L-121-60 from Dainippon Ink & Chemicals, Inc., solid content of 60%) | 18.7 parts |
| 2-Butanone | 100 parts |

In this case, the volume ratio of the inorganic pigment (titanium oxide) to the binder resin is 0.5/1. The weight ratio of the alkyd resin to the melamine resin is 6/4.

Thus, a photoreceptor of Example 18 was prepared.

Example 19

The procedure for preparation of the photoreceptor in Example 11 was repeated except that the formula of the moiré preventing layer coating liquid was changed as follows.

| Formula of moiré preventing layer coating liquid | |
| --- | --- |
| Titanium oxide (CR-EL from Ishihara Sangyo Kaisha Ltd., average particle diameter of 0.25 μm) | 336 parts |
| Alkyd resin (BEKKOLITE M6401-50-S from Dainippon Ink & Chemicals, Inc., solid content of 50%) | 33.6 parts |
| Melamine resin (SUPER BEKKAMIN L-121-60 from Dainippon Ink & Chemicals, Inc., solid content of 60%) | 18.7 parts |
| 2-Butanone | 100 parts |

In this case, the volume ratio of the inorganic pigment (titanium oxide) to the binder resin is 4/1. The weight ratio of the alkyd resin to the melamine resin is 6/4.

Thus, a photoreceptor of Example 19 was prepared.

Example 20

The procedure for preparation of the photoreceptor in Example 11 was repeated except that the formula of the moiré preventing layer coating liquid was changed as follows.

| Formula of moiré preventing layer coating liquid | |
| --- | --- |
| Titanium oxide (CR-EL from Ishihara Sangyo Kaisha Ltd., average particle diameter of 0.25 μm) | 126 parts |
| Alkyd resin (BEKKOLITE M6401-50-S from Dainippon Ink & Chemicals, Inc., solid content of 50%) | 22.4 parts |
| Melamine resin (SUPER BEKKAMIN L-121-60 from Dainippon Ink & Chemicals, Inc., solid content of 60%) | 28 parts |
| 2-Butanone | 100 parts |

In this case, the volume ratio of the inorganic pigment (titanium oxide) to the binder resin is 1.5/1. The weight ratio of the alkyd resin to the melamine resin is 4/6.

Thus, a photoreceptor of Example 20 was prepared.

Example 21

The procedure for preparation of the photoreceptor in Example 11 was repeated except that the formula of the moiré preventing layer coating liquid was changed as follows.

| Formula of moiré preventing layer coating liquid | |
| --- | --- |
| Titanium oxide (CR-EL from Ishihara Sangyo Kaisha Ltd., average particle diameter of 0.25 μm) | 126 parts |
| Alkyd resin (BEKKOLITE M6401-50-S from Dainippon Ink & Chemicals, Inc., solid content of 50%) | 28 parts |
| Melamine resin (SUPER BEKKAMIN L-121-60 from Dainippon Ink & Chemicals, Inc., solid content of 60%) | 23.3 parts |
| 2-Butanone | 100 parts |

In this case, the volume ratio of the inorganic pigment (titanium oxide) to the binder resin is 1.5/1. The weight ratio of the alkyd resin to the melamine resin is 5/5.

Thus, a photoreceptor of Example 21 was prepared.

Example 22

The procedure for preparation of the photoreceptor in Example 11 was repeated except that the formula of the moiré preventing layer coating liquid was changed as follows.

| Formula of moiré preventing layer coating liquid | |
| --- | --- |
| Titanium oxide (CR-EL from Ishihara Sangyo Kaisha Ltd., average particle diameter of 0.25 μm) | 126 parts |
| Alkyd resin (BEKKOLITE M6401-50-S from Dainippon Ink & Chemicals, Inc., solid content of 50%) | 39.2 parts |
| Melamine resin (SUPER BEKKAMIN L-121-60 from Dainippon Ink & Chemicals, Inc., solid content of 60%) | 14 parts |
| 2-Butanone | 100 parts |

In this case, the volume ratio of the inorganic pigment (titanium oxide) to the binder resin is 1.5/1. The weight ratio of the alkyd resin to the melamine resin is 7/3.

Thus, a photoreceptor of Example 22 was prepared.

Example 23

The procedure for preparation of the photoreceptor in Example 11 was repeated except that the formula of the moiré preventing layer coating liquid was changed as follows.

| Formula of moiré preventing layer coating liquid | |
|---|---|
| Titanium oxide (CR-EL from Ishihara Sangyo Kaisha Ltd., average particle diameter of 0.25 μm) | 126 parts |
| Alkyd resin (BEKKOLITE M6401-50-S from Dainippon Ink & Chemicals, Inc., solid content of 50%) | 44.8 parts |
| Melamine resin (SUPER BEKKAMIN L-121-60 from Dainippon Ink & Chemicals, Inc., solid content of 60%) | 9.3 parts |
| 2-butanone | 100 parts |

In this case, the volume ratio of the inorganic pigment (titanium oxide) to the binder resin is 1.5/1. The weight ratio of the alkyd resin to the melamine resin is 8/2.

Thus, a photoreceptor of Example 23 was prepared.

Example 24

The procedure for preparation of the photoreceptor in Example 11 was repeated except that the formula of the moiré preventing layer coating liquid was changed as follows.

| Formula of moiré preventing layer coating liquid | |
|---|---|
| Titanium oxide (CR-EL from Ishihara Sangyo Kaisha Ltd., average particle diameter of 0.25 μm) | 126 parts |
| Alkyd resin (BEKKOLITE M6401-50-S from Dainippon Ink & Chemicals, Inc., solid content of 50%) | 50.4 parts |
| Melamine resin (SUPER BEKKAMIN L-121-60 from Dainippon Ink & Chemicals, Inc., solid content of 60%) | 4.7 parts |
| 2-Butanone | 100 parts |

In this case, the volume ratio of the inorganic pigment (titanium oxide) to the binder resin is 1.5/1. The weight ratio of the alkyd resin to the melamine resin is 9/1.

Thus, a photoreceptor of Example 24 was prepared.

Example 25

The procedure for preparation of the photoreceptor in Example 11 was repeated except that the formula of the moiré preventing layer coating liquid was changed as follows.

| Formula of moiré preventing layer coating liquid | |
|---|---|
| Titanium oxide (CR-EL from Ishihara Sangyo Kaisha Ltd., average particle diameter of 0.25 μm) | 63 parts |
| Titanium oxide (PT-401M from Ishihara Sangyo Kaisha Ltd., average particle diameter of 0.07 μm) | 63 parts |
| Alkyd resin (BEKKOLITE M6401-50-S from Dainippon Ink & Chemicals, Inc., solid content of 50%) | 33.6 parts |
| Melamine resin (SUPER BEKKAMIN L-121-60 from Dainippon Ink & Chemicals, Inc., solid content of 60%) | 18.7 parts |
| 2-Butanone | 100 parts |

In this case, the volume ratio of the inorganic pigment (titanium oxide) to the binder resin is 1.5/1. The weight ratio of the alkyd resin to the melamine resin is 6/4. The ratio (D2/D1) of the average particle diameter of PT-401M to the average particle diameter of CR-EL is 0.28. In addition, the mixing ratio of PT-401M to CR-EL is 1/1 and therefore $(T2/(T1+T2))$ is 0.5.

Thus, a photoreceptor of Example 25 was prepared.

Example 26

The procedure for preparation of the photoreceptor in Example 11 was repeated except that the formula of the moiré preventing layer coating liquid was changed as follows.

| Formula of moiré preventing layer coating liquid | |
|---|---|
| Titanium oxide (CR-EL from Ishihara Sangyo Kaisha Ltd., average particle diameter of 0.25 μm) | 113.4 parts |
| Titanium oxide (PT-401M from Ishihara Sangyo Kaisha Ltd., average particle diameter of 0.07 μm) | 12.6 parts |
| Alkyd resin (BEKKOLITE M6401-50-S from Dainippon Ink & Chemicals, Inc., solid content of 50%) | 33.6 parts |
| Melamine resin (SUPER BEKKAMIN L-121-60 from Dainippon Ink & Chemicals, Inc., solid content of 60%) | 18.7 parts |
| 2-Butanone | 100 parts |

In this case, the volume ratio of the inorganic pigment (titanium oxide) to the binder resin is 1.5/1. The weight ratio of the alkyd resin to the melamine resin is 6/4. The ratio (D2/D1) of the average particle diameter of PT-401M to the average particle diameter of CR-EL is 0.28. In addition, the mixing ratio of PT-401M to CR-EL is 1/9 and therefore $(T2/(T1+T2))$ is 0.1.

Thus, a photoreceptor of Example 26 was prepared.

Example 27

The procedure for preparation of the photoreceptor in Example 11 was repeated except that the formula of the moiré preventing layer coating liquid was changed as follows.

| Formula of moiré preventing layer coating liquid | |
|---|---|
| Titanium oxide (CR-EL from Ishihara Sangyo Kaisha Ltd., average particle diameter of 0.25 μm) | 12.6 parts |
| Titanium oxide (PT-401M from Ishihara Sangyo Kaisha Ltd., average particle diameter of 0.07 μm) | 113.4 parts |
| Alkyd resin (BEKKOLITE M6401-50-S from Dainippon Ink & Chemicals, Inc., solid content of 50%) | 33.6 parts |

-continued

| Formula of moiré preventing layer coating liquid | |
|---|---|
| Melamine resin (SUPER BEKKAMIN L-121-60 from Dainippon Ink & Chemicals, Inc., solid content of 60%) | 18.7 parts |
| 2-Butanone | 100 parts |

In this case, the volume ratio of the inorganic pigment (titanium oxide) to the binder resin is 1.5/1. The weight ratio of the alkyd resin to the melamine resin is 6/4. The ratio (D2/D1) of the average particle diameter of PT-401M to the average particle diameter of CR-EL is 0.28. In addition, the mixing ratio of PT-401M to CR-EL is 9/1 and therefore (T2/(T1+T2)) is 0.9.

Thus, a photoreceptor of Example 27 was prepared.

Example 28

The procedure for preparation of the photoreceptor in Example 11 was repeated except that the formula of the moiré preventing layer coating liquid was changed as follows.

| Formula of moiré preventing layer coating liquid | |
|---|---|
| Titanium oxide (CR-EL from Ishihara Sangyo Kaisha Ltd., average particle diameter of 0.25 μm) | 63 parts |
| Titanium oxide (TTO-F1 from Ishihara Sangyo Kaisha Ltd., average particle diameter of 0.04 μm) | 63 parts |
| Alkyd resin (BEKKOLITE M6401-50-S from Dainippon Ink & Chemicals, Inc., solid content of 50%) | 33.6 parts |
| Melamine resin (SUPER BEKKAMIN L-121-60 from Dainippon Ink & Chemicals, Inc., solid content of 60%) | 18.7 parts |
| 2-Butanone | 100 parts |

In this case, the volume ratio of the inorganic pigment (titanium oxide) to the binder resin is 1.5/1. The weight ratio of the alkyd resin to the melamine resin is 6/4. The ratio (D2/D1) of the average particle diameter of PT-401M to the average particle diameter of CR-EL is 0.16. In addition, the mixing ratio of PT-401M to CR-EL is 1/1 and therefore (T2/(T1+T2)) is 0.5.

Thus, a photoreceptor of Example 28 was prepared.

Example 29

The procedure for preparation of the photoreceptor in Example 11 was repeated except that the formula of the moiré preventing layer coating liquid was changed as follows.

| Formula of moiré preventing layer coating liquid | |
|---|---|
| Titanium oxide (CR-EL from Ishihara Sangyo Kaisha Ltd., average particle diameter of 0.25 μm) | 63 parts |
| Titanium oxide (A-100 from Ishihara Sangyo Kaisha Ltd., average particle diameter of 0.15 μm) | 63 parts |
| Alkyd resin (BEKKOLITE M6401-50-S from Dainippon Ink & Chemicals, Inc., solid content of 50%) | 33.6 parts |
| Melamine resin (SUPER BEKKAMIN L-121-60 from Dainippon Ink & Chemicals, Inc., solid content of 60%) | 18.7 parts |
| 2-Butanone | 100 parts |

In this case, the volume ratio of the inorganic pigment (titanium oxide) to the binder resin is 1.5/1. The weight ratio of the alkyd resin to the melamine resin is 6/4. The ratio (D2/D1) of the average particle diameter of PT-401M to the average particle diameter of CR-EL is 0.6. In addition, the mixing ratio of PT-401M to CR-EL is 1/1 and therefore (T2/(T1+T2)) is 0.5.

Thus, a photoreceptor of Example 29 was prepared.

The photoreceptors of Examples 15 to 29 were evaluated in the same manner as mentioned above in Example 11 under a condition of 22° C. and 55% RH.

The results are shown in Table 8.

TABLE 8

(22° C. and 55% RH)

| Photo-receptor | Charge blocking layer coating liquid | Image qualities | | |
|---|---|---|---|---|
| | | Initial Background development | After running test Background development | Other image qualities |
| Ex. 11 | 5 | ⊚ | ○ | Good |
| Ex. 15 | 5 | ⊚ | ○ | Good |
| Ex. 16 | 5 | ⊚ | ○ | Good |
| Ex. 17 | 5 | ⊚ | ○ | Good |
| Ex. 18 | 5 | ⊚ | ⊚ | Slight moiré fringe (still acceptable) |
| Ex. 19 | 5 | ⊚-○ | ○-Δ | Good |
| Ex. 20 | 5 | ⊚ | ○ | Slightly low density image (still acceptable) |
| Ex. 21 | 5 | ⊚ | ○ | Good |
| Ex. 22 | 5 | ⊚ | ○ | Good |
| Ex. 23 | 5 | ⊚ | ○ | Good |
| Ex. 24 | 5 | ⊚-○ | ○-Δ | Good |
| Ex. 25 | 5 | ⊚ | ⊚ | Good |
| Ex. 26 | 5 | ⊚ | ⊚ | Good |
| Ex. 27 | 5 | ⊚ | ⊚ | Slight moiré fringe (still acceptable) |
| Ex. 28 | 5 | ⊚ | ⊚ | Slight moiré fringe (still acceptable) |
| Ex. 29 | 5 | ⊚ | ⊚ | Good |

Example 30

The procedure for preparation of the photoreceptor in Example 6 was repeated except that the CGL coating liquid 2 was replaced with the CGL coating liquid 1.

Thus, a photoreceptor of Example 30 was prepared.

Example 31

The procedure for preparation of the photoreceptor in Example 6 was repeated except that the CGL coating liquid 2 was replaced with the CGL coating liquid 3.

Thus, a photoreceptor of Example 31 was prepared.

Example 32

The procedure for preparation of the photoreceptor in Example 6 was repeated except that the CGL coating liquid 2 was replaced with the CGL coating liquid 4.
Thus, a photoreceptor of Example 32 was prepared.

Example 33

The procedure for preparation of the photoreceptor in Example 6 was repeated except that the CGL coating liquid 2 was replaced with the CGL coating liquid 5.
Thus, a photoreceptor of Example 33 was prepared.

Example 34

The procedure for preparation of the photoreceptor in Example 6 was repeated except that the CGL coating liquid 2 was replaced with the CGL coating liquid 6.
Thus, a photoreceptor of Example 34 was prepared.

Example 35

The procedure for preparation of the photoreceptor in Example 6 was repeated except that the CGL coating liquid 2 was replaced with the CGL coating liquid 7.
Thus, a photoreceptor of Example 35 was prepared.

Example 36

The procedure for preparation of the photoreceptor in Example 6 was repeated except that the CGL coating liquid 2 was replaced with the CGL coating liquid 8.
Thus, a photoreceptor of Example 36 was prepared.

Example 37

The procedure for preparation of the photoreceptor in Example 6 was repeated except that the CGL coating liquid 2 was replaced with the CGL coating liquid 9.
Thus, a photoreceptor of Example 37 was prepared.

Example 38

The procedure for preparation of the photoreceptor in Example 6 was repeated except that the CGL coating liquid 2 was replaced with the CGL coating liquid 10.
Thus, a photoreceptor of Example 38 was prepared.

Example 39

The procedure for preparation of the photoreceptor in Example 6 was repeated except that the CGL coating liquid 2 was replaced with the CGL coating liquid 11.
Thus, a photoreceptor of Example 39 was prepared.

Example 40

The procedure for preparation of the photoreceptor in Example 6 was repeated except that the CGL coating liquid 2 was replaced with the CGL coating liquid 12.
Thus, a photoreceptor of Example 40 was prepared.

Example 41

The procedure for preparation of the photoreceptor in Example 6 was repeated except that the CGL coating liquid 2 was replaced with the CGL coating liquid 13.
Thus, a photoreceptor of Example 41 was prepared.

Example 42

The procedure for preparation of the photoreceptor in Example 6 was repeated except that the CGL coating liquid 2 was replaced with the CGL coating liquid 15.
Thus, a photoreceptor of Example 42 was prepared.

The thus prepared photoreceptors of Examples 30 to 42 were evaluated in the same manner as mentioned above for evaluating the photoreceptor of Example 6 except that each of the photoreceptors was set the image forming apparatus after set in a process cartridge having the configuration illustrated in FIG. 14 and the running test was performed under an environmental condition of 22° C. and 55% RH.
The results are shown in Table 9.

TABLE 9

(22° C. and 55% RH)

| Photoreceptor | CGL coating liquid | Image qualities Initial Background development | After running test Background development | Other image qualities |
|---|---|---|---|---|
| Ex. 6 | 2 | ⊚ | ○ | Good |
| Ex. 30 | 1 | ○ | Δ | Good |
| Ex. 31 | 3 | Δ | Δ | Good |
| Ex. 32 | 4 | Δ | Δ-X | Slightly low density image |
| Ex. 33 | 5 | Δ | Δ-X | Good |
| Ex. 34 | 6 | Δ | Δ | Good |
| Ex. 35 | 7 | Δ | Δ | Good |
| Ex. 36 | 8 | Δ | Δ | Slightly low density image |
| Ex. 37 | 9 | Δ | Δ-X | Good |
| Ex. 38 | 10 | ⊚ | ○ | Good |
| Ex. 39 | 11 | ⊚ | ○ | Good |
| Ex. 40 | 12 | ○ | Δ | Good |
| Ex. 41 | 13 | ○ | Δ | Good |
| Ex. 42 | 15 | Δ-X | Δ-X | Low density image |

It is clear from Table 9 that the photoreceptors of the present invention having a CGL prepared by the CGL coating liquid of the present invention, which has been preserved for a long period of time, can be practically used. However, when an azo pigment is used for the CGL (i.e., the photoreceptor of Example 42), the image density of the produced images was lower than that of the images produced by the other photoreceptors, which have a CGL including a TiOPc crystal. In addition, it is clear that among the photoreceptors having a CGL including a TiOPc crystal, the photoreceptor having a CGL including the TiOPc crystal synthesized in Synthesis Example 1 can produce images having better qualities than the other photoreceptors.

Further, it is clear from Table 9 that the photoreceptors (i.e., the photoreceptors of Examples 6, 38 and 39) having a CGL including the TiOPc crystal which is synthesized in Synthesis Example 1 and which has a primary particle diameter of not greater than 0.25 μm can produce images with less background development than the other photoreceptors. Furthermore, it is found that with respect to the particle diameter controlling method, both the method in which the particle diameter of a TiOPc crystal is controlled so as to be not greater than 0.25 μm in the synthesis process and the method in which the particle diameter is controlled by removing coarse particles after the dispersion process can be used.

Example 43

The procedure for preparation of the photoreceptor in Example 9 was repeated except that the CTL coating liquid was replaced with the following CTL coating liquid.

| | |
|---|---|
| Charge transport polymer having the following formula (weight average molecular weight of about 135,000) | 10 parts |
| 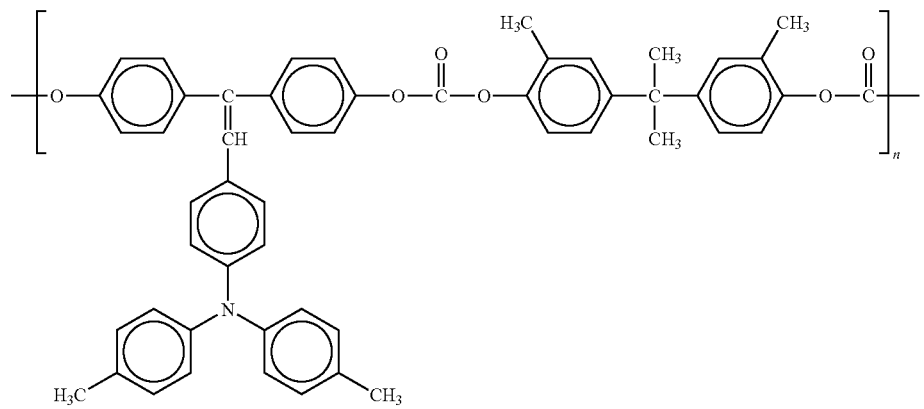 | |
| Additive having the following formula | 0.5 parts |
| 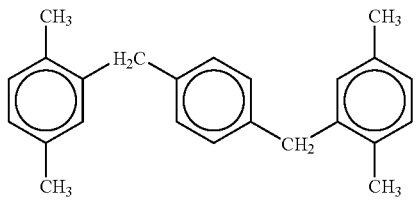 | |
| Methylene chloride | 100 parts |

Thus, a photoreceptor of Example 43 was prepared.

Example 44

The procedure for preparation of the photoreceptor in Example 9 was repeated except that the thickness of the CTL was changed to 18 μm, and the following protective layer coating liquid was coated on the CTL, followed by drying to prepare a protective layer having a thickness of 5 μm.

| Protective layer coating liquid | |
|---|---|
| Polycarbonate (TS2050 from Teijin Chemical Ltd., viscosity average molecular weight of 50,000) | 10 parts |
| Charge transport material having the following formula | 7 parts |
| 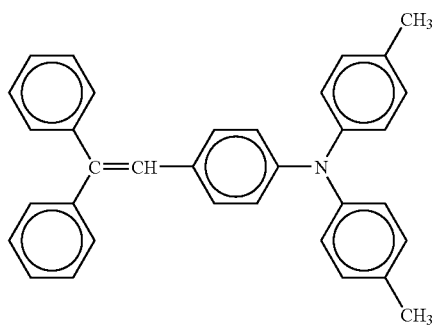 | |

| -continued | |
|---|---|
| Protective layer coating liquid | |
| Particulate α-alumina (resistivity of $2.5 \times 10^{12}$ Ω·cm, average primary particle diameter of 0.4 μm) | 4 parts |
| Cyclohexanone | 500 parts |
| Tetrahydrofuran | 150 parts |

Thus, a photoreceptor of Example 44 was prepared.

Example 45

The procedure for preparation of the photoreceptor in Example 44 was repeated except that the particulate alumina in the protective layer coating liquid was replaced with the following titanium oxide.

| | |
|---|---|
| Titanium oxide (resistivity of $1.5 \times 10^{10}$ Ω·cm, average primary particle diameter of 0.5 μm) | 4 parts |

Thus, a photoreceptor of Example 45 was prepared.

Example 46

The procedure for preparation of the photoreceptor in Example 44 was repeated except that the particulate alumina in the protective layer coating liquid was replaced with the following tin oxide—antimony oxide powder.

| Tin oxide - antimony oxide powder | 4 parts |
|---|---|
| (resistivity of $1 \times 10^6$ Ω · cm, average primary particle diameter of 0.4 µm) | |

Thus, a photoreceptor of Example 46 was prepared.

Example 47

The procedure for preparation of the photoreceptor in Example 9 was repeated except that the thickness of the CTL was changed to 18 µm, and the following protective layer coating liquid was coated on the CTL, followed by drying to prepare a protective layer having a thickness of 5 µm.

| Protective layer coating liquid | |
|---|---|
| Methyltrimethoxy silane | 100 parts |
| 3% acetic acid | 20 parts |
| Charge transport material having the following formula | 35 parts |

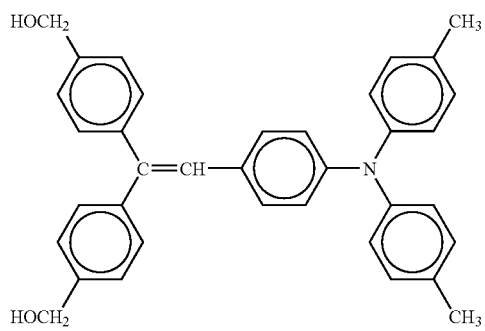

| Antioxidant | 1 part |
|---|---|
| (SANOL LS2626 from Sankyo Chemical Co., Ltd.) | |
| Crosslinking agent | 1 part |
| (dibutyl tin acetate) | |
| 2-Propanol | 200 parts |

Thus, a photoreceptor of Example 47 was prepared.

Example 48

The procedure for preparation of the photoreceptor in Example 9 was repeated except that the thickness of the charge transport layer was changed to 18 µm, and the following protective layer coating liquid was coated on the charge transport layer, followed by drying to prepare a protective layer having a thickness of 5 µm.

| Protective layer coating liquid | |
|---|---|
| Methyltrimethoxy silane | 100 parts |
| 3% acetic acid | 20 parts |

| Protective layer coating liquid | |
|---|---|
| Charge transport material having the following formula | 35 parts |

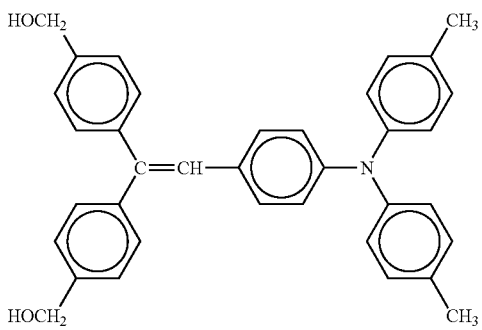

| Particulate α-alumina | 15 parts |
|---|---|
| (resistivity of $2.5 \times 10^{12}$ Ω · cm, average primary particle diameter of 0.4 µm) | |
| Antioxidant | 1 part |
| (SANOL LS2626 from Sankyo Chemical Co., Ltd.) | |
| Crosslinking agent | 1 part |
| (dibutyl tin acetate) | |
| 2-Propanol | 200 parts |

Thus, a photoreceptor of Example 48 was prepared.

Example 49

The procedure for preparation of the photoreceptor in Example 9 was repeated except that the thickness of the charge transport layer was changed to 18 µm, and the following protective layer coating liquid was coated on the charge transport layer by a spray coating method, followed by natural drying for 20 minutes and light irradiation to prepare a protective layer having a thickness of 5 µm. The light irradiation condition is as follows.

Power of metal halide lamp used: 160 W/cm
Irradiation distance: 120 mm
Exposure: 500 mW/cm$^2$
Irradiation time: 60 sec

| Protective layer coating liquid | |
|---|---|
| Radical polymerizable trifunctional monomer | 10 parts |
| having no charge transport structure | |
| (trimethylolpropane triacrylate, KAYARAD TMPTA from Nippon Kayaku Co., Ltd., having a molecular weight of 296, and a ratio of molecular weight to number of functional groups of 99) | |

-continued

| Protective layer coating liquid | |
|---|---|
| Radical polymerizable monofunctional monomer having a charge transport structure and the following formula | 10 parts |

[Structural formula: a radical polymerizable monomer with $CH=CH_2$ acrylate group attached via ester linkage to a biphenyl-triarylamine (di-p-tolylamino) structure]

| | |
|---|---|
| Photopolymerization initiator (1-hydroxycyclohexyl phenyl ketone, IRGACURE 184 from Ciba Specialty Chemicals) | 1 part |
| Tetrahydrofuran | 100 parts |

The thus prepared photoreceptors of Examples 6 and 43 to 49 were evaluated in the same manner as mentioned above for evaluating the photoreceptor of Example 6 except that the running test was performed only under an environmental condition of 22° C. and 55% RH.

The results are shown in Table 10.

TABLE 10

| | Image qualities | | Abrasion |
|---|---|---|---|
| | Background development | Half tone image quality | Amount (μm) |
| Ex. 6 | ⊚ | Good | 5.9 |
| Ex. 43 | ⊚ | Good | 3.7 |
| Ex. 44 | ⊚ | Good | 2.5 |
| Ex. 45 | ⊚ | Good | 2.3 |
| Ex. 46 | ○ | Slightly blurred | 2.5 |
| Ex. 47 | ⊚ | Good | 1.9 |
| Ex. 48 | ⊚ | Good | 1.6 |
| Ex. 49 | ⊚ | Good | 1.1 |

Example 50

The procedure for preparation of the photoreceptor in Example 6 was repeated except that the electroconductive substrate was replaced with an aluminum cylinder (JIS1050) with a diameter of 30 mm.

Thus, a photoreceptor of Example 50 was prepared.

Example 51

The procedure for preparation of the photoreceptor in Example 7 was repeated except that the electroconductive substrate was replaced with an aluminum cylinder (JIS1050) with a diameter of 30 mm.

Thus, a photoreceptor of Example 51 was prepared.

Example 52

The procedure for preparation of the photoreceptor in Example 8 was repeated except that the electroconductive substrate was replaced with an aluminum cylinder (JIS1050) with a diameter of 30 mm.

Thus, a photoreceptor of Example 52 was prepared.

Example 53

The procedure for preparation of the photoreceptor in Example 9 was repeated except that the electroconductive substrate was replaced with an aluminum cylinder (JIS1050) with a diameter of 30 mm.

Thus, a photoreceptor of Example 53 was prepared.

Example 54

The procedure for preparation of the photoreceptor in Example 10 was repeated except that the electroconductive substrate was replaced with an aluminum cylinder (JIS1050) with a diameter of 30 mm.

Thus, a photoreceptor of Example 54 was prepared.

Example 55

The procedure for preparation of the photoreceptor in Example 11 was repeated except that the electroconductive substrate was replaced with an aluminum cylinder (JIS1050) with a diameter of 30 mm.

Thus, a photoreceptor of Example 55 was prepared.

Comparative Example 10

The procedure for preparation of the photoreceptor in Comparative Example 4 was repeated except that the electroconductive substrate was replaced with an aluminum cylinder (JIS1050) with a diameter of 30 mm.

Thus, a photoreceptor of Comparative Example 10 was prepared.

Comparative Example 11

The procedure for preparation of the photoreceptor in Comparative Example 5 was repeated except that the electroconductive substrate was replaced with an aluminum cylinder (JIS1050) with a diameter of 30 mm.

Thus, a photoreceptor of Comparative Example 11 was prepared.

Comparative Example 12

The procedure for preparation of the photoreceptor in Comparative Example 6 was repeated except that the electroconductive substrate was replaced with an aluminum cylinder (JIS1050) with a diameter of 30 mm.

Thus, a photoreceptor of Comparative Example 12 was prepared.

Comparative Example 13

The procedure for preparation of the photoreceptor in Comparative Example 7 was repeated except that the electroconductive substrate was replaced with an aluminum cylinder (JIS1050) with a diameter of 30 mm.

Thus, a photoreceptor of Comparative Example 13 was prepared.

Comparative Example 14

The procedure for preparation of the photoreceptor in Comparative Example 8 was repeated except that the electroconductive substrate was replaced with an aluminum cylinder (JIS1050) with a diameter of 30 mm.

Thus, a photoreceptor of Comparative Example 14 was prepared.

Evaluation Method

Each of the photoreceptors of Examples 50-55 and Comparative Examples 10-14 was set in each of four process cartridges (having the constitution as illustrated in FIG. 14) together with a charger, and the four process cartridges were set in a tandem full color image forming apparatus having the constitution as illustrated in FIG. 13. Then a running test in which 40,000 images of a full color original image are continuously produced was performed under conditions of 28° C. and 75% RH while the positions of the four process cartridges were changed after every 10,000 copies. The charging conditions are as follows.

(1) DC bias: −900 V
(2) AC bias: 1.9 kV (peak to peak voltage) 1.0 kHz (frequency)
(3) Charging member: a short-range charging roller which is prepared by winding an insulating tape with a thickness of 50 μm on both side portions of a charging roller (i.e., the gap between the surface of the photoreceptor and surface of the charging roller is 50 μm)
(4) Optical writing device: a laser diode emitting light with wavelength of 780 nm and polygon mirror
(5) developing bias: −650 V After the running test, the color image was observed to evaluate the color images.

The image qualities were graded into the following four ranks:

⊚: The color images are excellent
○○: The image quality of the color images slightly deteriorates but is still acceptable.
Δ: The color images clearly have defective images.
X: The color images have seriously defective images.

The results are shown in Table 11.

TABLE 11

| | Charge blocking layer coating liquid | Image qualities Background development | | Other image qualities |
|---|---|---|---|---|
| | | Initial | After running test | |
| Ex. 50 | 5 | ○ | ○-Δ | Slightly poor color reproducibility |
| Ex. 51 | 4 | ○ | ○ | Slightly poor color reproducibility |
| Ex. 52 | 2 | ⊚ | ○ | Slightly poor color reproducibility |
| Ex. 53 | 3 | ⊚ | ⊚ | Good |
| Ex. 54 | 8 | ⊚ | ⊚ | Good |
| Ex. 55 | 5 | ⊚ | ○ | Slightly poor color reproducibility |
| Comp. Ex. 10 | 1 | X | X | Poor color reproducibility |
| Comp. Ex. 11 | 6 | Δ-X | X | Poor color reproducibility |
| Comp. Ex. 12 | — | Δ | Δ-X | Poor color reproducibility |
| Comp. Ex. 13 | 5 | Δ-X | X | Moiré fringes |
| Comp. Ex. 14 | 5 | X | X | Poor color reproducibility |

It is clear from Table 11 that the photoreceptors having a CGL including an N-alkoxymethylated nylon including ions in an amount of from 200 to 500 ppm can produce high quality images without causing background development and without deteriorating the color reproducibility. This is because the charge blocking layers of the good photoreceptors have good film formability as illustrated in Table 2.

Synthesis Example 8

At first, 100 parts of a 6-nylon was dissolved in 160 parts of methanol to prepare a solution. Then 75 parts of formaldehyde and 2 parts of phosphoric acid were added to the solution and the mixture was agitated well. The mixture was heated to 125° C. over 1 hour. After heated for 30 minutes at 125° C., the mixture was cooled to room temperature over 45 minutes. The mixture achieved a transparent gel state.

In order to neutralize phosphoric acid included in the gel, a mixture including 95% ethanol and an excess amount of ammonia was added to the gel to dissolve the gel. The thus prepared solution was added to water to precipitate a polyamide (i.e., an N-methoxymethylated nylon).

The precipitated polyamide was separated from the liquid by filtering. The polyamide was washed with 1 liter of running water. Then the polyamide was subjected to a re-precipitation treatment using the method described in JP-B 06-93129. Specifically, 20 g of the polyamide was dissolved in 200 g of methanol while heating. After the polyamide was dissolved, the solution was cooled to room temperature. The solution was dropped into 2,500 g of acetone over 40 minutes to re-precipitate the polyamide. The liquid was subjected to a suction filtering treatment using a filter paper No. 4 from Kiriyama Filter Paper to obtain the precipitate. The thus re-precipitated polyamide was washed with acetone, and then dried in vacuum for 2 days at 80° C.

Thus, a resin 8 was prepared.

Synthesis Example 9

The procedure for preparation of the resin 8 in Synthesis Example 8 was repeated except that the washing operation using running water was performed twice.

Thus, a resin 9 was prepared.

Synthesis Example 10

The procedure for preparation of the resin 8 in Synthesis Example 8 was repeated except that the washing operation using running water was performed three times.

Thus, a resin 10 was prepared.

Synthesis Example 11

The procedure for preparation of the resin 8 in Synthesis Example 8 was repeated except that the washing operation using running water was performed four times.

Thus, a resin 11 was prepared.

Synthesis Example 12

The procedure for preparation of the resin 8 in Synthesis Example 8 was repeated except that the washing operation using running water was performed five times.

Thus, a resin 12 was prepared.

Synthesis Example 13

The procedure for preparation of the resin 8 in Synthesis Example 8 was repeated except that the washing operation was performed using ion-exchange water instead of running water.

Thus, a resin 13 was prepared.

Synthesis Example 14

The resin 13 prepared above was subjected to the re-precipitation treatment described in JP-B 06-93129. Specifically, 20 g of the resin 13 (i.e., an N-methoxymethylated nylon) was dissolved in 200 g of methanol while heating. After the polyamide was dissolved, the solution was cooled to room temperature. The solution was dropped into 2,500 g of acetone over 40 minutes to re-precipitate the polyamide. The liquid was subjected to a suction filtering treatment using a filter paper No. 4 from Kiriyama Filter Paper to obtain the precipitate. The thus re-precipitated polyamide was washed with acetone, and then dried in vacuum for 2 days at 80° C.

Thus, a resin 14 was prepared. Thus, the resin 14 was subjected the two re-precipitation treatments.

The amount of methylamine in each of the resins 8 to 14 was determined by ion chromatography. Specifically, the method is as follows.
(1) 0.5 g of a resin which had been pulverized by a frost shattering method was dipped into 25 ml of super pure water;
(2) the mixture was heated for 30 minutes at 50° C. to extract water-soluble components;
(3) the extracting liquid was filtered using a filer having openings of 0.45 μm to prepare a test sample; and
(4) the test sample was subjected to ion chromatography using instruments DX-500 and DX-300 manufactured by DIONEX to determine the amount (concentration) of methylamine in the resin.

The content of methylamine in the resins 8-14 is as follows.

TABLE 12

| | Concentration of methylamine (ppm) |
|---|---|
| Resin 8 | 110 |
| Resin 9 | 85 |
| Resin 10 | 28 |

TABLE 12-continued

| | Concentration of methylamine (ppm) |
|---|---|
| Resin 11 | 38 |
| Resin 12 | 17 |
| Resin 13 | 7 |
| Resin 14 | 1.1 |

Comparative Example 15

Preparation of Charge Blocking Layer Coating Liquid 9

The following components were mixed to dissolve the resin in the solvents.

| | |
|---|---|
| N-methoxymethylated nylon (resin 8) | 6.4 parts |
| Methanol | 70 parts |
| n-Butanol | 30 parts |

Thus, a charge blocking layer coating liquid 9 was prepared.

Examples 56-59 and Comparative Examples 16-17

Preparation of Charge Blocking Layer Coating Liquids 10-15

The procedure for preparation of the charge blocking layer coating liquid 9 was repeated except that the resin 8 was replaced with each of the resins 9-14.

Thus, charge blocking layer coating liquids 10-15 were prepared.

Example 60

Preparation of Charge Blocking Layer Coating Liquid 16

The following components were mixed to dissolve the resin in the solvents.

| | |
|---|---|
| Resin 10 | 6.4 parts |
| Methanol | 70 parts |
| n-Butanol | 25 parts |
| Ion-exchange water | 5 parts |

Thus, a charge blocking layer coating liquid 16 was prepared.

The thus prepared charge blocking layer coating liquids were evaluated with respect to the preservation stability (i.e., clouding, thickness variation and low temperature preservability) using the methods mentioned above.

The evaluation results are shown in Tables 13 and 14.

TABLE 13

|  |  | Methylamine (ppm) | Clouding rate (%) | | | Thickness variation | |
|---|---|---|---|---|---|---|---|
|  |  |  | After 1 month | After 3 months | After 6 months | After 0 month | After 6 months |
| Comp. Ex. 15 | Liquid 9 | 110 | ◯ | Δ | X | ◯ | X |
| Ex. 56 | Liquid 10 | 85 | ◎ | ◎ | ◯ | ◎ | Δ |
| Ex. 57 | Liquid 11 | 28 | ◎ | ◎ | ◯ | ◎ | ◯ |
| Ex. 58 | Liquid 12 | 38 | ◎ | ◯ | Δ | ◎ | ◯ |
| Ex. 59 | Liquid 13 | 17 | ◯ | ◯ | Δ | ◯ | Δ |
| Comp. Ex. 16 | Liquid 14 | 7 | ◯ | Δ | X | ◯ | Δ |
| Comp. Ex. 17 | Liquid 15 | 1.1 | X | X | X | Δ | X |
| Ex. 60 | Liquid 16 | 28 | ◎ | ◎ | ◎ | ◎ | ◯ |

It is clear from Table 13 that the coating liquids including an N-alkoxymethylated nylon including methylamine in an amount of from 15 to 100 ppm has a small clouding rate even when preserved for a long period of time. Therefore, by using such coating liquids, a layer with uniform thickness can be formed.

TABLE 14

|  |  | Methylamine (ppm) | Clouding rate After 1 month preservation | Thickness variation After 1 month preservation |
|---|---|---|---|---|
| Comp. Ex. 15 | Liquid 9 | 110 | X | X |
| Ex. 56 | Liquid 10 | 85 | ◯ | ◯ |
| Ex. 57 | Liquid 11 | 28 | ◯ | ◎ |
| Ex. 58 | Liquid 12 | 38 | Δ | ◯ |
| Ex. 59 | Liquid 13 | 17 | Δ | Δ |
| Comp. Ex. 16 | Liquid 14 | 7 | Δ | Δ |
| Comp. Ex. 17 | Liquid 15 | 1.1 | X | X |
| Ex. 60 | Liquid 16 | 28 | ◎ | ◎ |

It is clear from Table 14 that the coating liquids including an N-alkoxymethylated nylon including methylamine in an amount of from 15 to 100 ppm has a small clouding rate even when preserved under a low temperature condition. Therefore, by using such coating liquids, a layer with uniform thickness which can be preferably used for electrophotographic photoreceptors can be formed.

Example 61

Preparation of Charge Blocking Layer

The above-prepared charge blocking layer coating liquid 13 was coated on an aluminum drum (specified in JIS1050), which has an outside diameter of 60 mm, and the coated liquid was dried to form a charge blocking layer having a thickness of 0.3 μm.

Preparation of Moiré Preventing Layer

The following components were mixed to prepare a moiré preventing layer coating liquid.

| | |
|---|---|
| Titanium oxide | 70 parts |
| (CR-EL from Ishihara Sangyo Kaisha Ltd.) | |
| Alkyd resin | 14 parts |
| (BEKKOLITE M6401-50-S from Dainippon Ink & Chemicals, Inc., solid content of 50%) | |
| Melamine resin | 10 parts |
| (SUPER BEKKAMIN G-821-60 from Dainippon Ink & Chemicals, Inc., solid content of 60%) | |
| 2-butanone | 100 parts |

The thus prepared moiré preventing layer coating liquid was coated on the charge blocking layer, and the coated liquid was dried to form a moiré preventing layer having a thickness of 3.5 μm.

In this case, the volume ratio of the inorganic pigment (titanium oxide) to the binder resin is 1.66/1. The weight ratio of the alkyd resin to the melamine resin is 7/6.

Preparation of CGL

The CGL coating liquid 2 prepared above was coated on the moiré preventing layer, and the coated liquid was dried to form a CGL having a thickness of 0.3 μm.

Preparation of CTL

The following components were mixed to prepare a CTL coating liquid.

| | |
|---|---|
| Polycarbonate | 10 parts |
| (TS2050 from Teijin Chemicals Ltd.) | |

-continued

| CTM having the following formula | 7 parts |
|---|---|
| 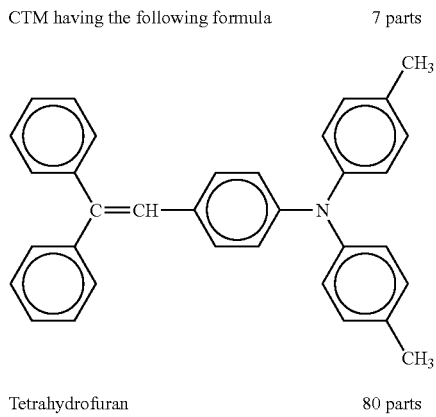 | |
| Tetrahydrofuran | 80 parts |

The thus prepared CTL coating liquid was coated on the CGL and then dried. Thus a CTL having a thickness of 25 μm was prepared.

Thus, a photoreceptor of Example 61 was prepared.

Comparative Examples 18 and 19

The procedure for preparation of the photoreceptor in Example 61 was repeated except that the charge blocking layer coating liquid 13 was replaced with each of the charge blocking layer coating liquids 9 and 14. Thus, photoreceptors of Comparative Examples 18 and 19 were prepared.

Example 62

The procedure for preparation of the photoreceptor in Example 61 was repeated except that the charge blocking layer coating liquid 13 was replaced with the charge blocking layer coating liquid 12. Thus, a photoreceptor of Example 62 was prepared.

Example 63

The procedure for preparation of the photoreceptor in Example 61 was repeated except that the charge blocking layer coating liquid 13 was replaced with the charge blocking layer coating liquid 10. Thus, a photoreceptor of Example 63 was prepared.

Example 64

The procedure for preparation of the photoreceptor in Example 61 was repeated except that the charge blocking layer coating liquid 13 was replaced with the charge blocking layer coating liquid 11. Thus, a photoreceptor of Example 64 was prepared.

Example 65

The procedure for preparation of the photoreceptor in Example 61 was repeated except that the charge blocking layer coating liquid 13 was replaced with the charge blocking layer coating liquid 16. Thus, a photoreceptor of Example 65 was prepared.

Example 66

The procedure for preparation of the photoreceptor in Example 61 was repeated except that the thickness of the charge blocking layer was changed to 0.7 μm. Thus, a photoreceptor of Example 66 was prepared.

Example 67

The procedure for preparation of the photoreceptor in Example 61 was repeated except that the thickness of the charge blocking layer was changed to 2.1 μm. Thus, a photoreceptor of Example 67 was prepared.

Example 68

The procedure for preparation of the photoreceptor in Example 61 was repeated except that the thickness of the charge blocking layer was changed to 0.05 μm. Thus, a photoreceptor of Example 68 was prepared.

Example 69

The procedure for preparation of the photoreceptor in Example 61 was repeated except that the thickness of the charge blocking layer was changed to 1.9 μm. Thus, a photoreceptor of Example 69 was prepared.

Comparative Example 20

The procedure for preparation of the photoreceptor in Example 61 was repeated except that the charge blocking layer was not formed. Thus, a photoreceptor of Comparative Example 20 was prepared.

Comparative Example 21

The procedure for preparation of the photoreceptor in Example 61 was repeated except that the moiré preventing layer was not formed. Thus, a photoreceptor of Comparative Example 20 was prepared.

Comparative Example 22

The procedure for preparation of the photoreceptor in Example 61 was repeated except that the positions of the charge blocking layer and the moiré preventing layer were reversed. Thus, a photoreceptor of Comparative Example 22 was prepared.

Comparative Example 23

The procedure for preparation of the photoreceptor in Example 61 was repeated except that the charge blocking layer coating liquid 13 was replaced with the charge blocking layer coating liquid 15. Thus, a photoreceptor of Example 10 was prepared.

Evaluation (Evaluation Method 1)

Each of the thus prepared photoreceptors was set in an image forming apparatus having a constitution as illustrated in FIG. 12. The image forming apparatus includes an image irradiator which irradiates the photoreceptor with laser light having a wavelength of 780 nm emitted by a laser diode while scanning the light using a polygon mirror; a scorotron charger configured to charge the photoreceptor; and a transfer device including a transfer belt. A running test in which 200,000 images of an original with an image proportion of 6% are continuously reproduced was performed on each photoreceptor using a A-4 size plain paper, followed by production of white solid images and half tone images. The image forming conditions are as follows.

(1) environmental conditions: 22° C. and 55% RH; 10° C. and 15% RH; and 30° C. and 90% RH
(2) Charging conditions
  DC bias: −900 V
  AC bias: 2.0 kV (peak to peak voltage) 2.0 kHz (frequency)

The image qualities of the white solid images and half tone images, i.e., background development, moiré fringes and image density, were checked and the background development was graded into the following four ranks:

⊚: excellent
○: good
Δ: slightly bad
X: bad

The results are shown in Tables 15-1, 15-2 and 15-3.

TABLE 15-1

(22° C. and 55% RH)

| | Charge blocking layer coating liquid | Image qualities | | |
|---|---|---|---|---|
| | | Initial | After running test | |
| | | Background development | Background development | Other image qualities |
| Ex. 61 | 13 | ○ | ○-Δ | Slightly uneven density image |
| Ex. 62 | 12 | ○ | ○ | Slightly uneven density image |
| Ex. 63 | 10 | ⊚ | ○ | Slightly uneven density image |
| Ex. 64 | 11 | ⊚ | ⊚ | Excellent |
| Ex. 65 | 16 | ⊚ | ⊚ | Excellent |
| Ex. 66 | 13 | ⊚ | ○ | Good |
| Ex. 67 | 13 | ○ | Δ | Slightly low density image |
| Ex. 68 | 13 | ○-Δ | Δ | Slight background development |
| Ex. 69 | 13 | ⊚ | ⊚ | Excellent |
| Comp. Ex. 18 | 9 | X | X | Seriously uneven density image |
| Comp. Ex. 19 | 14 | Δ-X | X | Uneven density image |
| Comp. Ex. 20 | — (no layer) | Δ | Δ-X | Uneven density image, low density image |
| Comp. Ex. 21 | 13 | Δ-X | X | Uneven density image, moiré fringe |
| Comp. Ex. 22 | 13 | X | X | Seriously uneven density image, low density image |
| Comp. Ex. 23 | 15 | X | X | Seriously uneven density image, low density image |

TABLE 15-2

(10° C. and 15% RH)

| | Charge blocking layer coating liquid | Image qualities | | |
|---|---|---|---|---|
| | | Initial | After running test | |
| | | Background development | Background development | Other image qualities |
| Ex. 61 | 13 | ○ | ○-Δ | Slightly uneven density image |
| Ex. 62 | 12 | ○ | ○ | Slightly uneven density image |
| Ex. 63 | 10 | ⊚ | ○ | Slightly uneven density image |
| Ex. 64 | 11 | ⊚ | ⊚-○ | Good |
| Ex. 65 | 16 | ⊚ | ⊚ | Excellent |
| Ex. 66 | 13 | ⊚ | ○ | Good |
| Ex. 67 | 13 | ○ | Δ | Slightly low density image |
| Ex. 68 | 13 | ○-Δ | Δ | Slight background development |
| Ex. 69 | 13 | ⊚ | ⊚ | Excellent |
| Comp. Ex. 18 | 9 | X | X | Seriously uneven density image, seriously low density image |
| Comp. Ex. 19 | 14 | X | X | Uneven density image, seriously low density image |

TABLE 15-2-continued (10° C. and 15% RH)

|  | Charge blocking layer coating liquid | Image qualities | | |
|---|---|---|---|---|
|  |  | Initial | After running test | |
|  |  | Background development | Background development | Other image qualities |
| Comp. Ex. 20 | — (no layer) | Δ | X | Uneven density image, low density image |
| Comp. Ex. 21 | 13 | X | X | Uneven density image, moiré fringe |
| Comp. Ex. 22 | 13 | X | X | Seriously uneven density image, low density image |
| Comp. Ex. 23 | 15 | X | X | Seriously uneven density image, low density image |

TABLE 15-3

(30° C. and 90% RH)

|  | Charge blocking layer coating liquid | Image qualities | | |
|---|---|---|---|---|
|  |  | Initial | After running test | |
|  |  | Background development | Background development | Other image qualities |
| Ex. 61 | 13 | ○ | ○-Δ | Slightly uneven density image |
| Ex. 62 | 12 | ○ | ○ | Slightly uneven density image |
| Ex. 63 | 10 | ○ | Δ | Slightly uneven density image |
| Ex. 64 | 11 | ⊚ | ⊚-○ | Good |
| Ex. 65 | 16 | ⊚ | ⊚ | Excellent |
| Ex. 66 | 13 | ⊚ | ○ | Good |
| Ex. 67 | 13 | ○ | Δ | Slightly low density image |
| Ex. 68 | 13 | ○-Δ | Δ | Slight background development |
| Ex. 69 | 13 | ⊚ | ⊚ | Excellent |
| Comp. Ex. 18 | 9 | X | X | Seriously uneven density image, seriously low density image |
| Comp. Ex. 19 | 14 | Δ-X | X | Seriously uneven density image, seriously low density image |
| Comp. Ex. 20 | — (no layer) | X | X | Uneven density image, seriously low density image |
| Comp. Ex. 21 | 13 | Δ | X | Uneven density image, moiré fringe |
| Comp. Ex. 22 | 13 | X | X | Seriously uneven density image, low density image |
| Comp. Ex. 23 | 15 | X | X | Seriously uneven density image; low density image |

It is clear from Tables 15-1 to 15-3 that the photoreceptors having a charge blocking layer prepared by the charge blocking layer coating liquid have good environmental stability and can stably produce high quality images without forming undesired images such as background development and uneven density images even when the charge blocking layer coating liquid is preserved for a long period of time.

Example 70

The procedure for preparation of the photoreceptor in Example 66 was repeated except that the formula of the moiré preventing layer coating liquid was changed as follows.

| Formula of moiré preventing layer coating liquid | |
|---|---|
| Titanium oxide (CR-EL from Ishihara Sangyo Kaisha Ltd., average particle diameter of 0.25 μm) | 168 parts |
| Alkyd resin (BEKKOLITE M6401-50-S from Dainippon Ink & Chemicals, Inc., solid content of 50%) | 33.6 parts |
| Melamine resin (SUPER BEKKAMIN L-121-60 from Dainippon Ink & Chemicals, Inc., solid content of 60%) | 18.7 parts |

-continued

| Formula of moiré preventing layer coating liquid | |
|---|---|
| 2-Butanone | 100 parts |

In this case, the volume ratio of the inorganic pigment (titanium oxide) to the binder resin is 2/1. The weight ratio of the alkyd resin to the melamine resin is 6/4.

Thus, a photoreceptor of Example 70 was prepared.

Example 71

The procedure for preparation of the photoreceptor in Example 66 was repeated except that the formula of the moiré preventing layer coating liquid was changed as follows.

| Formula of moiré preventing layer coating liquid | |
|---|---|
| Titanium oxide (CR-EL from Ishihara Sangyo Kaisha Ltd., average particle diameter of 0.25 μm) | 252 parts |
| Alkyd resin (BEKKOLITE M6401-50-S from Dainippon Ink & Chemicals, Inc., solid content of 50%) | 33.6 parts |
| Melamine resin (SUPER BEKKAMIN L-121-60 from Dainippon Ink & Chemicals, Inc., solid content of 60%) | 18.7 parts |
| 2-Butanone | 100 parts |

In this case, the volume ratio of the inorganic pigment (titanium oxide) to the binder resin is 3/1. The weight ratio of the alkyd resin to the melamine resin is 6/4.

Thus, a photoreceptor of Example 71 was prepared.

Example 72

The procedure for preparation of the photoreceptor in Example 66 was repeated except that the formula of the moiré preventing layer coating liquid was changed as follows.

| Formula of moiré preventing layer coating liquid | |
|---|---|
| Titanium oxide (CR-EL from Ishihara Sangyo Kaisha Ltd., average particle diameter of 0.25 μm) | 84 parts |
| Alkyd resin (BEKKOLITE M6401-50-S from Dainippon Ink & Chemicals, Inc., solid content of 50%) | 33.6 parts |
| Melamine resin (SUPER BEKKAMIN L-121-60 from Dainippon Ink & Chemicals, Inc., solid content of 60%) | 18.7 parts |
| 2-Butanone | 100 parts |

In this case, the volume ratio of the inorganic pigment (titanium oxide) to the binder resin is 1/1. The weight ratio of the alkyd resin to the melamine resin is 6/4.

Thus, a photoreceptor of Example 72 was prepared.

Example 73

The procedure for preparation of the photoreceptor in Example 66 was repeated except that the formula of the moiré preventing layer coating liquid was changed as follows.

| Formula of moiré preventing layer coating liquid | |
|---|---|
| Titanium oxide (CR-EL from Ishihara Sangyo Kaisha Ltd., average particle diameter of 0.25 μm) | 42 parts |
| Alkyd resin (BEKKOLITE M6401-50-S from Dainippon Ink & Chemicals, Inc., solid content of 50%) | 33.6 parts |
| Melamine resin (SUPER BEKKAMIN L-121-60 from Dainippon Ink & Chemicals, Inc., solid content of 60%) | 18.7 parts |
| 2-Butanone | 100 parts |

In this case, the volume ratio of the inorganic pigment (titanium oxide) to the binder resin is 0.5/1. The weight ratio of the alkyd resin to the melamine resin is 6/4.

Thus, a photoreceptor of Example 73 was prepared.

Example 74

The procedure for preparation of the photoreceptor in Example 66 was repeated except that the formula of the moiré preventing layer coating liquid was changed as follows.

| Formula of moiré preventing layer coating liquid | |
|---|---|
| Titanium oxide (CR-EL from Ishihara Sangyo Kaisha Ltd., average particle diameter of 0.25 μm) | 336 parts |
| Alkyd resin (BEKKOLITE M6401-50-S from Dainippon Ink & Chemicals, Inc., solid content of 50%) | 33.6 parts |
| Melamine resin (SUPER BEKKAMIN L-121-60 from Dainippon Ink & Chemicals, Inc., solid content of 60%) | 18.7 parts |
| 2-Butanone | 100 parts |

In this case, the volume ratio of the inorganic pigment (titanium oxide) to the binder resin is 4/1. The weight ratio of the alkyd resin to the melamine resin is 6/4.

Thus, a photoreceptor of Example 74 was prepared.

Example 75

The procedure for preparation of the photoreceptor in Example 66 was repeated except that the formula of the moiré preventing layer coating liquid was changed as follows.

| Formula of moiré preventing layer coating liquid | |
|---|---|
| Titanium oxide (CR-EL from Ishihara Sangyo Kaisha Ltd., average particle diameter of 0.25 μm) | 126 parts |
| Alkyd resin (BEKKOLITE M6401-50-S from Dainippon Ink & Chemicals, Inc., solid content of 50%) | 22.4 parts |
| Melamine resin (SUPER BEKKAMIN L-121-60 from Dainippon Ink & Chemicals, Inc., solid content of 60%) | 28 parts |
| 2-Butanone | 100 parts |

In this case, the volume ratio of the inorganic pigment (titanium oxide) to the binder resin is 1.5/1. The weight ratio of the alkyd resin to the melamine resin is 4/6.

Thus, a photoreceptor of Example 75 was prepared.

Example 76

The procedure for preparation of the photoreceptor in Example 66 was repeated except that the formula of the moiré preventing layer coating liquid was changed as follows.

| Formula of moiré preventing layer coating liquid | |
|---|---|
| Titanium oxide (CR-EL from Ishihara Sangyo Kaisha Ltd., average particle diameter of 0.25 μm) | 126 parts |
| Alkyd resin (BEKKOLITE M6401-50-S from Dainippon Ink & Chemicals, Inc., solid content of 50%) | 28 parts |
| Melamine resin (SUPER BEKKAMIN L-121-60 from Dainippon Ink & Chemicals, Inc., solid content of 60%) | 23.3 parts |
| 2-Butanone | 100 parts |

In this case, the volume ratio of the inorganic pigment (titanium oxide) to the binder resin is 1.5/1. The weight ratio of the alkyd resin to the melamine resin is 5/5.

Thus, a photoreceptor of Example 76 was prepared.

Example 77

The procedure for preparation of the photoreceptor in Example 66 was repeated except that the formula of the moiré preventing layer coating liquid was changed as follows.

| Formula of moiré preventing layer coating liquid | |
|---|---|
| Titanium oxide (CR-EL from Ishihara Sangyo Kaisha Ltd., average particle diameter of 0.25 μm) | 126 parts |
| Alkyd resin (BEKKOLITE M6401-50-S from Dainippon Ink & Chemicals, Inc., solid content of 50%) | 39.2 parts |
| Melamine resin (SUPER BEKKAMIN L-121-60 from Dainippon Ink & Chemicals, Inc., solid content of 60%) | 14 parts |
| 2-Butanone | 100 parts |

In this case, the volume ratio of the inorganic pigment (titanium oxide) to the binder resin is 1.5/1. The weight ratio of the alkyd resin to the melamine resin is 7/3.

Thus, a photoreceptor of Example 77 was prepared.

Example 78

The procedure for preparation of the photoreceptor in Example 66 was repeated except that the formula of the moiré preventing layer coating liquid was changed as follows.

| Formula of moiré preventing layer coating liquid | |
|---|---|
| Titanium oxide (CR-EL from Ishihara Sangyo Kaisha Ltd., average particle diameter of 0.25 μm) | 126 parts |
| Alkyd resin (BEKKOLITE M6401-50-S from Dainippon Ink & Chemicals, Inc., solid content of 50%) | 44.8 parts |
| Melamine resin (SUPER BEKKAMIN L-121-60 from Dainippon Ink & Chemicals, Inc., solid content of 60%) | 9.3 parts |
| 2-Butanone | 100 parts |

In this case, the volume ratio of the inorganic pigment (titanium oxide) to the binder resin is 1.5/1. The weight ratio of the alkyd resin to the melamine resin is 8/2.

Thus, a photoreceptor of Example 78 was prepared.

Example 79

The procedure for preparation of the photoreceptor in Example 66 was repeated except that the formula of the moiré preventing layer coating liquid was changed as follows.

| Formula of moiré preventing layer coating liquid | |
|---|---|
| Titanium oxide (CR-EL from Ishihara Sangyo Kaisha Ltd., average particle diameter of 0.25 μm) | 126 parts |
| Alkyd resin (BEKKOLITE M6401-50-S from Dainippon Ink & Chemicals, Inc., solid content of 50%) | 50.4 parts |
| Melamine resin (SUPER BEKKAMIN L-121-60 from Dainippon Ink & Chemicals, Inc., solid content of 60%) | 4.7 parts |
| 2-Butanone | 100 parts |

In this case, the volume ratio of the inorganic pigment (titanium oxide) to the binder resin is 1.5/1. The weight ratio of the alkyd resin to the melamine resin is 9/1.

Thus, a photoreceptor of Example 79 was prepared.

Example 80

The procedure for preparation of the photoreceptor in Example 66 was repeated except that the formula of the moiré preventing layer coating liquid was changed as follows.

| Formula of moiré preventing layer coating liquid | |
|---|---|
| Titanium oxide (CR-EL from Ishihara Sangyo Kaisha Ltd., average particle diameter of 0.25 μm) | 63 parts |
| Titanium oxide (PT-401M from Ishihara Sangyo Kaisha Ltd., average particle diameter of 0.07 μm) | 63 parts |
| Alkyd resin (BEKKOLITE M6401-50-S from Dainippon Ink & Chemicals, Inc., solid content of 50%) | 33.6 parts |
| Melamine resin (SUPER BEKKAMIN L-121-60 from Dainippon Ink & Chemicals, Inc., solid content of 60%) | 18.7 parts |
| 2-Butanone | 100 parts |

In this case, the volume ratio of the inorganic pigment (titanium oxide) to the binder resin is 1.5/1. The weight ratio of the alkyd resin to the melamine resin is 6/4. The ratio (D2/D1) of the average particle diameter of PT-401M to the average particle diameter of CR-EL is 0.28. In addition, the mixing ratio of PT-401M to CR-EL is 1/1 and therefore (T2/(T1+T2)) is 0.5.

Thus, a photoreceptor of Example 80 was prepared.

Example 81

The procedure for preparation of the photoreceptor in Example 66 was repeated except that the formula of the moiré preventing layer coating liquid was changed as follows.

| Formula of moiré preventing layer coating liquid | |
|---|---|
| Titanium oxide (CR-EL from Ishihara Sangyo Kaisha Ltd., average particle diameter of 0.25 μm) | 113.4 parts |
| Titanium oxide (PT-401M from Ishihara Sangyo Kaisha Ltd., average particle diameter of 0.07 μm) | 12.6 parts |
| Alkyd resin (BEKKOLITE M6401-50-S from Dainippon Ink & Chemicals, Inc., solid content of 50%) | 33.6 parts |
| Melamine resin (SUPER BEKKAMIN L-121-60 from Dainippon Ink & Chemicals, Inc., solid content of 60%) | 18.7 parts |
| 2-Butanone | 100 parts |

In this case, the volume ratio of the inorganic pigment (titanium oxide) to the binder resin is 1.5/1. The weight ratio of the alkyd resin to the melamine resin is 6/4. The ratio (D2/D1) of the average particle diameter of PT-401M to the average particle diameter of CR-EL is 0.28. In addition, the mixing ratio of PT-401M to CR-EL is 1/9 and therefore (T2/(T1+T2)) is 0.1.

Thus, a photoreceptor of Example 81 was prepared.

Example 82

The procedure for preparation of the photoreceptor in Example 66 was repeated except that the formula of the moiré preventing layer coating liquid was changed as follows.

| Formula of moiré preventing layer coating liquid | |
|---|---|
| Titanium oxide (CR-EL from Ishihara Sangyo Kaisha Ltd., average particle diameter of 0.25 μm) | 12.6 parts |
| Titanium oxide (PT-401M from Ishihara Sangyo Kaisha Ltd., average particle diameter of 0.07 μm) | 113.4 parts |
| Alkyd resin (BEKKOLITE M6401-50-S from Dainippon Ink & Chemicals, Inc., solid content of 50%) | 33.6 parts |
| Melamine resin (SUPER BEKKAMIN L-121-60 from Dainippon Ink & Chemicals, Inc., solid content of 60%) | 18.7 parts |
| 2-Butanone | 100 parts |

In this case, the volume ratio of the inorganic pigment (titanium oxide) to the binder resin is 1.5/1. The weight ratio of the alkyd resin to the melamine resin is 6/4. The ratio (D2/D1) of the average particle diameter of PT-401M to the average particle diameter of CR-EL is 0.28. In addition, the mixing ratio of PT-401M to CR-EL is 9/1 and therefore (T2/(T1+T2)) is 0.9.

Thus, a photoreceptor of Example 82 was prepared.

Example 83

The procedure for preparation of the photoreceptor in Example 66 was repeated except that the formula of the moiré preventing layer coating liquid was changed as follows.

| Formula of moiré preventing layer coating liquid | |
|---|---|
| Titanium oxide (CR-EL from Ishihara Sangyo Kaisha Ltd., average particle diameter of 0.25 μm) | 63 parts |
| Titanium oxide (TTO-F1 from Ishihara Sangyo Kaisha Ltd., average particle diameter of 0.04 μm) | 63 parts |
| Alkyd resin (BEKKOLITE M6401-50-S from Dainippon Ink & Chemicals, Inc., solid content of 50%) | 33.6 parts |
| Melamine resin (SUPER BEKKAMTN L-121-60 from Dainippon Ink & Chemicals, Inc., solid content of 60%) | 18.7 parts |
| 2-Butanone | 100 parts |

In this case, the volume ratio of the inorganic pigment (titanium oxide) to the binder resin is 1.5/1. The weight ratio of the alkyd resin to the melamine resin is 6/4. The ratio (D2/D1) of the average particle diameter of PT-401M to the average particle diameter of CR-EL is 0.16. In addition, the mixing ratio of PT-401M to CR-EL is 1/1 and therefore (T2/(T1+T2)) is 0.5.

Thus, a photoreceptor of Example 83 was prepared.

Example 84

The procedure for preparation of the photoreceptor in Example 66 was repeated except that the formula of the moiré preventing layer coating liquid was changed as follows.

| Formula of moiré preventing layer coating liquid | |
|---|---|
| Titanium oxide (CR-EL from Ishihara Sangyo Kaisha Ltd., average particle diameter of 0.25 μm) | 63 parts |
| Titanium oxide (A-100 from Ishihara Sangyo Kaisha Ltd., average particle diameter of 0.15 μm) | 63 parts |
| Alkyd resin (BEKKOLITE M6401-50-S from Dainippon Ink & Chemicals, Inc., solid content of 50%) | 33.6 parts |
| Melamine resin (SUPER BEKKAMIN L-121-60 from Dainippon Ink & Chemicals, Inc., solid content of 60%) | 18.7 parts |
| 2-Butanone | 100 parts |

In this case, the volume ratio of the inorganic pigment (titanium oxide) to the binder resin is 1.5/1. The weight ratio of the alkyd resin to the melamine resin is 6/4. The ratio (D2/D1) of the average particle diameter of PT-401M to the average particle diameter of CR-EL is 0.6. In addition, the mixing ratio of PT-401M to CR-EL is 1/1 and therefore (T2/(T1+T2)) is 0.5.

Thus, a photoreceptor of Example 84 was prepared.

The photoreceptors of Examples 70 to 84 were evaluated in the same manner as mentioned in Example 66 under a condition of 22° C. and 55% RH.

The results are shown in Table 16.

TABLE 16

(22° C. and 55% RH)

| Photo-receptor | Charge blocking layer coating liquid | Image qualities | | Other image qualities |
|---|---|---|---|---|
| | | Initial Background development | After running test Background development | |
| Ex. 66 | 13 | ◎ | ○ | Good |
| Ex. 70 | 13 | ◎ | ○ | Good |
| Ex. 71 | 13 | ◎ | ○ | Good |
| Ex. 72 | 13 | ◎ | ○ | Good |
| Ex. 73 | 13 | ◎ | ◎ | Slight moiré fringe (still acceptable) |
| Ex. 74 | 13 | ◎-○ | ○-Δ | Good |
| Ex. 75 | 13 | ◎ | ○ | Slightly low density image (still acceptable) |
| Ex. 76 | 13 | ◎ | ○ | Good |
| Ex. 77 | 13 | ◎ | ○ | Good |
| Ex. 78 | 13 | ◎ | ○ | Good |
| Ex. 79 | 13 | ◎-○ | ○-Δ | Good |
| Ex. 80 | 13 | ◎ | ◎ | Good |
| Ex. 81 | 13 | ◎ | ◎ | Good |
| Ex. 82 | 13 | ◎ | ◎ | Slight moiré fringe (still acceptable) |
| Ex. 83 | 13 | ◎ | ◎ | Slight moiré fringe (still acceptable) |
| Ex. 84 | 13 | ◎ | ◎ | Good |

Example 85

The procedure for preparation of the photoreceptor in Example 61 was repeated except that the CGL coating liquid 2 was replaced with the CGL coating liquid 1.

Thus, a photoreceptor of Example 85 was prepared.

Example 86

The procedure for preparation of the photoreceptor in Example 61 was repeated except that the CGL coating liquid 2 was replaced with the CGL coating liquid 3.

Thus, a photoreceptor of Example 86 was prepared.

Example 87

The procedure for preparation of the photoreceptor in Example 61 was repeated except that the CGL coating liquid 2 was replaced with the CGL coating liquid 4.

Thus, a photoreceptor of Example 87 was prepared.

Example 88

The procedure for preparation of the photoreceptor in Example 61 was repeated except that the CGL coating liquid 2 was replaced with the CGL coating liquid 5.

Thus, a photoreceptor of Example 88 was prepared.

Example 89

The procedure for preparation of the photoreceptor in Example 61 was repeated except that the CGL coating liquid 2 was replaced with the CGL coating liquid 6.

Thus, a photoreceptor of Example 89 was prepared.

Example 90

The procedure for preparation of the photoreceptor in Example 61 was repeated except that the CGL coating liquid 2 was replaced with the CGL coating liquid 7.

Thus, a photoreceptor of Example 90 was prepared.

Example 91

The procedure for preparation of the photoreceptor in Example 61 was repeated except that the CGL coating liquid 2 was replaced with the CGL coating liquid 8.

Thus, a photoreceptor of Example 9.1 was prepared.

Example 92

The procedure for preparation of the photoreceptor in Example 61 was repeated except that the CGL coating liquid 2 was replaced with the CGL coating liquid 9.

Thus, a photoreceptor of Example 92 was prepared.

Example 93

The procedure for preparation of the photoreceptor in Example 61 was repeated except that the CGL coating liquid 2 was replaced with the CGL coating liquid 10.

Thus, a photoreceptor of Example 93 was prepared.

Example 94

The procedure for preparation of the photoreceptor in Example 61 was repeated except that the CGL coating liquid 2 was replaced with the CGL coating liquid 11.

Thus, a photoreceptor of Example 94 was prepared.

Example 95

The procedure for preparation of the photoreceptor in Example 61 was repeated except that the CGL coating liquid 2 was replaced with the CGL coating liquid 12.

Thus, a photoreceptor of Example 95 was prepared.

Example 96

The procedure for preparation of the photoreceptor in Example 61 was repeated except that the CGL coating liquid 2 was replaced with the CGL coating liquid 13.

Thus, a photoreceptor of Example 96 was prepared.

Example 97

The procedure for preparation of the photoreceptor in Example 61 was repeated except that the CGL coating liquid 2 was replaced with the CGL coating liquid 15.

Thus, a photoreceptor of Example 97 was prepared.

The thus prepared photoreceptors of Examples 85 to 97 were evaluated in the same manner as mentioned above for evaluating the photoreceptor of Example 61 except that each of the photoreceptors was set the image forming apparatus after set in a process cartridge having the configuration illus trated in FIG. 14, the charging conditions were changed as follows and the running test was performed under an environmental condition of 22° C. and 55% RH.

Charging Conditions
Charger: contact charging roller
DC bias: −1300V
The results are shown in Table 17.

TABLE 17

(22° C. and 55% RH)

| | | Image qualities | | |
| | CGL | Initial | After running test | |
| | coating liquid | Background development | Background development | Other image qualities |
|---|---|---|---|---|
| Ex. 61 | 2 | ⊚ | ○ | Good |
| Ex. 85 | 1 | ○ | Δ | Good |
| Ex. 86 | 3 | Δ | Δ | Good |
| Ex. 87 | 4 | Δ | Δ-X | Slightly low density image |
| Ex. 88 | 5 | Δ | Δ-X | Good |
| Ex. 89 | 6 | Δ | Δ | Good |
| Ex. 90 | 7 | Δ | Δ | Good |
| Ex. 91 | 8 | Δ | Δ | Slightly low density image |
| Ex. 92 | 9 | Δ | Δ-X | Good |
| Ex. 93 | 10 | ⊚ | ○ | Good |
| Ex. 94 | 11 | ⊚ | ○ | Good |
| Ex. 95 | 12 | ○ | Δ | Good |
| Ex. 96 | 13 | ○ | Δ | Good |
| Ex. 97 | 15 | Δ-X | Δ-X | Low density image |

It is clear from Table 17 that the photoreceptors of the present invention having a CGL prepared by the CGL coating liquid of the present invention, which has been preserved for a long period of time, can be practically used. However, when an azo pigment is used for the CGL (i.e., the photoreceptor of Example 97), the image density of the produced images was lower than that of the images produced by the other photoreceptors, which have a CGL including a TiOPc. In addition, it is clear that among the photoreceptors having a CGL including a TiOPc, the photoreceptor having a CGL including the TiOPc synthesized in Synthesis Example 1 can produce images having better qualities than the other photoreceptors.

Further, it is clear from Table 17 that the photoreceptors (i.e., the photoreceptors of Examples 61, 93 and 94) having a CGL including the TiOPc which is synthesized in Synthesis Example 1 and which has a primary particle diameter of not greater than 0.25 μm can produce images with better background development property than that of the images produced by other photoreceptors. Furthermore, it is found that with respect to the particle diameter controlling method, both the method in which the particle diameter of a TiOPc is controlled so as to be not greater than 0.25 μm in the synthesis process and the method in which the particle diameter is controlled by removing coarse particles after the dispersion process can be used.

Example 98

The procedure for preparation of the photoreceptor in Example 64 was repeated except that the CTL coating liquid was replaced with the following CTL coating liquid.

Charge transport polymer having the following formula    10 parts
(weight average molecular weight of about 135,000)

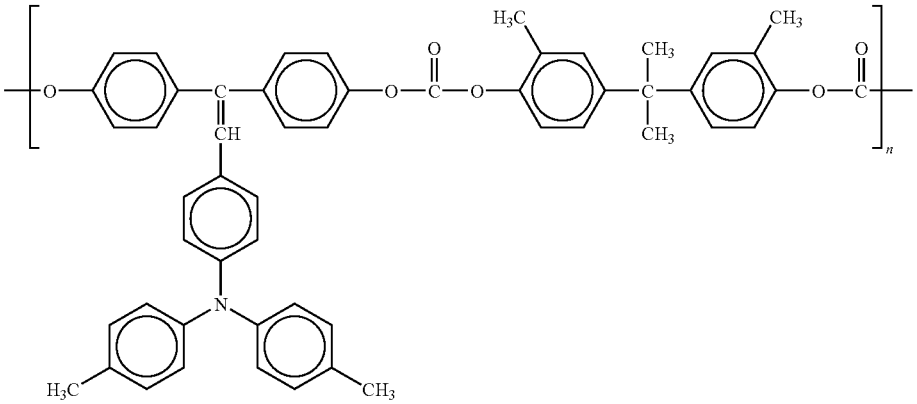

| -continued | |
|---|---|
| Additive having the following formula | 0.5 parts |

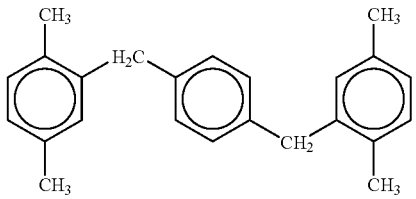

| Methylene chloride | 100 parts |

Thus, a photoreceptor of Example 98 was prepared.

Example 99

The procedure for preparation of the photoreceptor in Example 64 was repeated except that the thickness of the CTL was changed to 18 μm, and the following protective layer coating liquid was coated on the CTL, followed by drying to prepare a protective layer having a thickness of 5 μm.

| Protective layer coating liquid | |
|---|---|
| Polycarbonate (TS2050 from Teijin Chemical Ltd., viscosity average molecular weight of 50,000) | 10 parts |
| Charge transport material having the following formula | 7 parts |

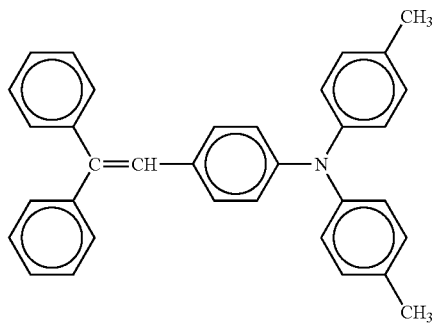

| Particulate α-alumina (resistivity of $2.5 \times 10^{12}$ Ω·cm, average primary particle diameter of 0.4 μm) | 4 parts |
| Cyclohexanone | 500 parts |
| Tetrahydrofuran | 150 parts |

Thus, a photoreceptor of Example 99 was prepared.

Example 100

The procedure for preparation of the photoreceptor in Example 99 was repeated except that the particulate alumina in the protective layer coating liquid was replaced with the following titanium oxide.

| Titanium oxide (resistivity of $1.5 \times 10^{10}$ Ω·cm, average primary particle diameter of 0.5 μm) | 4 parts |

Thus, a photoreceptor of Example 100 was prepared.

Example 101

The procedure for preparation of the photoreceptor in Example 99 was repeated except that the particulate alumina in the protective layer coating liquid was replaced with the following tin oxide—antimony oxide powder.

| Tin oxide - antimony oxide powder (resistivity of $1 \times 10^6$ Ω·cm, average primary particle diameter of 0.4 μm) | 4 parts |

Thus, a photoreceptor of Example 101 was prepared.

Example 102

The procedure for preparation of the photoreceptor in Example 64 was repeated except that the thickness of the CTL was changed to 18 μm, and the following protective layer coating liquid was coated on the CTL, followed by drying to prepare a protective layer having a thickness of 5 μm.

| Protective layer coating liquid | |
|---|---|
| Methyltrimethoxy silane | 100 parts |
| 3% acetic acid | 20 parts |
| Charge transport material having the following formula | 35 parts |

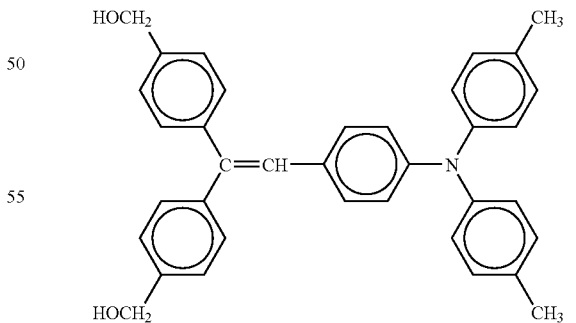

| Antioxidant (SANOL LS2626 from Sankyo Chemical Co., Ltd.) | 1 part |
| Crosslinking agent (dibutyl tin acetate) | 1 part |
| 2-Propanol | 200 parts |

Thus, a photoreceptor of Example 102 was prepared.

Example 103

The procedure for preparation of the photoreceptor in Example 64 was repeated except that the thickness of the CTL was changed to 18 μm, and the following protective layer coating liquid was coated on the CTL, followed by drying to prepare a protective layer having a thickness of 5 μm.

| Protective layer coating liquid | |
|---|---|
| Methyltrimethoxy silane | 100 parts |
| 3% acetic acid | 20 parts |
| Charge transport material having the following formula | 35 parts |

[Structure: bis(4-hydroxymethylphenyl)methylene-CH-phenyl-N(p-tolyl)2]

| | |
|---|---|
| Particulate α-alumina (resistivity of 2.5 × 10$^{12}$ Ω·cm, average primary particle diameter of 0.4 μm) | 15 parts |
| Antioxidant (SANOL LS2626 from Sankyo Chemical Co., Ltd.) | 1 part |
| Crosslinking agent (dibutyl tin acetate) | 1 part |
| 2-Propanol | 200 parts |

Thus, a photoreceptor of Example 103 was prepared.

Example 104

The procedure for preparation of the photoreceptor in Example 64 was repeated except that the thickness of the charge transport layer was changed to 18 μm, and the following protective layer coating liquid was coated on the charge transport layer by a spray coating method, followed by natural drying for 20 minutes and light irradiation to prepare a protective layer having a thickness of 5 μm. The light irradiation condition is as follows.

Power of metal halide lamp used: 160 W/cm

Irradiation distance: 120 mm

Exposure: 500 mW/cm$^2$

Irradiation time: 60 sec

| Protective layer coating liquid | |
|---|---|
| Radical polymerizable trifunctional monomer having no charge transport structure (trimethylolpropane triacrylate, KAYARAD TMPTA from Nippon Kayaku Co., Ltd., having a molecular weight of 296, and a ratio of molecular weight to number of functional groups of 99) | 10 parts |
| Radical polymerizable monofunctional monomer having a charge transport structure and the following formula | 10 parts |

[Structure: vinyl ester of triarylamine derivative]

| | |
|---|---|
| Photopolymerization initiator (1-hydroxycyclohexyl phenyl ketone, IRGACURE 184 from Ciba Specialty Chemicals) | 1 part |
| Tetrahydrofuran | 100 parts |

The thus prepared photoreceptors of Examples 64 and 98 to 104 were evaluated in the same manner as mentioned above for evaluating the photoreceptor of Example 61 except that the running test was performed only under an environmental condition of 22° C. and 55% RH.

The results are shown in Table 18.

TABLE 18

| | Image qualities | | Abrasion |
|---|---|---|---|
| | Background development | Half tone image quality | Amount (μm) |
| Ex. 64 | ⊚ | Good | 5.9 |
| Ex. 98 | ⊚ | Good | 3.7 |
| Ex. 99 | ⊚ | Good | 2.5 |
| Ex. 100 | ⊚ | Good | 2.3 |
| Ex. 101 | ○ | Slightly blurred | 2.5 |
| Ex. 102 | ⊚ | Good | 1.9 |
| Ex. 103 | ⊚ | Good | 1.6 |
| Ex. 104 | ⊚ | Good | 1.1 |

Example 105

The procedure for preparation of the photoreceptor in Example 61 was repeated except that the electroconductive substrate was replaced with an aluminum cylinder (JIS1050) with a diameter of 30 mm.

Thus, a photoreceptor of Example 105 was prepared.

Example 106

The procedure for preparation of the photoreceptor in Example 62 was repeated except that the electroconductive substrate was replaced with an aluminum cylinder (JIS1050) with a diameter of 30 mm.

Thus, a photoreceptor of Example 106 was prepared.

Example 107

The procedure for preparation of the photoreceptor in Example 63 was repeated except that the electroconductive substrate was replaced with an aluminum cylinder (JIS1050) with a diameter of 30 mm.

Thus, a photoreceptor of Example 107 was prepared.

Example 108

The procedure for preparation of the photoreceptor in Example 64 was repeated except that the electroconductive substrate was replaced with an aluminum cylinder (JIS1050) with a diameter of 30 mm.

Thus, a photoreceptor of Example 108 was prepared.

Example 109

The procedure for preparation of the photoreceptor in Example 65 was repeated except that the electroconductive substrate was replaced with an aluminum cylinder (JIS1050) with a diameter of 30 mm.

Thus, a photoreceptor of Example 109 was prepared.

Example 110

The procedure for preparation of the photoreceptor in Example 66 was repeated except that the electroconductive substrate was replaced with an aluminum cylinder (JIS1050) with a diameter of 30 mm.

Thus, a photoreceptor of Example 110 was prepared.

Comparative Example 24

The procedure for preparation of the photoreceptor in Comparative Example 18 was repeated except that the electroconductive substrate was replaced with an aluminum cylinder (JIS1050) with a diameter of 30 mm.

Thus, a photoreceptor of Comparative Example 24 was prepared.

Comparative Example 25

The procedure for preparation of the photoreceptor in Comparative Example 19 was repeated except that the electroconductive substrate was replaced with an aluminum cylinder (JIS1050) with a diameter of 30 mm.

Thus, a photoreceptor of Comparative Example 25 was prepared.

Comparative Example 26

The procedure for preparation of the photoreceptor in Comparative Example 20 was repeated except that the electroconductive substrate was replaced with an aluminum cylinder (JIS1050) with a diameter of 30 mm.

Thus, a photoreceptor of Comparative Example 26 was prepared.

Comparative Example 27

The procedure for preparation of the photoreceptor in Comparative Example 21 was repeated except that the electroconductive substrate was replaced with an aluminum cylinder (JIS1050) with a diameter of 30 mm.

Thus, a photoreceptor of Comparative Example 27 was prepared.

Comparative Example 28

The procedure for preparation of the photoreceptor in Comparative Example 22 was repeated except that the electroconductive substrate was replaced with an aluminum cylinder (JIS1050) with a diameter of 30 mm.

Thus, a photoreceptor of Comparative Example 28 was prepared.

Evaluation Method

Each of the photoreceptors of Examples 105-110 and Comparative Examples 24-28 was set in each of four process cartridges (having the constitution as illustrated in FIG. 14) together with a charger, and the four process cartridges were set in a tandem full color image forming apparatus having the constitution as illustrated in FIG. 13. Then a running test in which 40,000 images of a full color original image are continuously produced was performed under conditions of 28° C. and 75% RH while the positions of the four process cartridges were changed after every 10,000 copies. The charging conditions are as follows.

(1) DC bias: −900 V
(2) AC bias: 1.9 kV (peak to peak voltage) 1.0 kHz (frequency)
(3) Charging member: a short-range charging roller which is prepared by winding an insulating tape with a thickness of 50 μm on both side portions of a charging roller (i.e., the gap between the surface of the photoreceptor and surface of the charging roller is 50 μm)
(4) Optical writing device: a laser diode emitting light with wavelength of 780 nm and polygon mirror
(5) Developing bias: −650 V After the running test, the color image was observed to evaluate the color images.

The image qualities were graded into the following four ranks:

⊚: The color images are excellent
○: The image quality of the color images slightly deteriorates but is still acceptable.
Δ: The color images clearly have defective images.
X: The color images have seriously defective images.

The results are shown in Table 19.

TABLE 19

| | Charge blocking layer coating liquid | Background development Initial | Background development After running test | Other image qualities |
|---|---|---|---|---|
| Ex. 105 | 13 | ○ | ○–Δ | Slightly poor color reproducibility |
| Ex. 106 | 12 | ○ | ○ | Slightly poor color reproducibility |

TABLE 19-continued

| | Image qualities | | | |
|---|---|---|---|---|
| | Charge blocking layer coating liquid | Background development Initial | After running test | Other image qualities |
| Ex. 107 | 10 | ◉ | ○ | Slightly poor color reproducibility |
| Ex. 108 | 11 | ◉ | ◉ | Good |
| Ex. 109 | 16 | ◉ | ◉ | Good |
| Ex. 110 | 13 | ◉ | ○ | Slightly poor color reproducibility |
| Comp. Ex. 24 | 9 | X | X | Poor color reproducibility |
| Comp. Ex. 25 | 14 | Δ–X | X | Poor color reproducibility |
| Comp. Ex. 26 | — | Δ | Δ–X | Poor color reproducibility |
| Comp. Ex. 27 | 13 | Δ–X | X | Moiré fringes |
| Comp. Ex. 28 | 13 | X | X | Poor color reproducibility |

It is clear from Table 19 that the photoreceptors having a CGL including an N-alkoxymethylated nylon including alkylamine in an amount of from 15 to 100 ppm can produce high quality images without causing the background development and without deteriorating the color reproducibility. This is because the charge blocking layers of the good photoreceptors have good film formability as illustrated in Table 13.

Finally, an experiment was performed to confirm whether the lowest angle peak of the X-ray diffraction spectrum of the TiOPc crystal used for the present invention, which is observed at an angle of 7.3°, is the same as or different from the lowest angle peak of the X-ray diffraction spectrum of known TiOPc crystals, which is observed at an angle of 7.5°.

Pigment Synthesis Example 9

Figure 17:
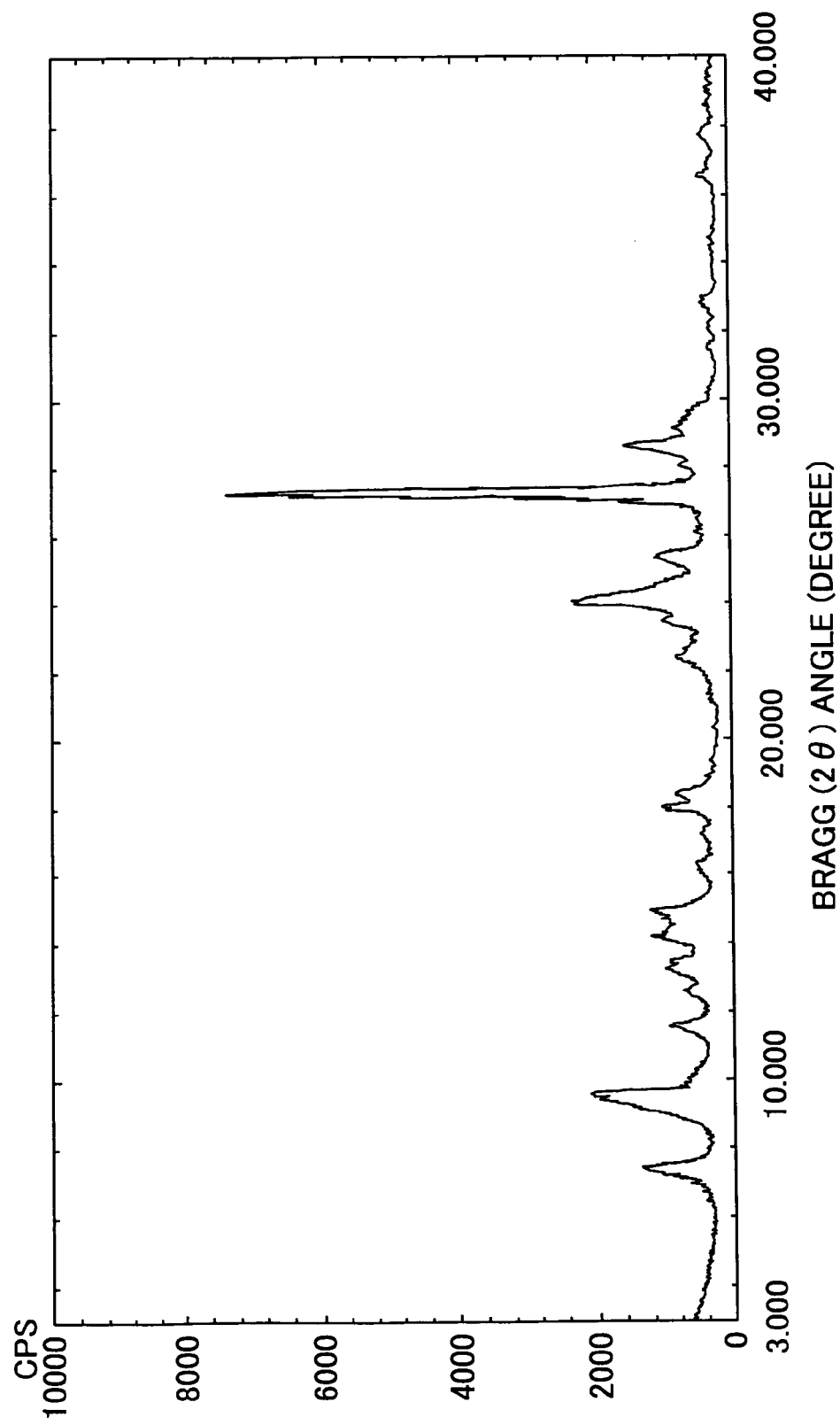
FIG. 17 is the X-ray diffraction spectrum of the titanyl phthalocyanine crystal prepared in Pigment Synthesis Example 10.

The procedure for preparation of the TiOPc crystal in Pigment Synthesis Example 1 and the X-ray diffraction analysis was repeated except that the crystal conversion solvent was changed from methylene chloride to 2-butanone. The X-ray diffraction spectrum of the thus prepared TiOPc crystal is illustrated in FIG. 17. It is clear from FIGS. 16 and 17 that the lowest angle peak (7.3°) of the TiOPc crystal prepared in Pigment Synthesis Example 1 is different from the lowest angle peak (7.5°) of the above-prepared TiOPc crystal.

Measurement Example 1

Figure 19:
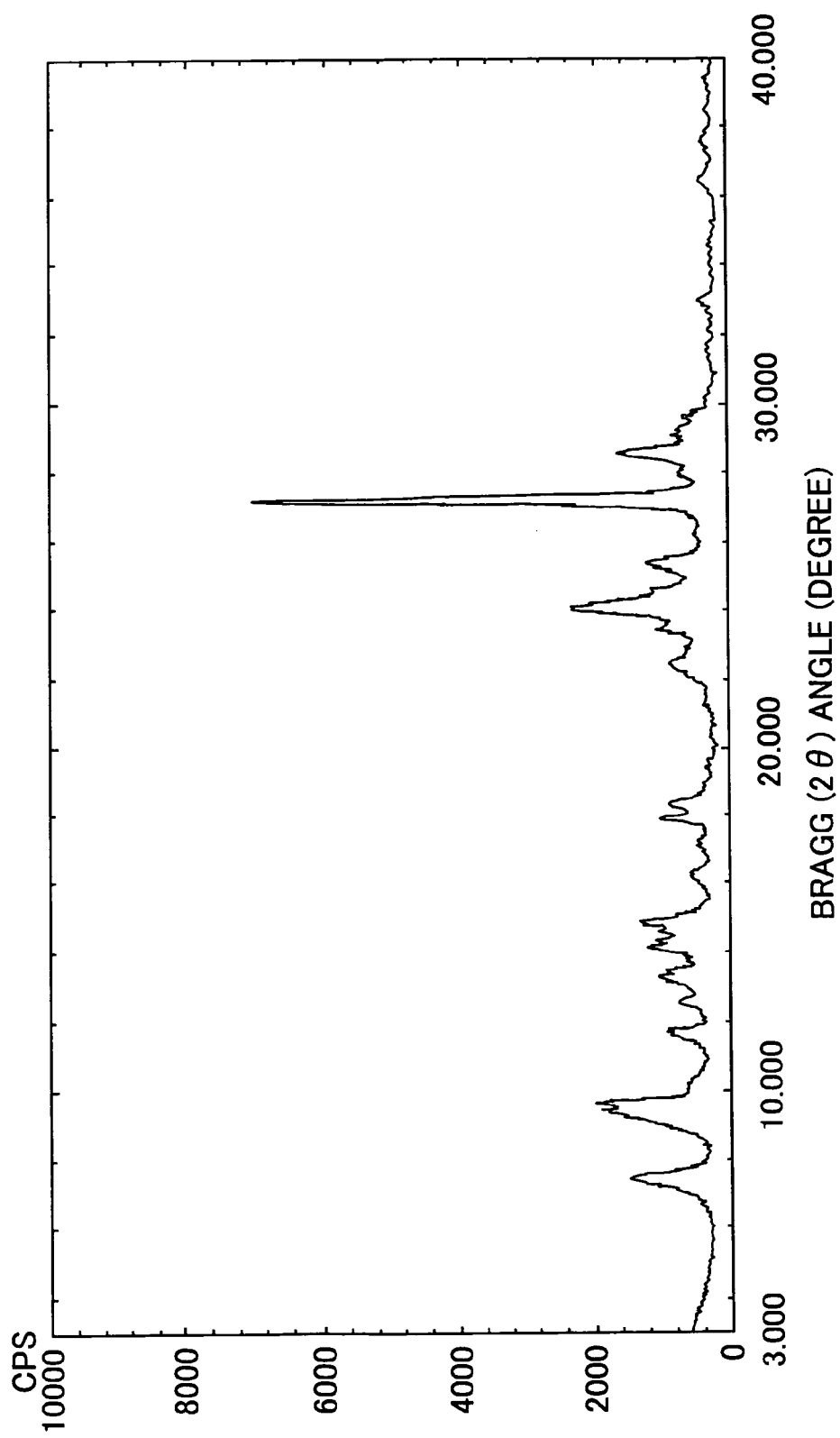
FIG. 19 is the X-ray diffraction spectrum of the pigment prepared in Measurement Example 2.

The TiOPc pigment which was prepared in Pigment Synthesis Example 1 and which has a lowest angle peak at 7.3° was mixed with a TiOPc crystal, which was prepared by the same method as disclosed in JP-A 61-239248 and which has a lowest angle peak at 7.5°, in a weight ratio of 100:3. The mixture was mixed in a mortar. The mixture was subjected to the X-ray diffraction analysis. The spectrum of the mixture is shown in FIG. 19.

Measurement Example 2

The titanyl phthalocyanine pigment which was prepared in Pigment Synthesis Example 10 and which has a lowest angle peak at 7.5° was mixed with a TiOPc crystal, which was prepared by the same method as disclosed in JP-A 61-239248 and which has a lowest angle peak at 7.5°, in a weight ratio of 100:3. The mixture was mixed in a mortar. The mixture was subjected to the X-ray diffraction analysis. The spectrum of the mixture is shown in FIG. 19.

Figure 18:
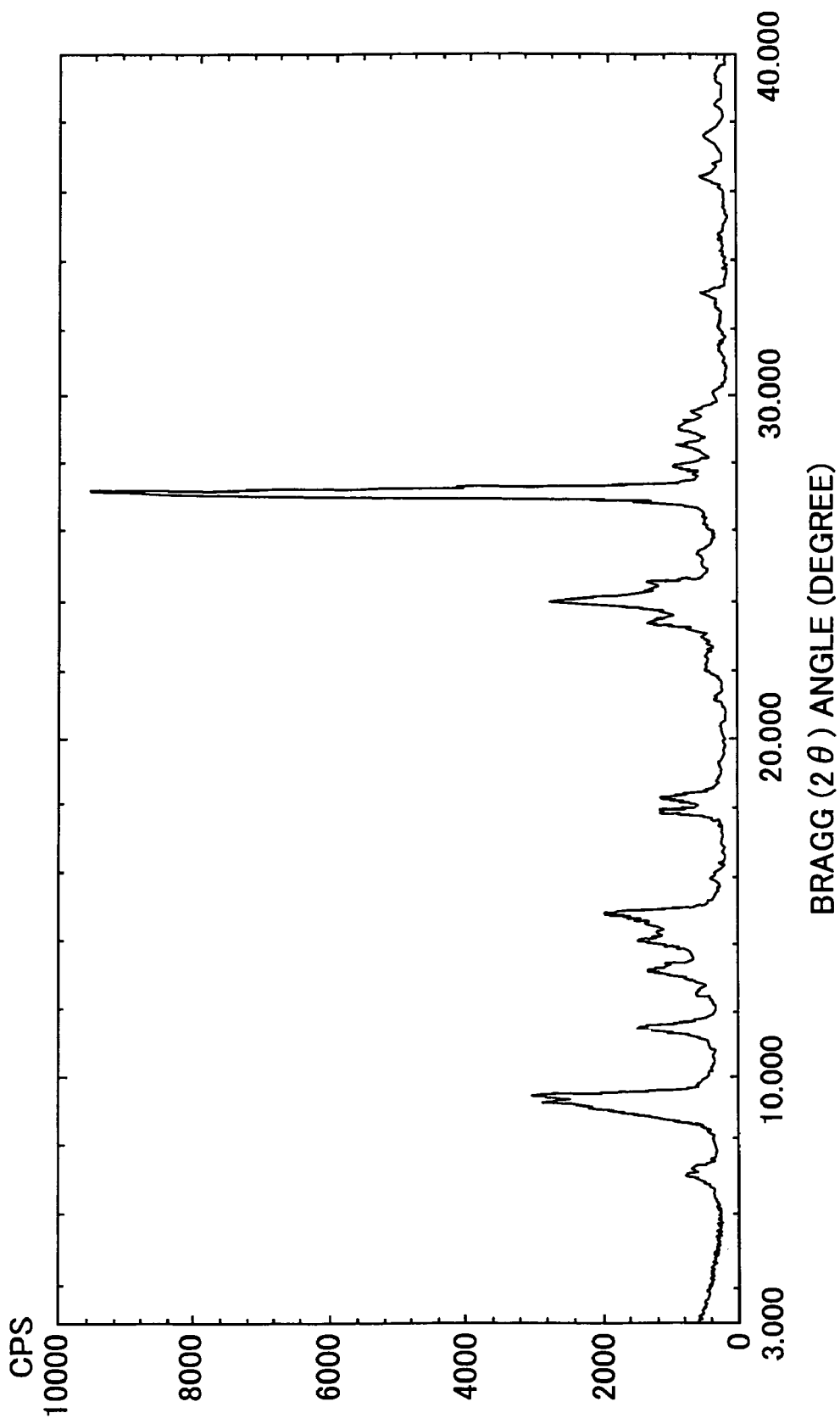
FIG. 18 is the X-ray diffraction spectrum of the pigment prepared in Measurement Example 1.

As can be understood from the spectrum as shown in FIG. 18, two independent peaks are present at 7.3° and 7.5°. Therefore, the peaks are different from the other. In contrast, in the spectrum as shown in FIG. 19, only one lowest angle peak is present at 7.5°, namely the spectrum as shown in FIG. 19 is clearly different from the spectrum as shown in FIG. 18. Therefore, the lowest angle peak (7.3°) of the TiOPc crystal of the present invention is clearly different from the lowest angle peak (7.5°) of the conventional TiOPc crystal.

This document claims priority and contains subject matter related to Japanese Patent Applications Nos. 2005-007847 and 2004-367655, filed on Jan. 14, 2005, and Dec. 20, 2004, respectively, incorporated herein by reference.

Having now fully described the invention, it will be apparent to one of ordinary skill in the art that many changes and modifications can be made thereto without departing from the spirit and scope of the invention as set forth therein.

What is claimed as new and desired to be secured by Letters Patent of the United States is:

1. A photoreceptor comprising:
an electroconductive substrate;
a charge blocking layer located overlying the substrate;
a moiré preventing layer located overlying the charge blocking layer; and
a photosensitive layer located overlying the moiré preventing layer,
wherein the charge blocking layer is formed by a method comprising:
coating a coating liquid comprising an N-alkoxymethylated nylon and a solvent, wherein the N-alkoxymethylated nylon includes one or more ions in an amount of from 200 to 500 ppm based on a weight of the N-alkoxymethylated nylon, overlying the substrate; and
drying the coated liquid to form the charge blocking layer.

2. The photoreceptor according to claim 1, wherein the charge blocking layer has a thickness of not less than 0.1 μm and less than 2.0 μm.

3. The photoreceptor according to claim 1, wherein the moiré preventing layer comprises a binder resin and an inorganic pigment, wherein a volume ratio of the inorganic pigment to the binder resin is from 1/1 to 3/1.

4. The photoreceptor according to claim 3, wherein the binder resin comprises a thermally crosslinked resin.

5. The photoreceptor according to claim 3, wherein the inorganic pigment comprises titanium oxide.

6. The photoreceptor according to claim 1, wherein the photosensitive layer comprises a charge generation layer and a charge transport layer, and wherein the charge generation layer comprises a titanyl phthalocyanine.

7. The photoreceptor according to claim 6, wherein the titanyl phthalocyanine is a titanyl phthalocyanine crystal having an average primary particle diameter not greater than 0.25 μm and an X-ray diffraction spectrum such that a maximum peak is observed at a Bragg (2θ) angle of 27.2°±0.2°; a peak is observed at each of Bragg (2θ) angles of 9.4°±0.2°, 9.6°±0.2° and 24.0°±0.2°; a lowest angle peak is observed at an angle of 7.3°±0.2°; no peak is observed between the lowest angle peak and the 9.4° peak; and no peak is observed at a Bragg (2θ) angle of 26.3°±0.2°, when a Cu—Kα X-ray having a wavelength of 1.542 Å is used.

8. The photoreceptor according to claim 6, wherein the charge generation layer is prepared using a coating liquid prepared by a method comprising:

dispersing the titanyl phthalocyanine crystal in a solvent such that the titanyl phthalocyanine crystal therein has a particle diameter distribution such that an average particle diameter is not greater than 10.3 µm and a standard deviation is not greater than 0.2 µm to prepare a dispersion; and filtering the dispersion using a filter having an effective pore diameter of not greater than 3 µM.

9. The photoreceptor according to claim 8, wherein the titanyl phthalocyanine crystal is prepared by a method comprising:

providing a titanyl phthalocyanine pigment having an amorphous state or a low crystallinity, which has an average particle diameter not greater than 0.1 µm and has a second X-ray diffraction spectrum such that a maximum peak having a half width not less than 1° is observed at a Bragg (2θ) angle of from 7.0° to 7.5° with a tolerance of ±0.2°;

changing the crystal form of the titanyl phthalocyanine having an amorphous state or a low crystallinity in an organic solvent in the presence of water so that the resultant titanyl phthalocyanine crystal has an X-ray diffraction spectrum such that a maximum peak is observed at a Bragg (2θ) angle of 27.2°±0.2°; a peak is observed at each of Bragg (2θ) angles of 9.4°±0.2°, 9.6±0.2° and 24.0±0.2°; a lowest angle peak is observed at an angle of 7.3°±0.2°; no peak is observed between the lowest angle peak and the 9.4° peak; and no peak is observed at a Bragg (2θ) angle of 26.3°±0.2°, when a Cu—K α X-ray having a wavelength of 1.542 Å is used; and filtering the dispersion including the titanyl phthalocyanine crystal before the average primary particle diameter thereof exceeds 0.25 µm, to prepare the titanyl phthalocyanine crystal.

10. The photoreceptor according to claim 9, wherein the titanyl phthalocyanine having an amorphous state or a low crystallinity is prepared by an acid paste method, and then washed using ion-exchanged water to an extent such that the ion-exchange water used for washing has a pH of from 6 to 8 and/or a specific conductivity not greater than 8 µS/cm after the washing.

11. The photoreceptor according to claim 9, wherein an amount of the organic solvent is not less than 30 times that of the titanyl phthalocyanine having an amorphous state or a low crystallinity.

12. The photoreceptor according to claim 7, wherein the titanyl phthalocyanine crystal is synthesized using raw materials including no halogen atom.

13. The photoreceptor according to claim 1, further comprising a protective layer located overlying the photosensitive layer.

14. The photoreceptor according to claim 13, wherein the protective layer comprises an inorganic pigment having a resistivity not less than $10^{10}$ Ω·cm.

15. The photoreceptor according to claim 13, wherein the protective layer comprises a crosslinked resin.

16. The photoreceptor according to claim 15, wherein the crosslinked resin is prepared by reacting and crosslinking a radical polymerizable polyfunctional monomer having three or more functional groups and no charge transport structure and a radical polymerizable monofunctional monomer having a charge transport structure.

17. A photoreceptor comprising:
an electroconductive substrate;
a charge blocking layer located overlying the substrate;
a moiré preventing layer located overlying the charge blocking layer; and
a photosensitive layer located overlying the moiré preventing layer,
wherein the charge blocking layer is formed by a method comprising:
coating a coating liquid overlying the substrate; and
drying the coated liquid to form the charge blocking layer, wherein the coating liquid comprises an N-alkoxymethylated nylon, wherein the N-alkoxymethylated nylon comprises one or more alkylamines in an amount of from 15 to 100 ppm based on a weight of the N-alkoxymethylated nylon.

18. The photoreceptor according to claim 17, wherein the one or more alkylamines include a primary alkylamine.

19. The photoreceptor according to claim 17, wherein the charge blocking layer has a thickness of not less than 0.1 pm and less than 2.0 p.m.

20. The photoreceptor according to claim 17, wherein the moiré preventing layer comprises a binder resin and an inorganic pigment, wherein a volume ratio of the inorganic pigment to the binder resin is from 1/1 to 3/1.

21. The photoreceptor according to claim 20, wherein the binder resin comprises a thermally crosslinked resin.

22. The photoreceptor according to claim 20, wherein the inorganic pigment comprises titanium oxide.

23. The photoreceptor according to claim 19, wherein the photosensitive layer comprises a charge generation layer and a charge transport layer, and wherein the charge generation layer comprises a titanyl phthalocyanine.

24. The photoreceptor according to claim 23, wherein the titanyl phthalocyanine is a titanyl phthalocyanine crystal having an average primary particle diameter of not greater than 0.25 µm and an X-ray diffraction spectrum such that a maximum peak is observed at a Bragg (2θ) angle of 27.2°±0.2°; a peak is observed at each of Bragg (2θ) angles of 9.4°±0.2°, 9.6±0.2° and 24.0±0.2°; a lowest angle peak is observed at an angle of 7.3°±0.2°; no peak is observed between the lowest angle peak and the 9.4° peak; and no peak is observed at a Bragg (2θ) angle of 26.30 ±0.2°, when a Cu—Kα X-ray having a wavelength of 1.542 Å is used.

25. The photoreceptor according to claim 23, wherein the charge generation layer is prepared using a coating liquid prepared by a method comprising:
dispersing the titanyl phthalocyanine crystal in a solvent such that the titanyl phthalocyanine crystal therein has a particle diameter distribution such that an average particle diameter is not greater than 0.3 µm and a standard deviation is not greater than 0.2 µm to prepare a dispersion; and
filtering the dispersion using a filter having an effective pore diameter not greater than 3 µm.

26. The photoreceptor according to claim 24, wherein the titanyl phthalocyanine crystal is prepared by a method comprising:
providing a titanyl phthalocyanine pigment having an amorphous state or a low crystallinity, which has an average particle diameter not greater than 0.1 µm and has a second X-ray diffraction spectrum such that a maximum peak having a half width not less than 1 ° is observed at a Bragg (2θ) angle of from 7.0 ° to 7.5 ° with a tolerance of ±0.2 °;

changing the crystal form of the titanyl phthalocyanine having an amorphous state or a low crystallinity in an organic solvent in the presence of water so that the resultant titanyl phthalocyanine crystal has an X-ray diffraction spectrum such that a maximum peak is observed at a Bragg (2θ) angle of 27.2° ± 0.2°; a peak is observed at each of Bragg (2θ) angles of 9.4° ± 0.2°, 9.6± 0.2° and 24.0±0.2°; a lowest angle peak is observed at an angle of 7.3° ±0.2°; no peak is observed between the lowest angle peak and the 9.4° peak; and no peak is observed at a Bragg (2θ) angle of 26.3° ±0.2°, when a Cu-Ka X-ray having a wavelength of 1.542Å is used; and filtering the dispersion including the titanyl phthalocyanine crystal before the average primary particle diameter thereof exceeds 0.25 μm, to prepare the titanyl phthalocyanine crystal.

27. The photoreceptor according to claim 26, wherein the titanyl phthalocyanine having an amorphous state or a low crystallinity is prepared by an acid paste method, and then washed using ion-exchanged water to an extent such that the ion-exchange water used for washing have a pH of from 6 to 8 and/or a specific conductivity not greater than 8μS/cm after the washing.

28. The photoreceptor according to claim 26, wherein an amount of the organic solvent is not less than 30 times that of the titanyl phthalocyanine having an amorphous state or a low crystallinity.

29. The photoreceptor according to claim 24, wherein the titanyl phthalocyanine crystal is synthesized using raw materials including no halogen atom.

30. The photoreceptor according to claim 17, further comprising a protective layer located overlying the photosensitive layer.

31. The photoreceptor according to claim 30, wherein the protective layer comprises an inorganic pigment having a resistivity not less than $10^{10}$ Ω·cm.

32. The photoreceptor according to claim 30, wherein the protective layer comprises a crosslinked resin.

33. The photoreceptor according to claim 32, wherein the crosslinked resin is prepared by reacting and crosslinking a radical polymerizable polyfunctional monomer having three or more functional groups and no charge transport structure and a radical polymerizable monofunctional monomer having a charge transport structure.

* * * * *